United States Patent
Ikeda et al.

(10) Patent No.: US 8,705,935 B2
(45) Date of Patent: *Apr. 22, 2014

(54) RECORDING MEDIUM, PLAYBACK DEVICE, INTEGRATED CIRCUIT

(75) Inventors: Wataru Ikeda, Osaka (JP); Tomoki Ogawa, Osaka (JP); Taiji Sasaki, Osaka (JP); Hiroshi Yahata, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/558,779

(22) Filed: Jul. 26, 2012

(65) Prior Publication Data

US 2012/0287127 A1   Nov. 15, 2012

Related U.S. Application Data

(60) Division of application No. 12/907,323, filed on Oct. 19, 2010, which is a continuation of application No. PCT/JP2010/000913, filed on Feb. 15, 2010.

(30) Foreign Application Priority Data

Feb. 19, 2009 (JP) ................................ 2009-037225
Mar. 18, 2009 (JP) ................................ 2009-066885

(51) Int. Cl.
H04N 5/92 (2006.01)

(52) U.S. Cl.
USPC ........................... 386/244; 386/248; 345/419

(58) Field of Classification Search
USPC .................... 386/244, 248; 345/419
See application file for complete search history.

(56) References Cited

U.S. PATENT DOCUMENTS

| 5,923,869 | A  | 7/1999  | Kashiwagi et al. |
| 6,052,100 | A  | 4/2000  | Soltan et al. |
| 6,393,574 | B1 | 5/2002  | Kashiwagi et al. |
| 6,470,460 | B1 | 10/2002 | Kashiwagi et al. |
| 6,484,266 | B2 | 11/2002 | Kashiwagi et al. |
| 6,502,198 | B2 | 12/2002 | Kashiwagi et al. |
| 6,502,199 | B2 | 12/2002 | Kashiwagi et al. |

(Continued)

FOREIGN PATENT DOCUMENTS

| CN | 1926857 | 3/2007 |
| CN | 1934873 | 3/2007 |

(Continued)

OTHER PUBLICATIONS

Supplementary European Search Report issued Oct. 8, 2012 in corresponding European Application No. 10743541.4.

(Continued)

Primary Examiner — Thai Tran
Assistant Examiner — Jose Mesa
(74) Attorney, Agent, or Firm — Wenderoth, Lind & Ponack, L.L.P.

(57) ABSTRACT

A base-view video stream and a dependent-view video stream are recorded on a BD-ROM. The base-view video stream includes picture data constituting a base view of a stereoscopic image. The dependent-view video stream includes offset metadata and picture data constituting a dependent view of the stereoscopic image. The offset metadata includes an offset sequence that defines an offset control of a plane memory when a graphics to be overlaid with the picture data is played back in a one-plane offset mode.

4 Claims, 104 Drawing Sheets

(56) References Cited

U.S. PATENT DOCUMENTS

| | | |
|---|---|---|
| 6,502,200 B2 | 12/2002 | Kashiwagi et al. |
| 6,516,138 B2 | 2/2003 | Kashiwagi et al. |
| 6,516,139 B2 | 2/2003 | Kashiwagi et al. |
| 6,519,414 B2 | 2/2003 | Kashiwagi et al. |
| 6,526,226 B2 | 2/2003 | Kashiwagi et al. |
| 6,546,195 B2 | 4/2003 | Kashiwagi et al. |
| 6,573,819 B1 | 6/2003 | Oshima et al. |
| 6,574,423 B1 | 6/2003 | Oshima et al. |
| 6,907,190 B2 | 6/2005 | Kashiwagi et al. |
| 6,925,250 B1 | 8/2005 | Oshima et al. |
| 6,954,584 B2 | 10/2005 | Kashiwagi et al. |
| 6,956,964 B2 | 10/2005 | Lee et al. |
| 7,194,194 B2 | 3/2007 | Kashiwagi et al. |
| 7,317,868 B2 | 1/2008 | Oshima et al. |
| 7,747,145 B2 | 6/2010 | Oshima et al. |
| 2001/0053281 A1 | 12/2001 | Kashiwagi et al. |
| 2001/0055474 A1 | 12/2001 | Kashiwagi et al. |
| 2002/0001454 A1 | 1/2002 | Kashiwagi et al. |
| 2002/0001455 A1 | 1/2002 | Kashiwagi et al. |
| 2002/0003944 A1 | 1/2002 | Kashiwagi et al. |
| 2002/0003945 A1 | 1/2002 | Kashiwagi et al. |
| 2002/0003950 A1 | 1/2002 | Kashiwagi et al. |
| 2002/0003951 A1 | 1/2002 | Kashiwagi et al. |
| 2002/0025143 A1 | 2/2002 | Kashiwagi et al. |
| 2003/0053797 A1 | 3/2003 | Oshima et al. |
| 2003/0108341 A1 | 6/2003 | Oshima et al. |
| 2003/0138238 A1 | 7/2003 | Kashiwagi et al. |
| 2004/0175133 A1 | 9/2004 | Kashiwagi et al. |
| 2004/0179820 A1 | 9/2004 | Kashiwagi et al. |
| 2005/0180735 A1 | 8/2005 | Oshima et al. |
| 2005/0248561 A1 | 11/2005 | Ito et al. |
| 2006/0078301 A1 | 4/2006 | Ikeda et al. |
| 2006/0176295 A1 | 8/2006 | Toho et al. |
| 2007/0002041 A1 | 1/2007 | Kim et al. |
| 2007/0274676 A1 | 11/2007 | Diomelli et al. |
| 2007/0286576 A1 | 12/2007 | Ikeda et al. |
| 2008/0008450 A1 | 1/2008 | Ikeda et al. |
| 2008/0008451 A1 | 1/2008 | Ikeda et al. |
| 2008/0018731 A1 | 1/2008 | Era |
| 2008/0025697 A1 | 1/2008 | Ikeda et al. |
| 2008/0031599 A1 | 2/2008 | Ikeda et al. |
| 2008/0056686 A1* | 3/2008 | Oshima et al. ............. 386/126 |
| 2008/0063385 A1 | 3/2008 | Oshima et al. |
| 2008/0063386 A1 | 3/2008 | Oshima et al. |
| 2008/0101767 A1 | 5/2008 | Oshima et al. |
| 2008/0232772 A1 | 9/2008 | Ikeda et al. |
| 2008/0232773 A1 | 9/2008 | Ikeda et al. |
| 2008/0232774 A1 | 9/2008 | Ikeda et al. |
| 2008/0292287 A1 | 11/2008 | Oshima et al. |
| 2009/0142041 A1 | 6/2009 | Nagasawa et al. |
| 2009/0220215 A1 | 9/2009 | Oshima et al. |
| 2009/0252483 A1 | 10/2009 | Oshima et al. |
| 2010/0020158 A1 | 1/2010 | Oshima et al. |
| 2010/0046912 A1 | 2/2010 | Ikeda et al. |
| 2010/0074594 A1 | 3/2010 | Nakamura et al. |
| 2010/0091012 A1* | 4/2010 | Newton et al. ............. 345/419 |
| 2010/0098389 A1 | 4/2010 | Shimada |
| 2010/0111503 A1 | 5/2010 | Oshima et al. |
| 2010/0119213 A1 | 5/2010 | Oshima et al. |
| 2011/0064374 A1 | 3/2011 | Ikeda et al. |
| 2011/0064382 A1 | 3/2011 | Ikeda et al. |

FOREIGN PATENT DOCUMENTS

| | | |
|---|---|---|
| CN | 1981342 | 6/2007 |
| CN | 101299345 | 11/2008 |
| EP | 1 501 316 | 1/2005 |
| EP | 1 863 032 | 12/2007 |
| JP | 10-234058 | 9/1998 |
| JP | 11-289555 | 10/1999 |
| JP | 2004-104742 | 4/2004 |
| JP | 2004-274125 | 9/2004 |
| JP | 3935507 | 3/2007 |
| JP | 2007-166651 | 6/2007 |
| JP | 2008-244835 | 10/2008 |
| WO | 2007/126508 | 11/2007 |
| WO | 2008/038205 | 4/2008 |
| WO | 2008/044191 | 4/2008 |
| WO | 2008/114595 | 9/2008 |
| WO | 2010/032399 | 3/2010 |

OTHER PUBLICATIONS

European Search Report issued Oct. 8, 2012 in corresponding European Application No. 12174658.0.
European Search Report issued Oct. 8, 2012 in corresponding European Application No. 12174659.8.
European Search Report issued Oct. 8, 2012 in corresponding European Application No. 12174660.6.
European Search Report issued Oct. 8, 2012 in corresponding European Application No. 12174662.2.
European Office Action issued Oct. 17, 2012 in corresponding European Application No. 12174662.2.
European Search Report issued Oct. 8, 2012 in corresponding European Application No. 12174665.5.
International Search Report issued May 18, 2010 in International (PCT) Application No. PCT/JP2010/000913.
USPTO Office Action issued Nov. 9, 2011 in U.S. Appl. No. 12/708,628.
U.S. Office Action issued Mar. 25, 2013 in U.S. Appl. No. 13/558,806.
Office Action issued Jul. 12, 2013 in corresponding Chinese Application No. 201210108098.3 (partial English language translation provided).
Office Action issued Nov. 4, 2013 in corresponding Chinese Application No. 201210264225.9, with partial English language translation.
Office Action issued Nov. 18, 2013 in corresponding European Application No. 12 174 662.2.

* cited by examiner

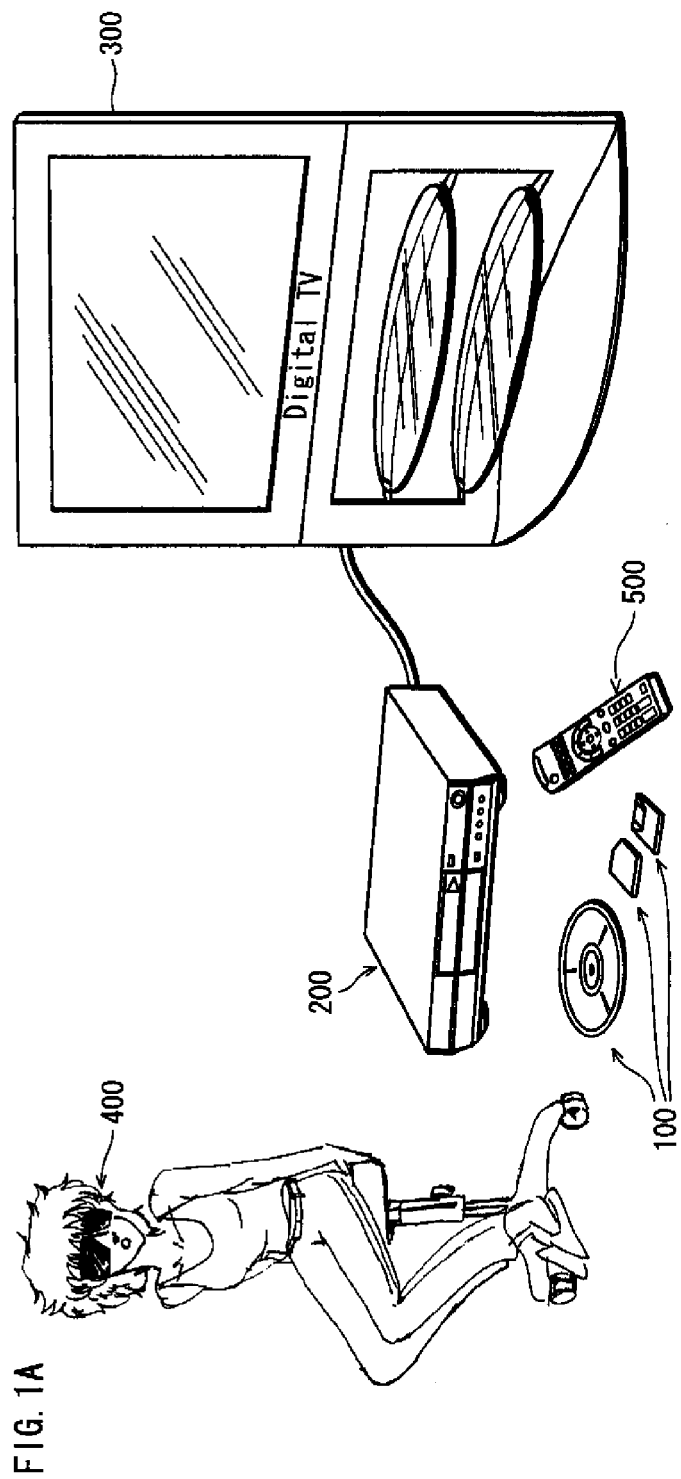
FIG. 1A
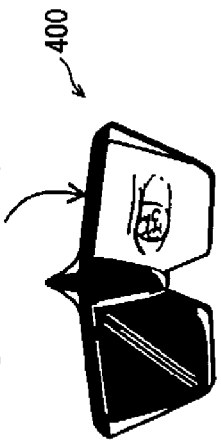
FIG. 1C Viewing with right eye
FIG. 1B Viewing with left eye

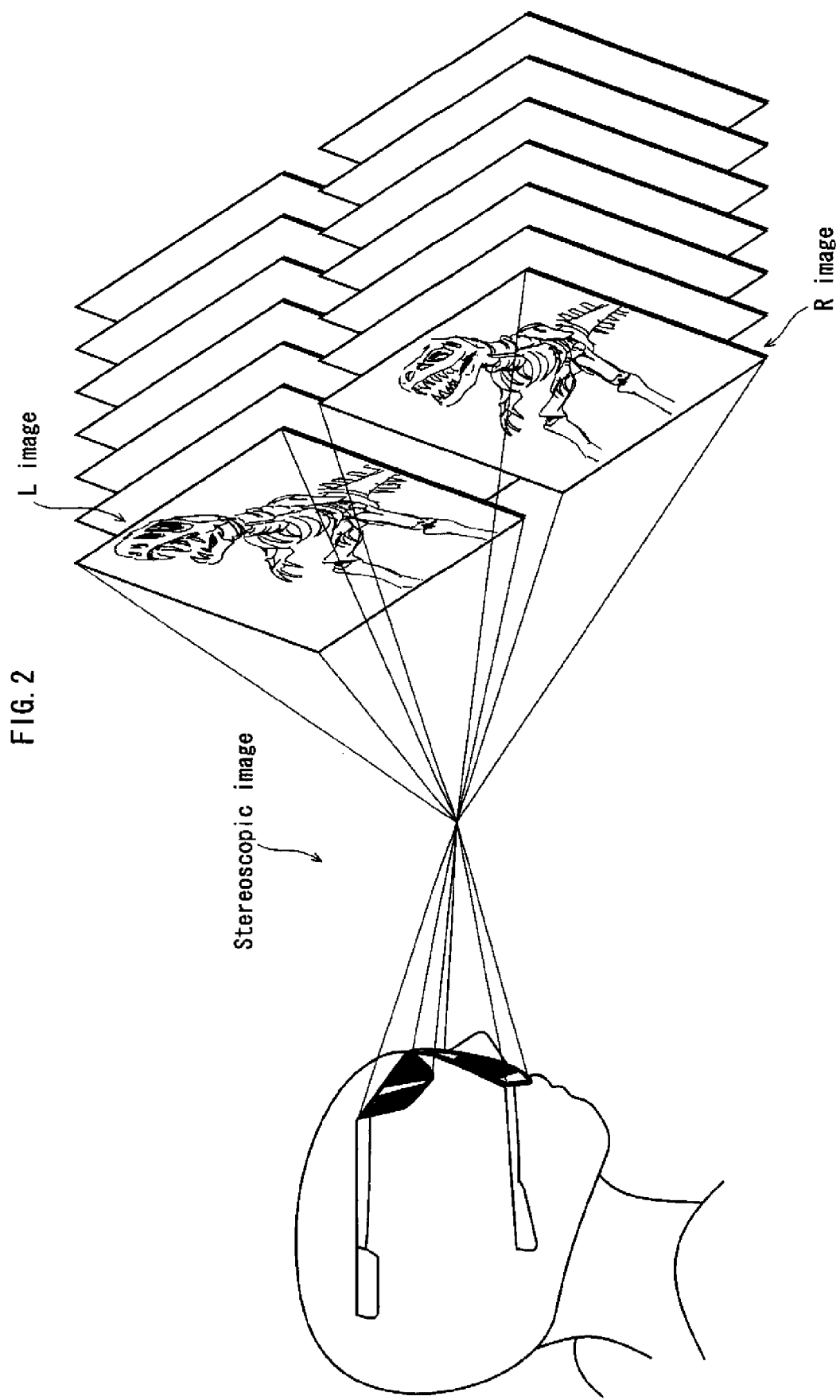

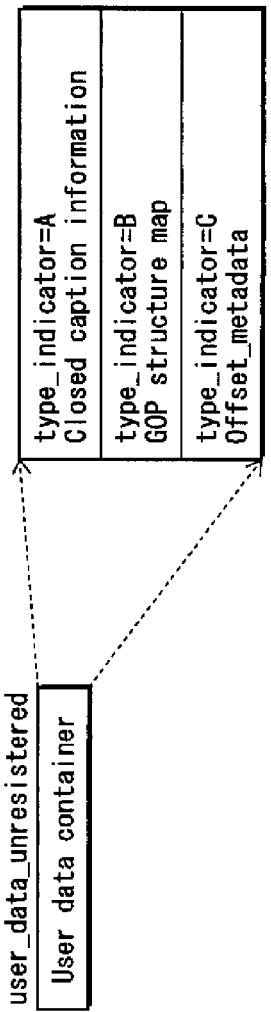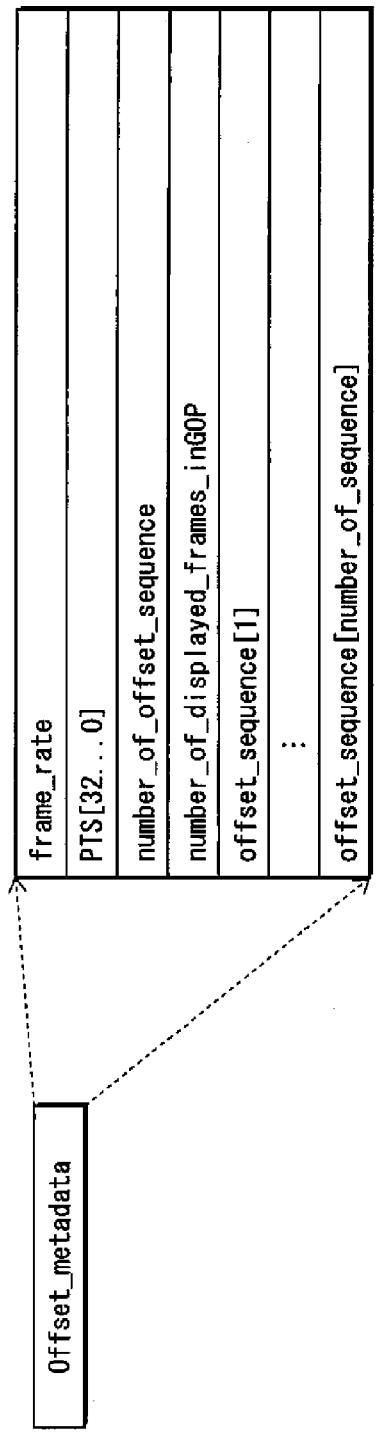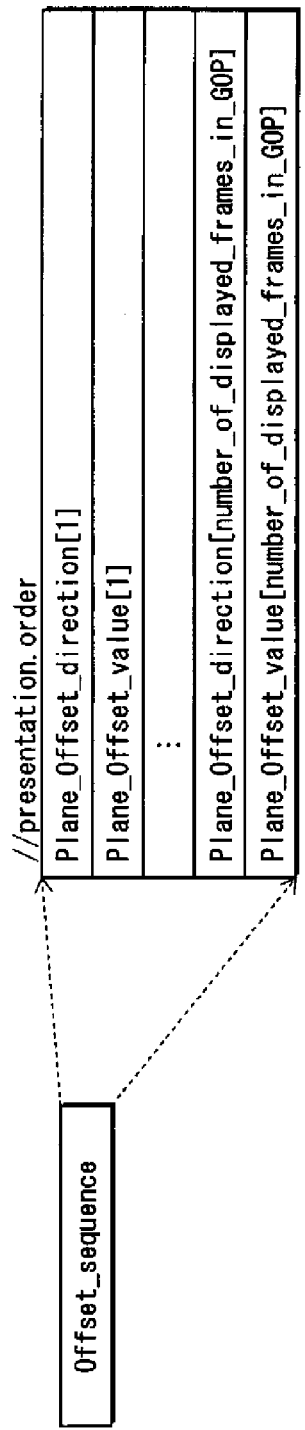

FIG. 9

| Syntax |
|---|
| offset_metadata() { |
|     marker_bit |
|     frame_rate |
|     PTS[32...0] |
|     number_of_offset_sequence |
|     number_of_displayed_frames_in_GOP |
|     marker_bit |
|     for(offset_sequence_id=0; <br>         offset_sequence_id<number_of_offset_sequence; <br>         offset_sequence_id ++) { |
|         offset_sequence() { |
|             for(i=0; i<number_of_displayed_frames_in_GOP; i++) { |
|                 //presentation order |
|                 Plane_offset_direction |
|                 Plane_offset_value |
|             } |
|         } |
|     } |
| } |

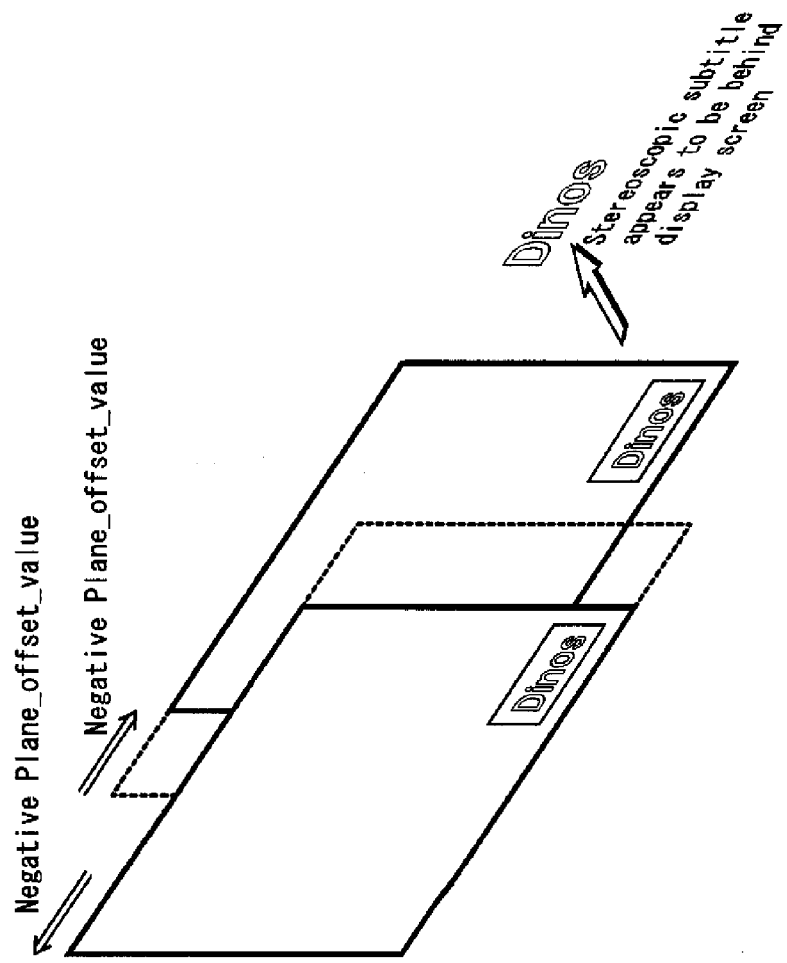
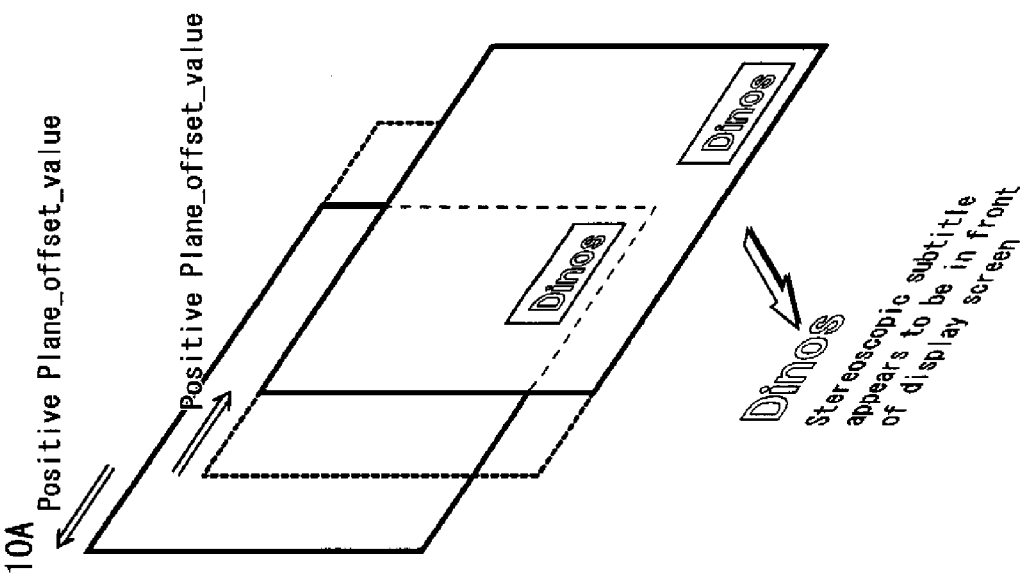

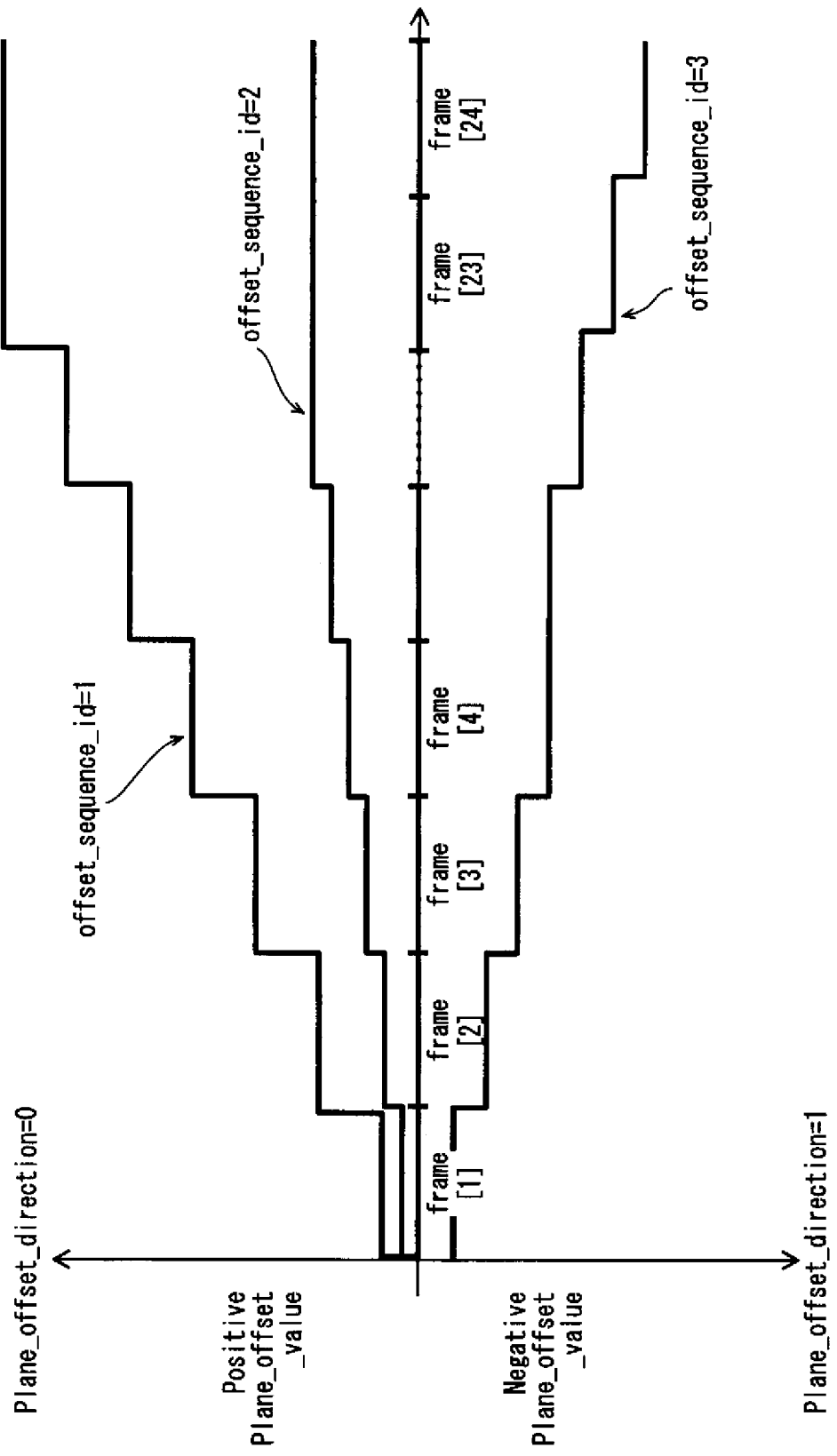

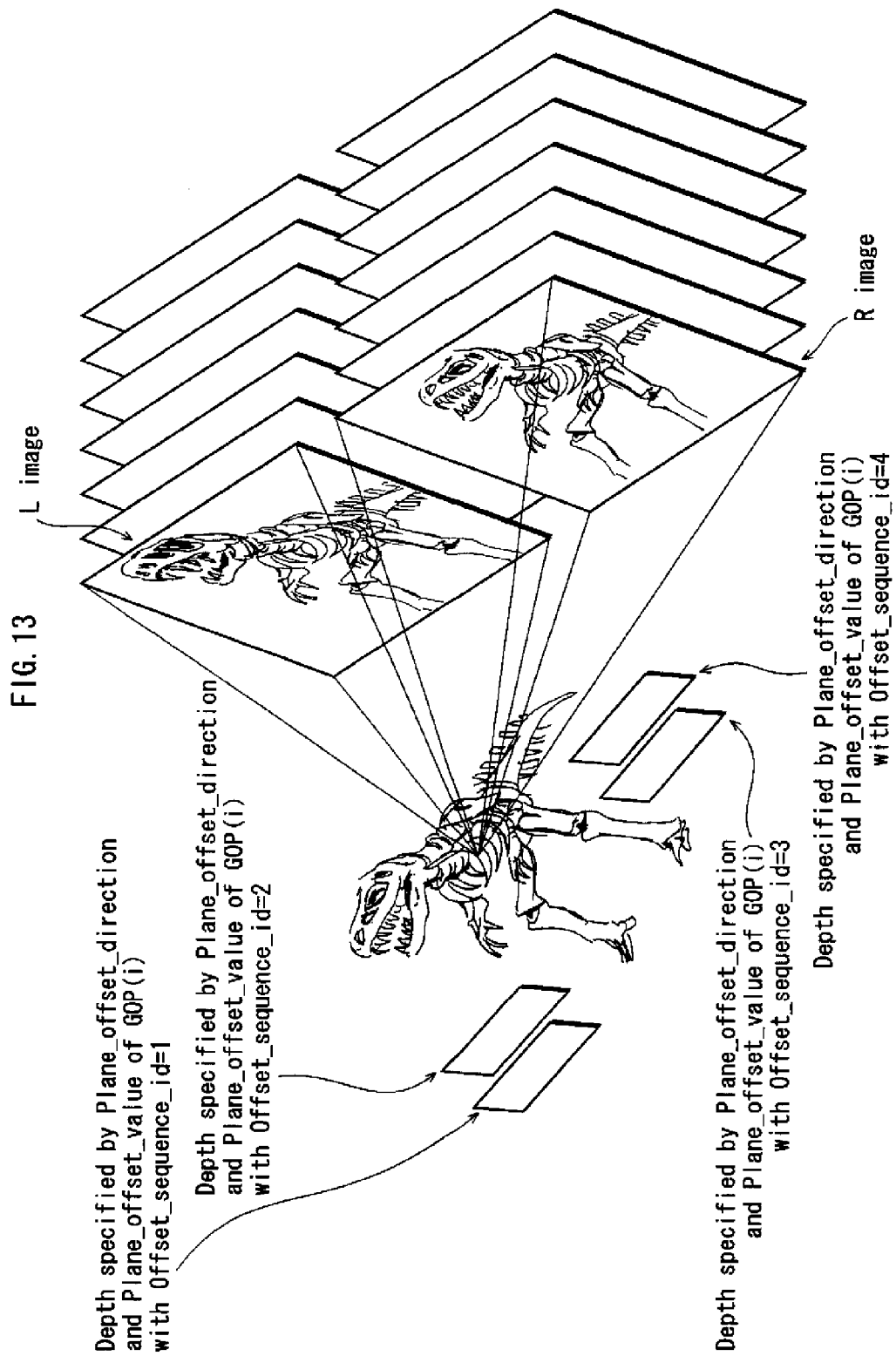

Recording medium

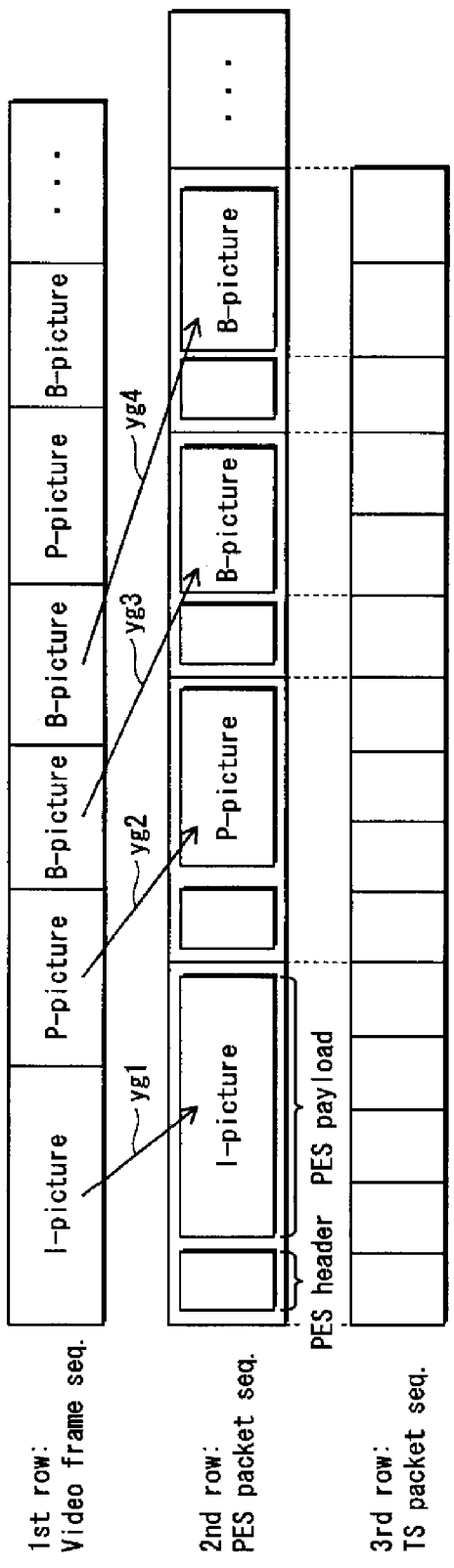
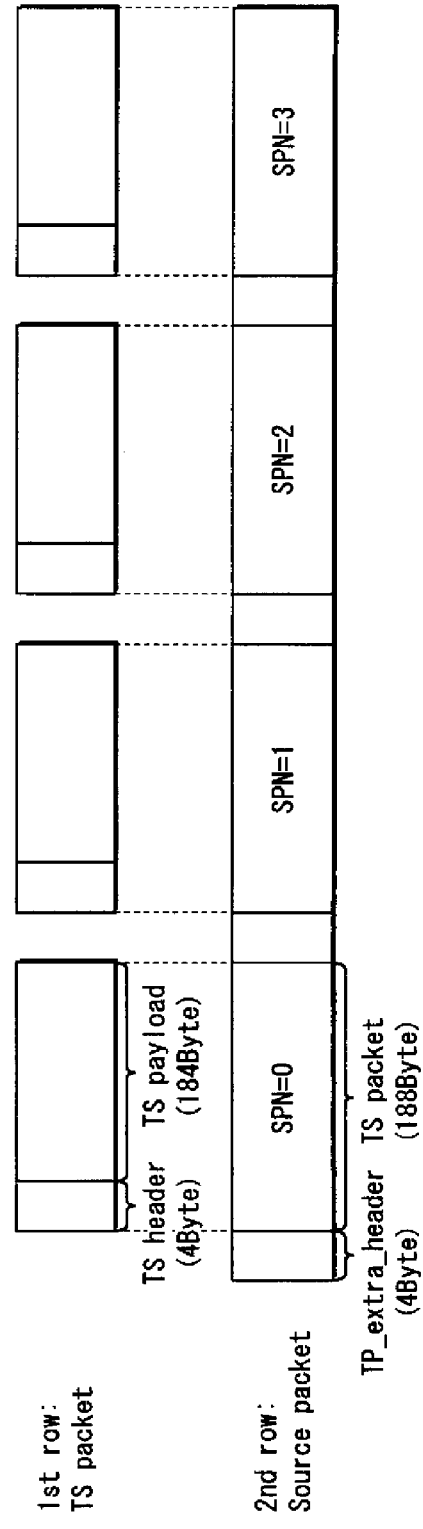
FIG. 15A

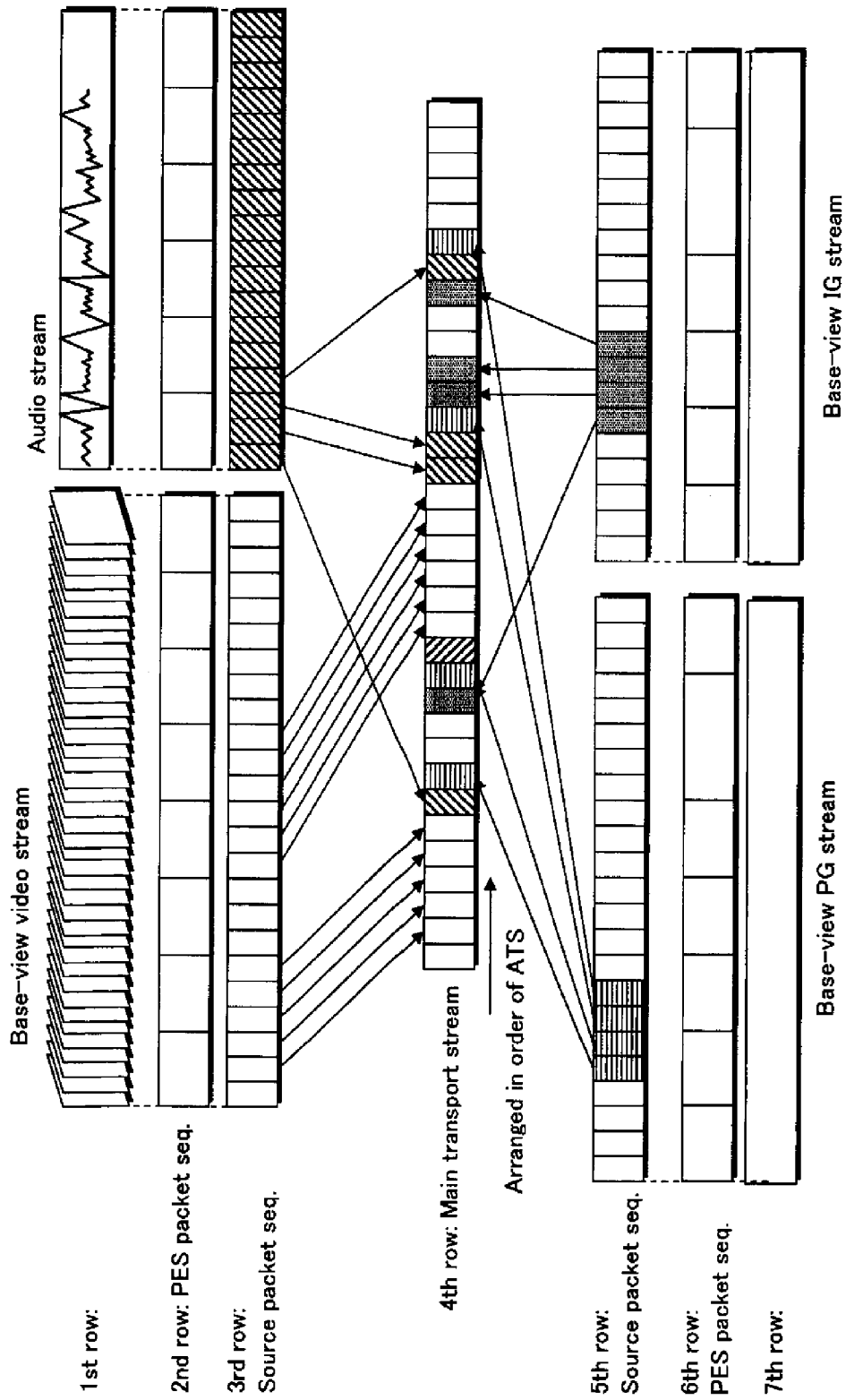

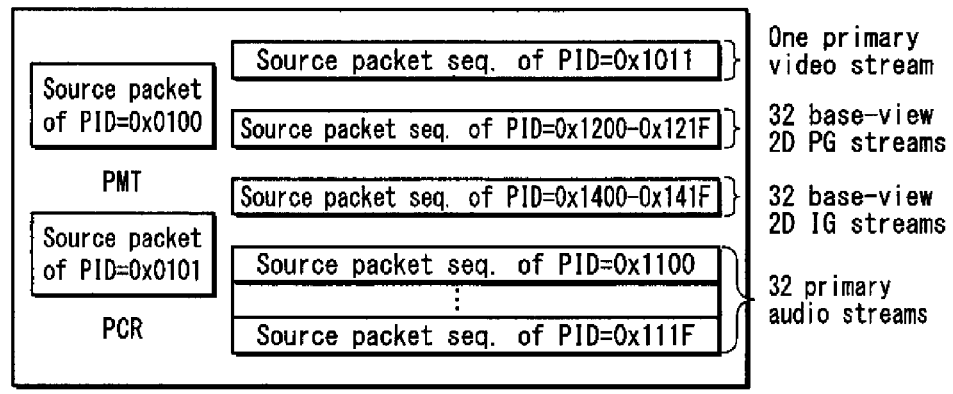
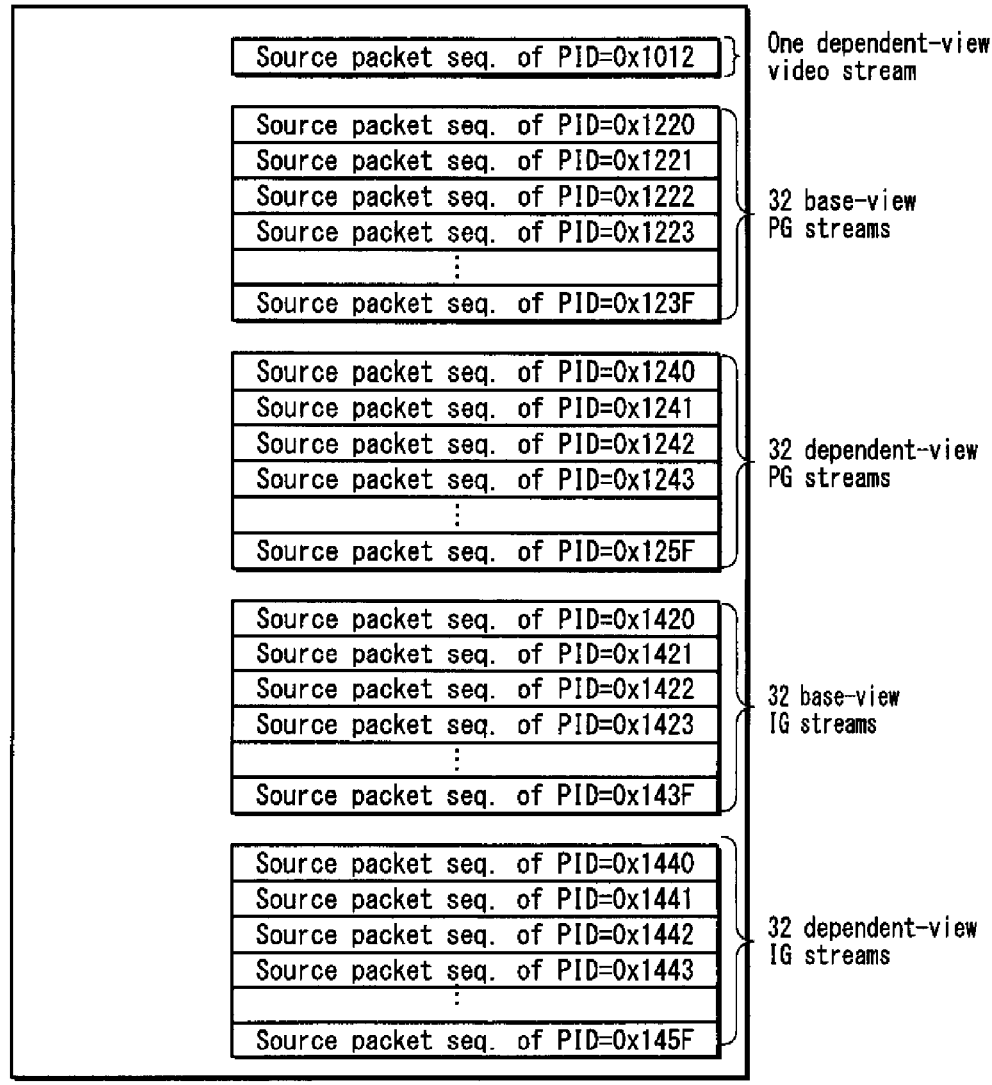

Playlist information

Main playback
section information
(playitem info)

Subjectional playback
section information
(sub-playitem info)

FIG. 20

Extension data

Extension stream selection table (STN_table_SS)

| Length |
| Fixed_offset_during_Popup |
| Dependent-view video stream registration seq. corresponding to playitem #1 |
| PG stream registration seq. corresponding to playitem #1 |
| IG stream registration seq. corresponding to playitem #1 |
| Dependent-view video stream registration seq. corresponding to playitem #2 |
| PG stream registration seq. corresponding to playitem #2 |
| IG stream registration seq. corresponding to playitem #2 |
| ... |
| Dependent-view video stream registration seq. corresponding to playitem #N |
| PG stream registration seq. corresponding to playitem #N |
| IG stream registration seq. corresponding to playitem #N |

Registration seq. corresponding to playitem #1

Registration seq. corresponding to playitem #2

Registration seq. corresponding to playitem #N

N represents the number of playitems in main path

FIG. 21A Dependent-view video stream registration seq.

| Stream No. =1 | Stream_entry | Stream_attribute | number_of_offset_sequence |
|---|---|---|---|

SS_dependent_view_block #1
SS_dependent_view_block #2
...
SS_dependent_view_block #V(x)

FIG. 21B PG stream registration seq.

| Stream No. =1 | PG_text_ST_offset_sequence_id_ref | is_SS_PG | Stream_entry_for_Base_View | Stream_entry_for_Dependent_View | Stream_attribute | SS_PG_text_ST_offset_sequence_id_ref |
|---|---|---|---|---|---|---|

PG stream registration info #1
PG stream registration info #2
...
PG stream registration info #P(x)

FIG. 21C IG stream registration seq.

| Stream No. =1 | IG_offset_sequence_id_ref | IG_Plane_offset_direction_during_BB_video | IG_Plane_offset_value_BB_video | is_SS_IG | Stream_entry_for_base_view | Stream_entry_for_dependent_view | Stream_attributes | SS_IG_offset_sequence_id_ref |
|---|---|---|---|---|---|---|---|---|

IG stream registration info #1
IG stream registration info #2
...
IG stream registration info #I(x)

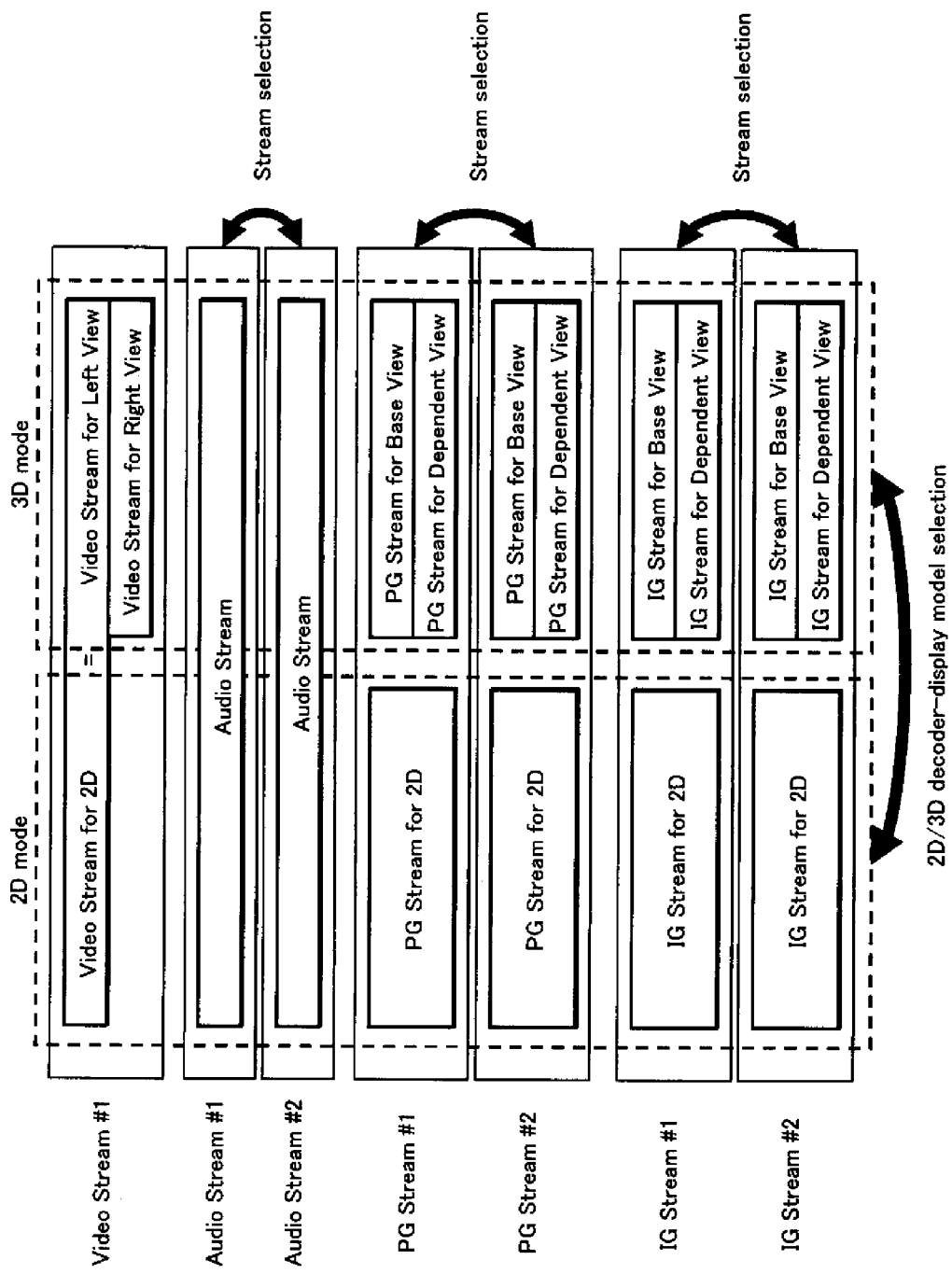

FIG. 25

```
STN_table_SS() {
for (PlayItem_id=0;PlayItem_id<number_of_PlayItems;PlayItem_id++) {
    length
    Fixed_offset_during_PopUp
        for (primary_video_stream_id=0;
            primary_video_stream_id
            <number_of_primary_video_stream_entries;
            primary_video_stream_id ++) {
            SS_dependent_view_block() {
                stream_entry()
                stream_attributes()
                number_of_offset_sequence
            }
        }
        for (PG_textST_stream_id=0;
            PG_textST_stream_id
            <number_of_PG_textST_stream_entries;
            PG_textST_stream_id ++) {
            PG_textST_offset_sequence_id_ref
            is_SS_PG
            if(is_SS_PG==1b) {
                stream_entry_for_base_view()
                stream_entry_for_dependent_view()
                stream_attributes()
                SS_PG_textST_offset_sequence_id_ref
            }
        }
        for (IG_stream_id=0;
            IG_stream_id<number_of_IG_stream_entries;
            IG_stream_id ++) {
            IG_offset_sequence_id_ref
            IG_Plane_offset_direction_during_BB_video
            IG_Plane_offset_value_during_BB_video
            is_SS_IG
            if(is_SS_IG==1b) {
                stream_entry_for_base_view()
                stream_entry_for_dependent_view()
                stream_attributes()
                if(Fixed_offset_during_PopUp==1) {
                }else{
                    SS_IG_offset_sequence_id_ref
                }
            }
        }
    }
}
```

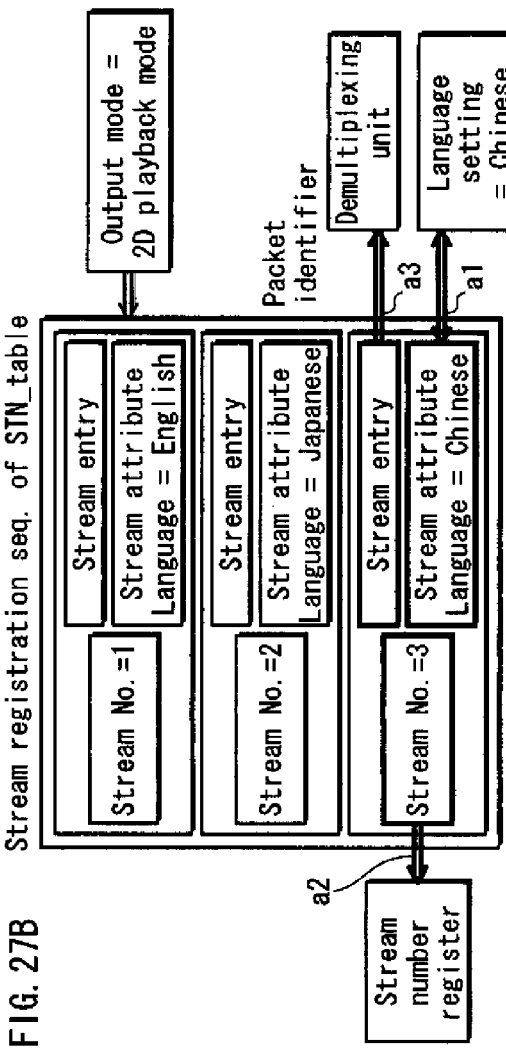
FIG. 27A
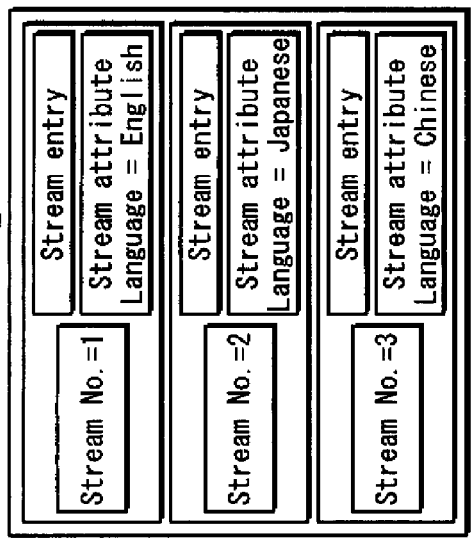
FIG. 27B
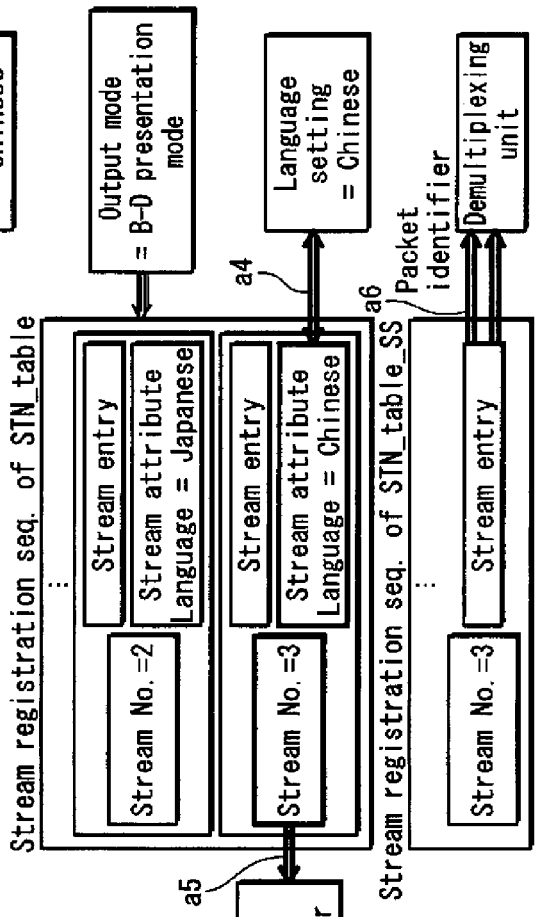
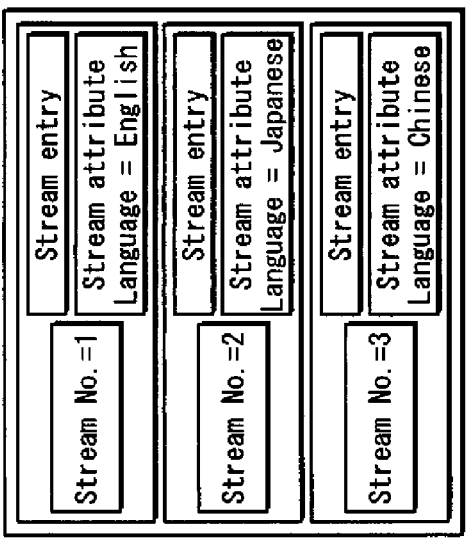
FIG. 27C

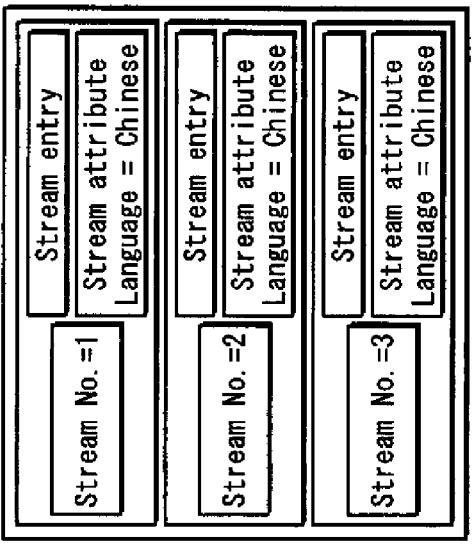

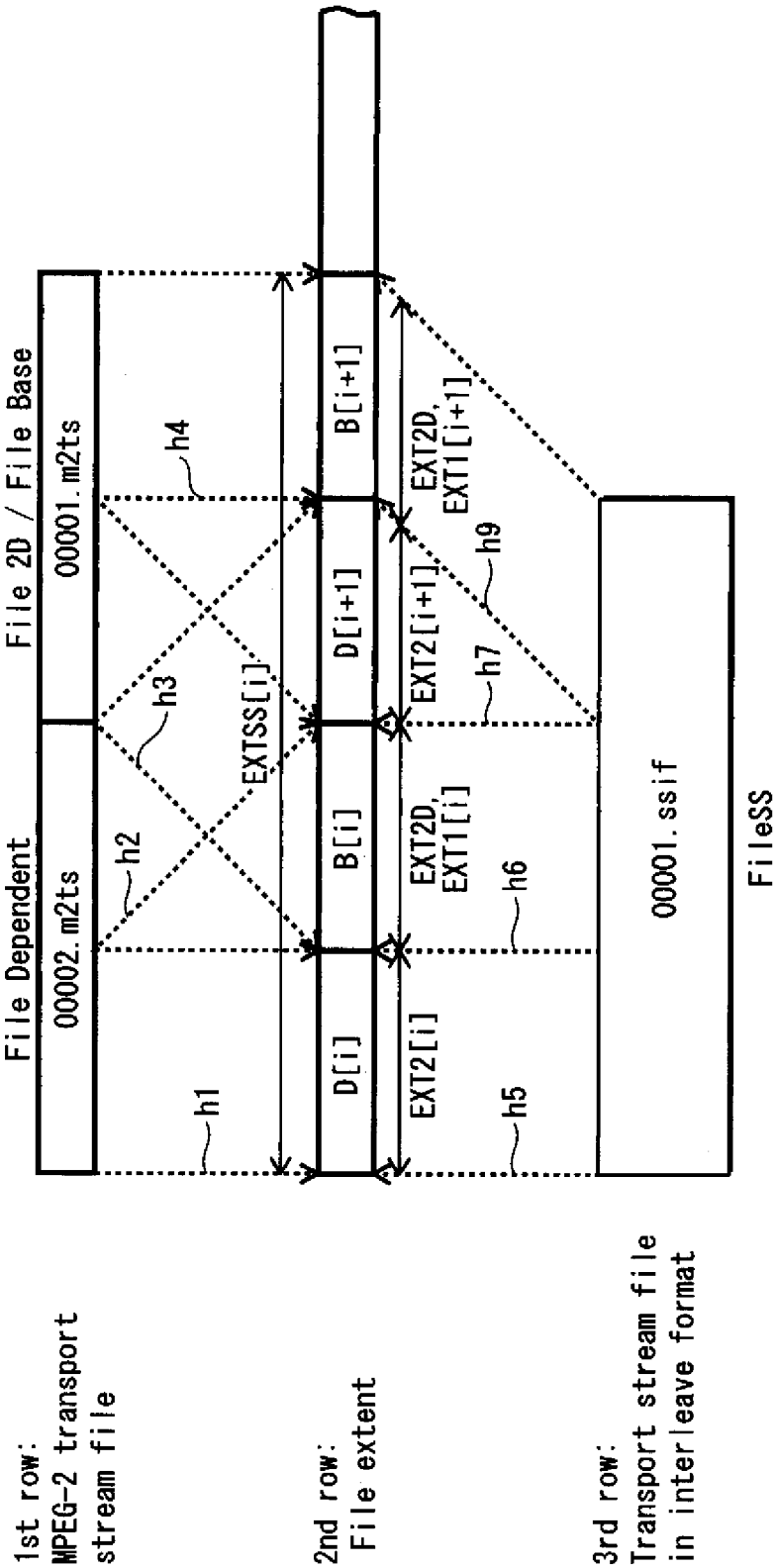

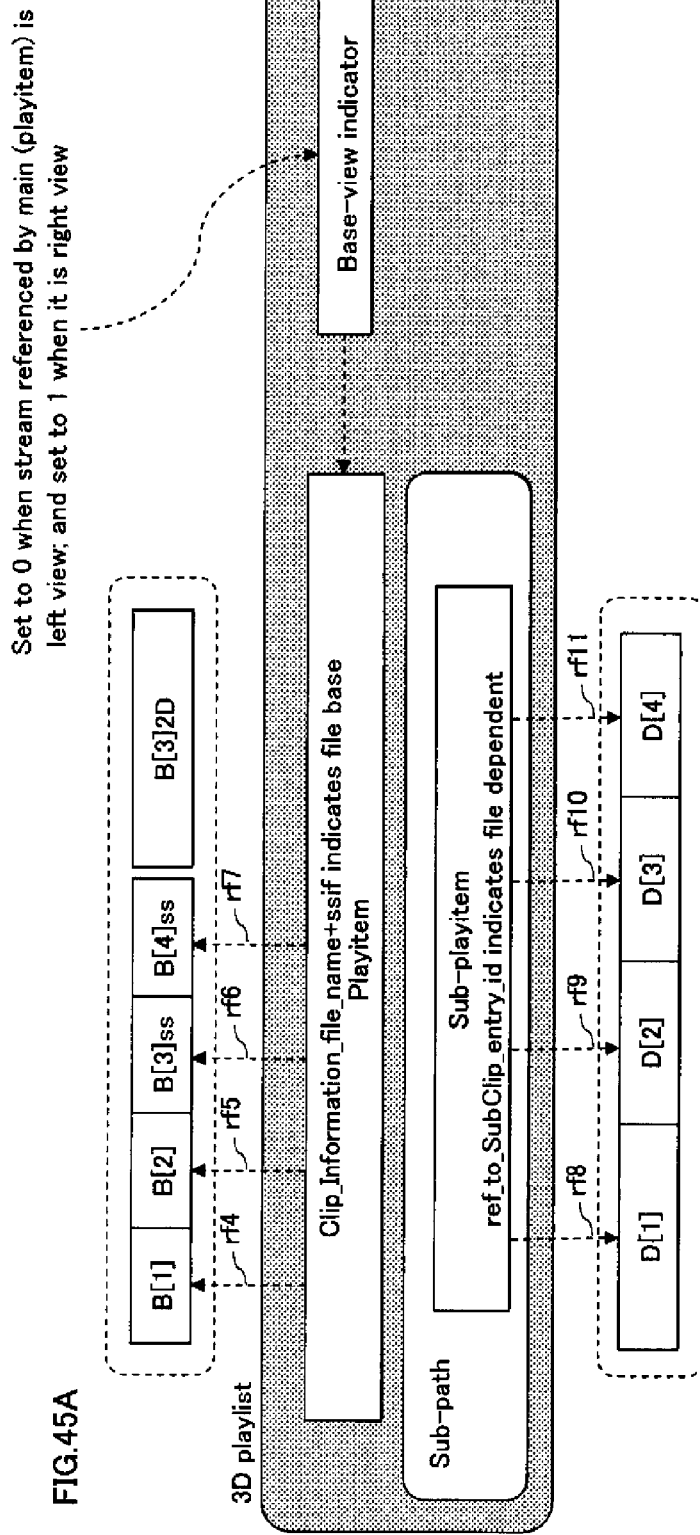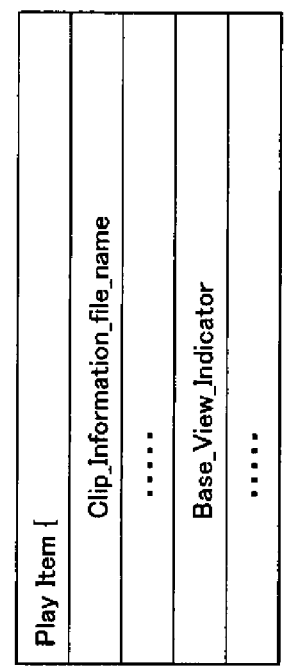
FIG.45A
FIG.45B

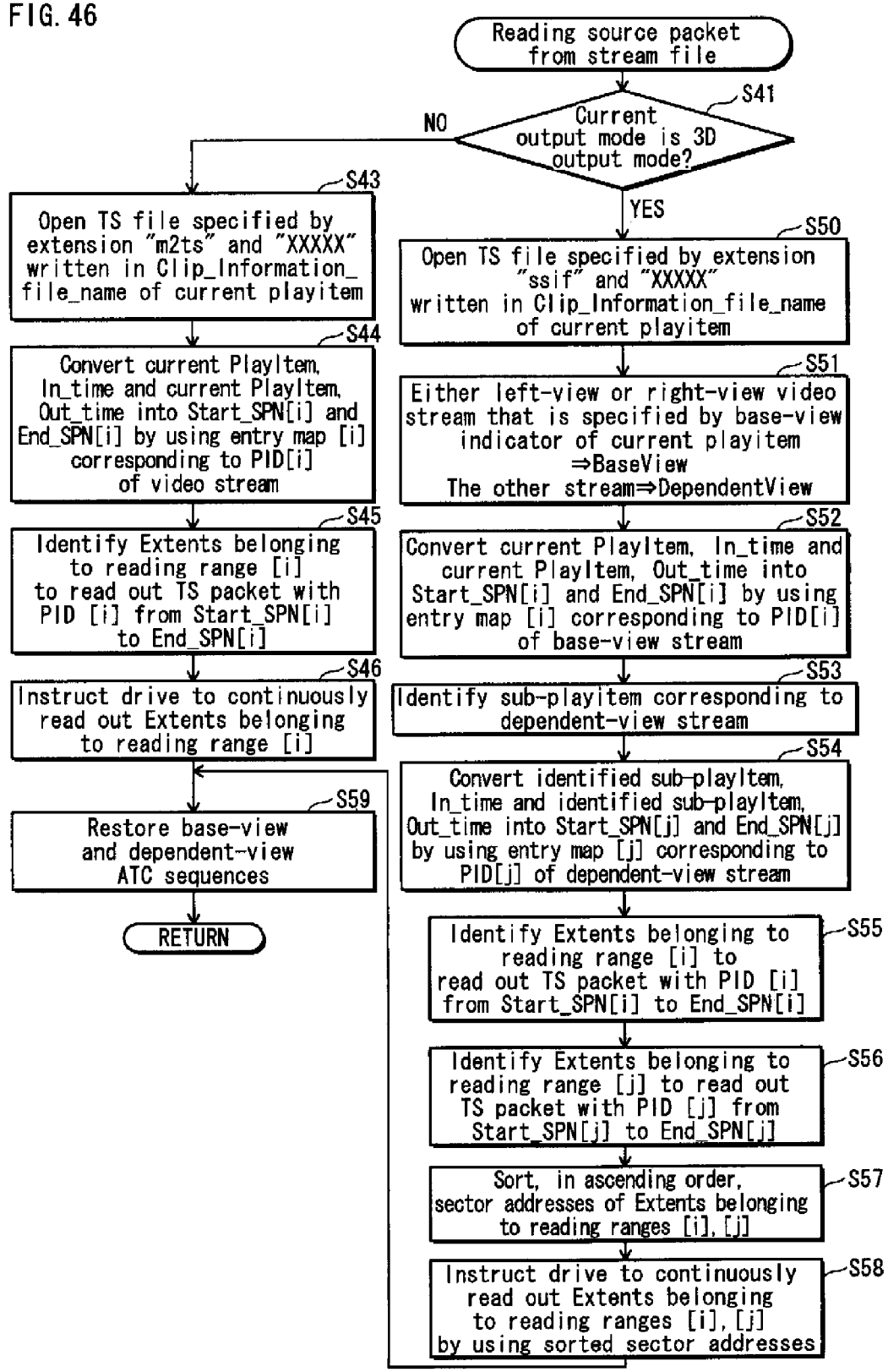

FIG. 48

| Syntax | No. of bits |
|---|---|
| Extent_Start_Address { | |
| length | 32 |
| number_of_extent_units | 16 |
| for (extent_id=0; extent_id<number_of_extent_units;extent_id++) { | |
| base_view_extent_start_address [extent_id] | 32 |
| dependent_view_extent_start_address [extent_id] | 32 |
| interleaved_base_view_extent_start_address [extent_id] | 32 |
| interleaved_dependent_view_extent_start_address [extent_id] | 32 |
| } | |
| } | |

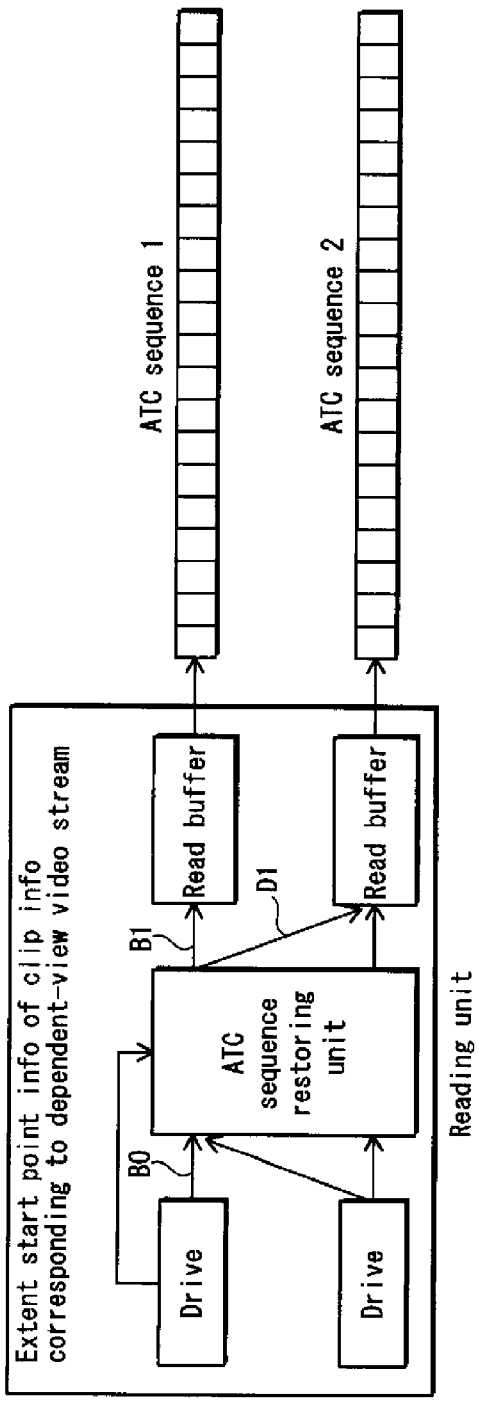
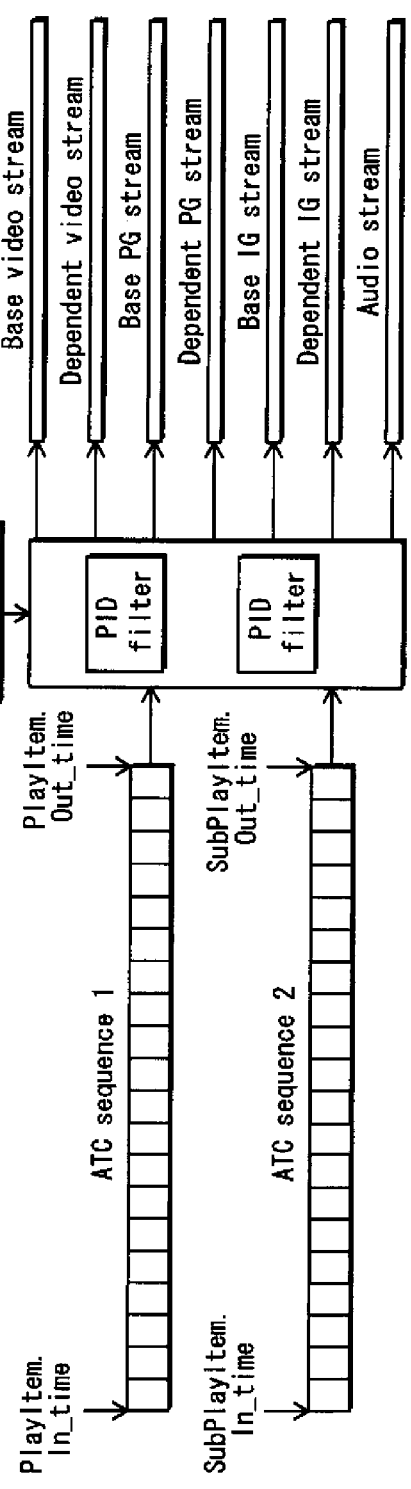
FIG. 53A
FIG. 53B

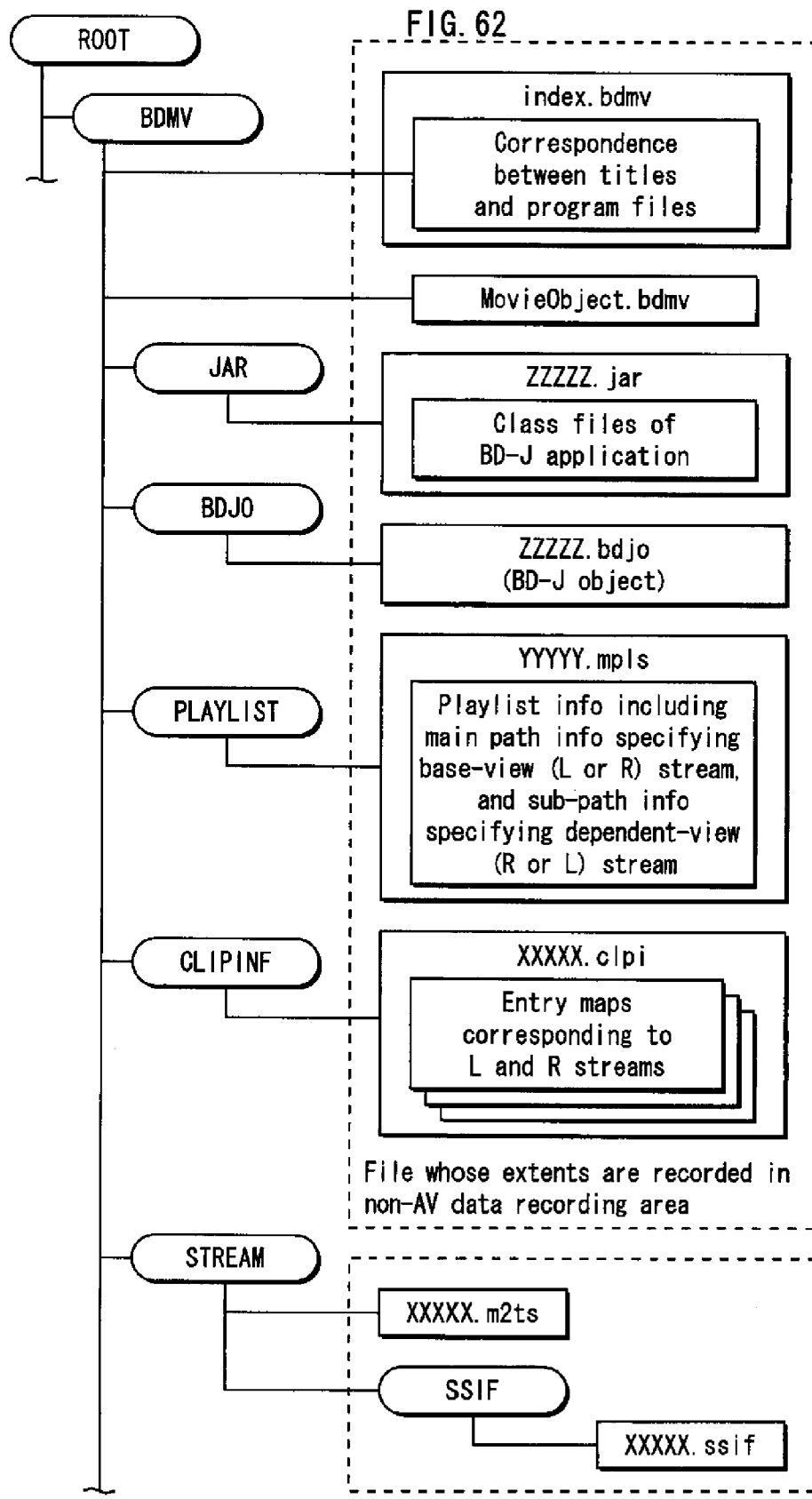

FIG. 73A  PSR21:Output Mode Preference

| b31 | b30 | b29 | b28 | b27 | b26 | b25 | b24 |
|---|---|---|---|---|---|---|---|
| reserved | | | | | | | |
| b23 | b22 | b21 | b20 | b19 | b18 | b17 | b16 |
| reserved | | | | | | | |
| b15 | b14 | b13 | b12 | b11 | b10 | b9 | b8 |
| reserved | | | | | | | |
| b7 | b6 | b5 | b4 | b3 | b2 | b1 | b0 |
| reserved | | | | | | | Output Mode Preference |

Output Mode Preference  ...  0b:2D Output Mode  1b:Stereoscopic Output Mode

FIG. 73B  PSR22:Stereoscopic status

| b31 | b30 | b29 | b28 | b27 | b26 | b25 | b24 |
|---|---|---|---|---|---|---|---|
| reserved | | | | | | | |
| b23 | b22 | b21 | b20 | b19 | b18 | b17 | b16 |
| reserved | | | | | | | |
| b15 | b14 | b13 | b12 | b11 | b10 | b9 | b8 |
| reserved | | | | | | | |
| b7 | b6 | b5 | b4 | b3 | b2 | b1 | b0 |
| reserved | | | | | | | Output Mode |

Output Mode  ...  0b:2D Output Mode  1b:Stereoscopic Output Mode

FIG. 73C  PSR23:Display Capability

| b31 | b30 | b29 | b28 | b27 | b26 | b25 | b24 |
|---|---|---|---|---|---|---|---|
| reserved | | | | | | | |
| b23 | b22 | b21 | b20 | b19 | b18 | b17 | b16 |
| reserved | | | | | | | |
| b15 | b14 | b13 | b12 | b11 | b10 | b9 | b8 |
| reserved | | | | | | | |
| b7 | b6 | b5 | b4 | b3 | b2 | b1 | b0 |
| reserved | | | | | | | Stereoscopic Display Capability |

Stereoscopic Display Capability  ...  Connected TV system is  0b:Stereoscopic presentation incapable  1b:Stereoscopic presentation capable FIG. 73D  PSR24:3D Capability

| b31 | b30 | b29 | b28 | b27 | b26 | b25 | b24 |
|---|---|---|---|---|---|---|---|
| reserved | | | | | | | |
| b23 | b22 | b21 | b20 | b19 | b18 | b17 | b16 |
| reserved | | | | | | | |
| b15 | b14 | b13 | b12 | b11 | b10 | b9 | b8 |
| reserved | | | | | | | |
| b7 | b6 | b5 | b4 | b3 | b2 | b1 | b0 |
| reserved | | | | | | | Stereoscopic Capability |

Stereoscopic Capability  ...  0b:Stereoscopic presentation incapable  1b:Stereoscopic presentation capable FIG. 74A
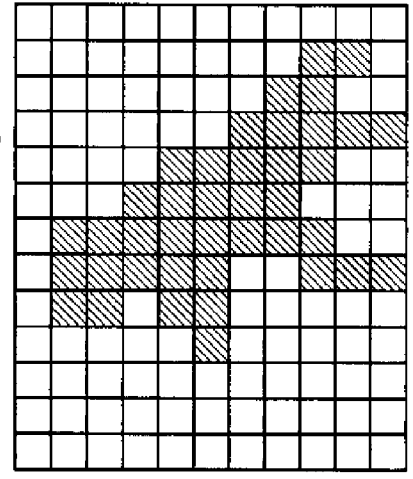
FIG. 74B
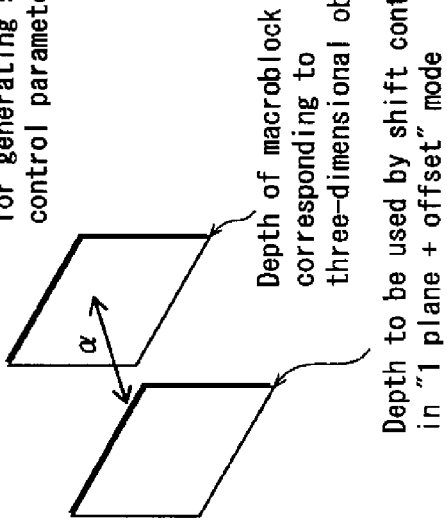
FIG. 74C
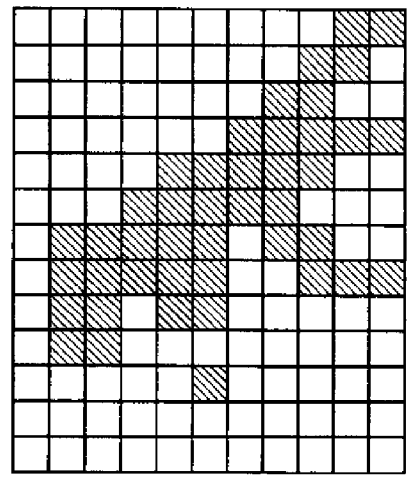
FIG. 74D
FIG. 74E
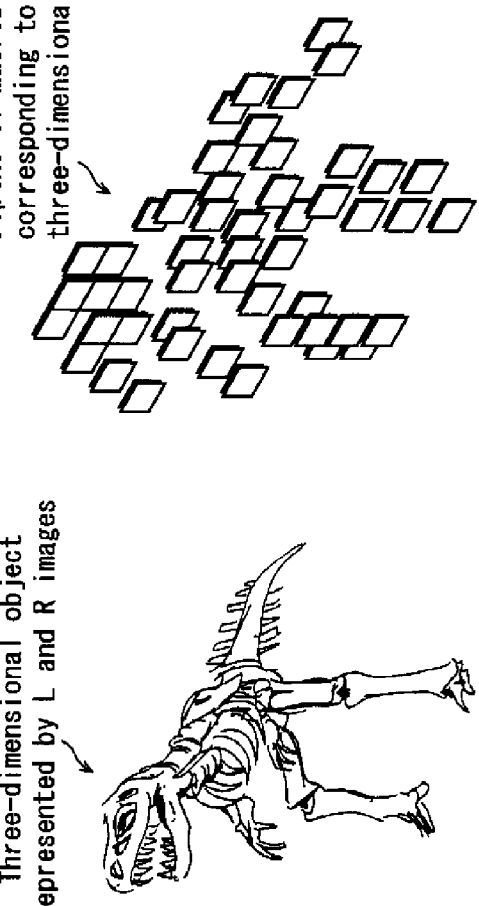

FIG.82
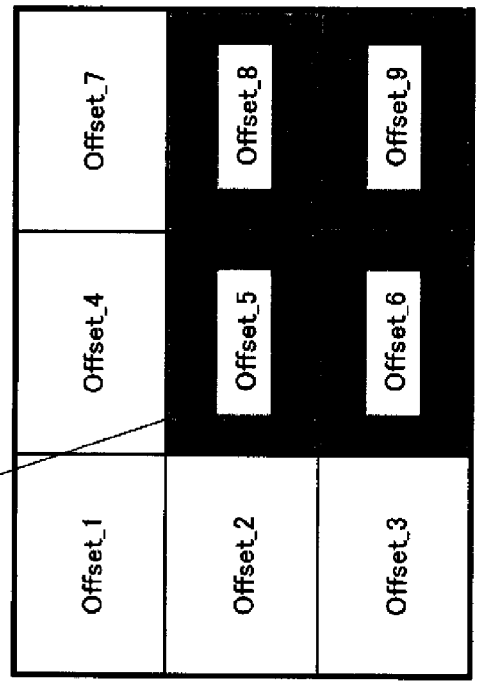
In this example, valid offsets are "5", "6", "8", and "9"
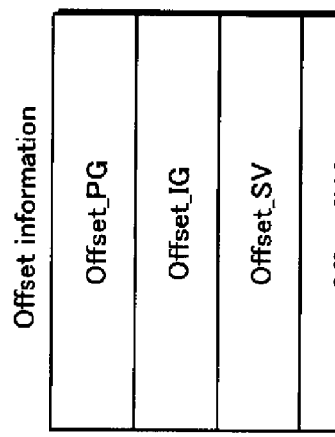
Offset information
Upper row
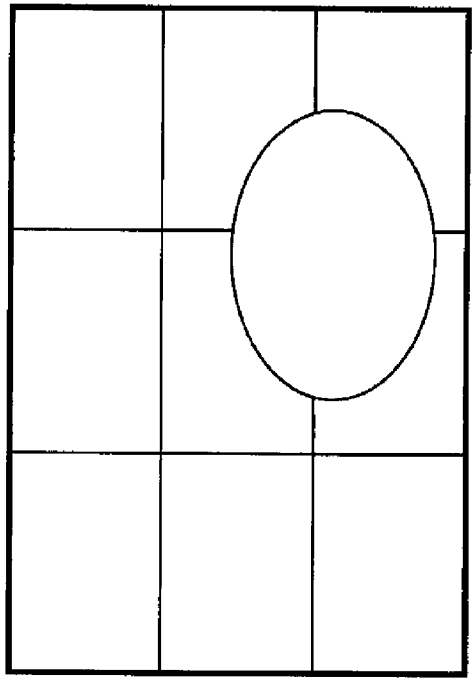
Lower row

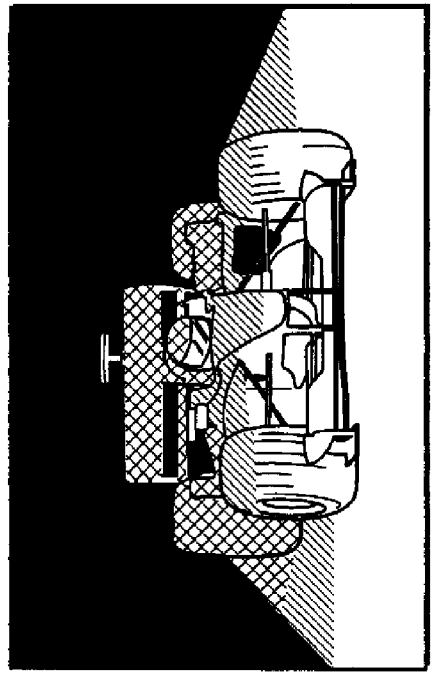
FIG. 83B Grayscale representing depth
Relationship between image and brightness
■ Deeper ▨ ... ☐ Shallower
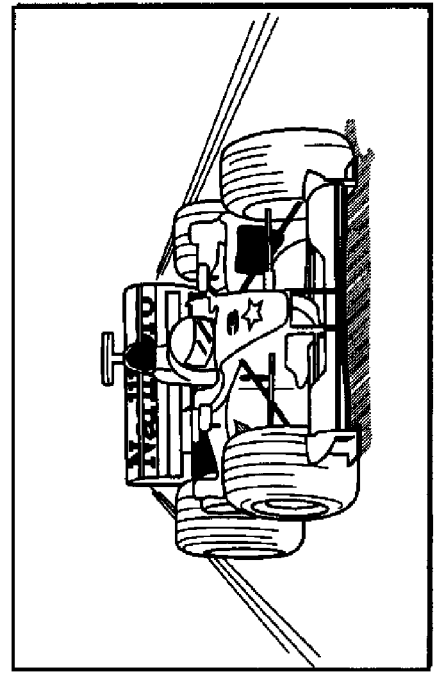
FIG. 83D
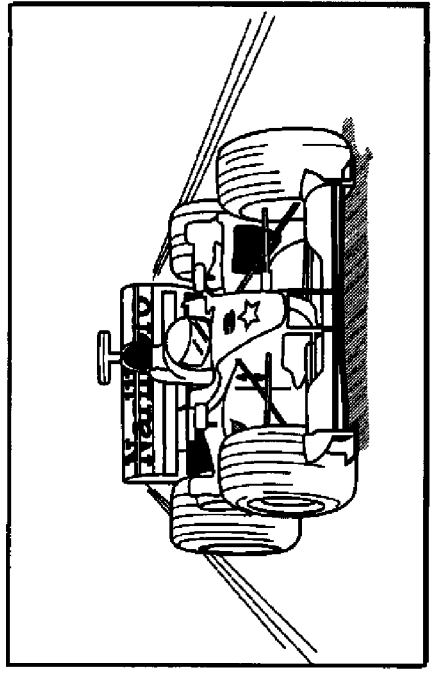
FIG. 83A
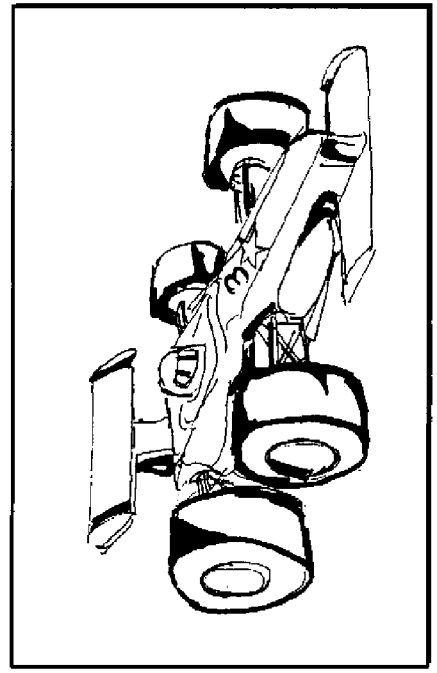
FIG. 83C

FIG.85B

| Syntax | No. of bits |
|---|---|
| STN_table_extension(){ | |
| length | 16 |
| for (primary_video_stream_id=0; primary_video_stream_id< number_of_primary_video_stream_entries; primary_video_stream_id++) { | |
| LR_dependent_view_ES_availability | 1 |
| LR_interleaved_file_availability | 1 |
| Depth_dependent_view_ES_availability | 1 |
| Depth_interleaved_file_availability | 1 |
| reserved | 12 |
| 3D_base_view_block() { | |
| stream_entry() | |
| stream_attributes() | |
| } | |
| if (LR_dependent_view_ES_availability) { | |
| stream_entry() | |
| stream_attributes() | |
| } | |
| else { | |
| padding_words | 128 |
| } | |
| if (Depth_dependent_view_ES_availability) { | |
| stream_entry() | |
| stream_attributes() | |
| } | |
| else { | |
| padding_words | 128 |
| } | |
| ... | |

FIG.85A

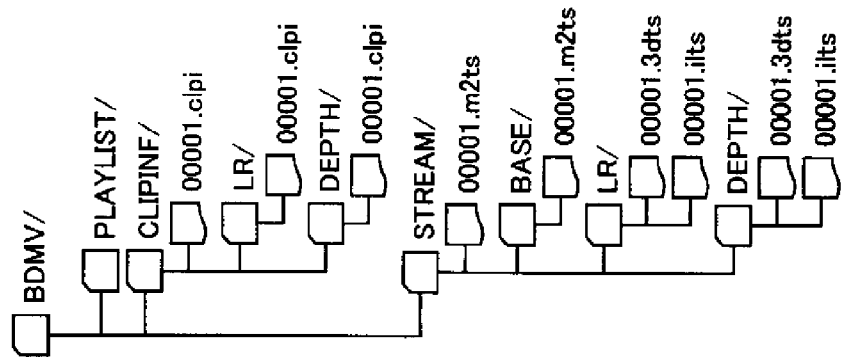

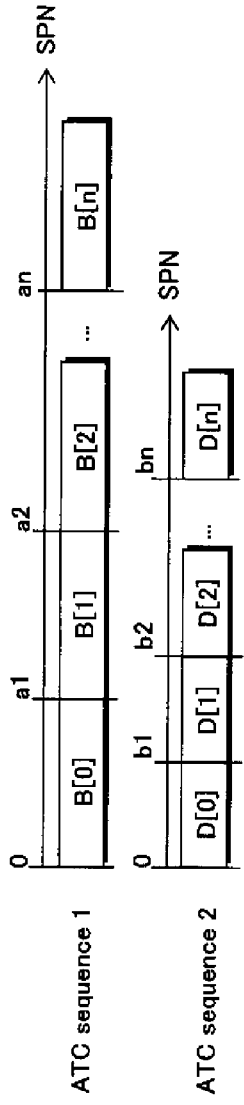
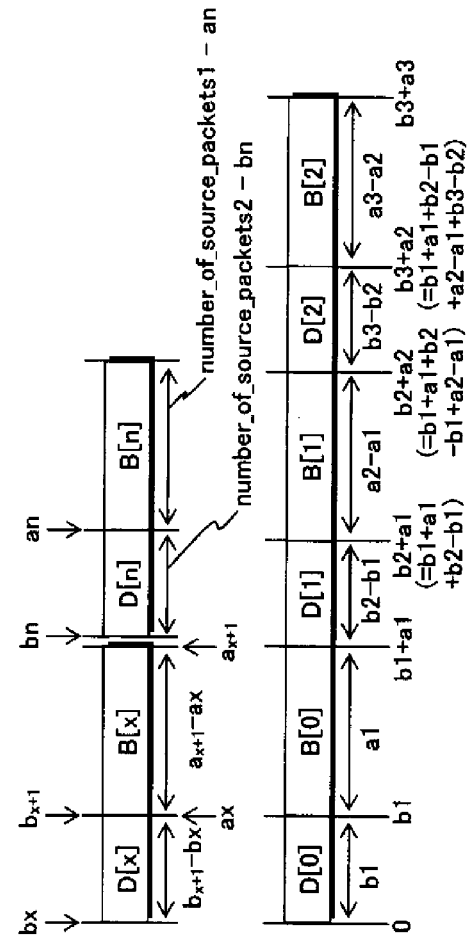
FIG.103A
FIG.103B
FIG.103C
FIG.103D

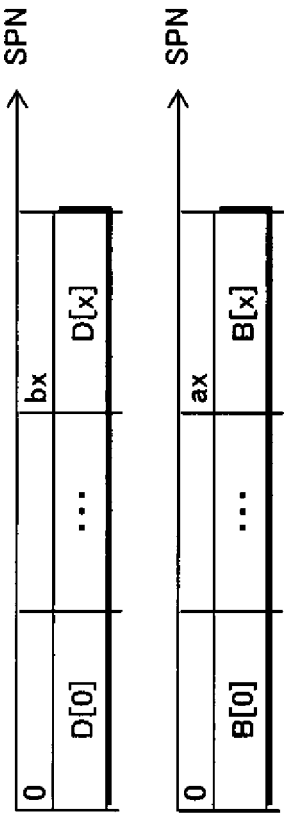
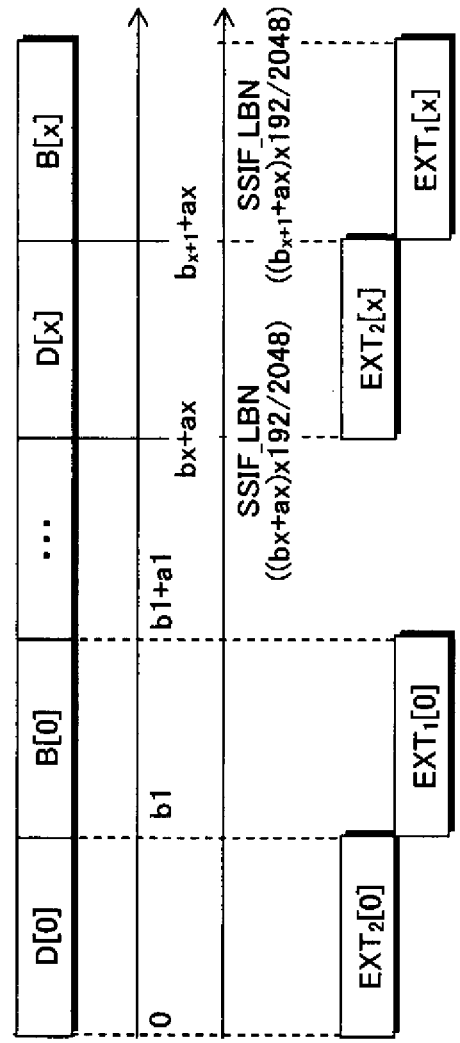
FIG.104A
FIG.104B
FIG.104C

RECORDING MEDIUM, PLAYBACK DEVICE, INTEGRATED CIRCUIT

This application is a divisional of application Ser. No. 12/907,323, filed Oct. 19, 2010, the contents of which are hereby incorporated by reference, which is a continuation of International Application PCT/JP2010/000913, with an international filing date of Feb. 15, 2010.

TECHNICAL FIELD

The present invention relates to a technology of playing back 3D and 2D images.

BACKGROUND ART

The 2D images, also called monoscopic images, are represented by pixels on an X-Y plane that is applied to the display screen of the display device.

In contrast, the 3D images have a depth in the Z-axis direction in addition to the pixels on the X-Y plane applied to the screen of the display device. The 3D images are presented to the viewers (users) by simultaneously playing back the left-view and right-view images to be viewed respectively by the left and right eyes so that a stereoscopic effect can be produced. The users would see, among the pixels constituting the 3D image, pixels having positive Z-axis coordinates in front of the display screen, and pixels having negative Z-axis coordinates behind the display screen.

It is preferable that an optical disc storing a 3D image has compatibility with a playback device that can play back only 2D images (hereinafter, such a playback device is referred to as "2D playback device"). This is because, otherwise, two types of discs for 3D and 2D images need to be produced so that the 2D playback device can play back the same content as that stored in a disc for 3D image. Such an arrangement will take a higher cost. It is accordingly necessary to provide an optical disc storing a 3D image that is played back as a 2D image by the 2D play back device, and as a 2D or 3D image by a play back device supporting both the 3D and 2D images (hereinafter, such a playback device is referred to as "2D/3D playback device").

Patent Literature 1 identified below is one example of prior art documents describing technologies for ensuring the compatibility in playback between 2D and 3D images, with respect to optical discs storing 3D images.

CITATION LIST

Patent Literature

[Patent Literature 1]
Japanese Patent No. 3935507

SUMMARY OF INVENTION

Technical Problem

The left-view and right-view images to be used in the stereoscopic playback are obtained by the shooting with use of a 3D camera. The 3D camera has two lenses separated by a distance corresponding to the parallax of human beings. When the left-view and right-view images having been shot via the two lenses are played back alternately, the parallax of human beings is created.

However, the subtitle and menu are not obtained by the shooting with use of a 3D camera, but are generated by the authoring process after the shooting is completed, seeing the stereoscopic video played back. To create the subtitle and menu for each of the left and right views, imagining how the subtitle and menu will appear during the stereoscopic playback, takes an enormous amount of time and effort by the authoring staff. Accordingly, the process of creating the subtitle and menu in the production of a stereoscopic content with subtitle and menu is desired to be as efficient as possible. Also, how far a moving object in the video appears to pop out changes moment by moment for each frame period. Thus when the depths of the subtitle and menu are fixed, the subtitle and menu often overlap with an image of a person in the video, causing such an odd scene as would invite a derisive laughter, as in a case where a rectangular frame of the menu appears to be thrust into the person in the screen. To prevent such a strange scene from being provided, the authoring should be done properly even if it takes a lot of time and effort.

Here, the efforts required for the authoring might be reduced to some extent by storing control information for the stereoscopic viewing of the subtitle and menu into the graphics stream so that the depths of the graphics can be adjusted automatically. However, there are as many as 32 graphics streams that represent the subtitle and menu. Some of them may not be decoded depending on the operation mode of the device, the state of the device, or the selection by the user. This necessitates a wasteful process of accessing the graphics stream in which the control information is stored, to obtain the control information for the stereoscopic viewing.

It is therefore an object of the present invention to provide a recording medium for enabling a high-quality stereoscopic video to be played back without increasing the amount of time and effort required for the authoring.

Solution to Problem

The above-described object is fulfilled by a recording medium on which a main-view video stream, a sub-view video stream, and a graphics stream are recorded, wherein the main-view video stream includes picture data constituting a main view of a stereoscopic image, the sub-view video stream includes metadata and picture data constituting a sub view of the stereoscopic image, the graphics stream includes graphics data, and a graphics plane on which the graphics data is drawn is overlaid with a main-view video plane and a sub-view video plane on which the respective picture data are drawn, the metadata is control information defining an offset control that applies offsets of leftward and rightward directions to horizontal coordinates in the graphics plane when the graphics plane is overlaid with the main-view video plane and the sub-view video plane, and the control information includes information that indicates, by a number of pixels, values of the offsets to be applied to the graphics plane.

Advantageous Effects of Invention

In the above-described structure, it is defined that the control information for the offset control is located in the sub-view video stream. This makes it possible to easily generate the control information for the offset control when the playback device operates with one plane, by generating the control information based on the depth information obtained in the shooting by a 3D camera, or the parallax information obtained in the encoding process by the encoder for generating the video stream, and incorporating the generated control information into the sub-view video stream as the metadata. This reduces the work in the authoring process by a great amount. The control information defines the offset control for the case where the playback device operates with one plane. Thus, even if there are no subtitles or menus for the left and right views, a stereoscopic playback is available only if there is one subtitle or menu. In this way, the structure of the present invention not only reduces the amount of time and effort required for creating a subtitle or menu for each of the main and sub views, but can realize a stereoscopic playback even if the memory in the playback device has a size of one plane as the plane memory. It therefore realizes both an efficient authoring and a cost reduction in the playback device.

In the above-stated recording medium, the picture data in the main-view video stream and the picture data in the sub-view video stream may each represent a plurality of groups of pictures, each of the plurality of groups of pictures may constitute a plurality of frames, and may have control information, as a parameter sequence, in correspondence with each of the plurality of frames. The parameter sequence can define the depth of graphics for each frame constituted from each group of pictures in the video stream time axis. Thus it is possible to define in one parameter sequence a function Z(t) for calculating, from an arbitrary frame time "t", a depth "z" that corresponds to the frame time "t".

When the function Z(t) is a parabolic function having the frame time as a variable, the playback device can use, for the shift control, a parameter sequence corresponding to the function Z(t) to produce a realistic video playback in which, for example, a graphics representing a baseball ball comes from far to in front of or goes away from the viewer.

With the above-described structure, it is possible to change the depth in real time as the playback point in the video stream time axis proceeds. It is therefore possible to realize a varied stereoscopic playback of graphics even if there are no graphics materials corresponding to the left and right eyes.

BRIEF DESCRIPTION OF DRAWINGS

FIGS. 1A through 1C show an embodiment of the usage act of the recording medium, playback device, display device, and glasses.

FIG. 2 shows the user's head on the left-hand side of the drawing and the images of a dinosaur skeleton seen respectively by the left eye and the right eye of the user on the right-hand side of the drawing.

5A through 5C show how a stereoscopic image is played back by the offset control shown in FIG. 4.

FIGS. 6A through 6D show how to realize the stereoscopic viewing in the "1 plane+offset" mode.

Figure 7:
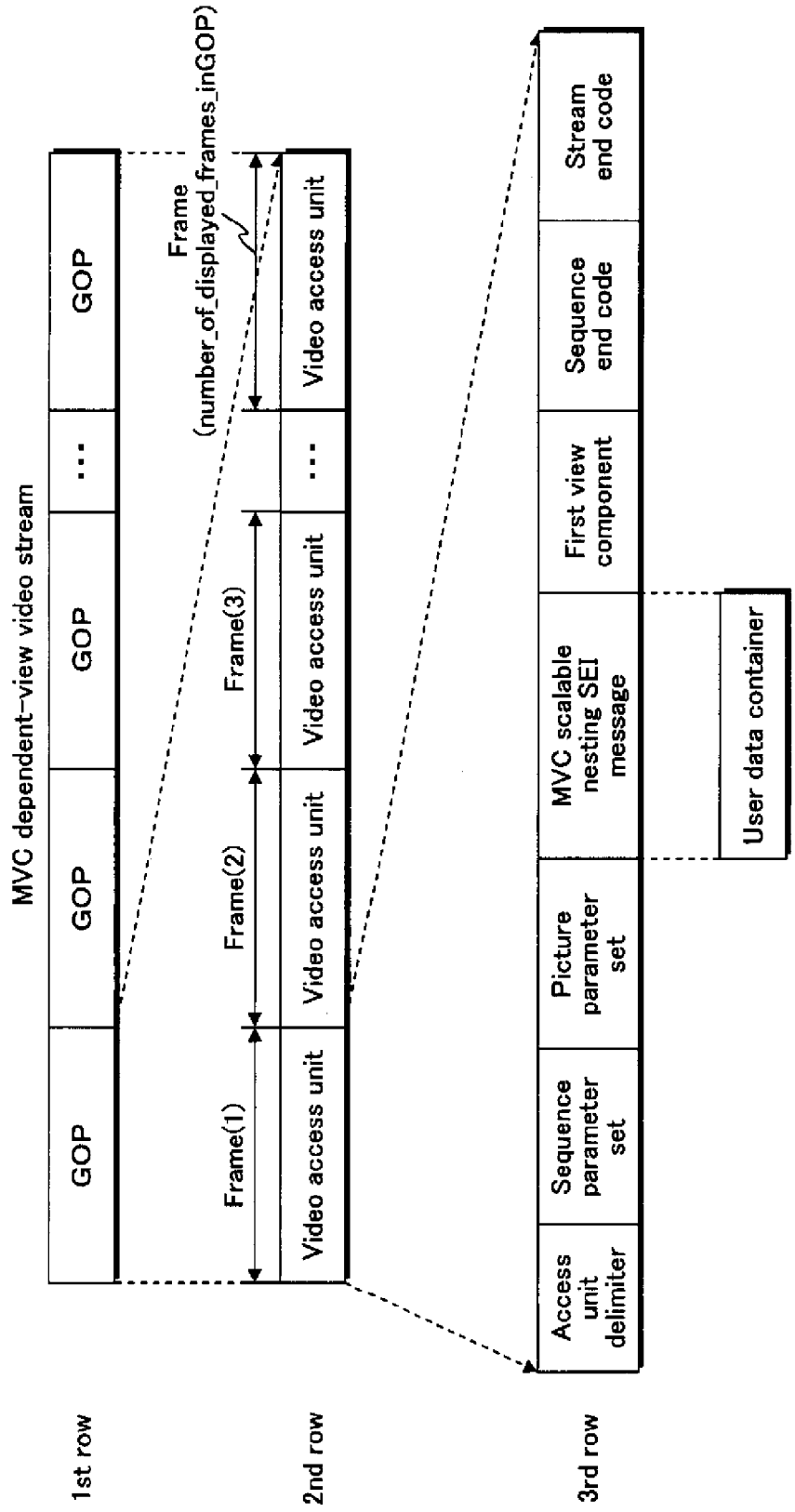

FIG. 7 shows the internal structure of the dependent-view stream which is provided with the control information for the "1 plane+offset" mode.

FIGS. 8A through 8C show the internal structure of the user data container.

FIG. 9 shows the syntax for describing the offset metadata.

FIGS. 10A and 10B show an example of the difference between viewings provided by positive and negative plane offsets.

Figure 11:
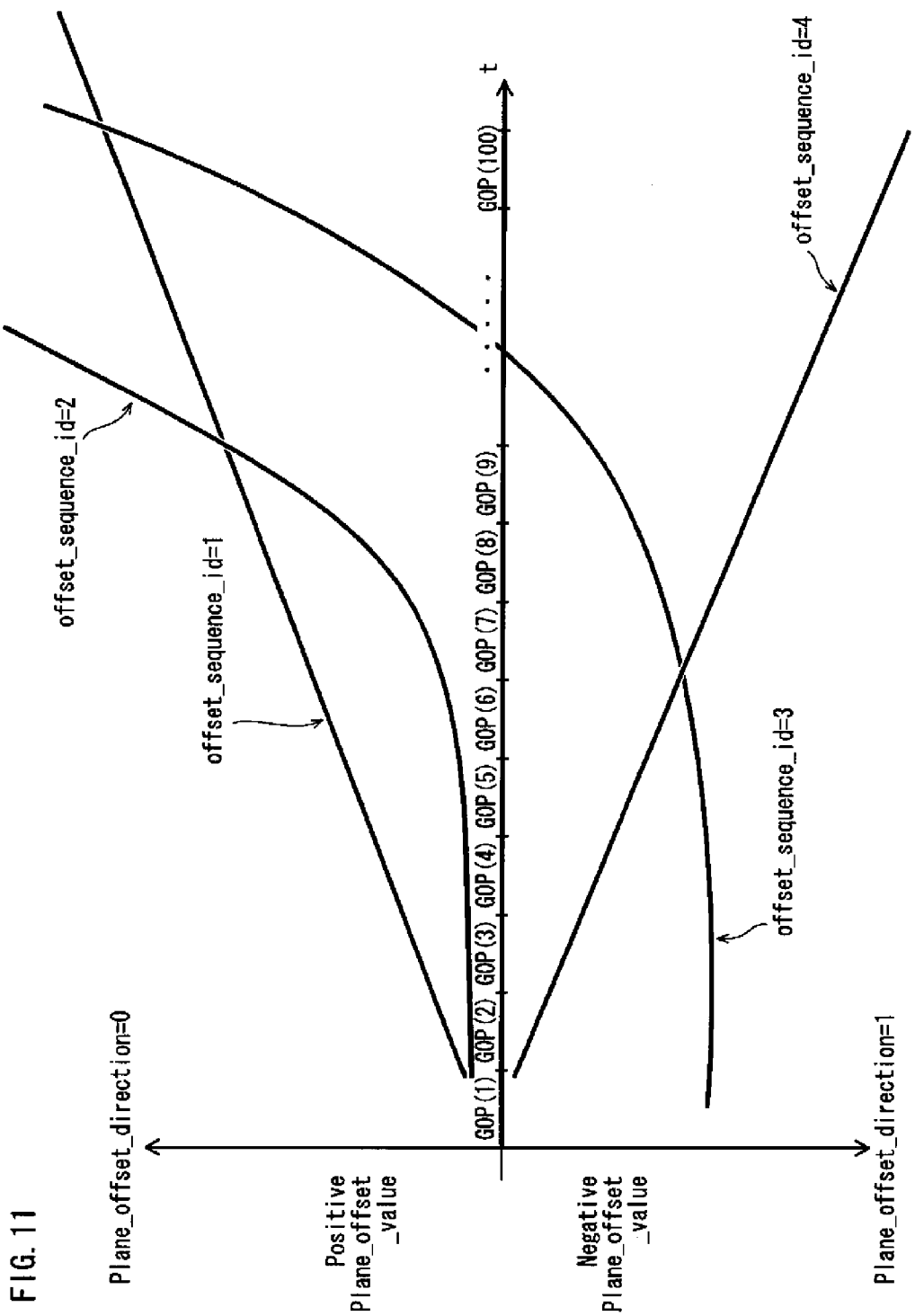

FIG. 11 is a graph in which the horizontal axis represents a time axis, and the vertical axis represents "Plane_offset_value[j]".

FIG. 12 is a graph in which the horizontal axis represents a time axis, and the vertical axis represents "Plane_offset_value[j]".

FIG. 13 shows one example of the depths defined by the offset sequences with offset_sequence_id=1, 2, 3, and 4.

Figure 14A:
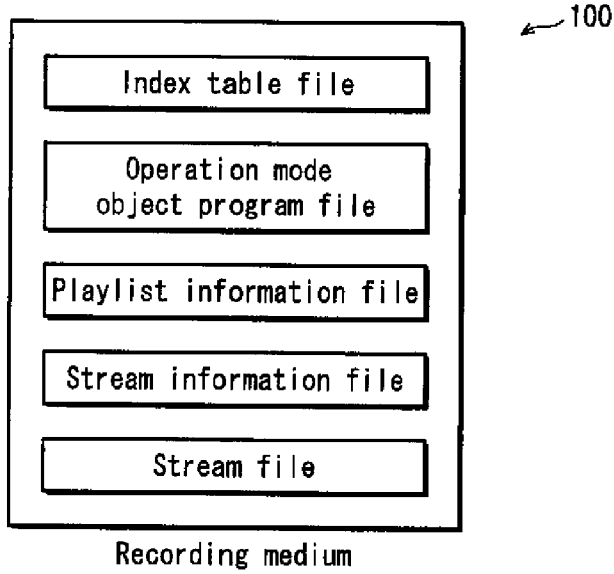
Figure 14B:
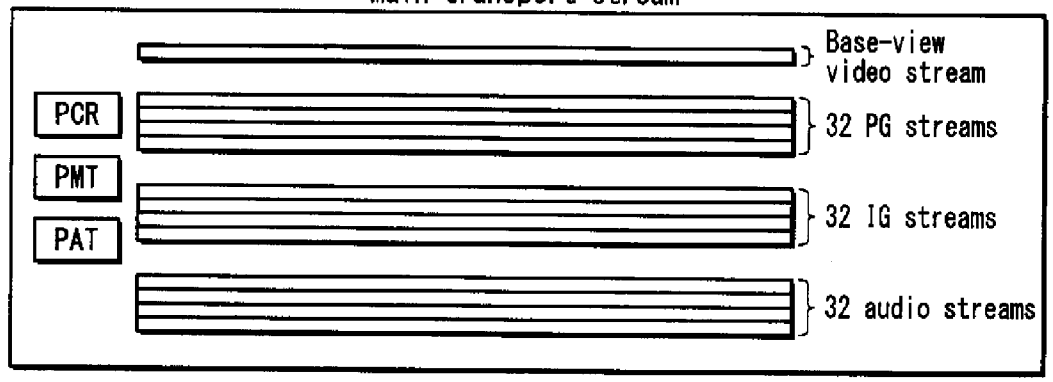
Figure 14C:
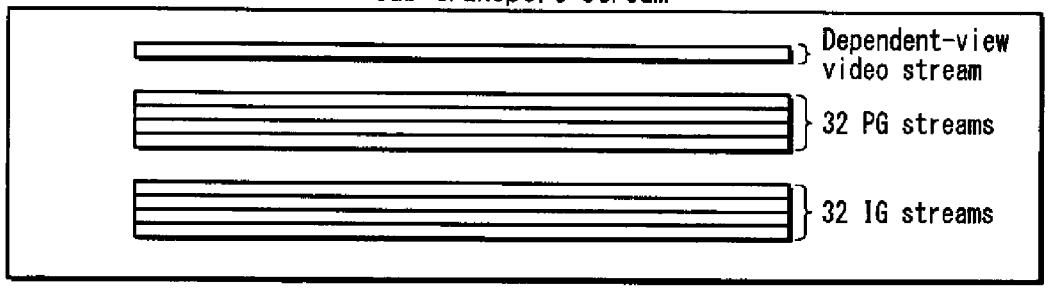

FIGS. 14A through 14C show the internal structure of the recording medium in Embodiment 1.

FIGS. 15A and 15B illustrate how the video stream is stored in the PES packet sequences.

FIG. 16 schematically shows how the main TS is multiplexed.

FIGS. 17A and 17B show the internal structures of the main TS and sub-TS.

FIGS. 18A through 18D show the internal structure of the playlist information.

Figure 19A:
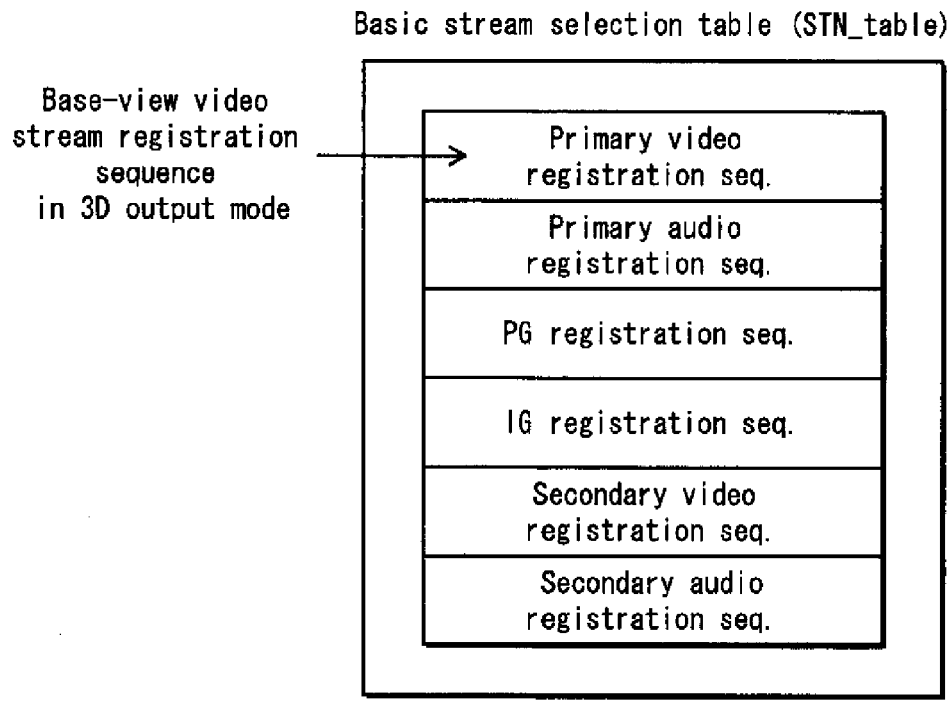
Figure 19B:
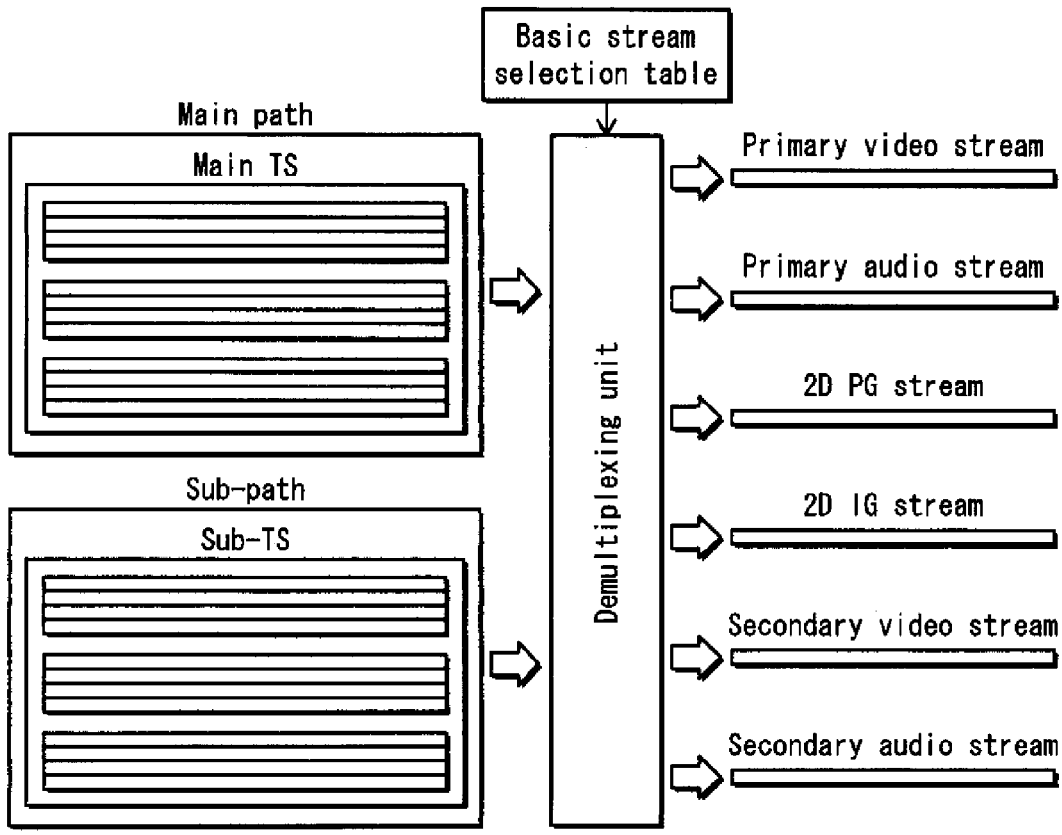

FIGS. 19A and 19B show one example of the basic stream selection table.

FIG. 20 shows the internal structure of the extension stream selection table.

FIGS. 21A through 21C shows the stream registration sequences in the extension stream selection table.

Figure 22:
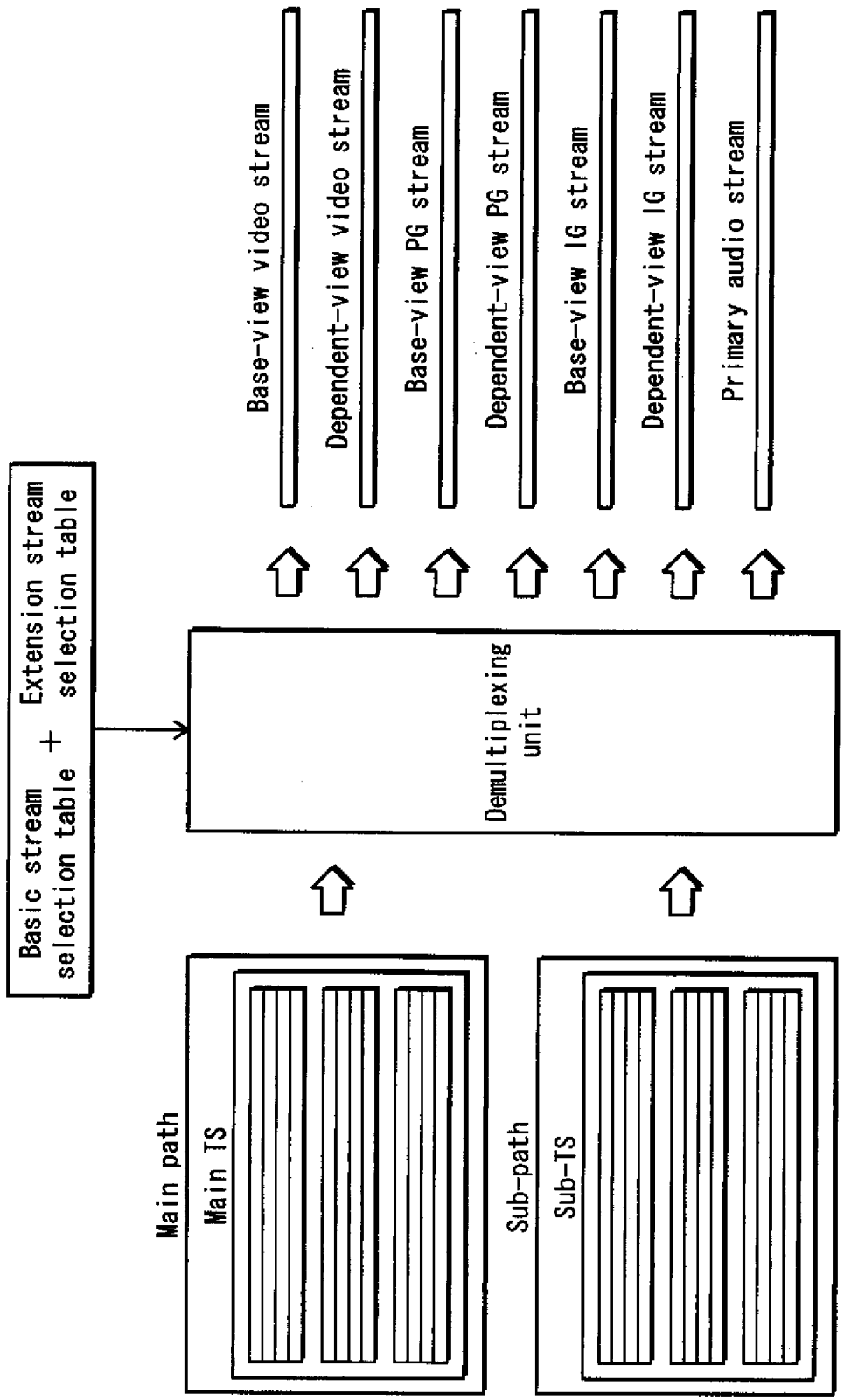

FIG. 22 shows what elementary streams are demultiplexed from the main TS and the sub-TSs by the basic stream selection table and the extension stream selection table.

Figure 23:
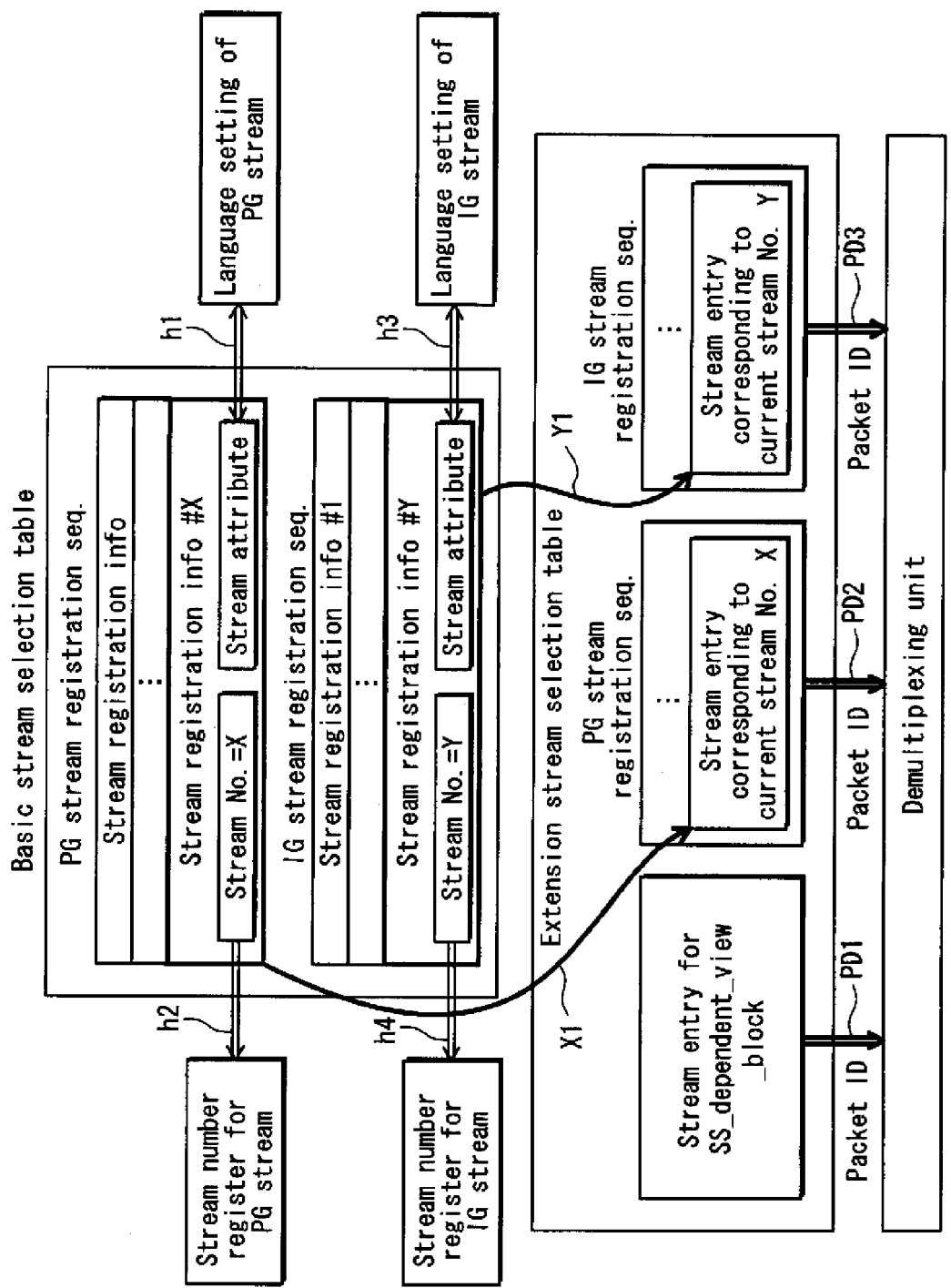

FIG. 23 shows how the stream registration sequences provided in the basic stream selection table and the extension stream selection table are referenced when the demultiplexing shown in FIG. 22 is performed.

FIG. 24 shows the change of assignment of the stream numbers.

FIG. 25 shows a syntax for writing the extension stream selection table in an object-oriented compiler language.

Figure 26:
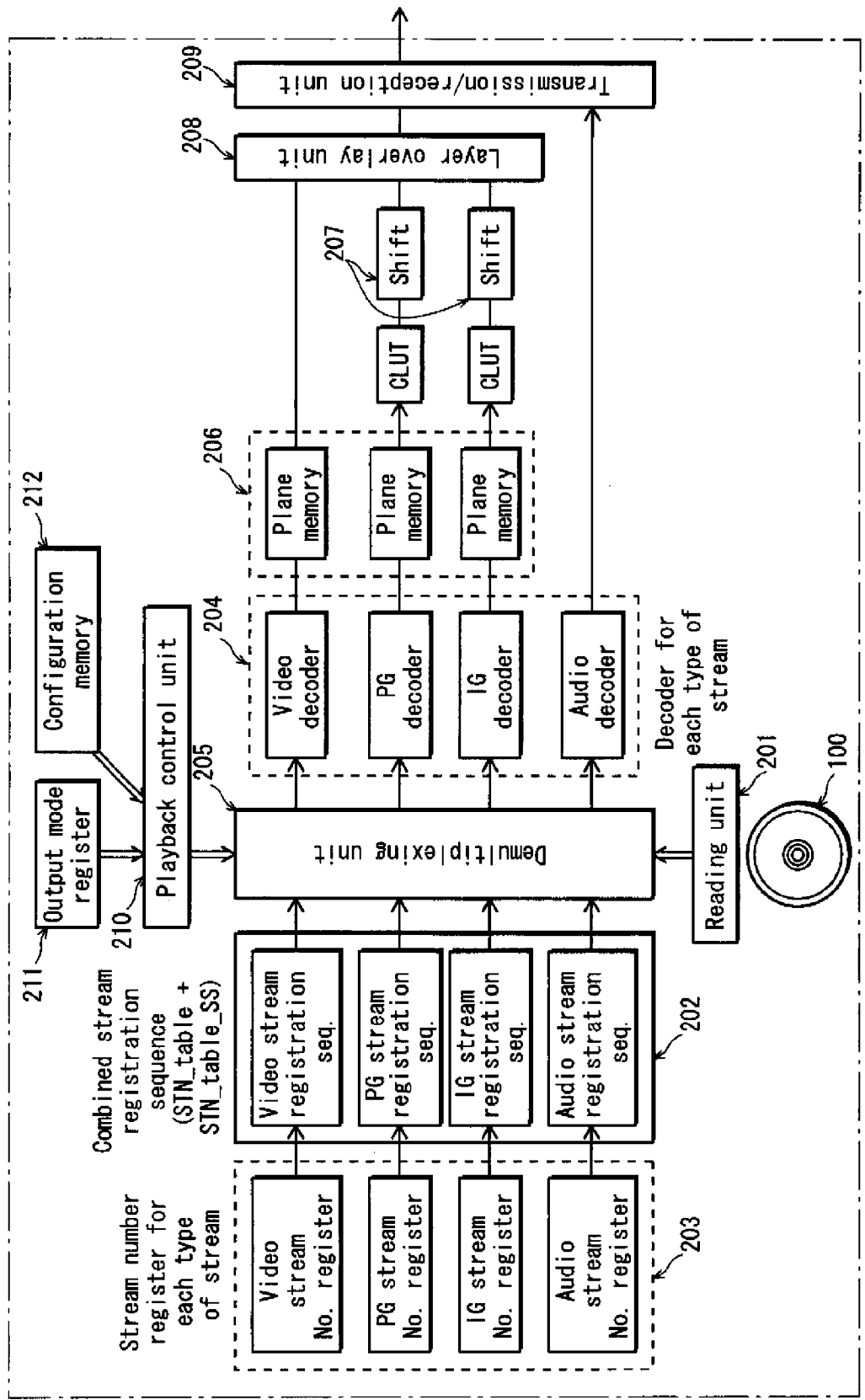

FIG. 26 shows the internal structure of the playback device.

FIGS. 27A through 27C show what packet identifiers are output to the demultiplexing unit by the combined stream registration sequence.

Figure 28A:
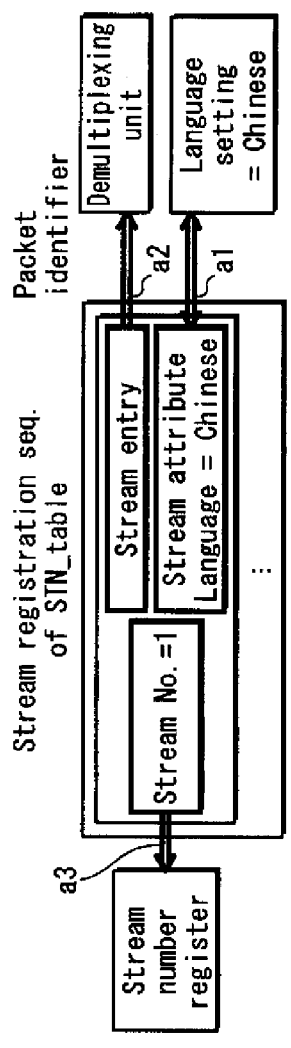
Figure 28B:
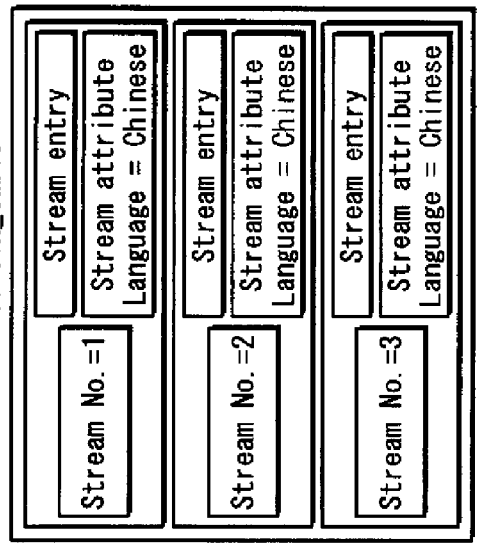
Figure 28C:
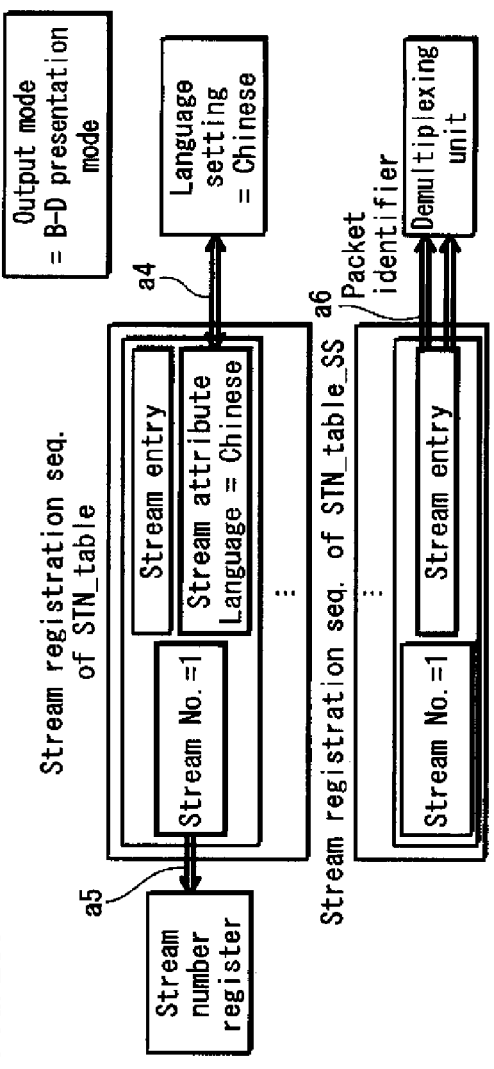

FIGS. 28A through 28C show what packet identifiers are output to the demultiplexing unit by the combined stream registration sequence.

Figure 29:
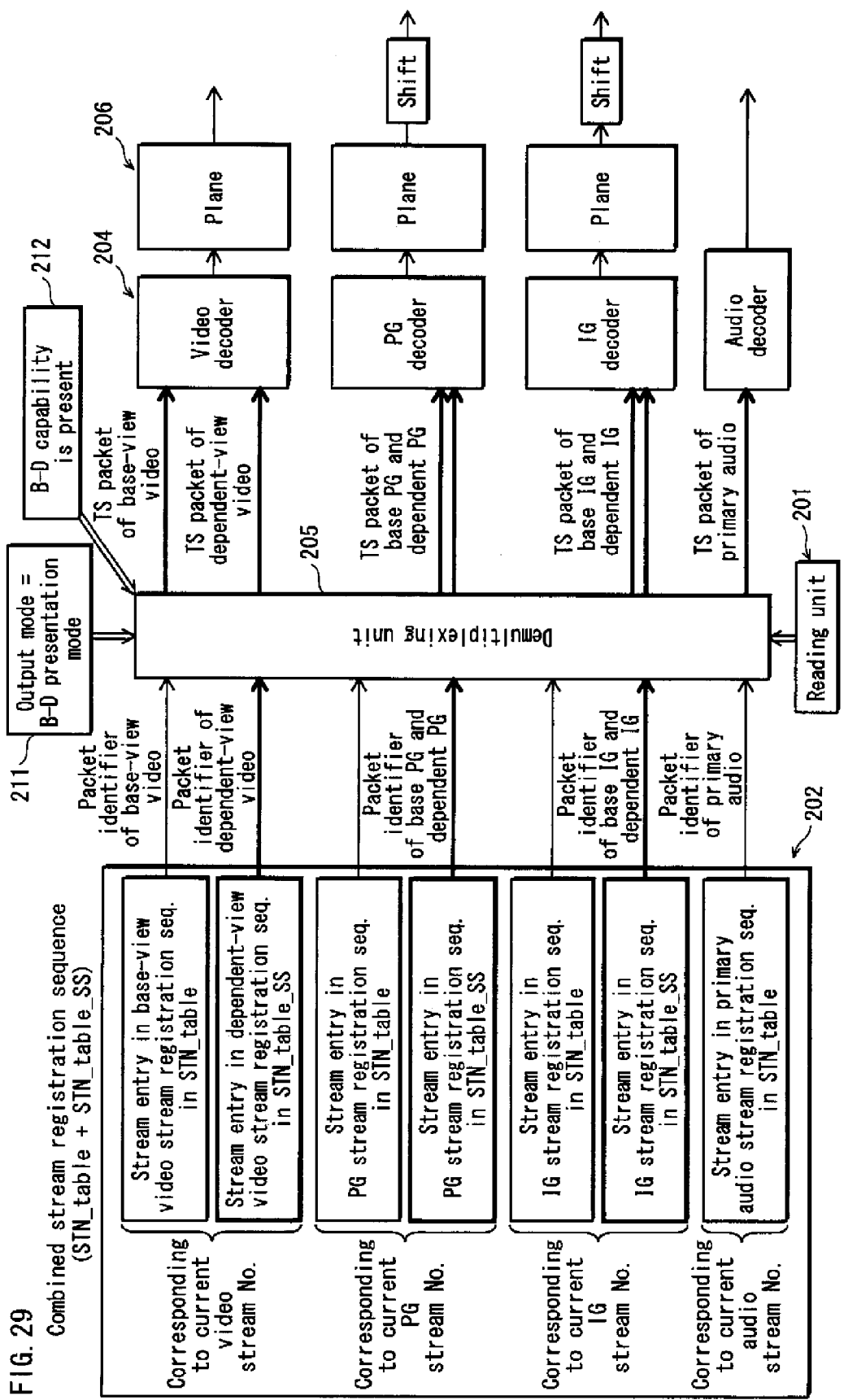

FIG. 29 shows referencing of the packet identifiers and outputting of the packets when the playback device is set to the B-D presentation mode and the playback device has the B-D capability.

Figure 30:
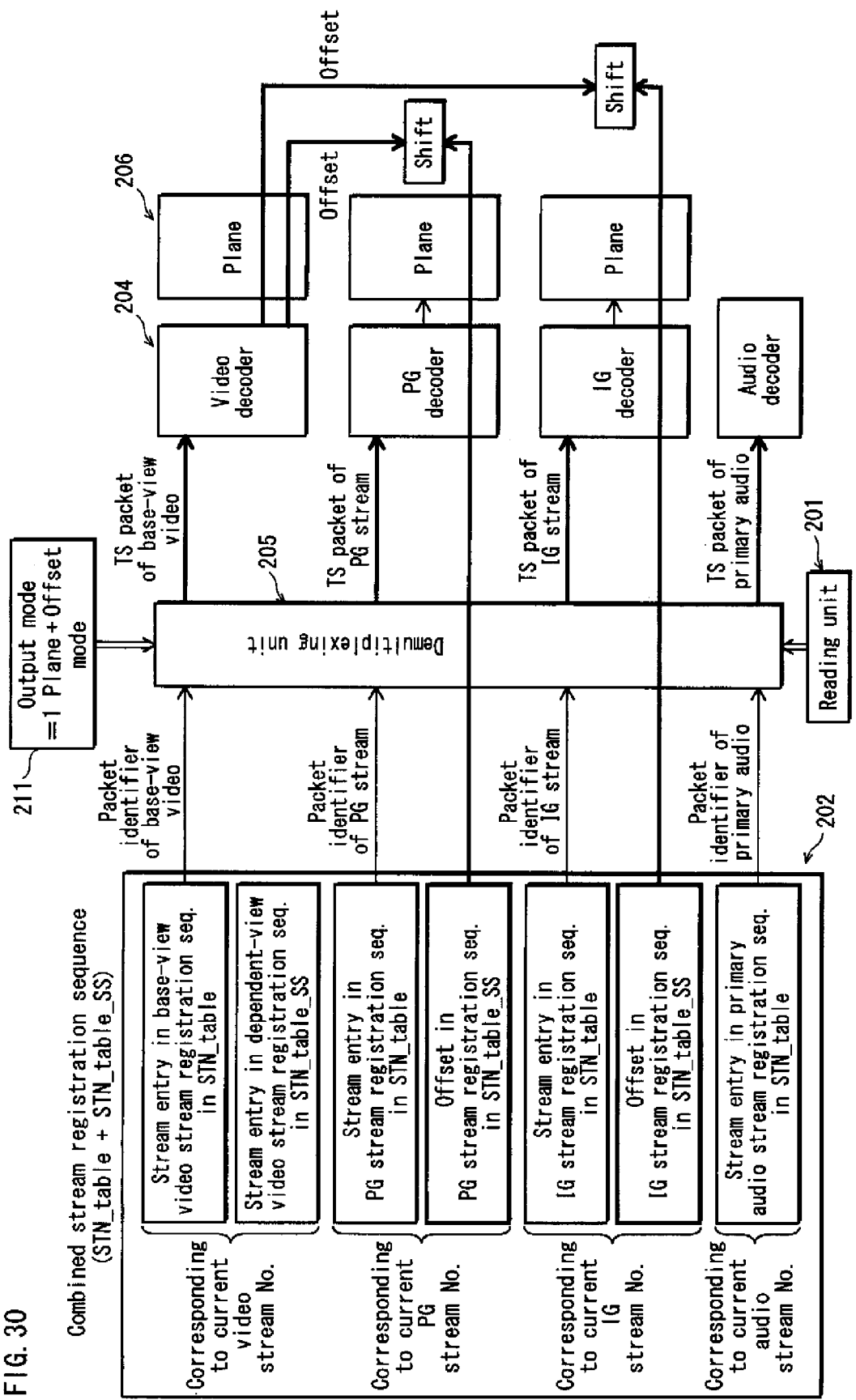

FIG. 30 shows referencing of the packet identifiers and outputting of the packets when the playback device is set to the "1 plane+offset" mode.

Figure 31:
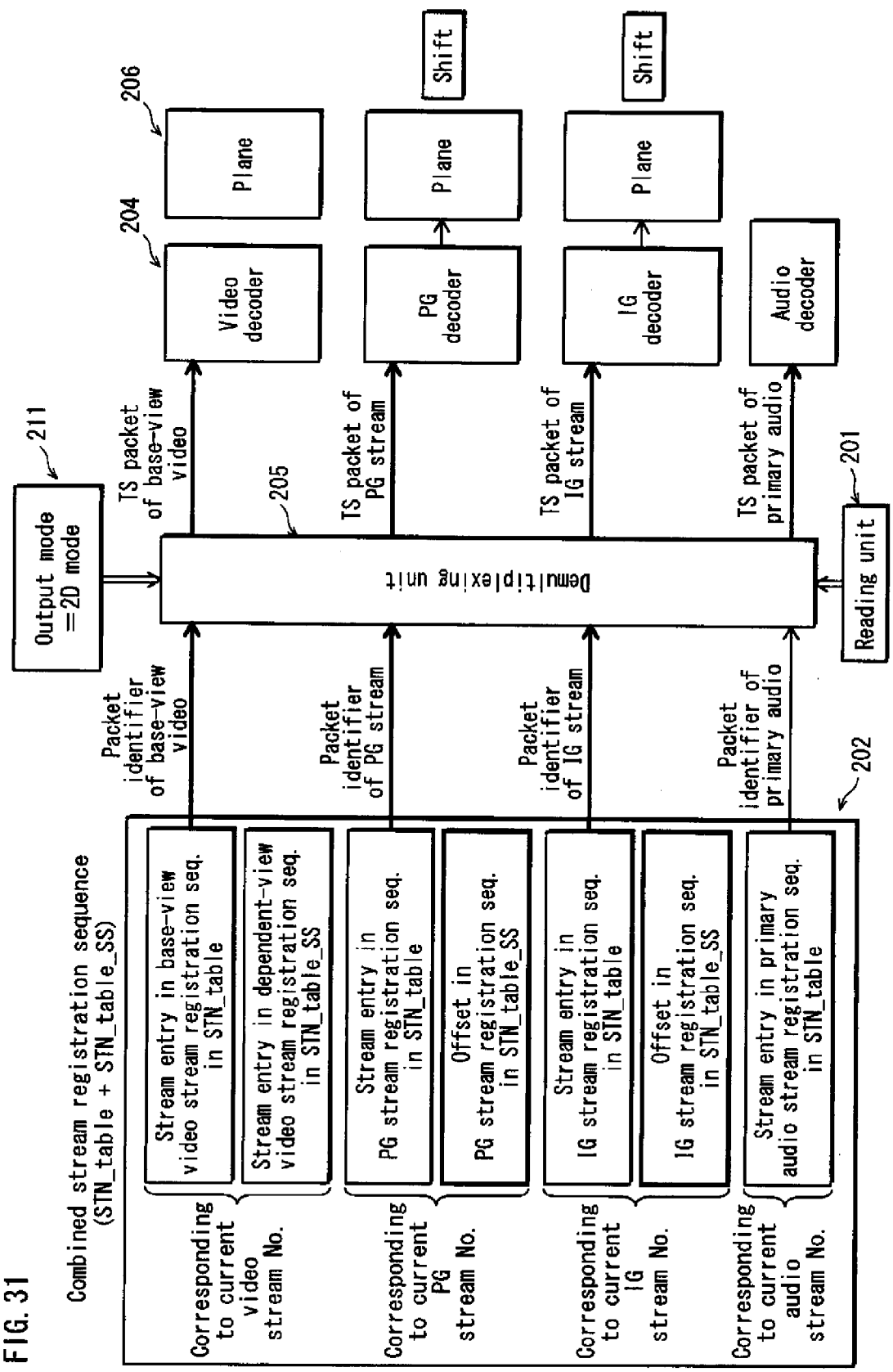

FIG. 31 shows referencing of the packet identifiers and outputting of the packets when the playback device is set to the 2D presentation mode.

Figure 32:
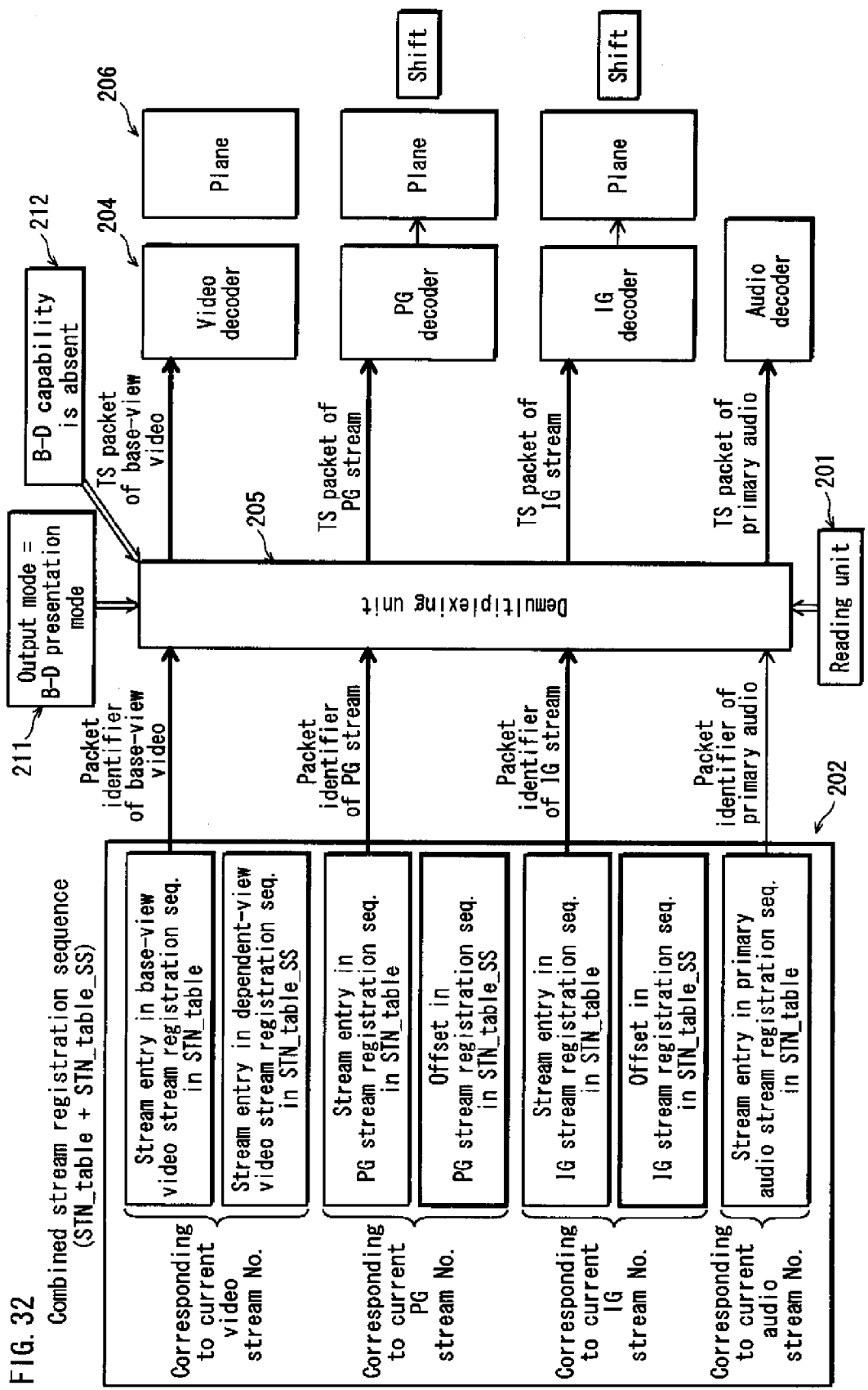

FIG. 32 shows referencing of the packet identifiers and outputting of the packets when the playback device does not have the capability for the B-D presentation mode.

Figure 33:
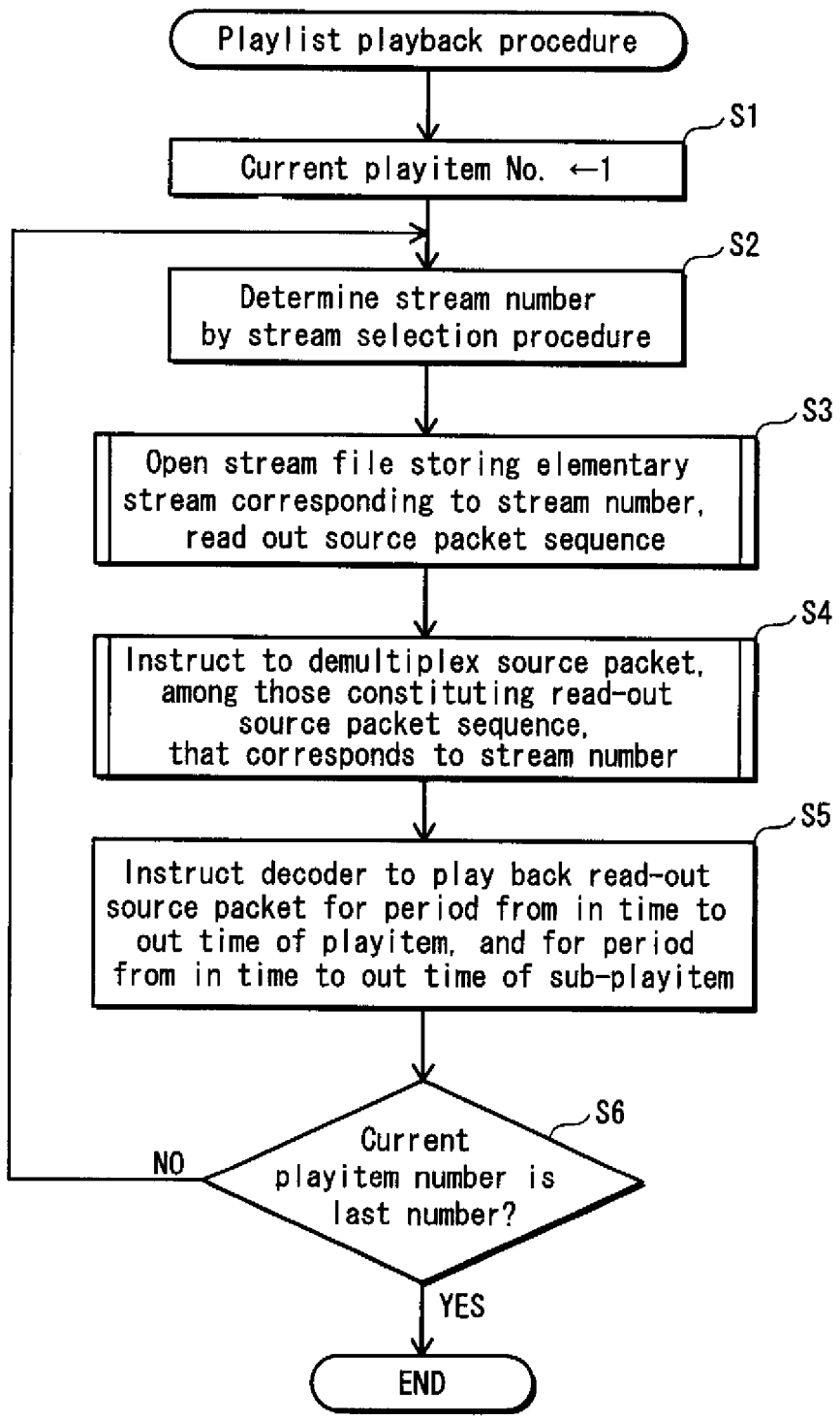

FIG. 33 shows the playlist playback procedure.

Figure 34:
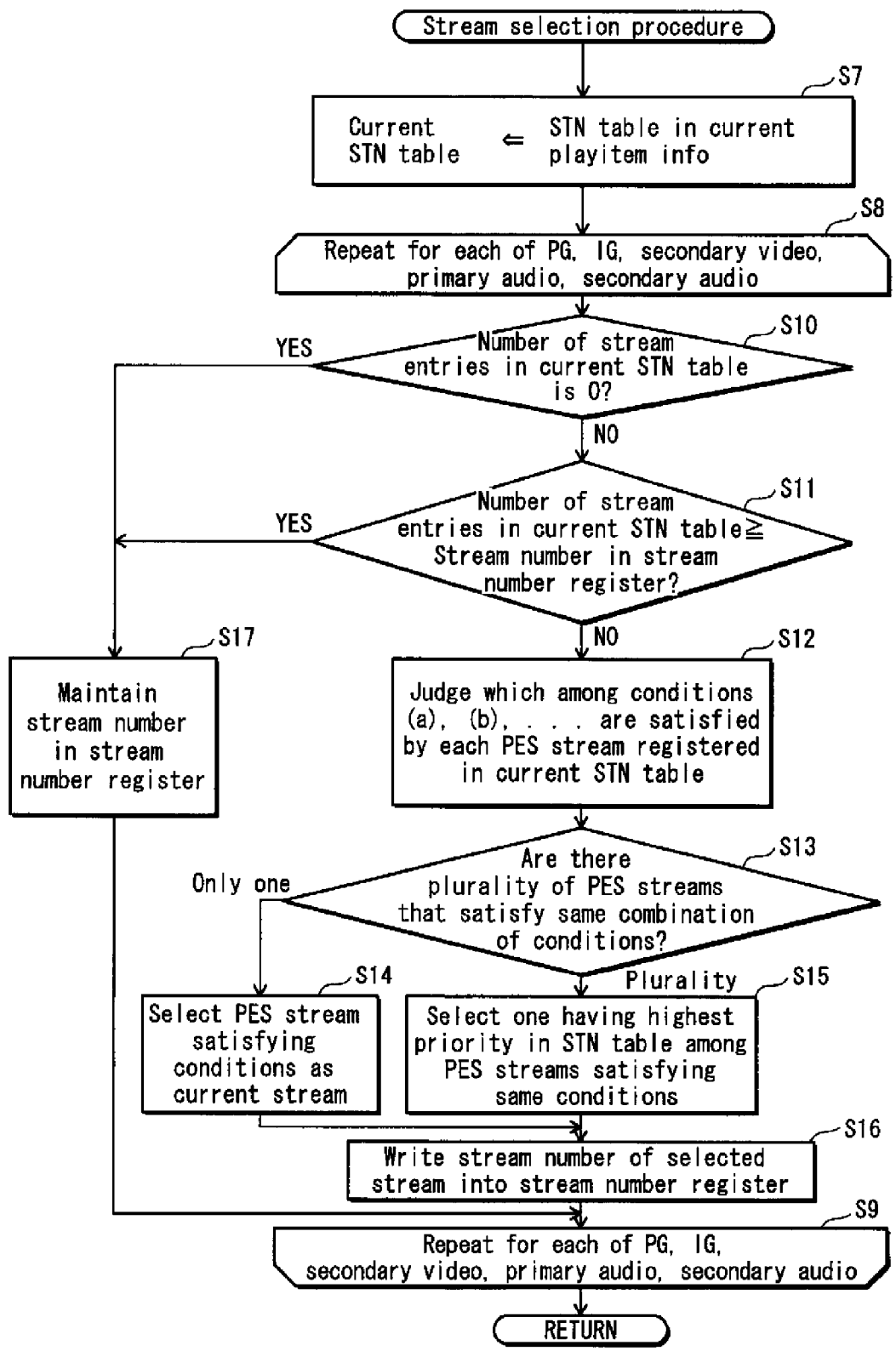

FIG. 34 shows the stream selection procedure.

Figure 35:
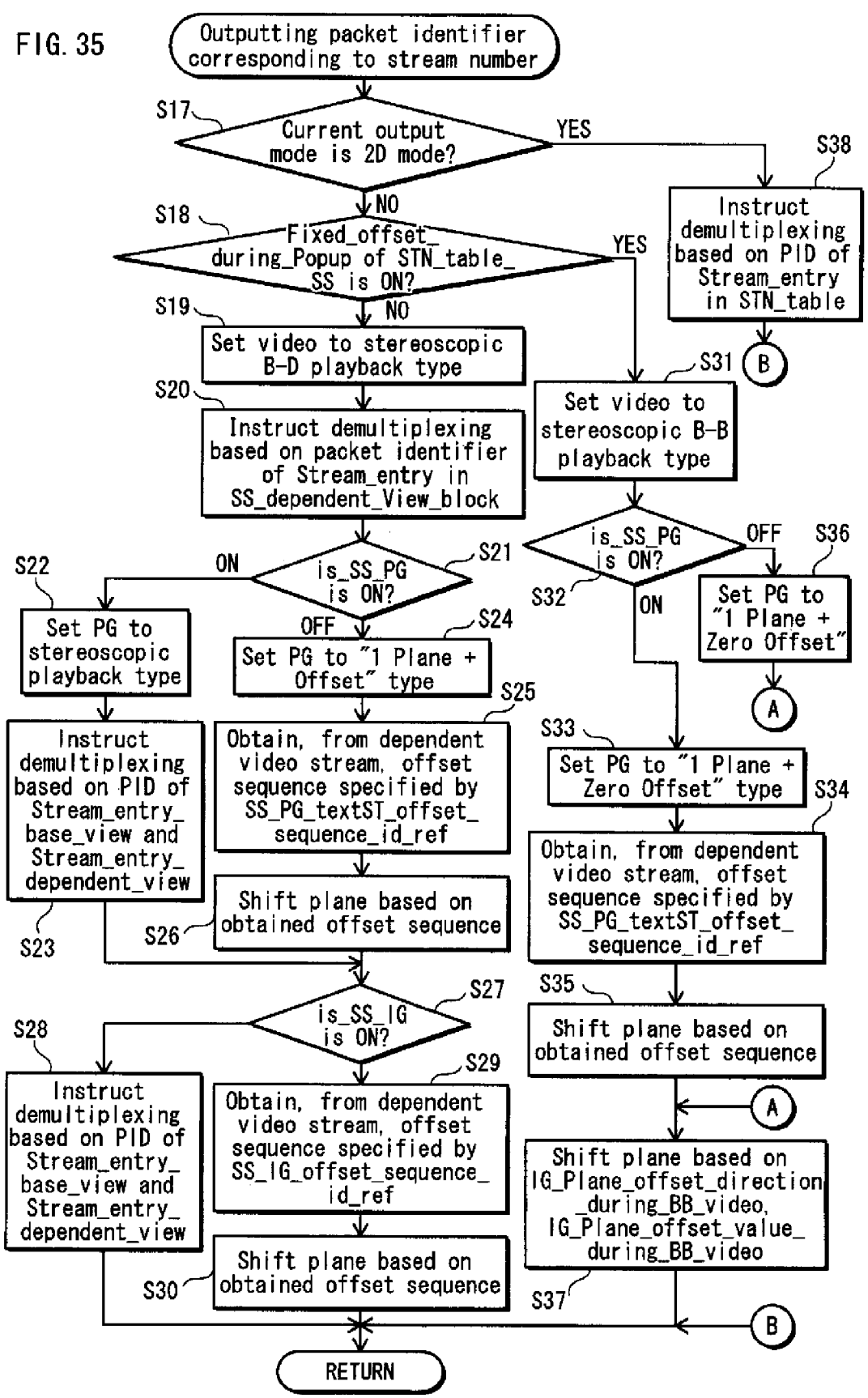

FIG. 35 shows the procedure of outputting the packet identifier corresponding to the stream number.

Figure 36:
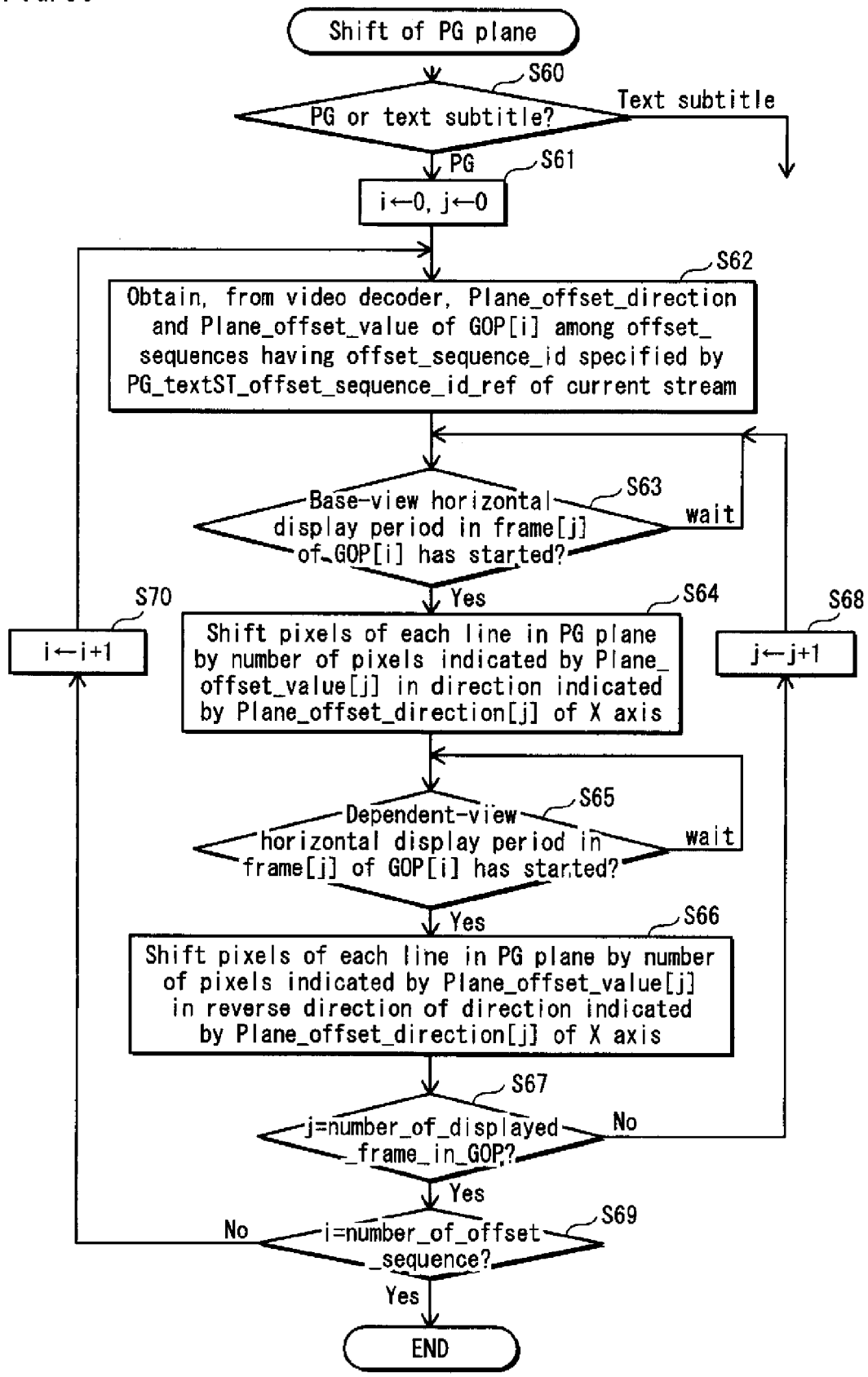

FIG. 36 is a flowchart showing the procedure of shifting the PG plane.

Figure 37:
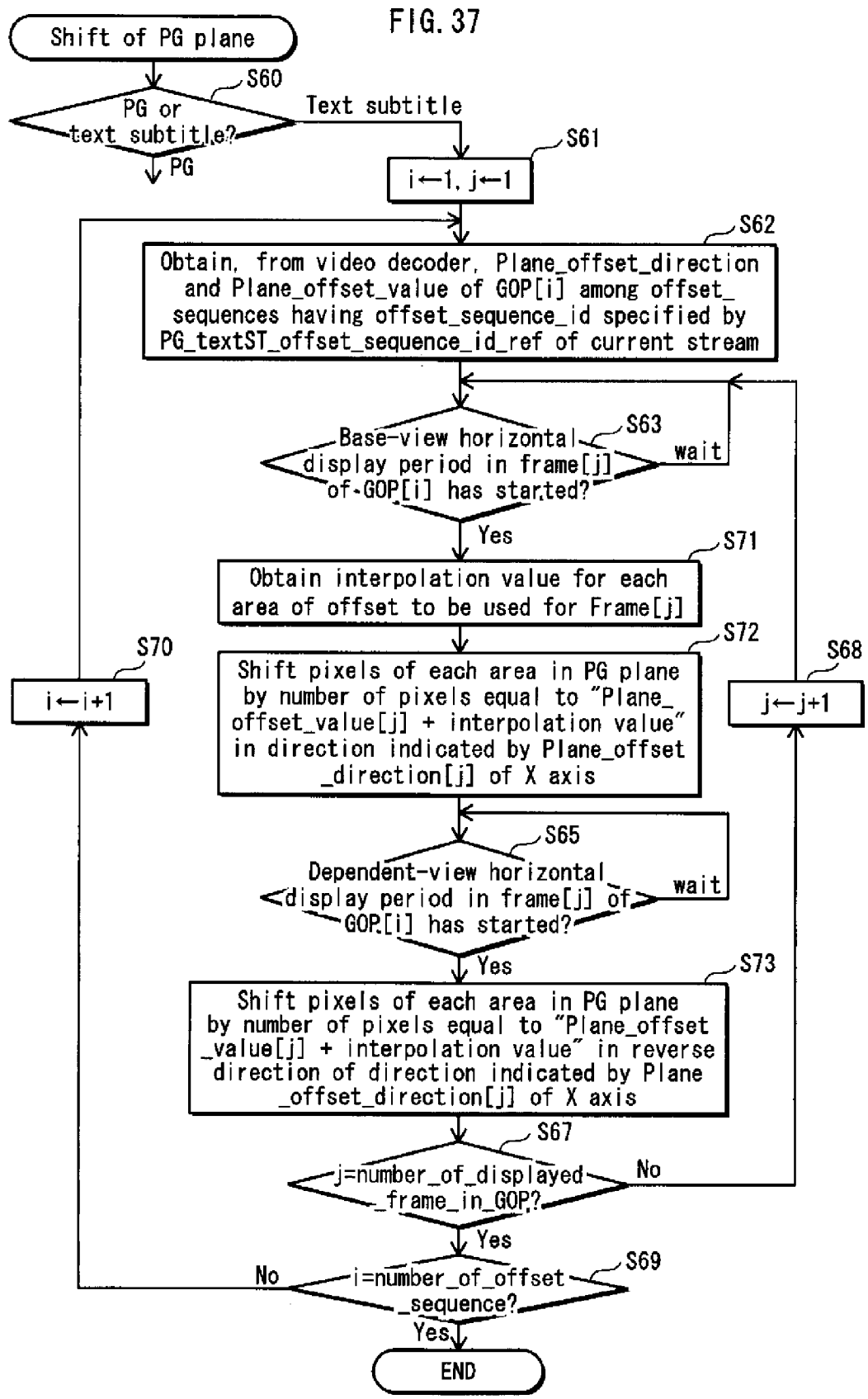

FIG. 37 is a flowchart showing the procedure of shifting the PG plane when the text subtitle stream is the target of playback.

Figure 38:
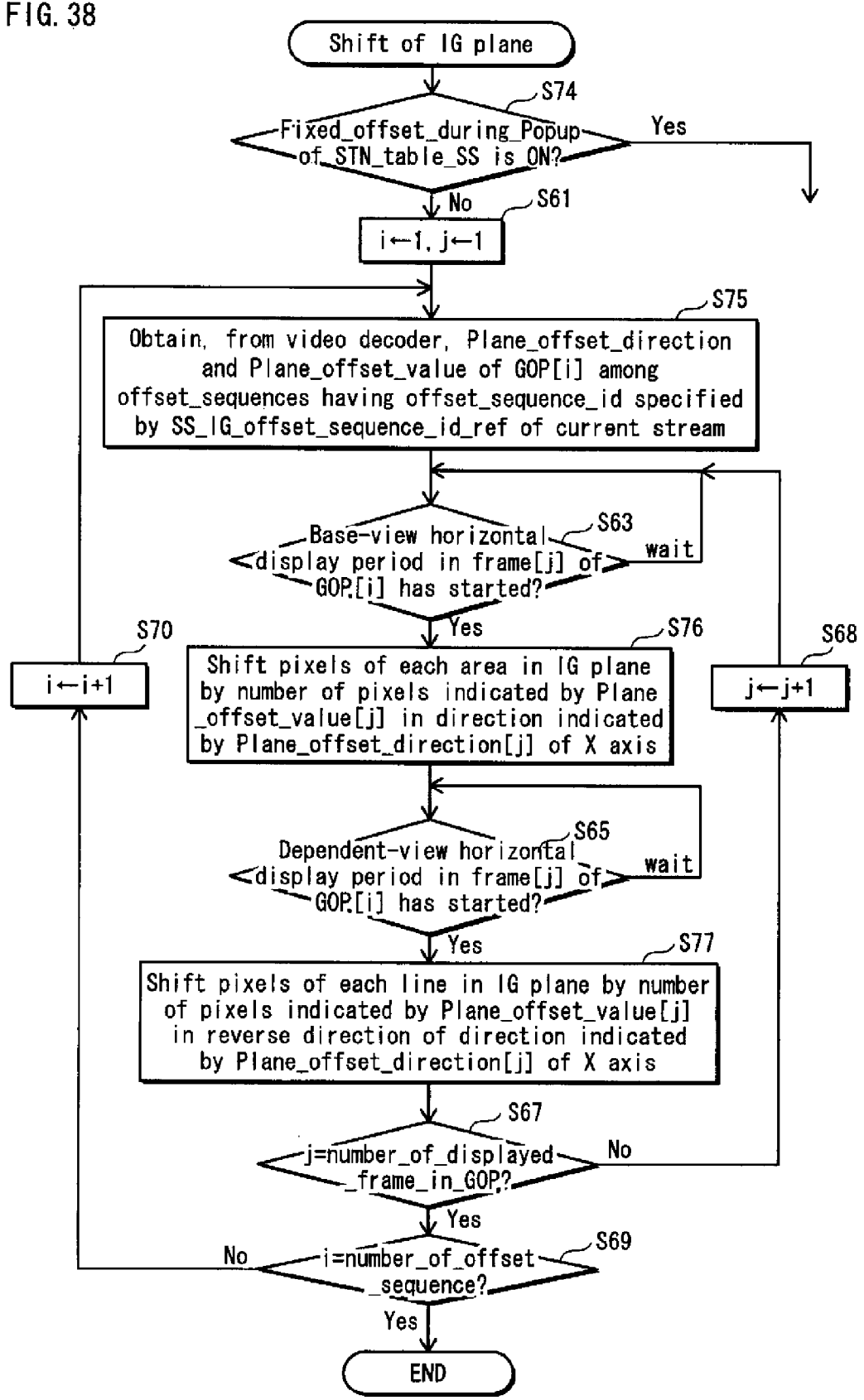

FIG. 38 is a flowchart showing the procedure of shifting the IG plane.

Figure 39:
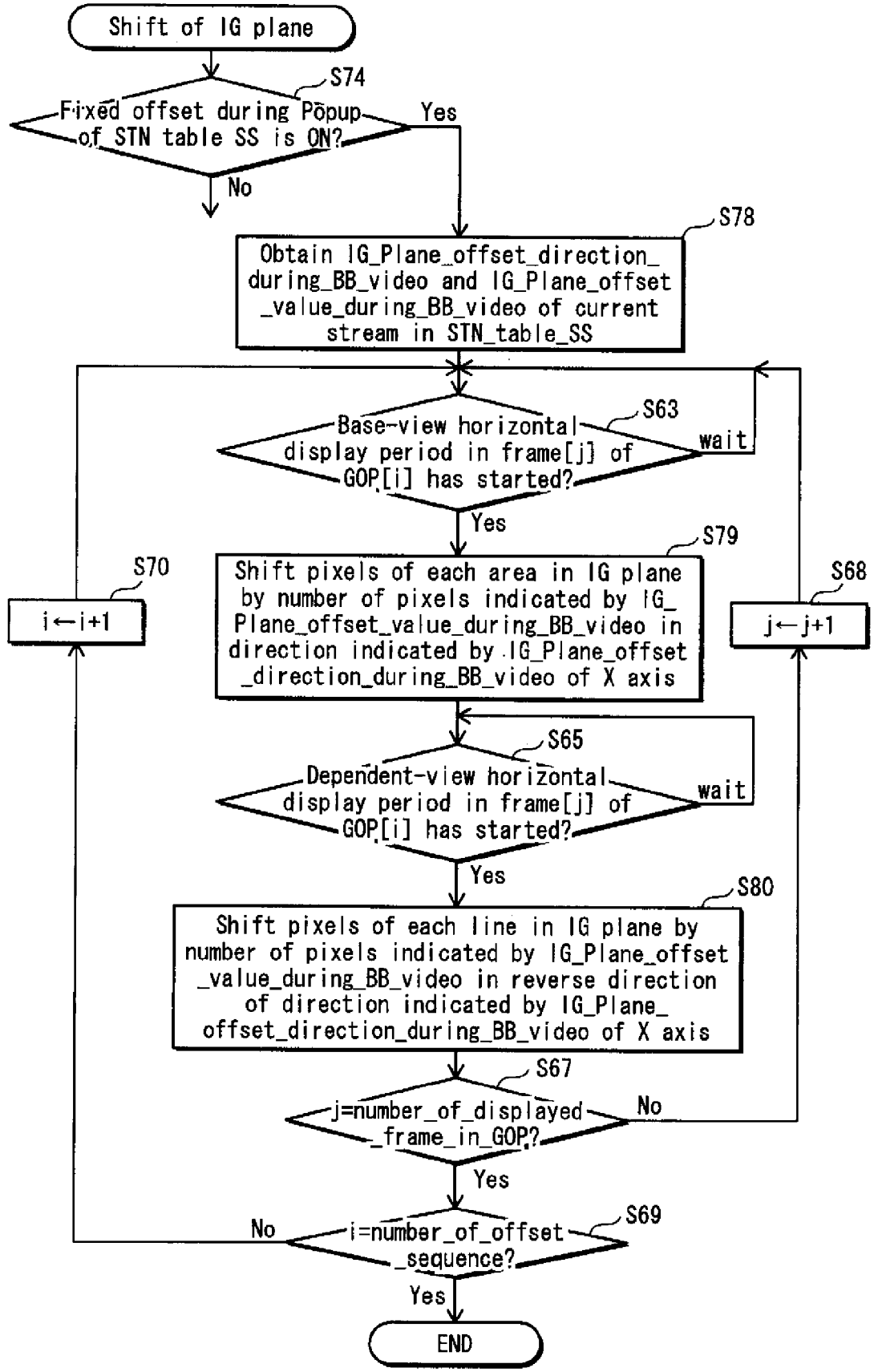

FIG. 39 is a flowchart showing the procedure of shifting the IG plane when the Fixed_offset_during_Popup of the STN_table_SS is ON.

FIG. 40 shows the correspondence between the file 2D/file base and the file dependent.

Figure 41A:
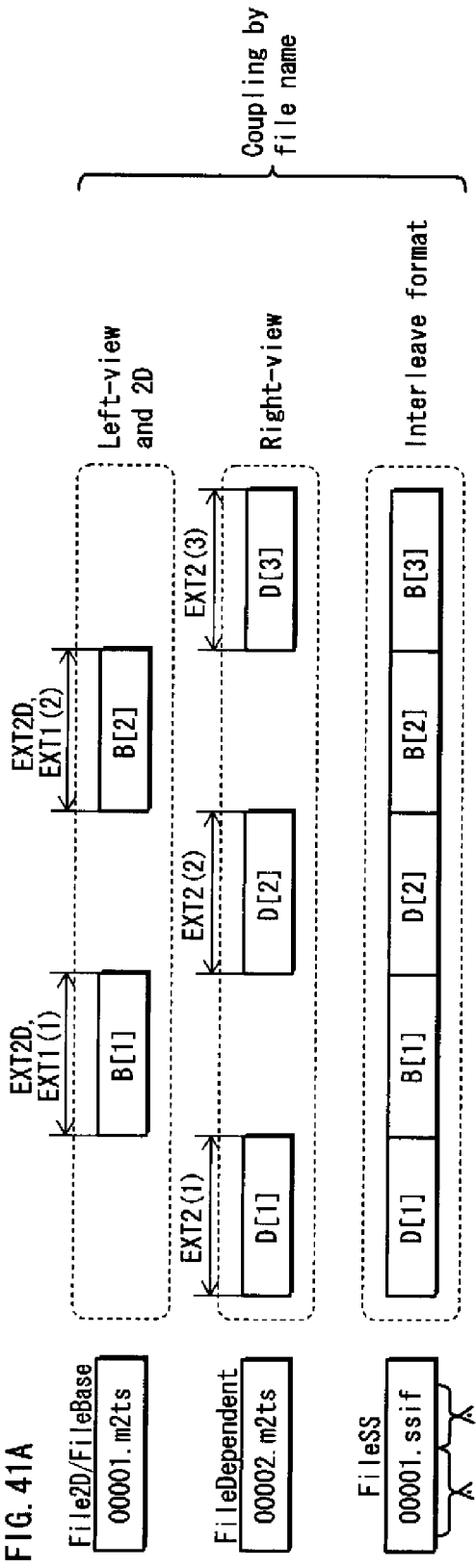
Figure 41C:
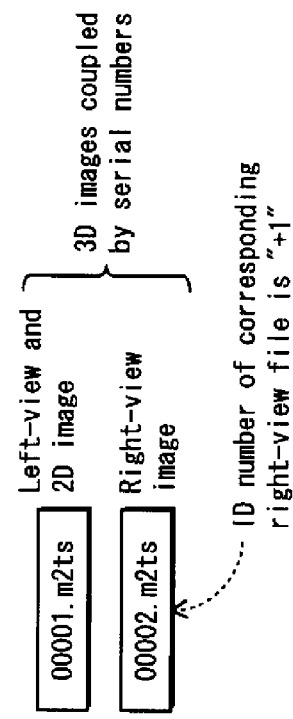
Figure 41B:
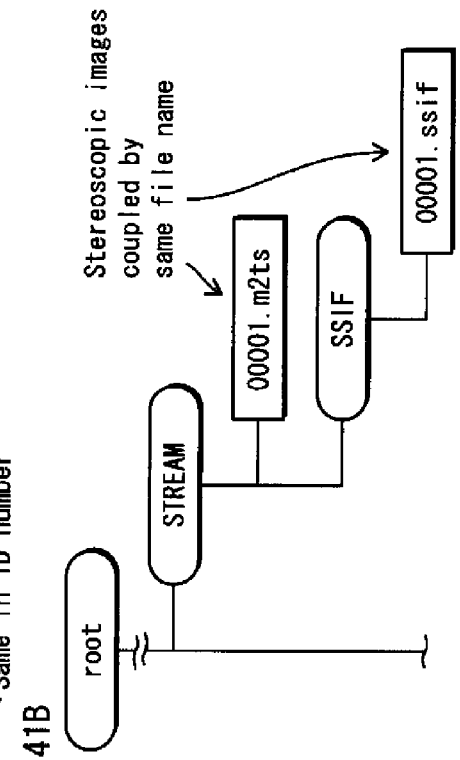

FIGS. 41A through 41C show the correspondence between the interleaved stream file and file 2D/file base.

Figure 42:
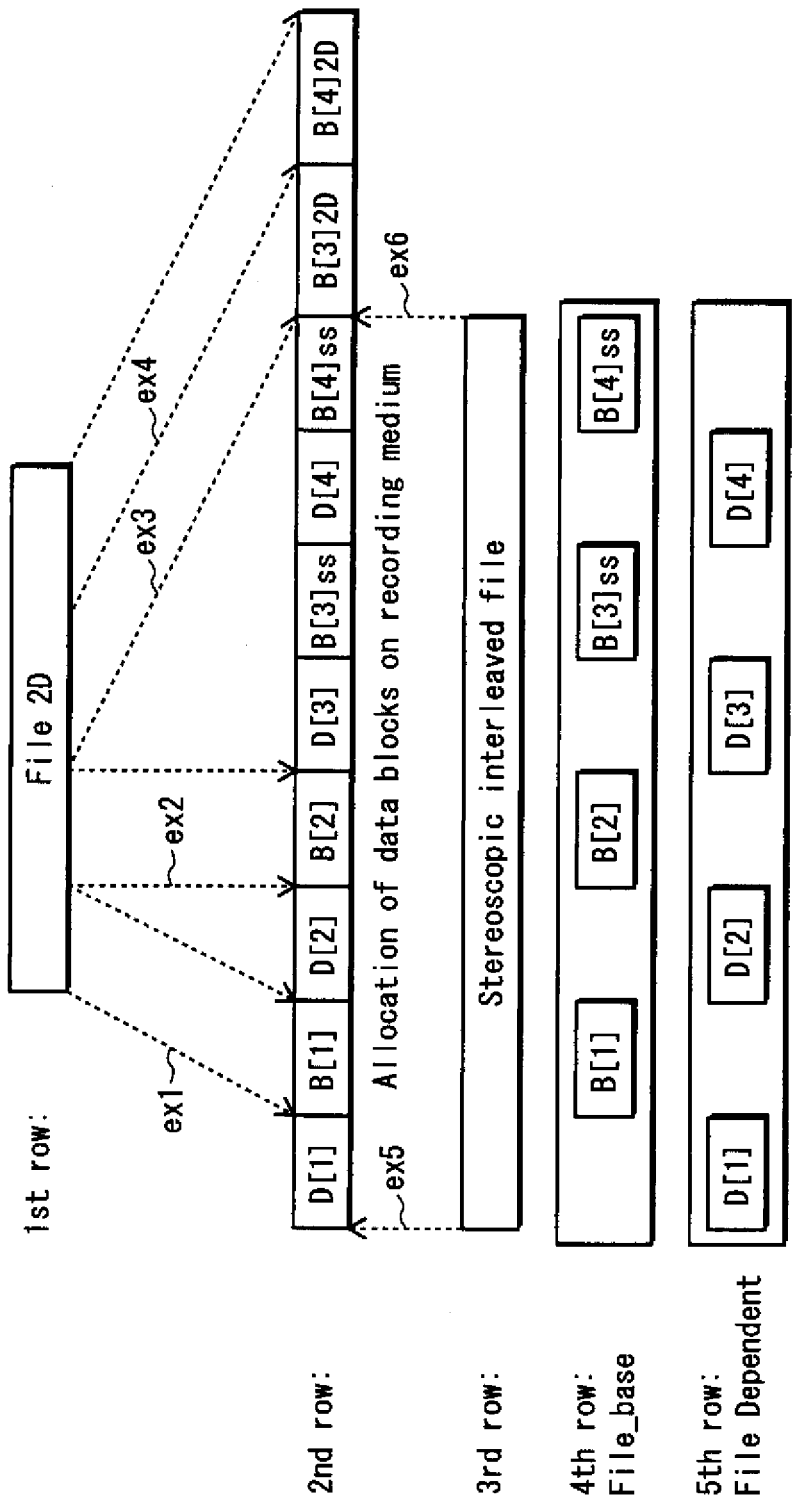

FIG. 42 shows correspondence among the stereoscopic interleaved stream file, file 2D, file base, and file dependent.

Figure 43:
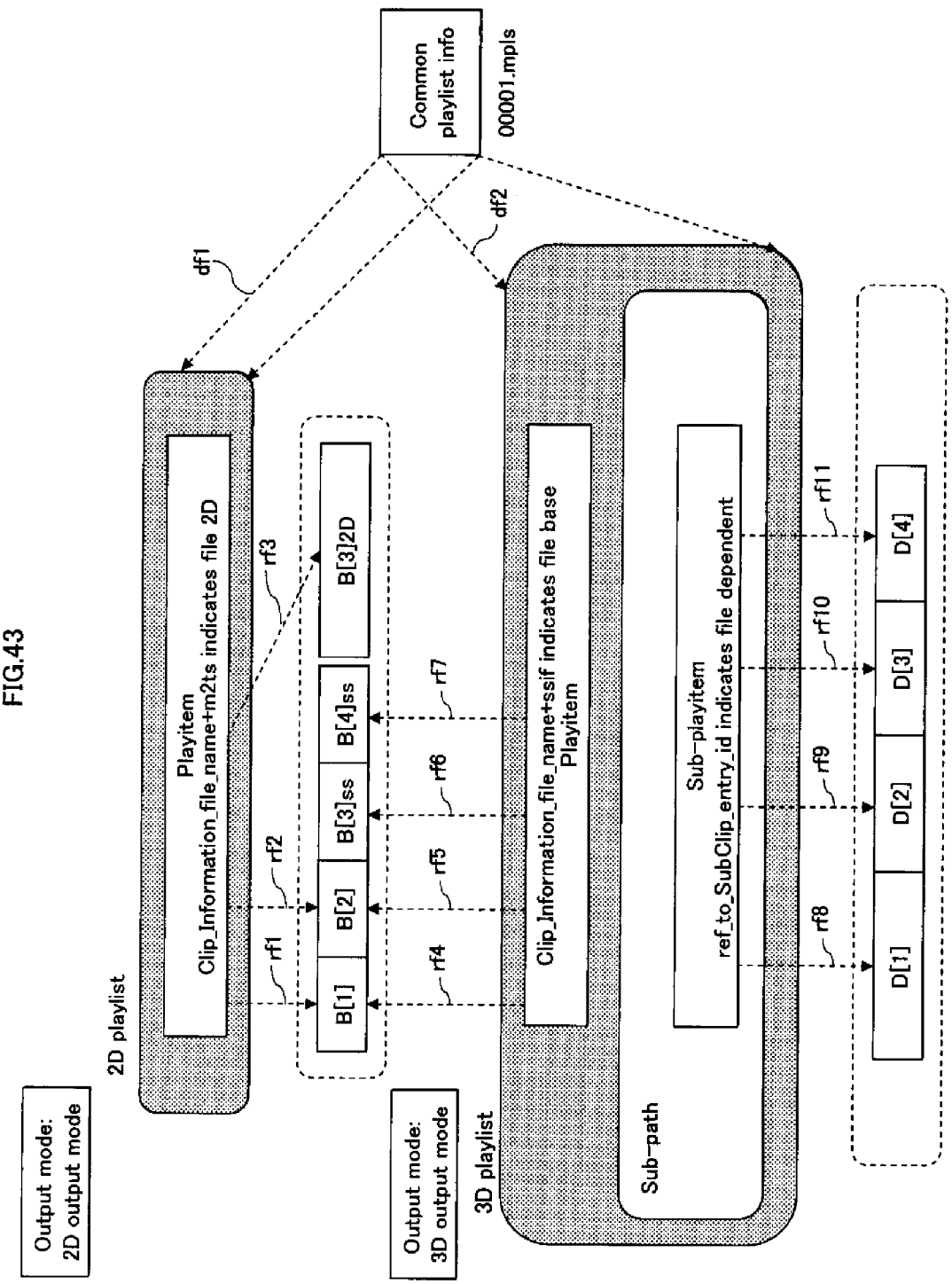

FIG. 43 shows the 2D playlist and 3D playlist.

Figure 44:
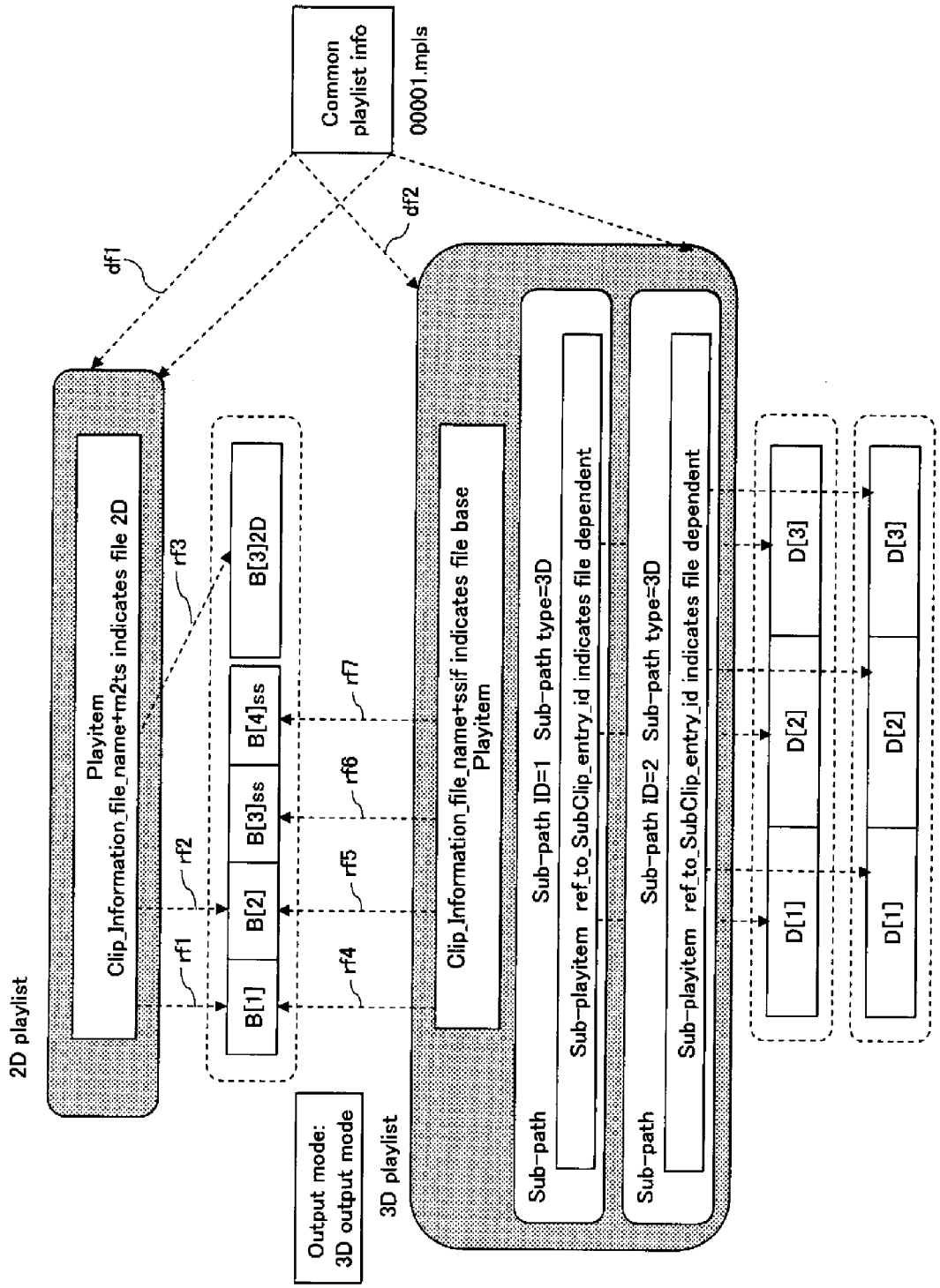

FIG. 44 shows a playlist generated by adding a sub-path to the 3D playlist.

FIGS. 45A and 45B show a 3D playlist generated by adding a base-view indicator to the 3D playlist.

FIG. 46 is a flowchart showing the playitem playback procedure.

Figure 47B:
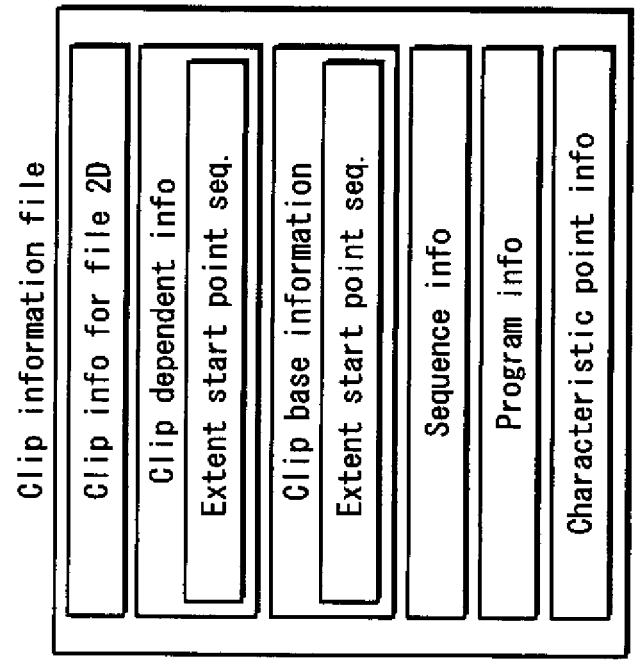
Figure 47A:
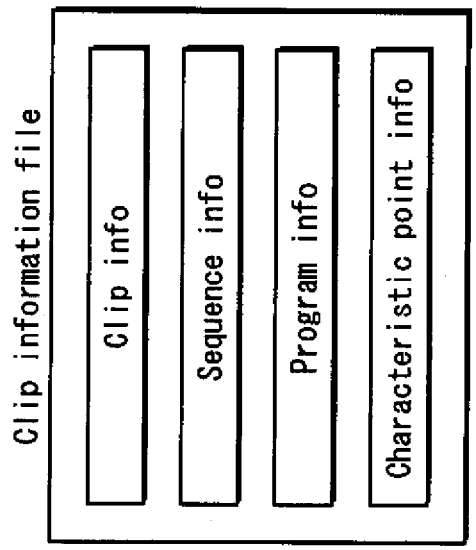

FIGS. 47A through 47B show the internal structure of the clip information file.

FIG. 48 shows a syntax of the Extent start point information.

Figure 49A:
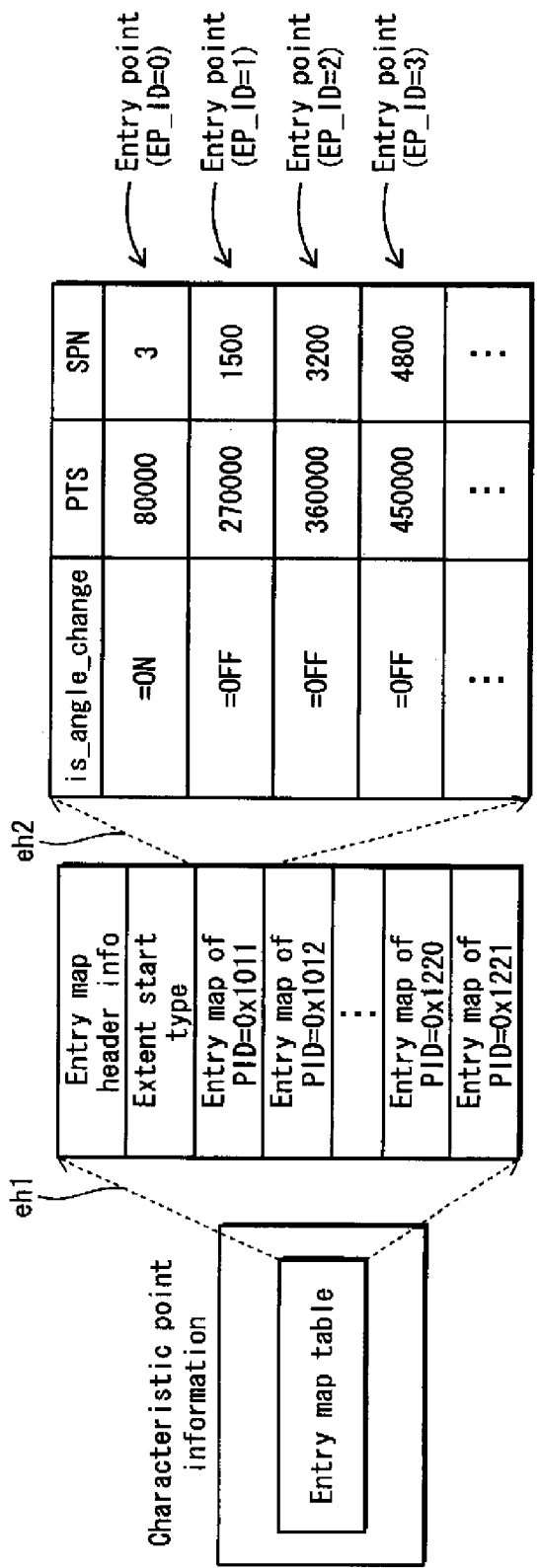
Figure 49B:
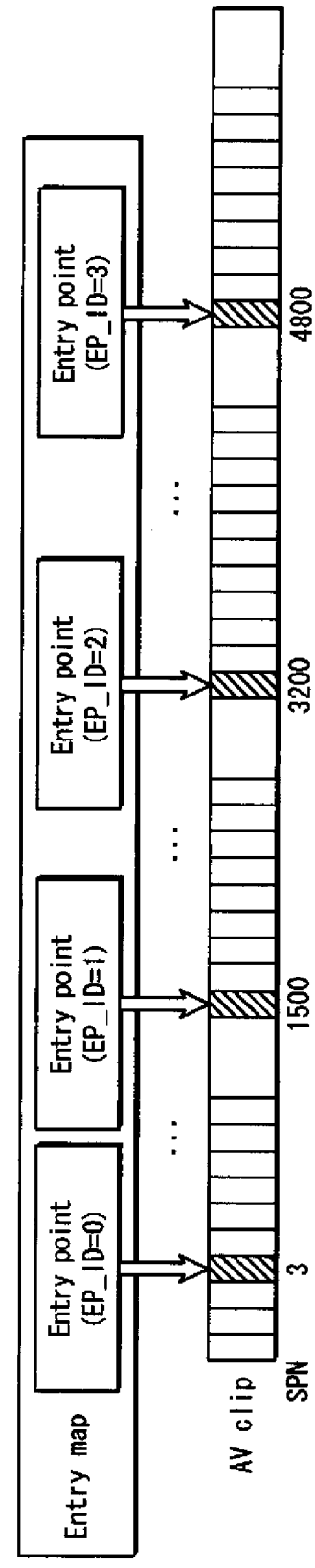

FIGS. 49A and 49B show the entry map table included in the clip information file.

Figure 50:
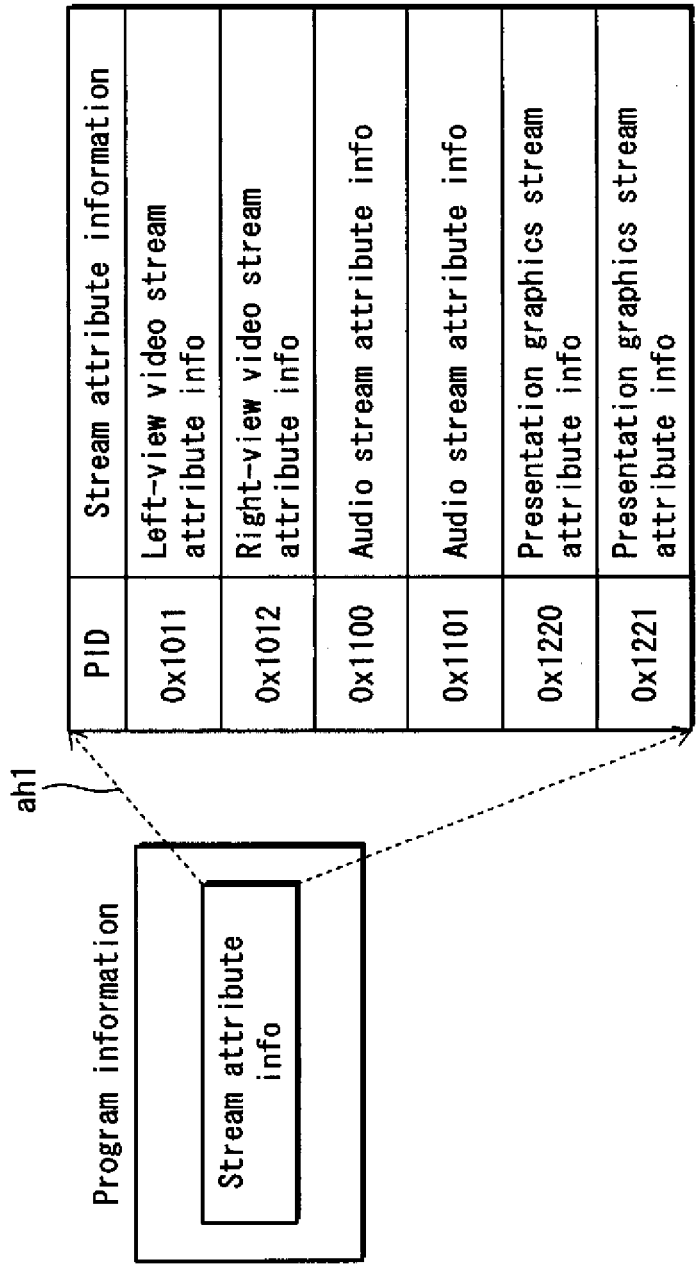

FIG. 50 shows the stream attribute included in the program information.

Figure 51:
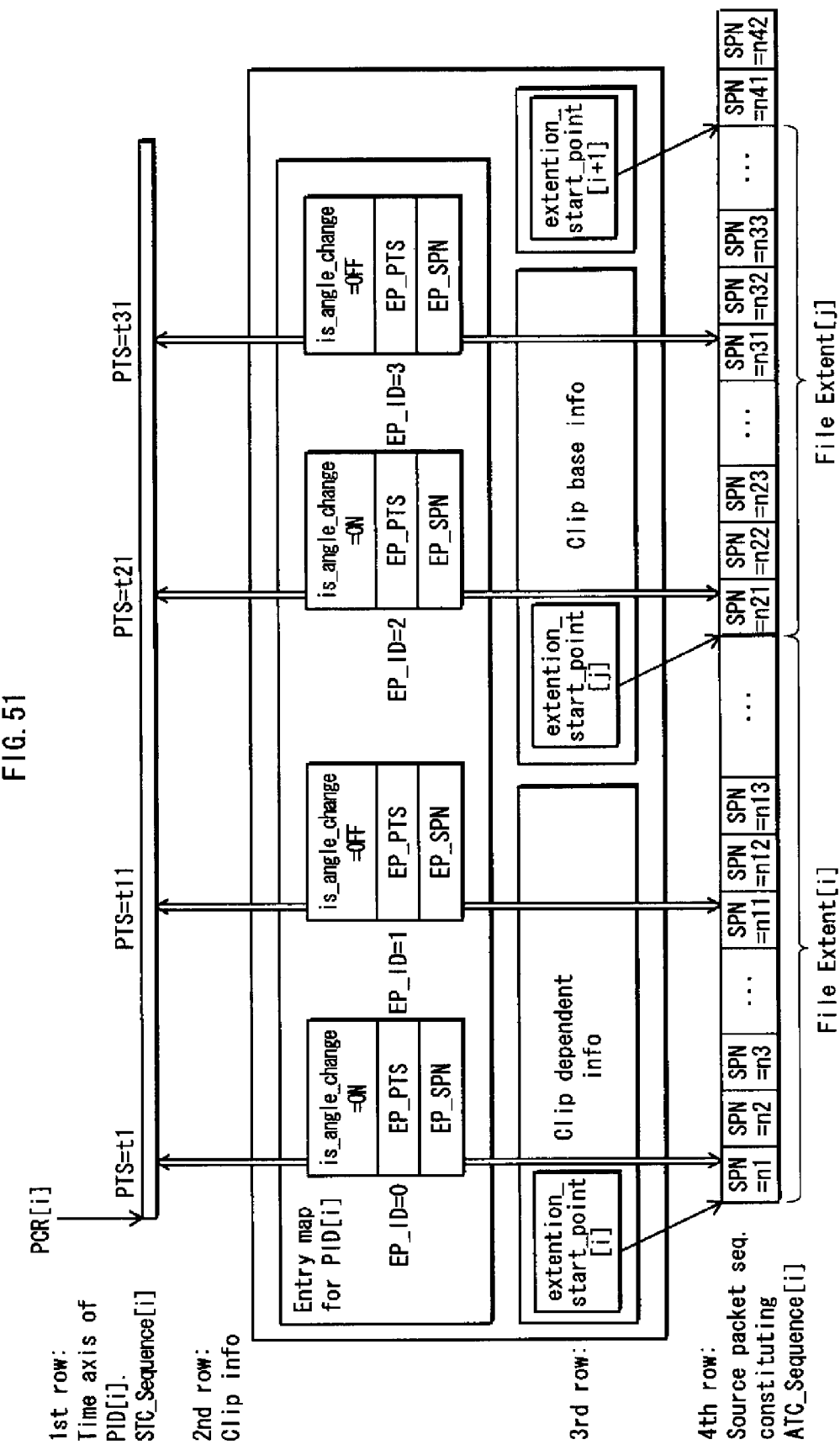

FIG. 51 shows how entry points are registered in an entry map.

Figure 52:
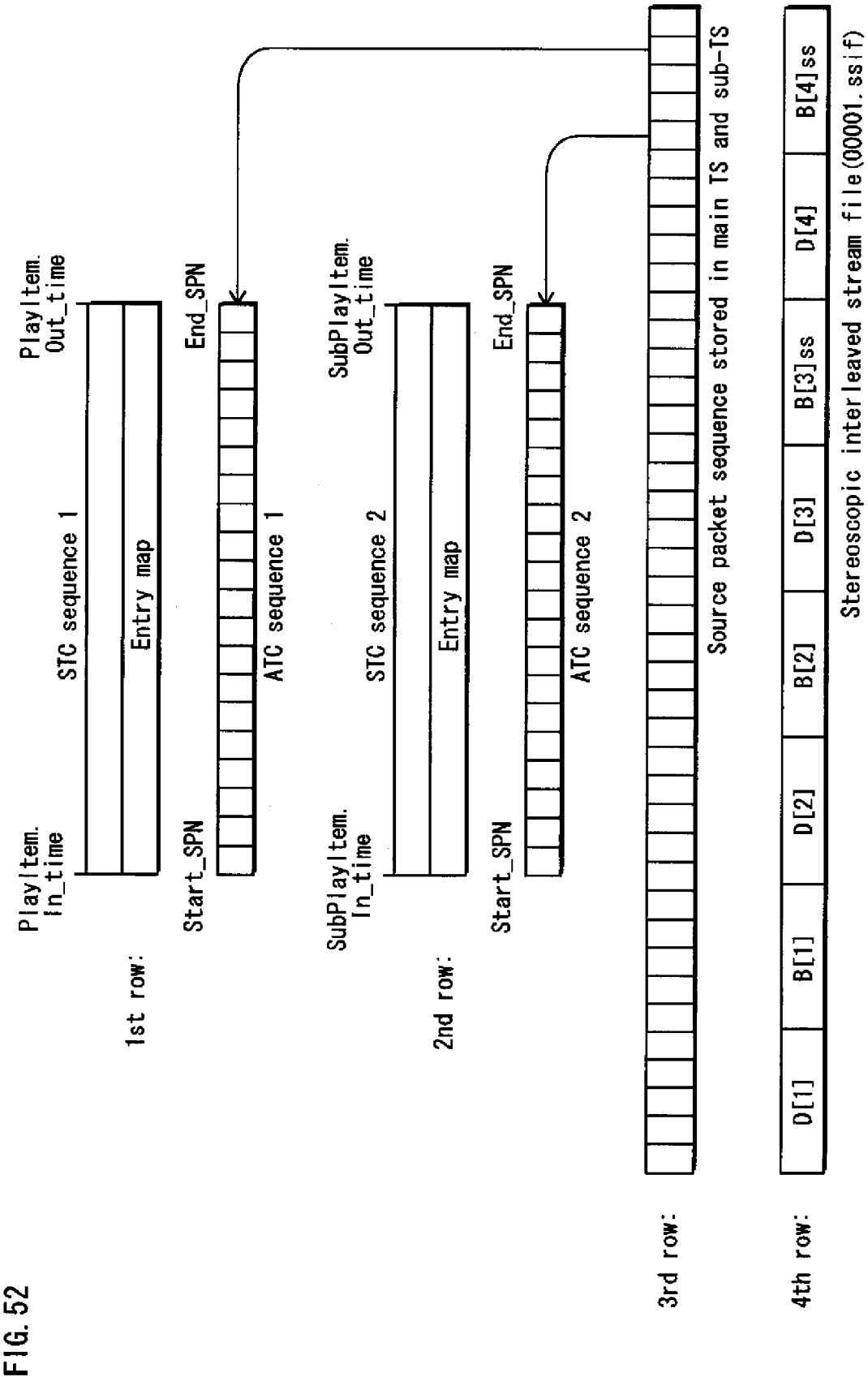

FIG. 52 shows how the ATC sequence is restored from the data blocks constituting the stereoscopic interleaved stream file.

FIGS. 53A and 53B show restoration of the ATC sequence.

Figure 54:
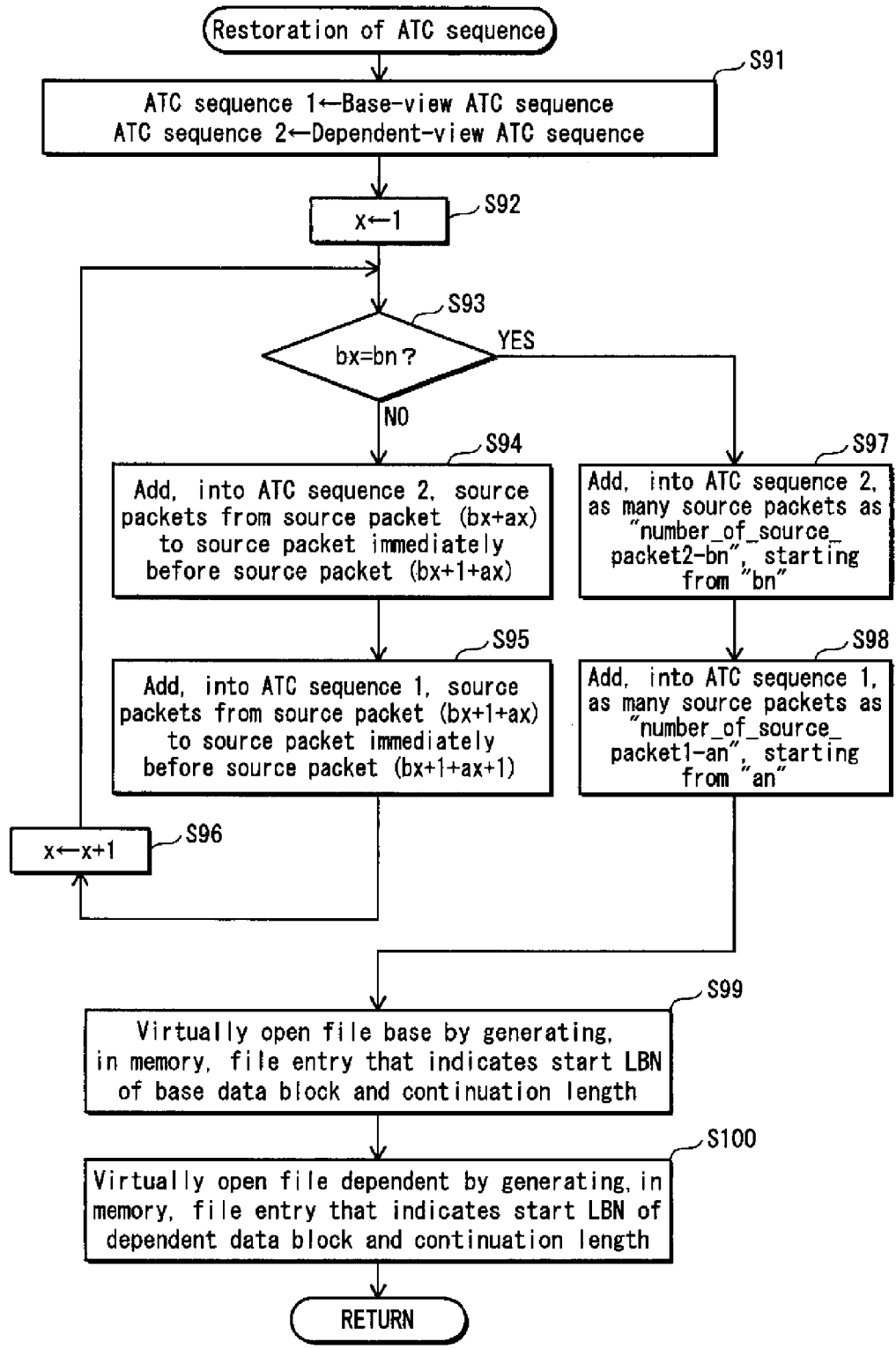

FIG. 54 shows the procedure for restoring the ATC sequence.

Figure 55A:
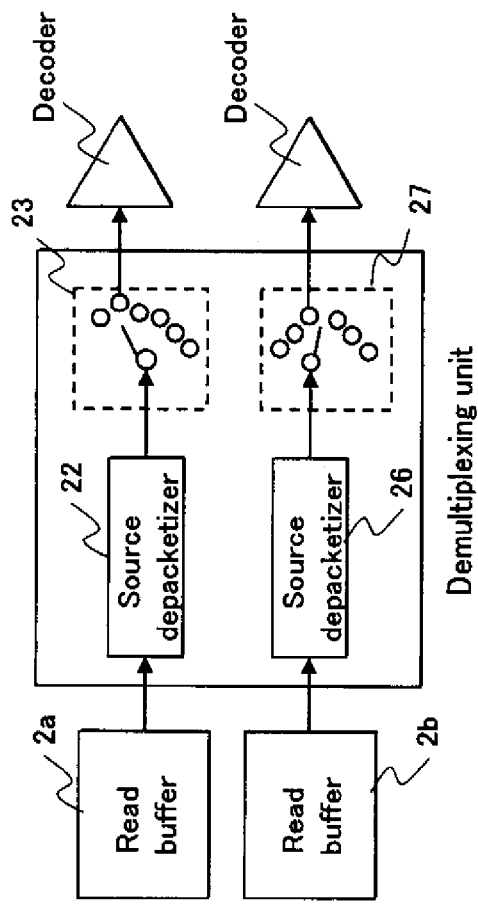
Figure 55B:
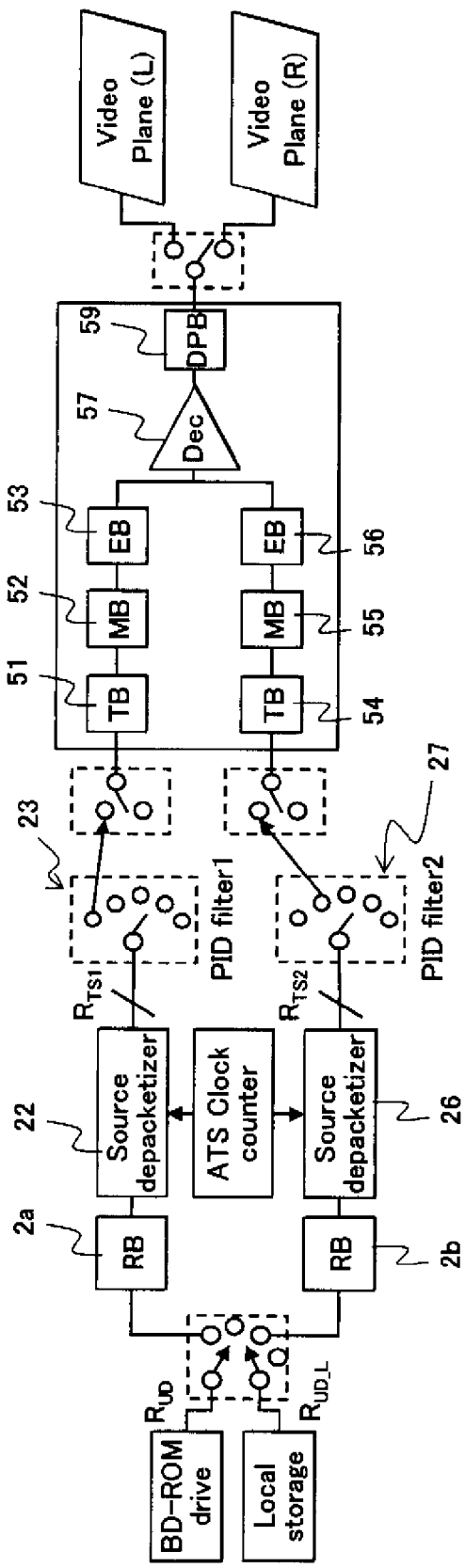

FIGS. 55A and 55B show the internal structures of the demultiplexing unit and the video decoder.

Figures 56A, 56B:
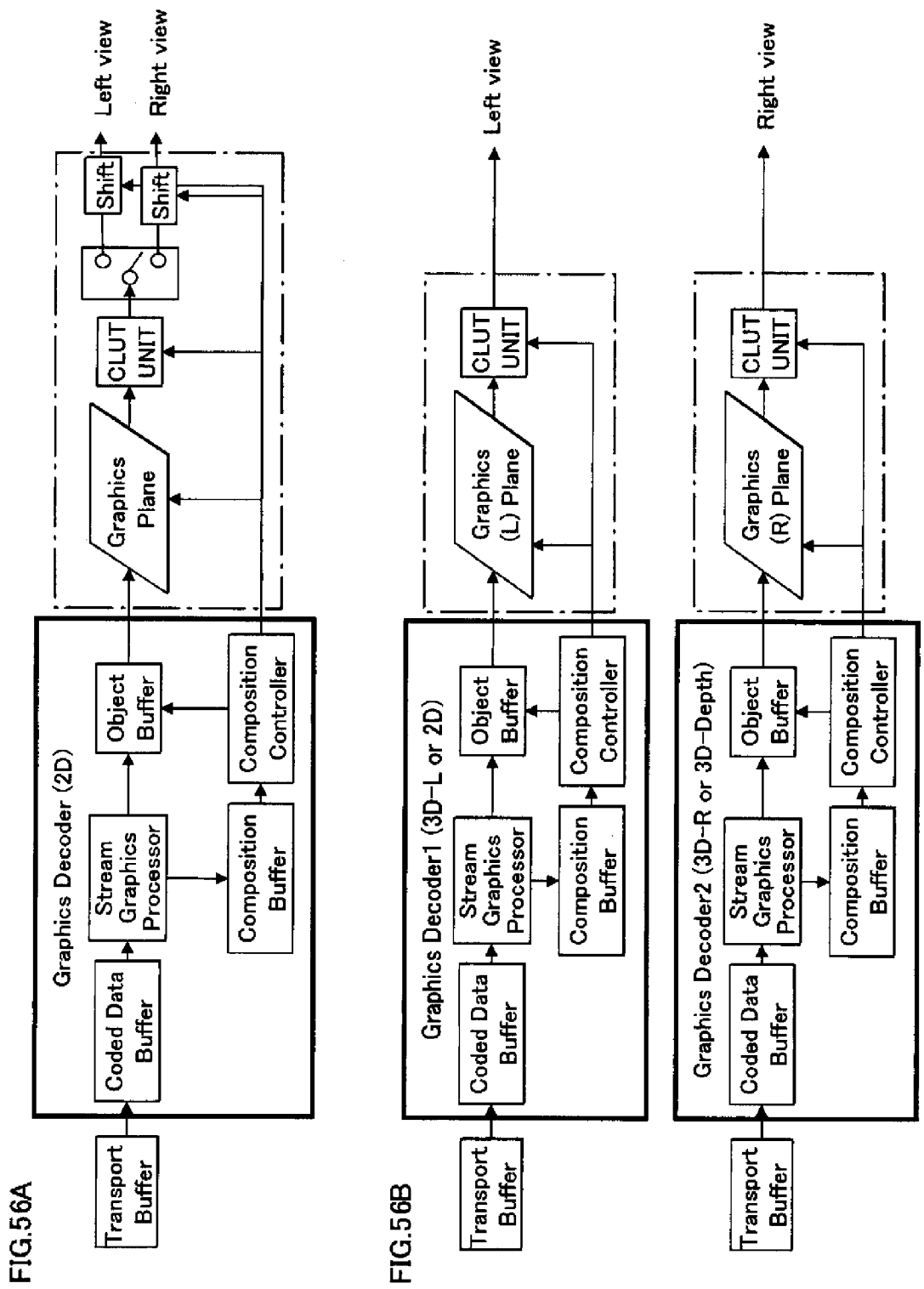

FIGS. 56A and 56B show the internal structure of the graphics decoder for the PG stream.

Figures 57A, 57B:
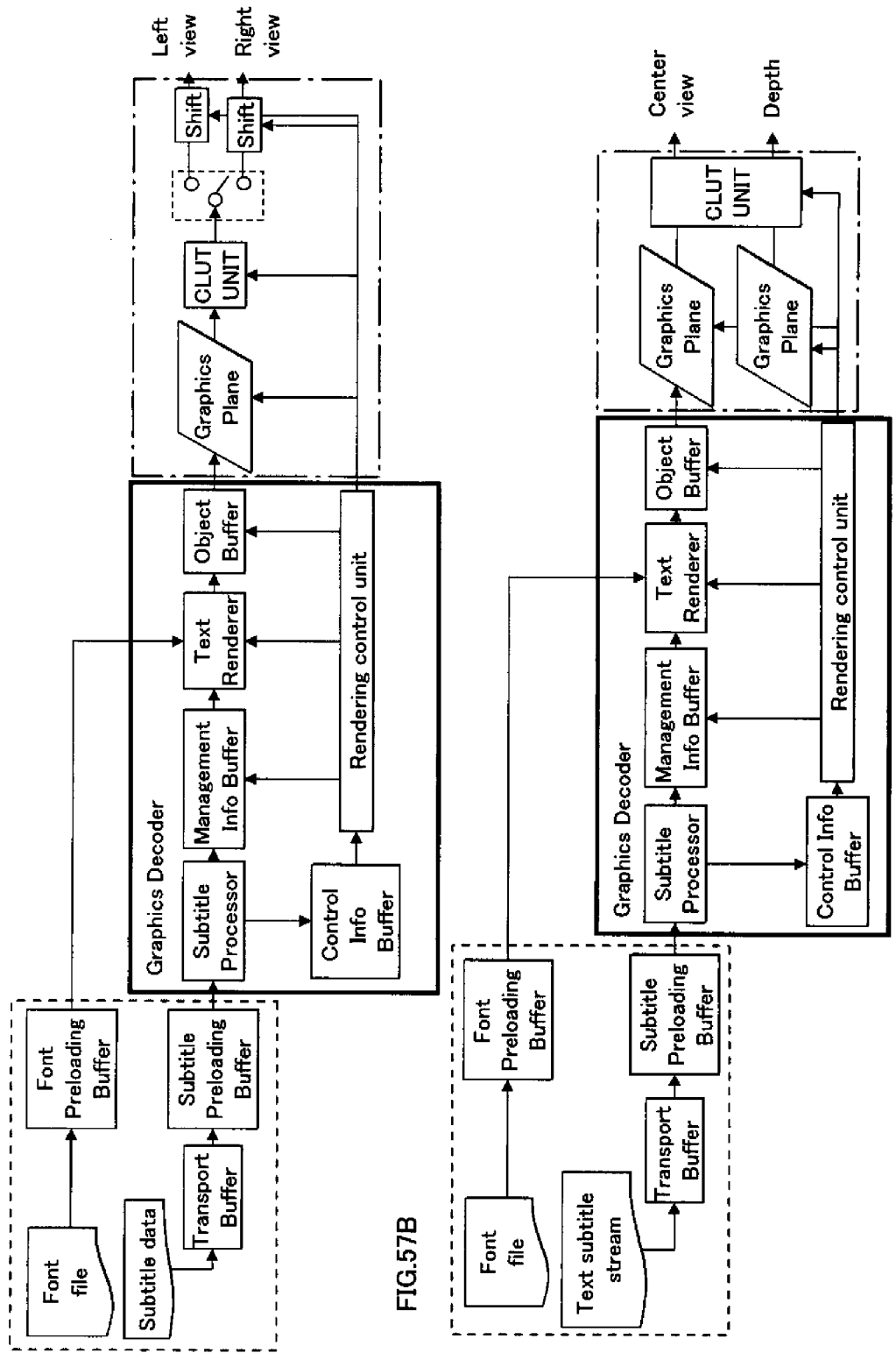

FIGS. 57A and 57B show the internal structure of the text subtitle decoder.

Figure 58A:
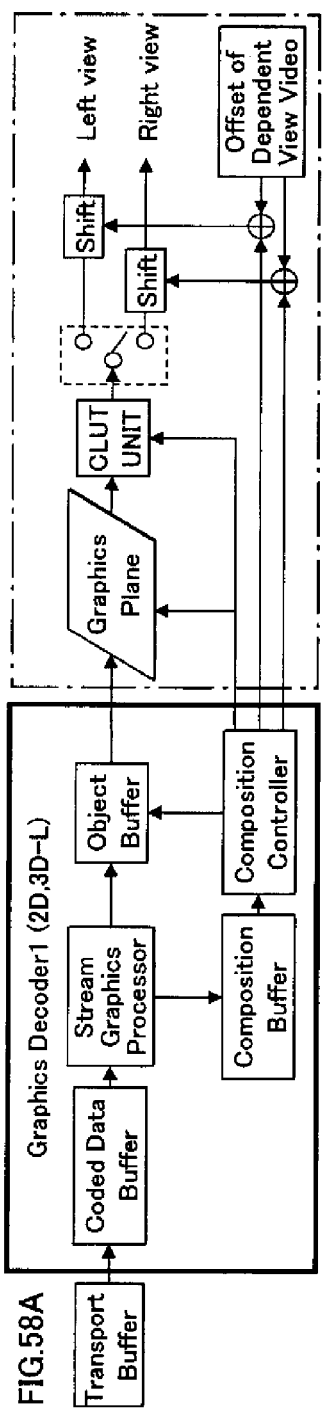
Figure 58B:
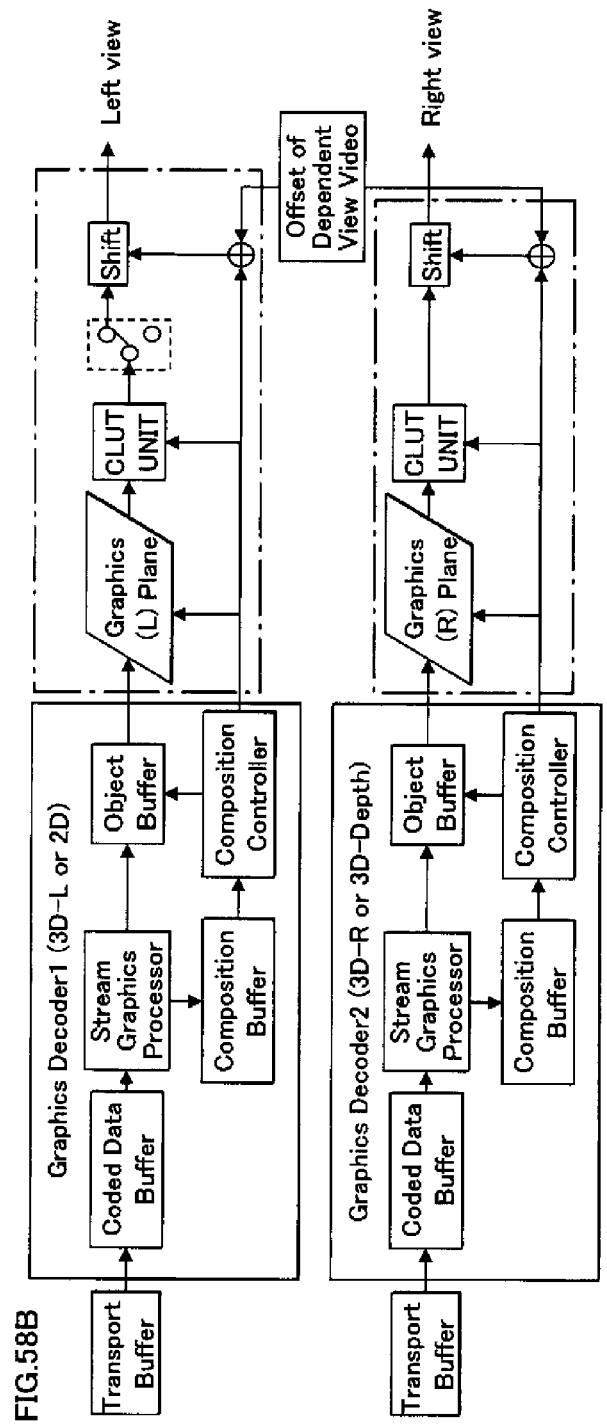

FIGS. 58A and 58B show decoder models of the IG decoder.

Figure 59:
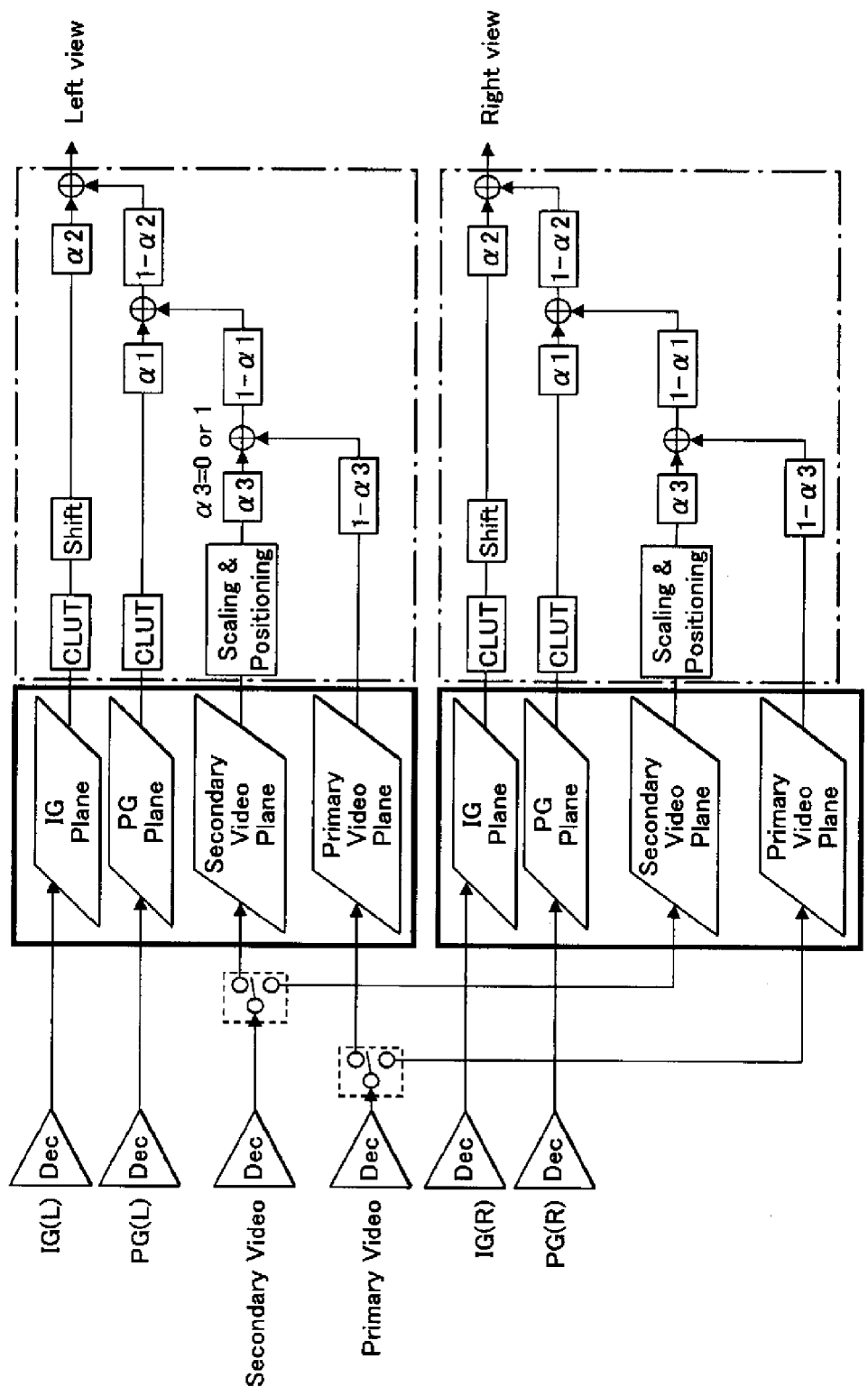

FIG. 59 shows a circuit structure for overlaying the outputs of these decoder models and outputting the result in the 3D-LR mode.

Figure 60:
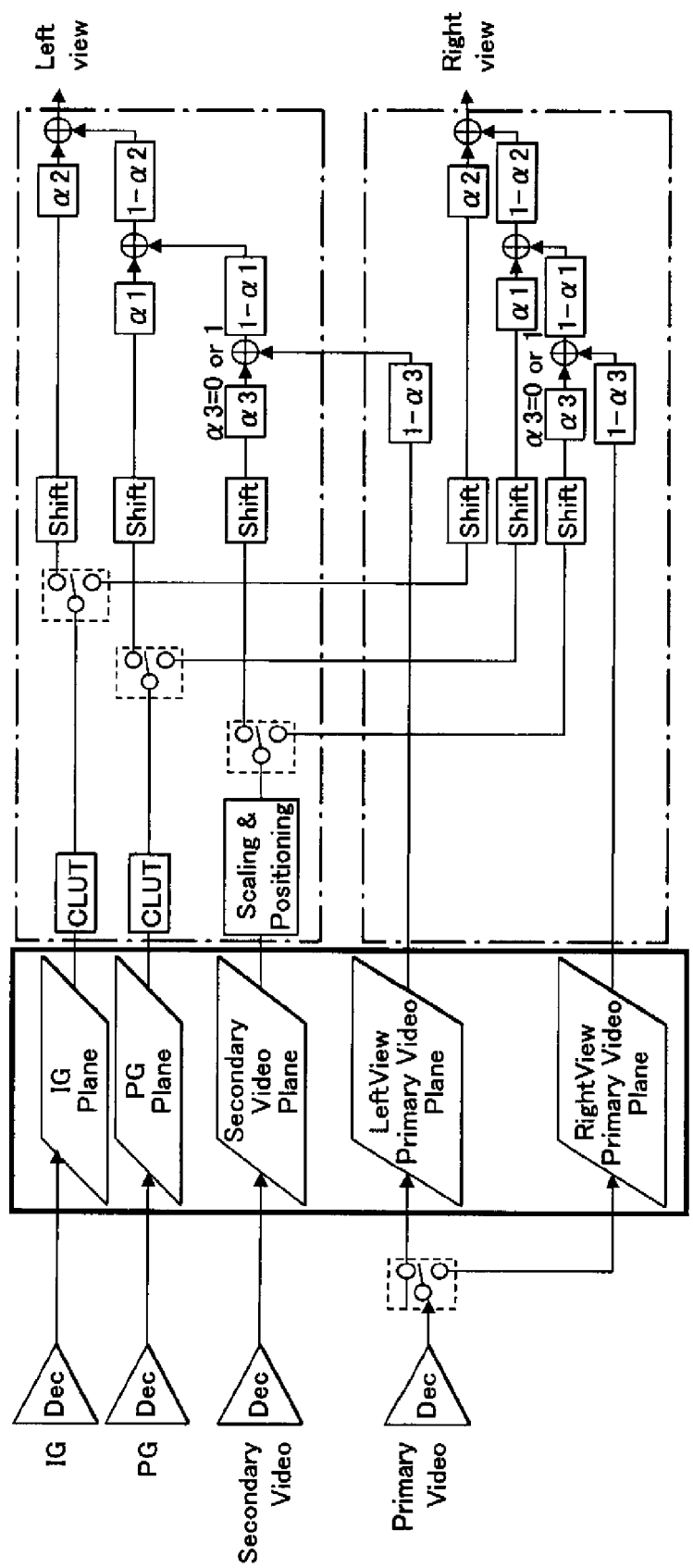

FIG. 60 shows a circuit structure for overlaying the outputs of the decoder models and outputting the result in the "1 plane+offset" mode.

Figure 61:
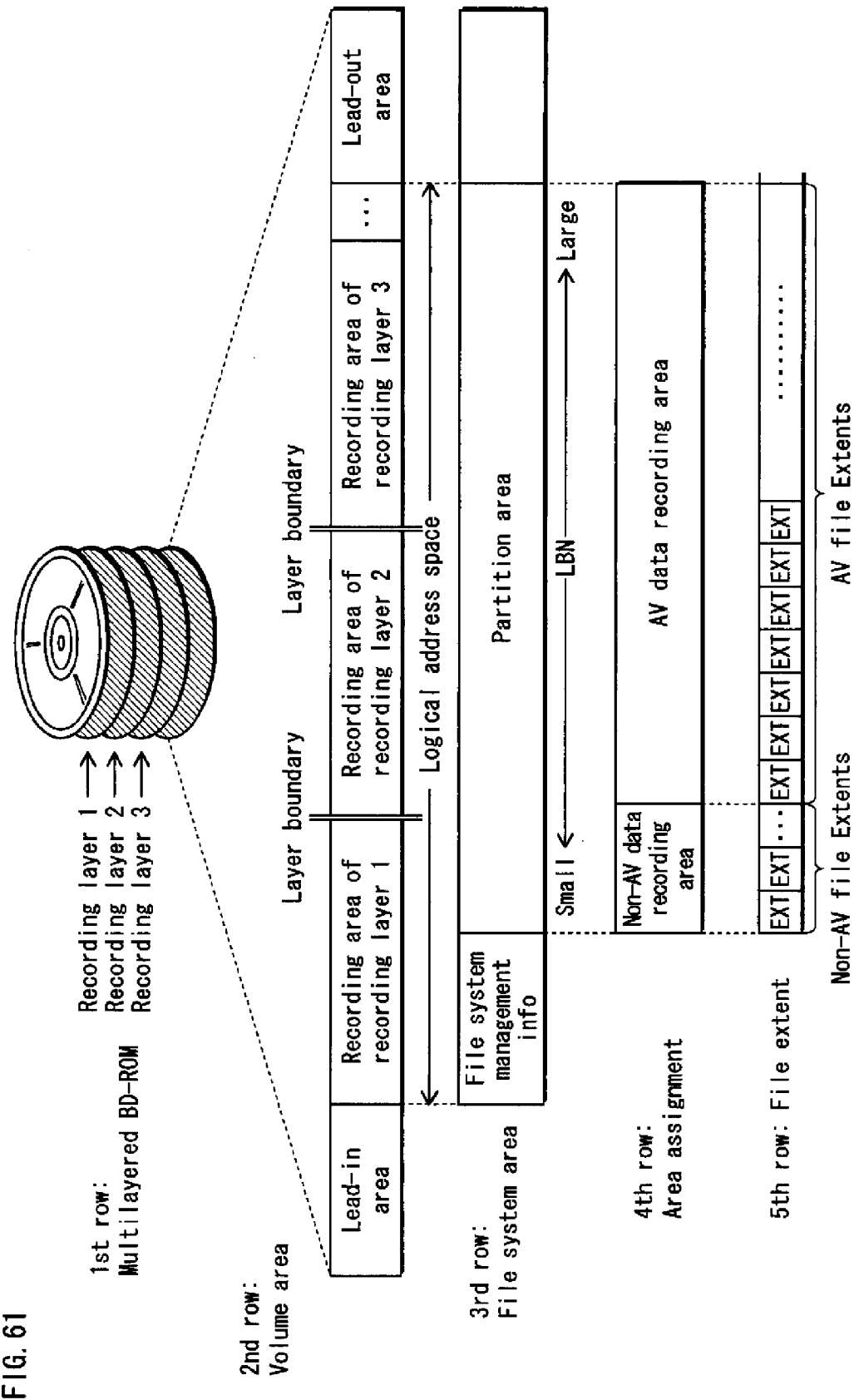

FIG. 61 shows an internal structure of a multi-layered optical disc.

FIG. 62 shows the application format of the optical disc based on the file system.

Figure 63A:
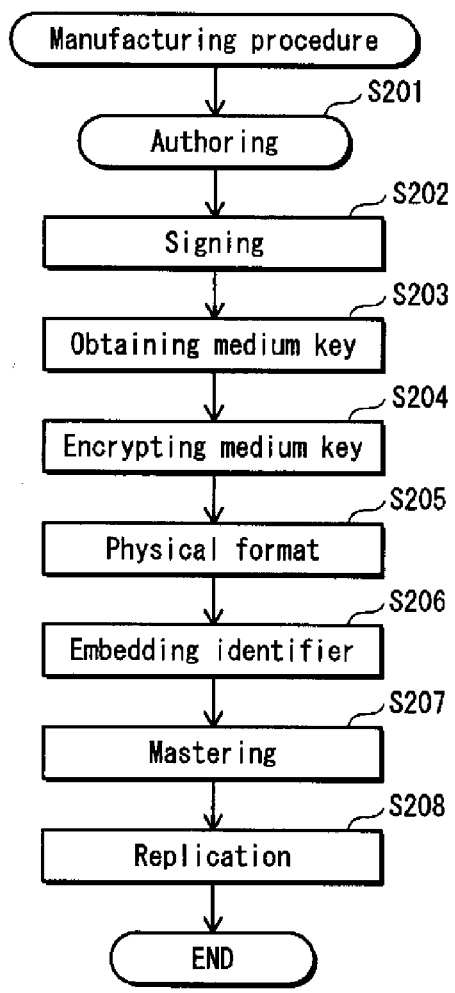
Figure 63B:
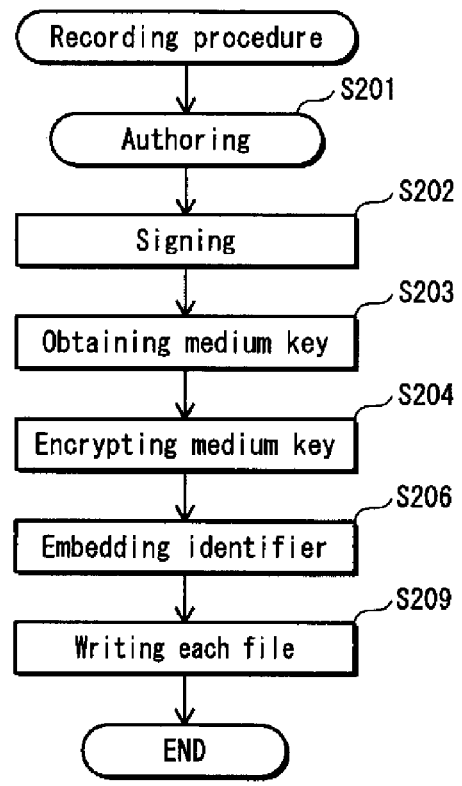

FIGS. 63A and 63B show the manufacturing method of an optical disc.

Figure 64:
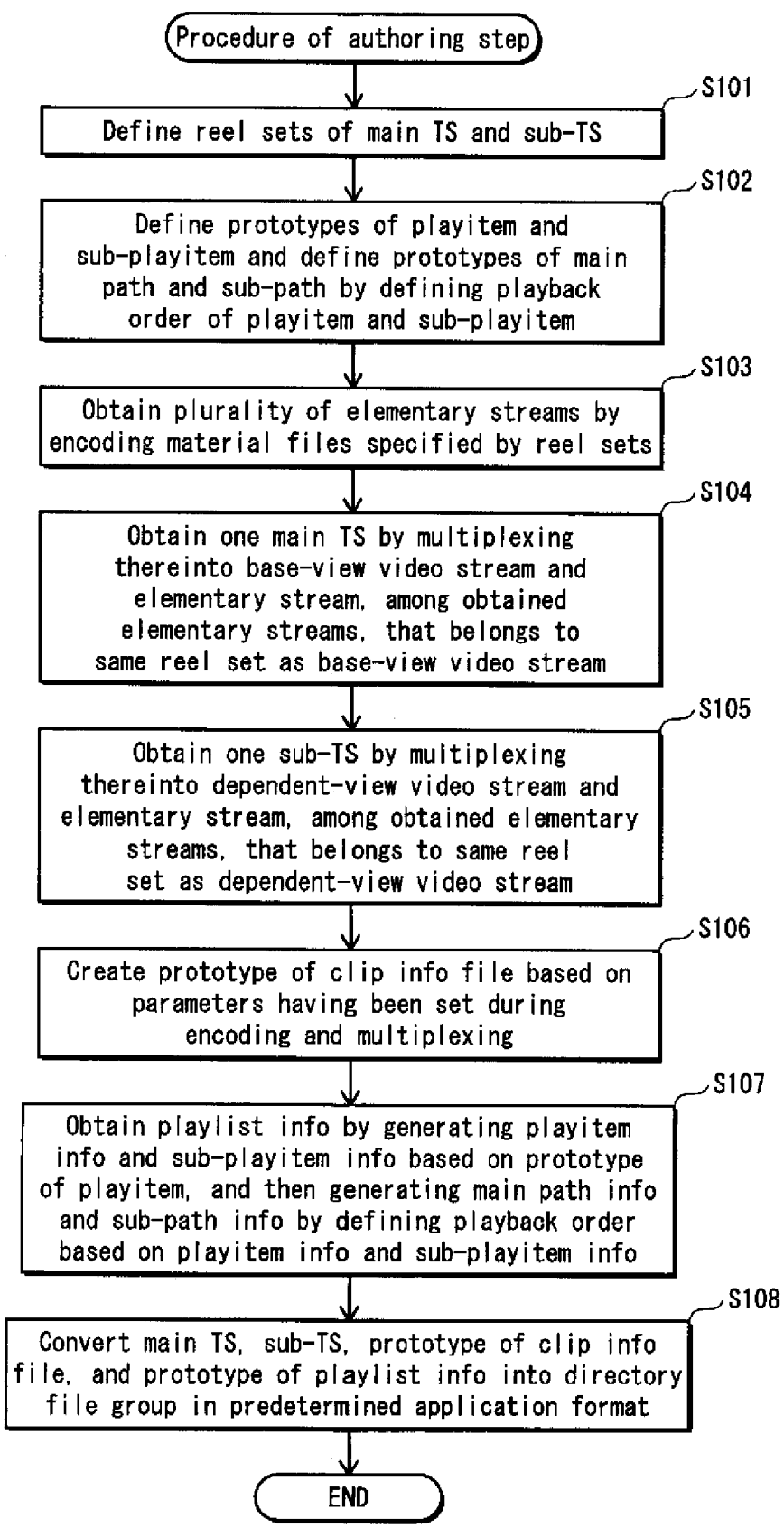

FIG. 64 is a flowchart showing the procedure of the authoring step.

Figure 65:
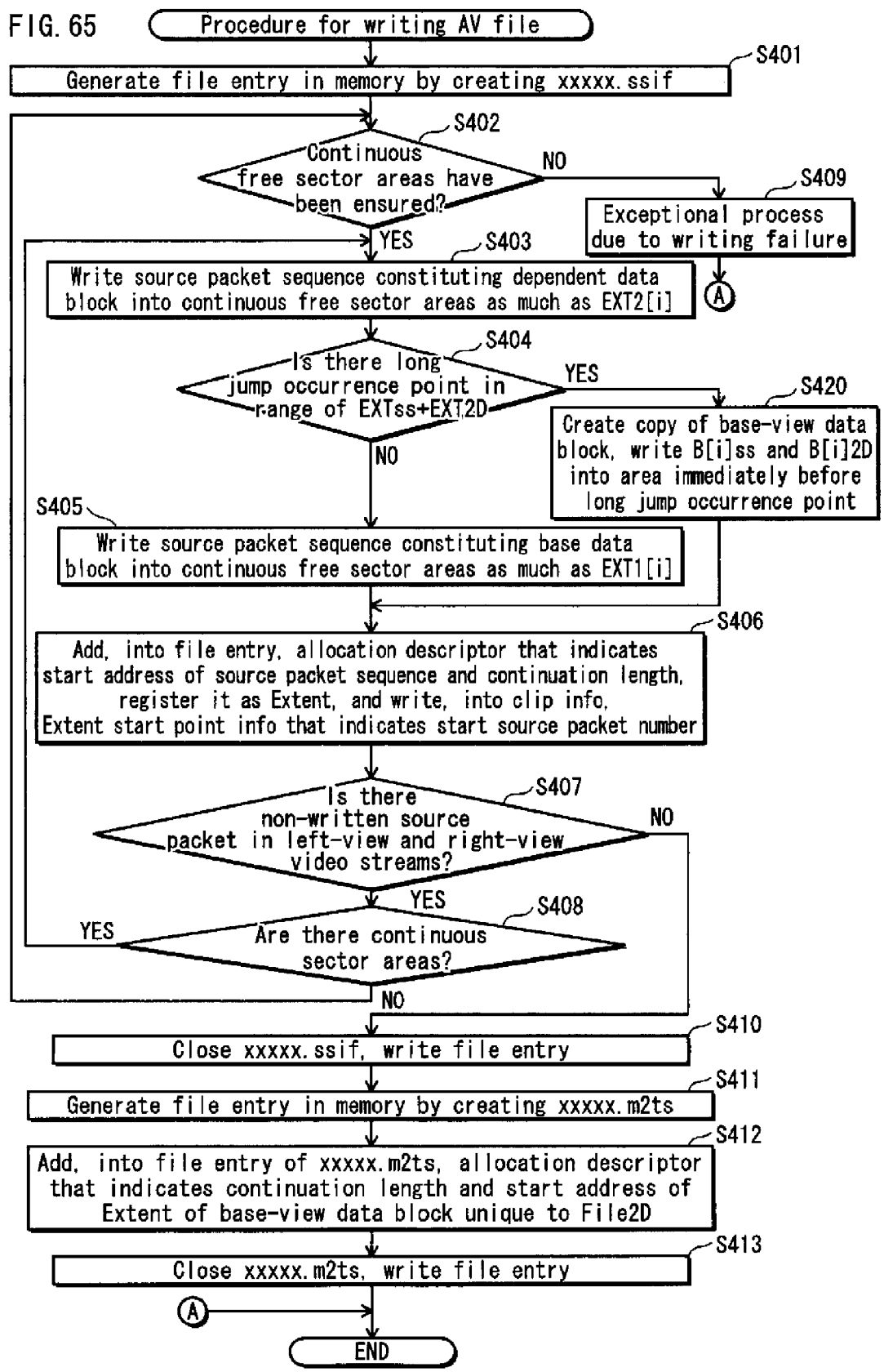

FIG. 65 is a flowchart showing the procedure for writing the AV file.

Figure 66:
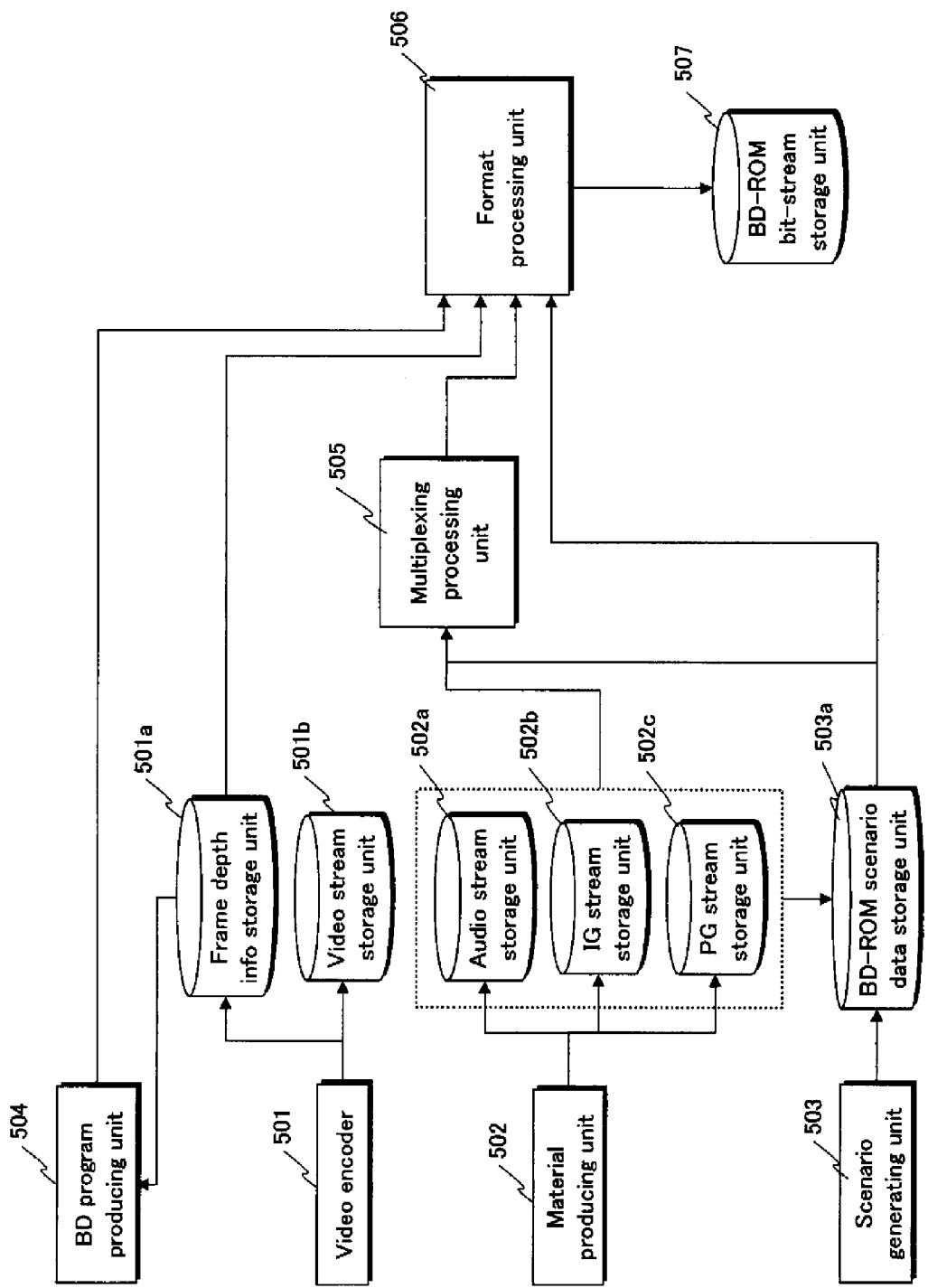

FIG. 66 shows the internal structure of the recording device.

Figure 67:
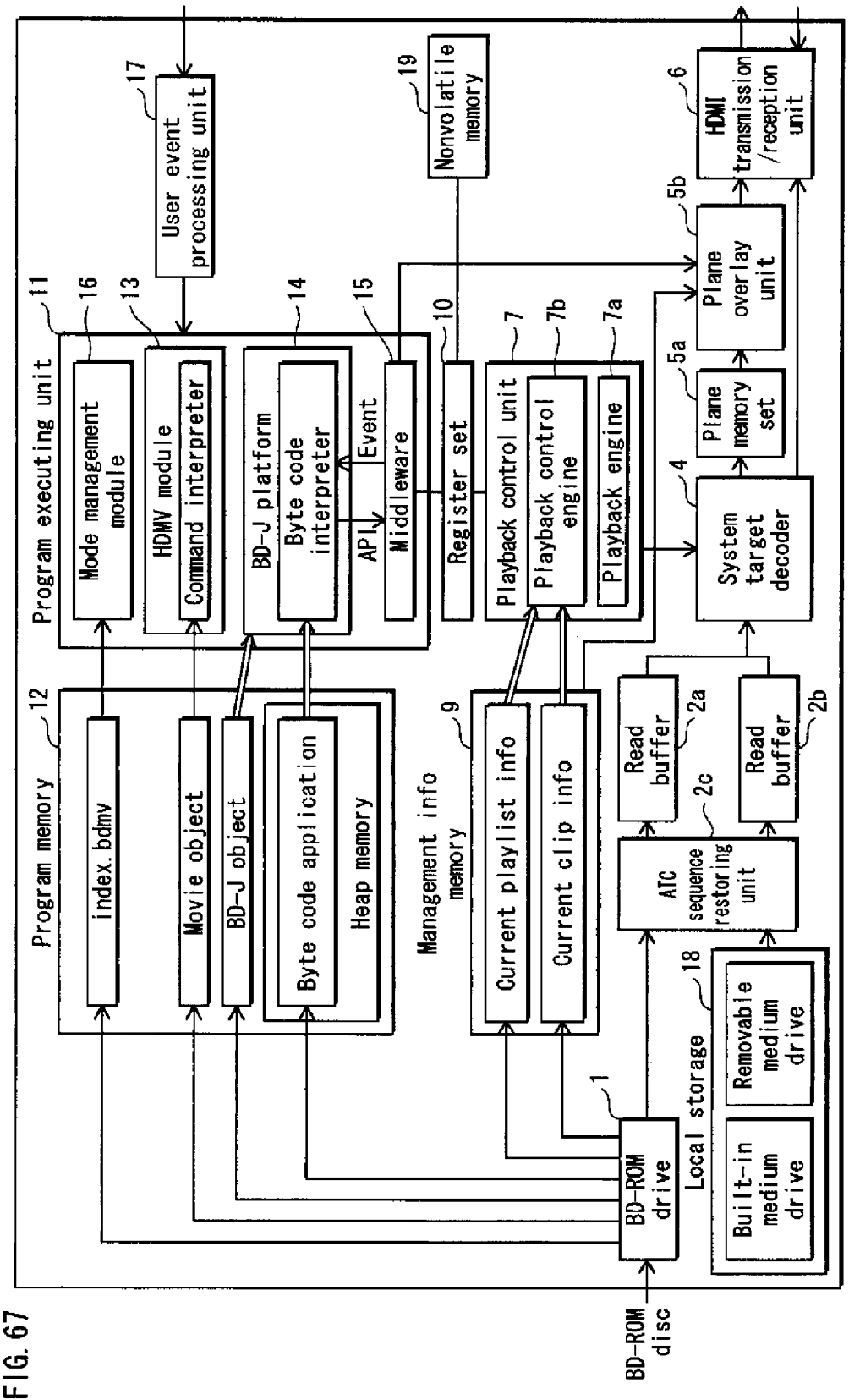

FIG. 67 shows the structure of a 2D/3D playback device.

Figure 68:
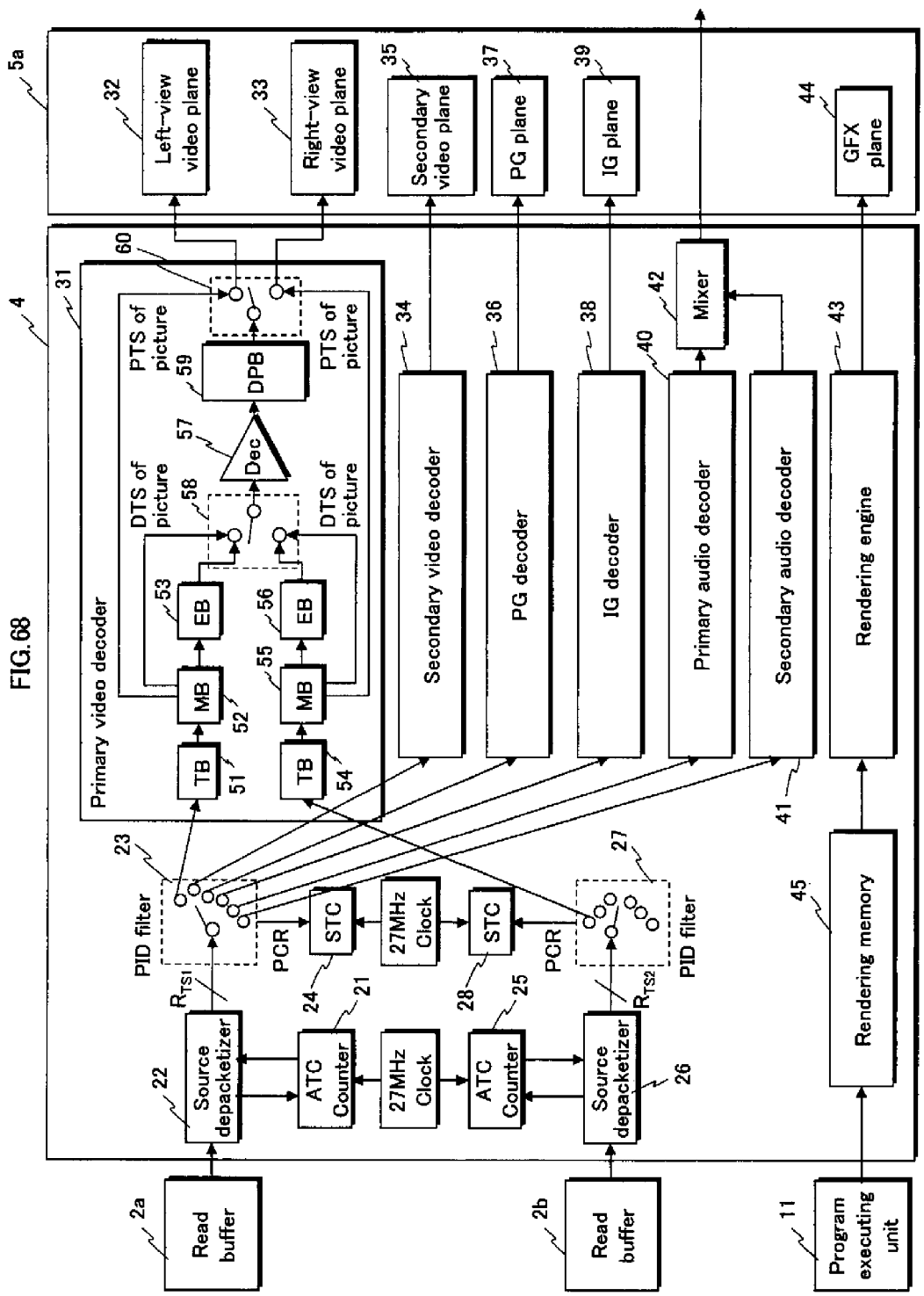

FIG. 68 shows the internal structure of the system target decoder 4 and the plane memory set 5a.

Figure 69:
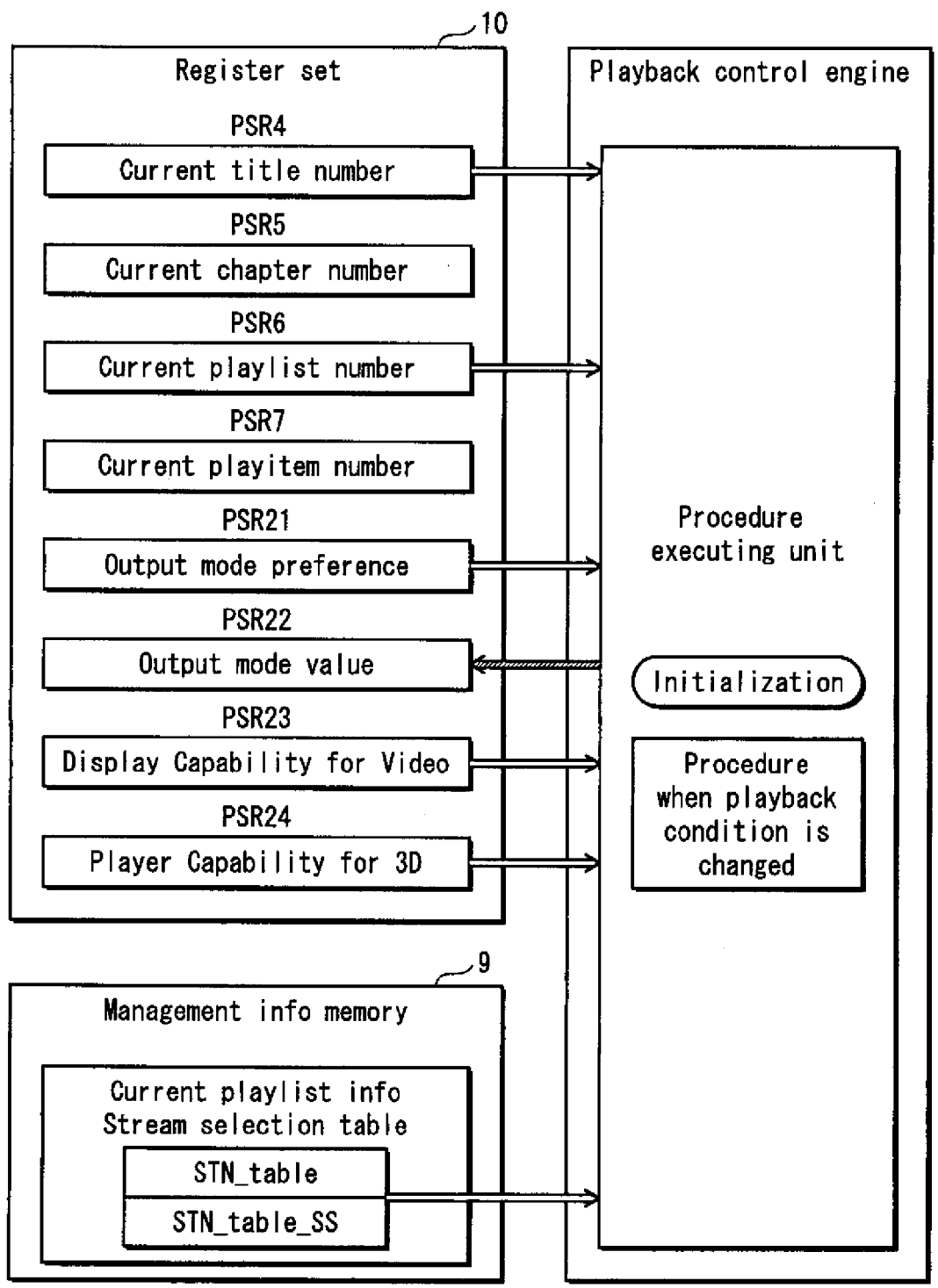

FIG. 69 shows the internal structures of the register set 10 and the playback control engine 7b.

Figure 70:
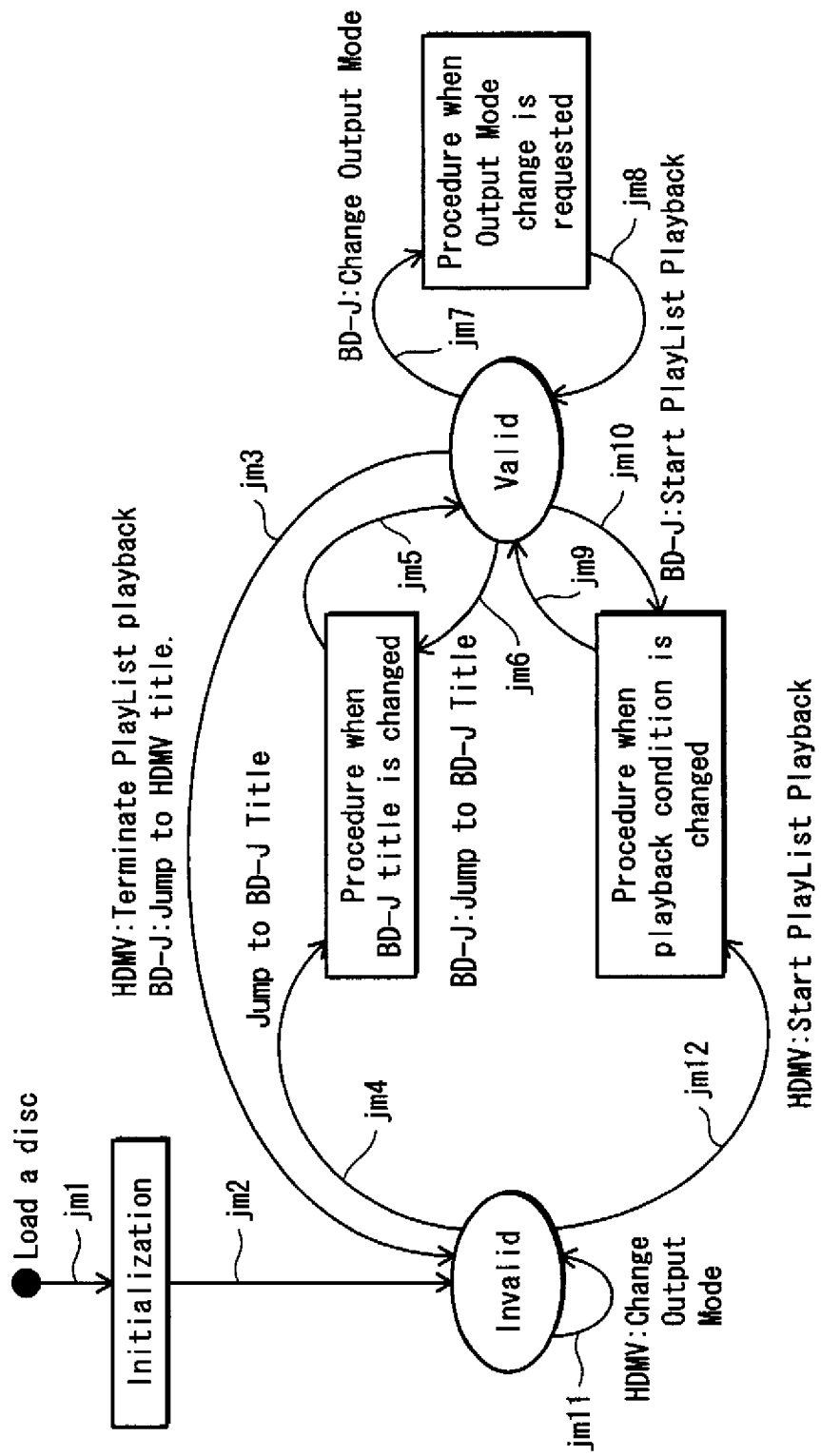

FIG. 70 shows the state transition of the selection model of the output mode.

Figure 71:
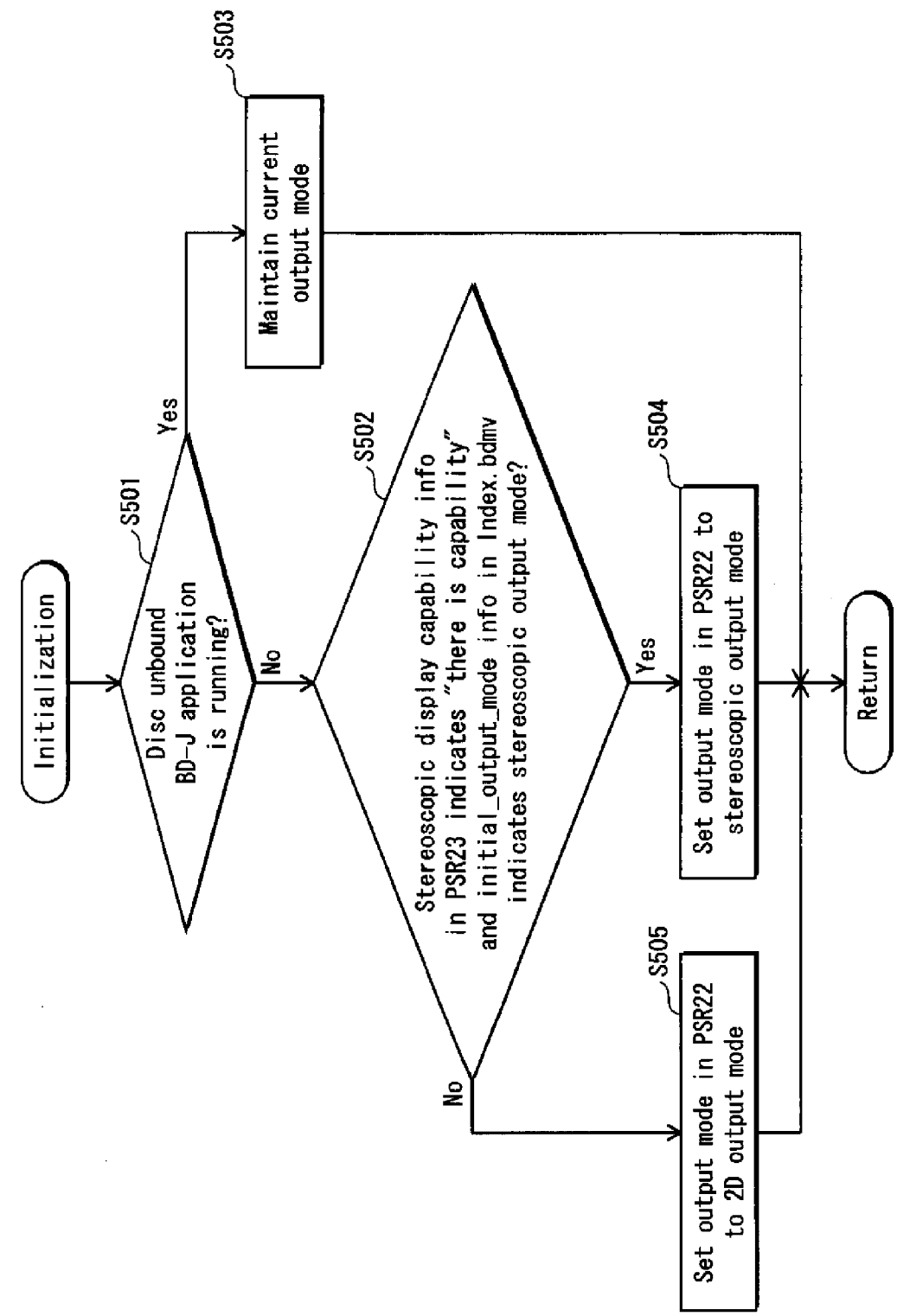

FIG. 71 is a flowchart showing the procedure for the initialization process.

Figure 72:
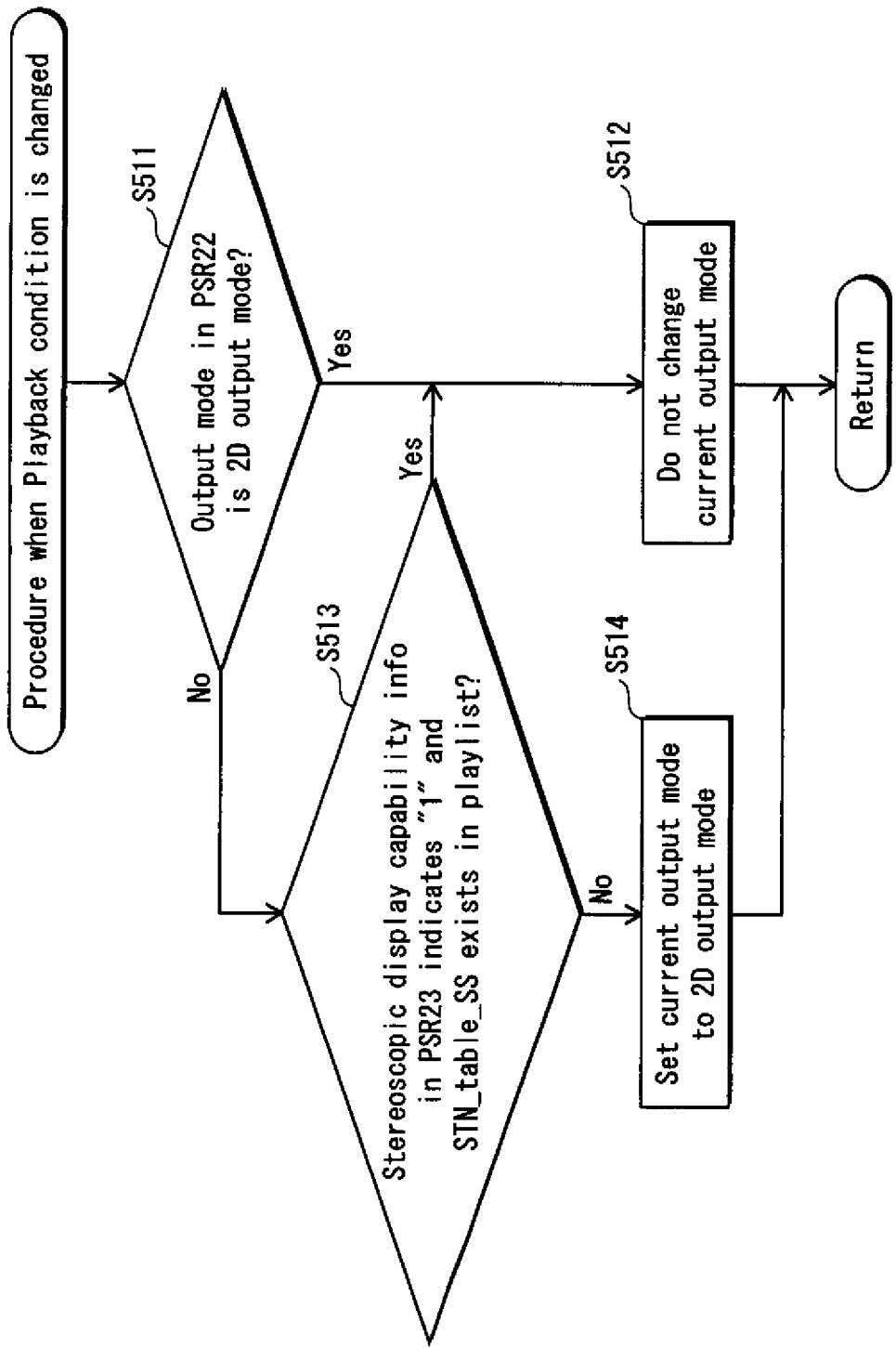

FIG. 72 shows the "Procedure when playback condition is changed".

FIGS. 73A through 73D show the bit assignment in the player setting register for realizing the 3D playback mode.

FIGS. 74A through 74E show relationships between the depths of the macroblocks and the parameters for the shift control.

Figure 75:
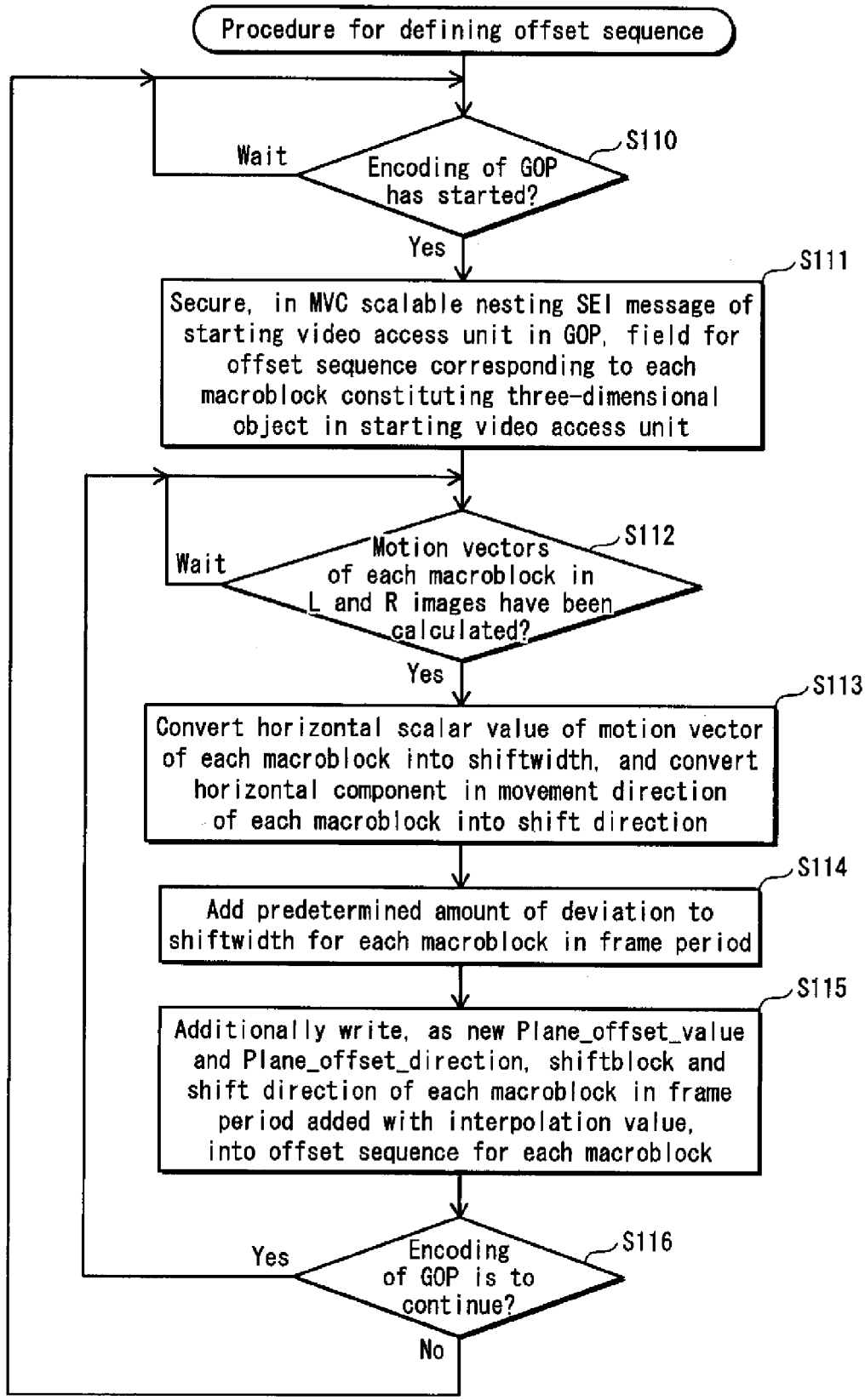

FIG. 75 is a flowchart showing the procedure for defining the offset sequence that is executed in parallel with the encoding of the video stream.

Figure 76A:
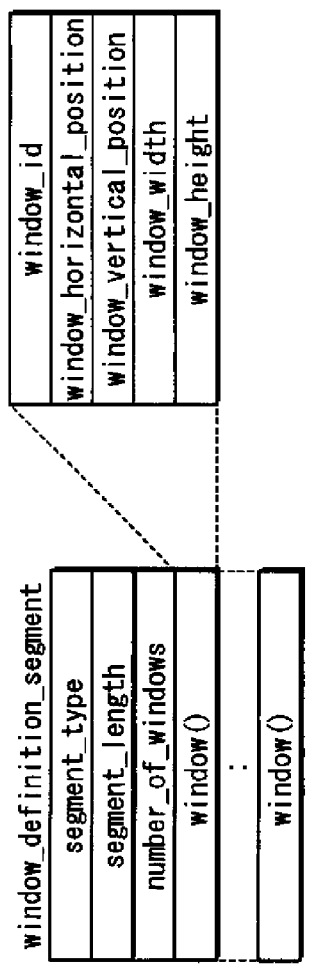
Figure 76B:
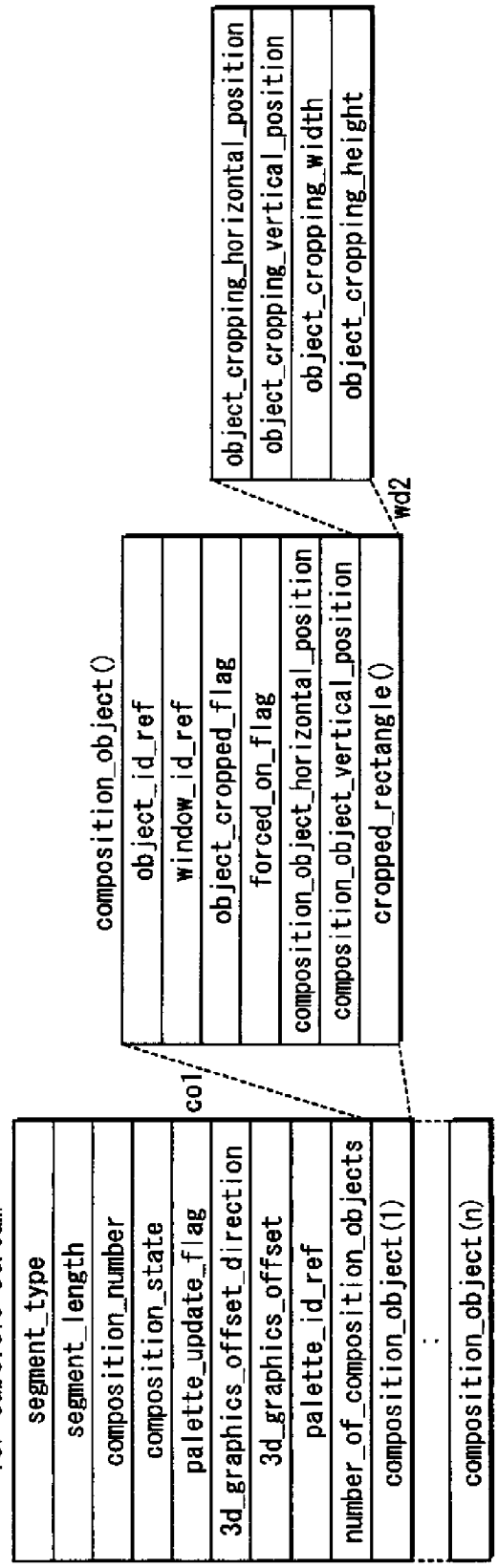

FIGS. 76A and 76B show the window definition segment and the control information in the subtitle stream.

Figures 77A, 77B, 77C:
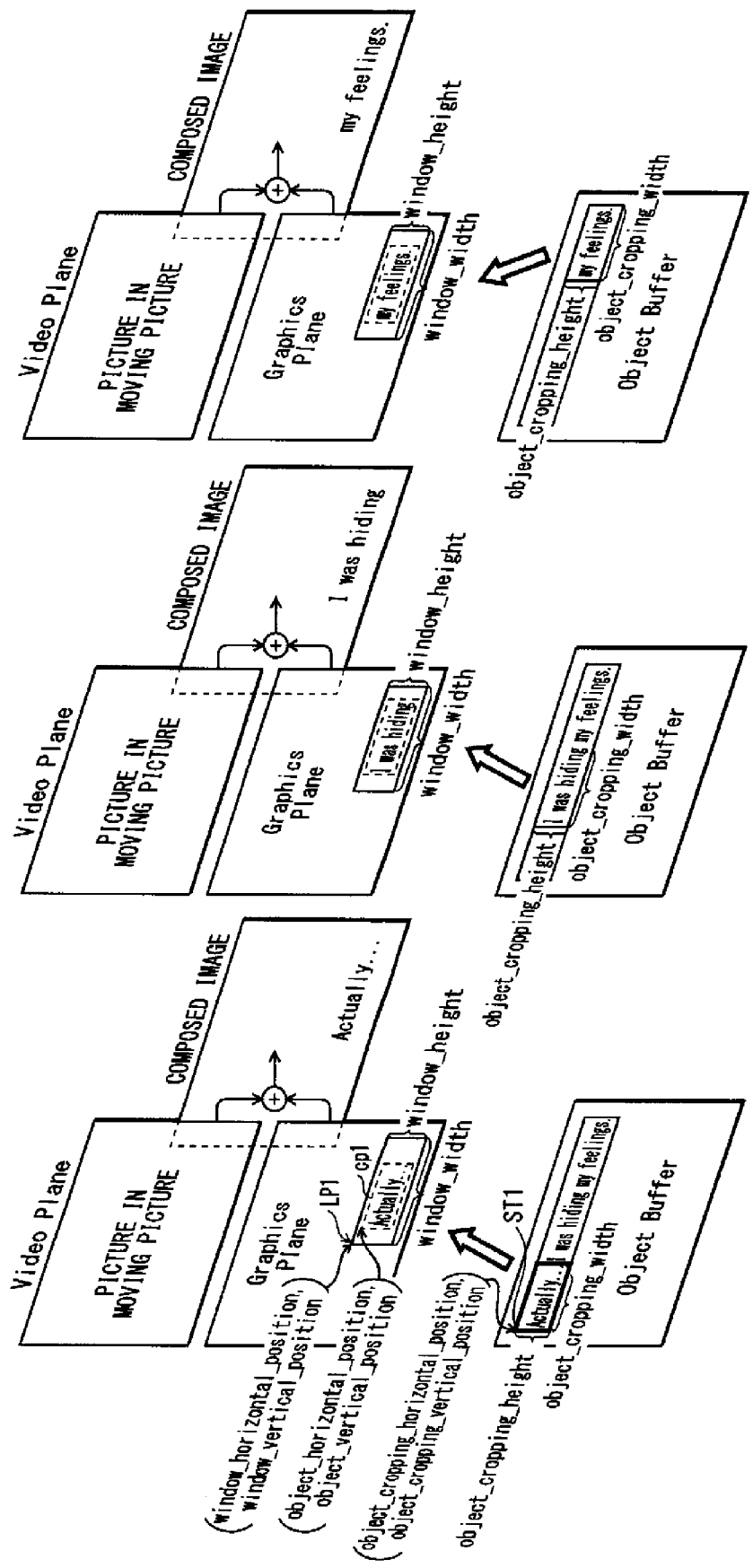

FIGS. 77A through 77C show examples of descriptions in the PCS of DS.

Figure 78:
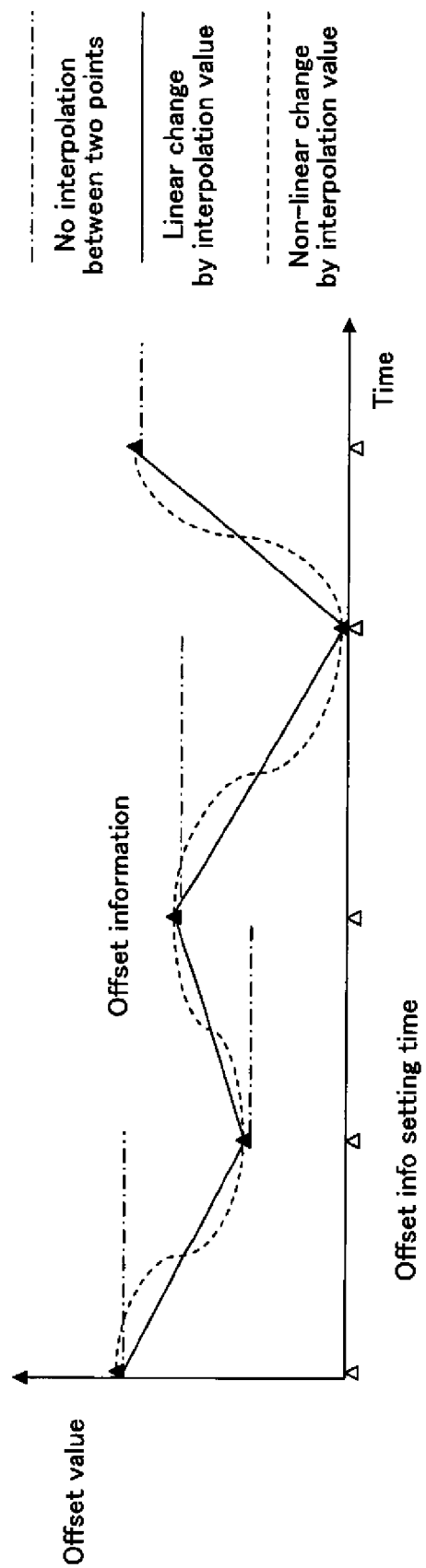

FIG. 78 shows how the offset changes over time in the case where an interpolation is performed by using "3d_graphics_offset" in "composition_object" and in the case where no interpolation is performed.

Figure 79:
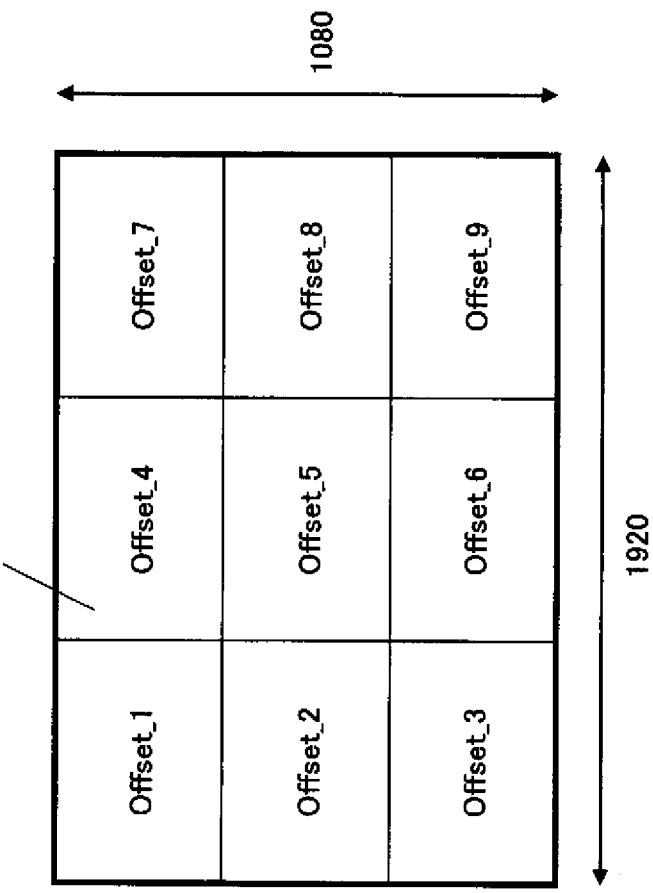

FIG. 79 shows an offset sequence composed of offsets that correspond to respective areas obtained by dividing the screen.

Figure 80:
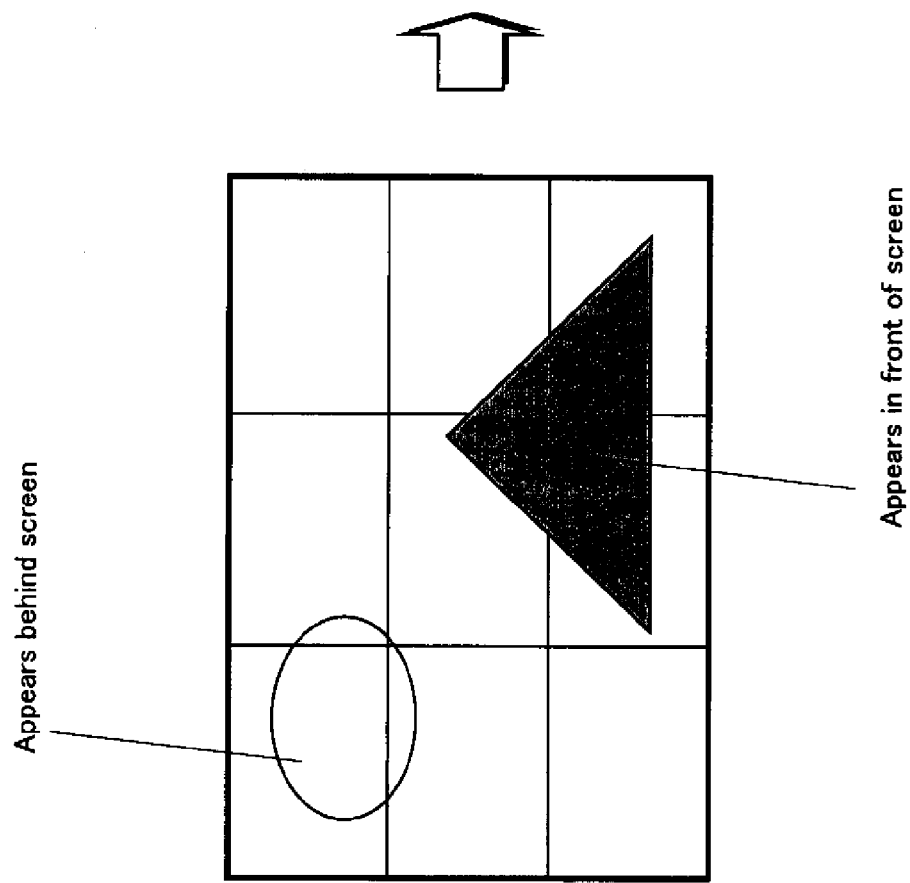

FIG. 80 shows the correspondence between the depths of objects in the screen and the offsets.

Figure 81:
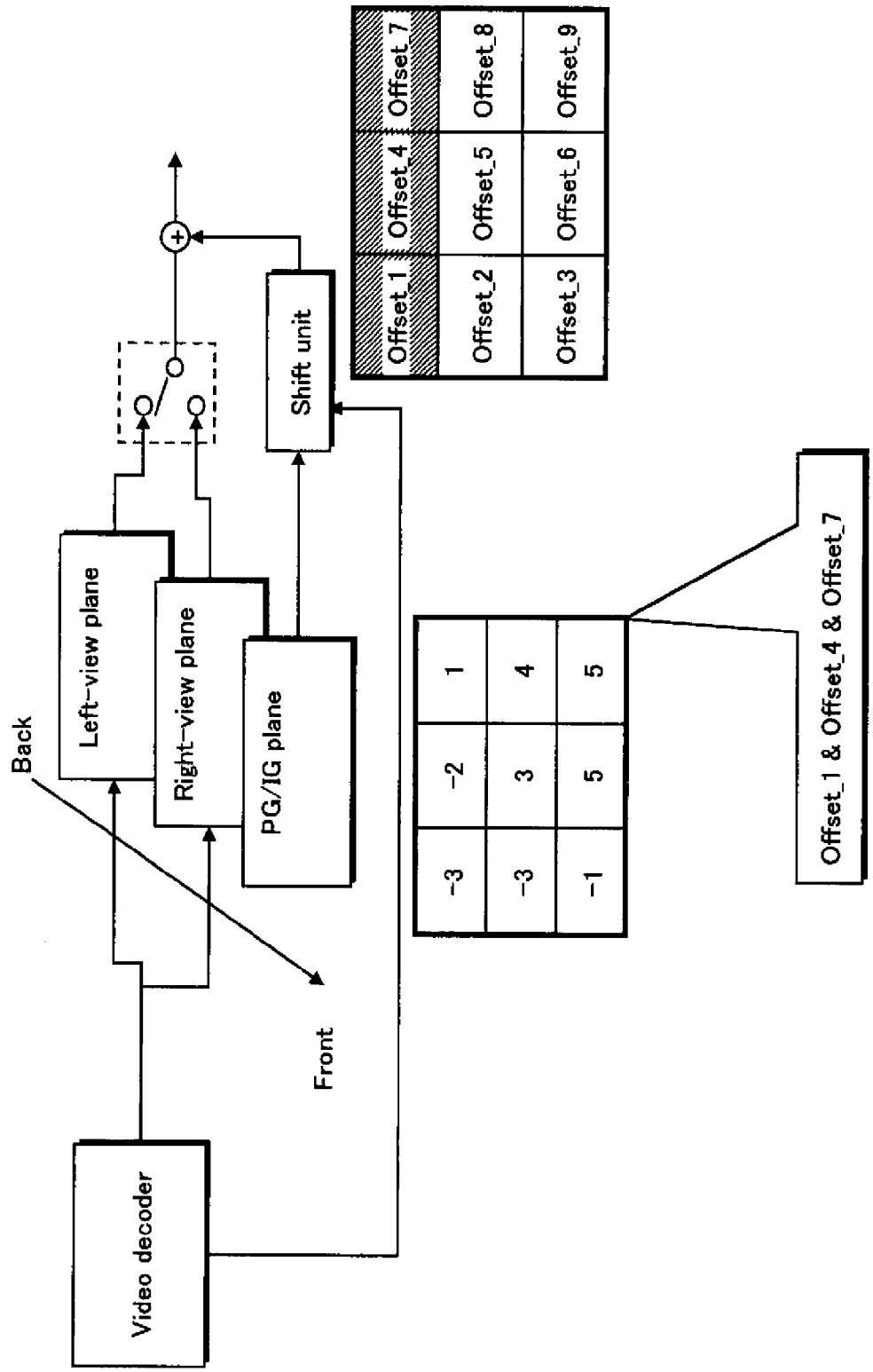

FIG. 81 shows the video decoder, left-view plane, right-view plane, and PG/IG plane, among the components of the playback device.

FIG. 82 shows the correspondence between the contents of the graphics plane and the offsets.

FIGS. 83A through 83D show one example of the 3D-depth method.

Figure 84:
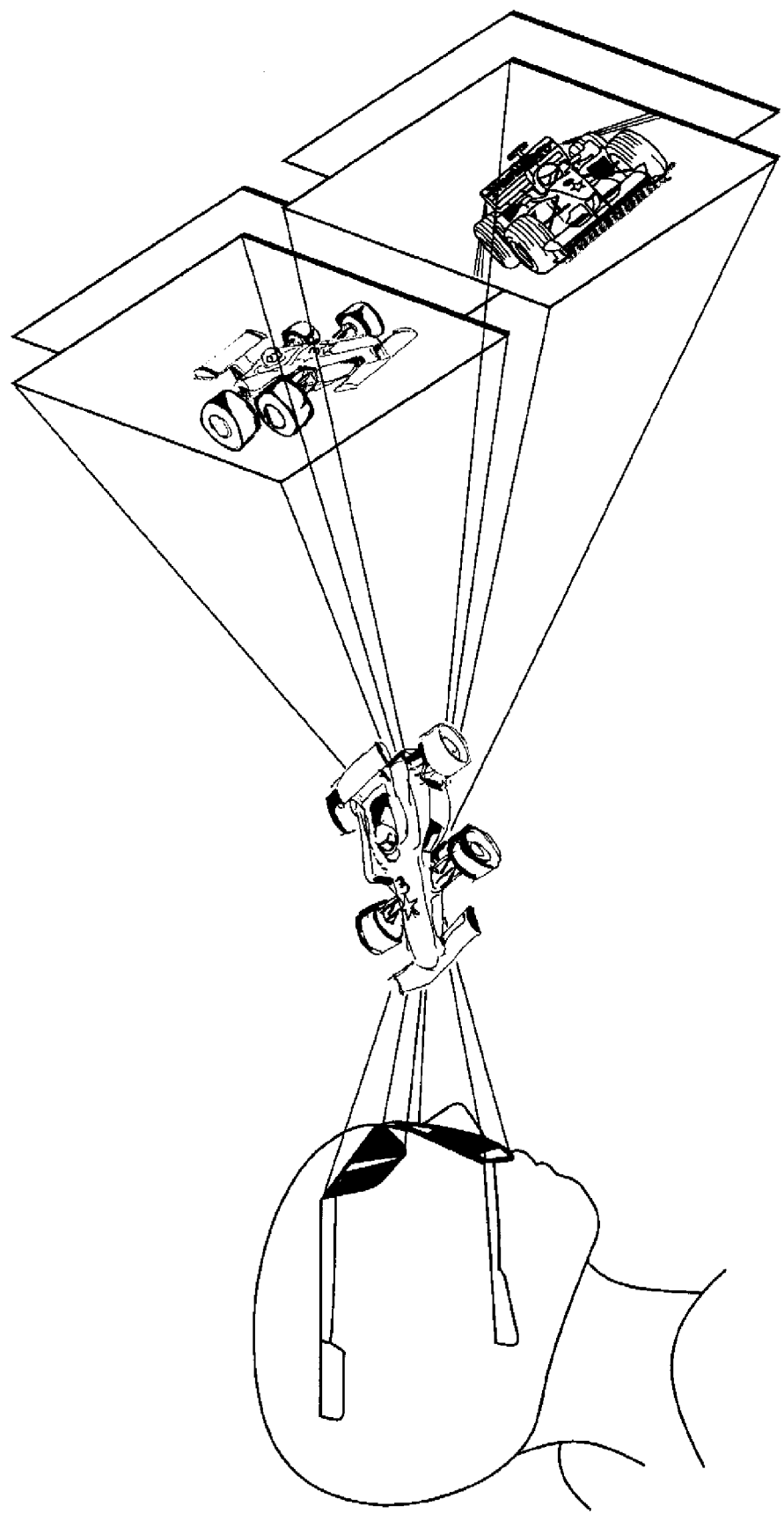

FIG. 84 shows a stereoscopic image generated in the 3D-depth mode.

FIGS. 85A and 85B show one example of the structure of recording medium for realizing the 3D-depth mode.

Figure 86:
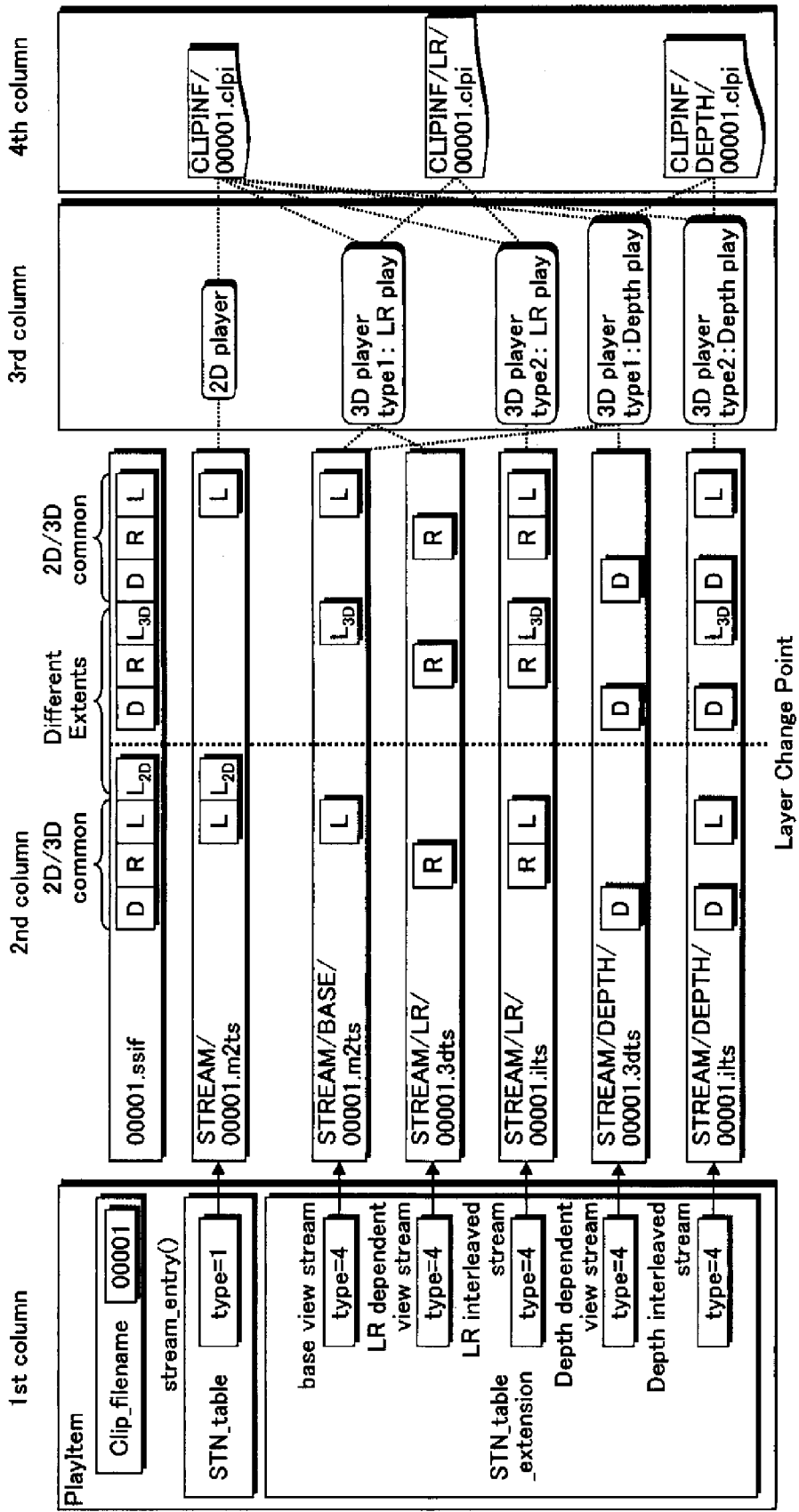

FIG. 86 shows a mechanism for distinguishing the stream files to be played back in the 2D from those to be played back in the 3D, with use of the directory names and the file extensions, and a mechanism for distinguishing the stream files to be played back in the LR method from those to be played back in the depth method.

Figure 87:
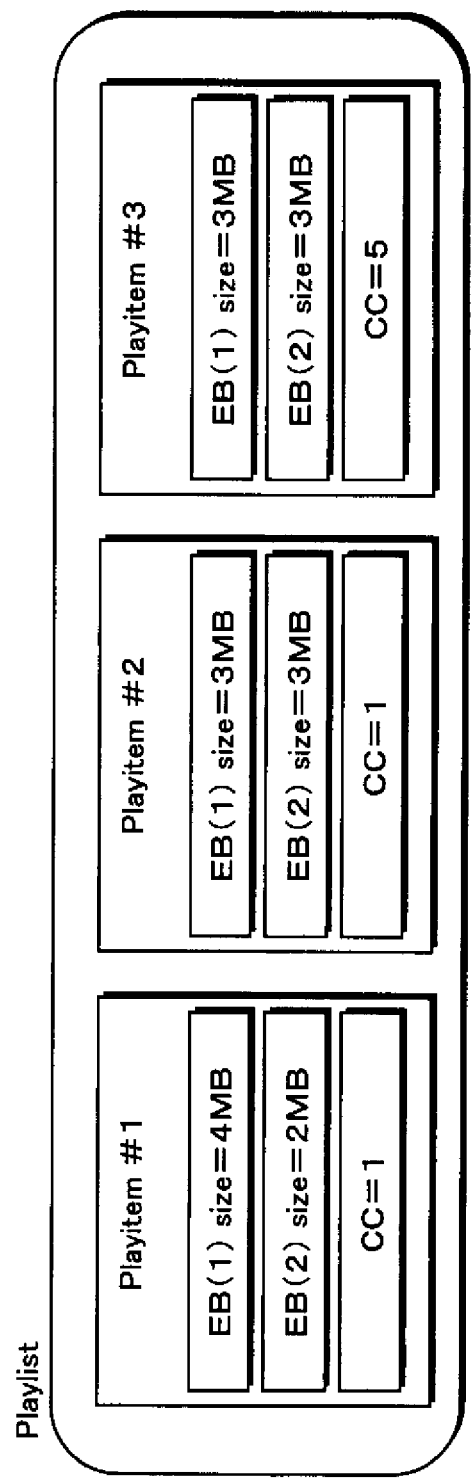

FIG. 87 shows the playitem information that includes size information of the elementary buffers.

Figure 88:
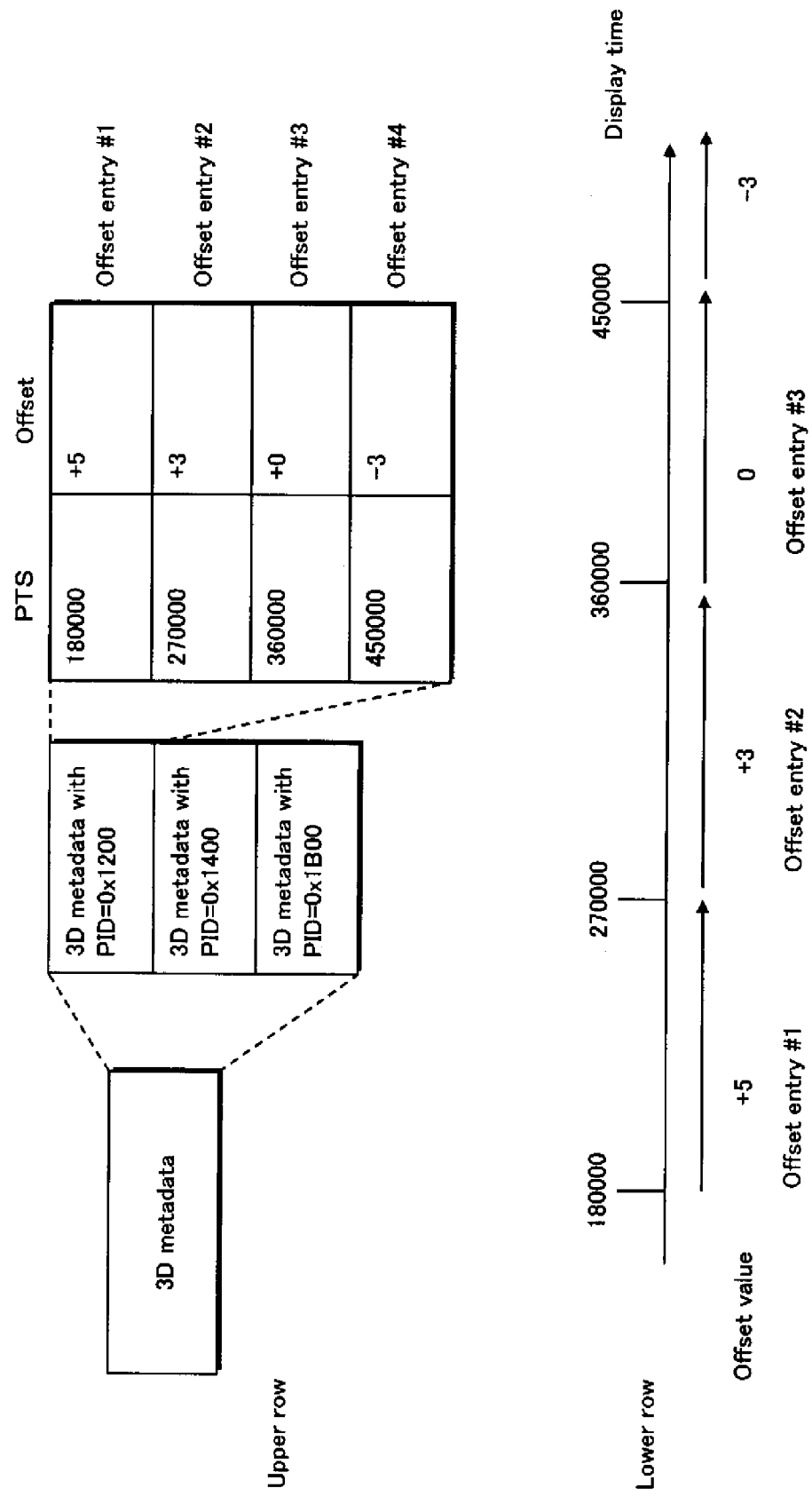

FIG. 88 shows the 3D metadata to which the depth information has been added.

Figure 89:
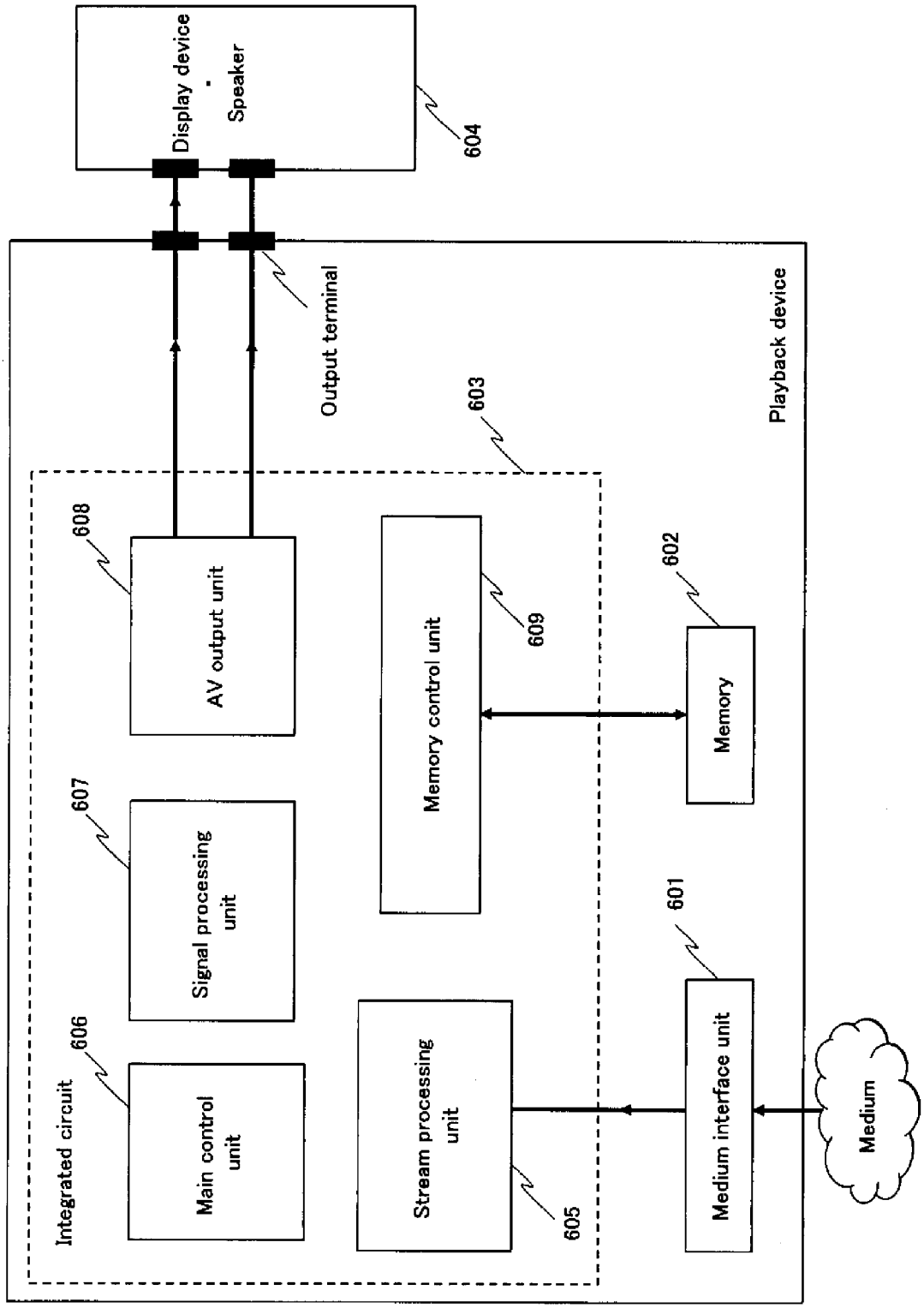

FIG. 89 shows an example structure of a 2D/3D playback device which is realized by using an integrated circuit.

Figure 90:
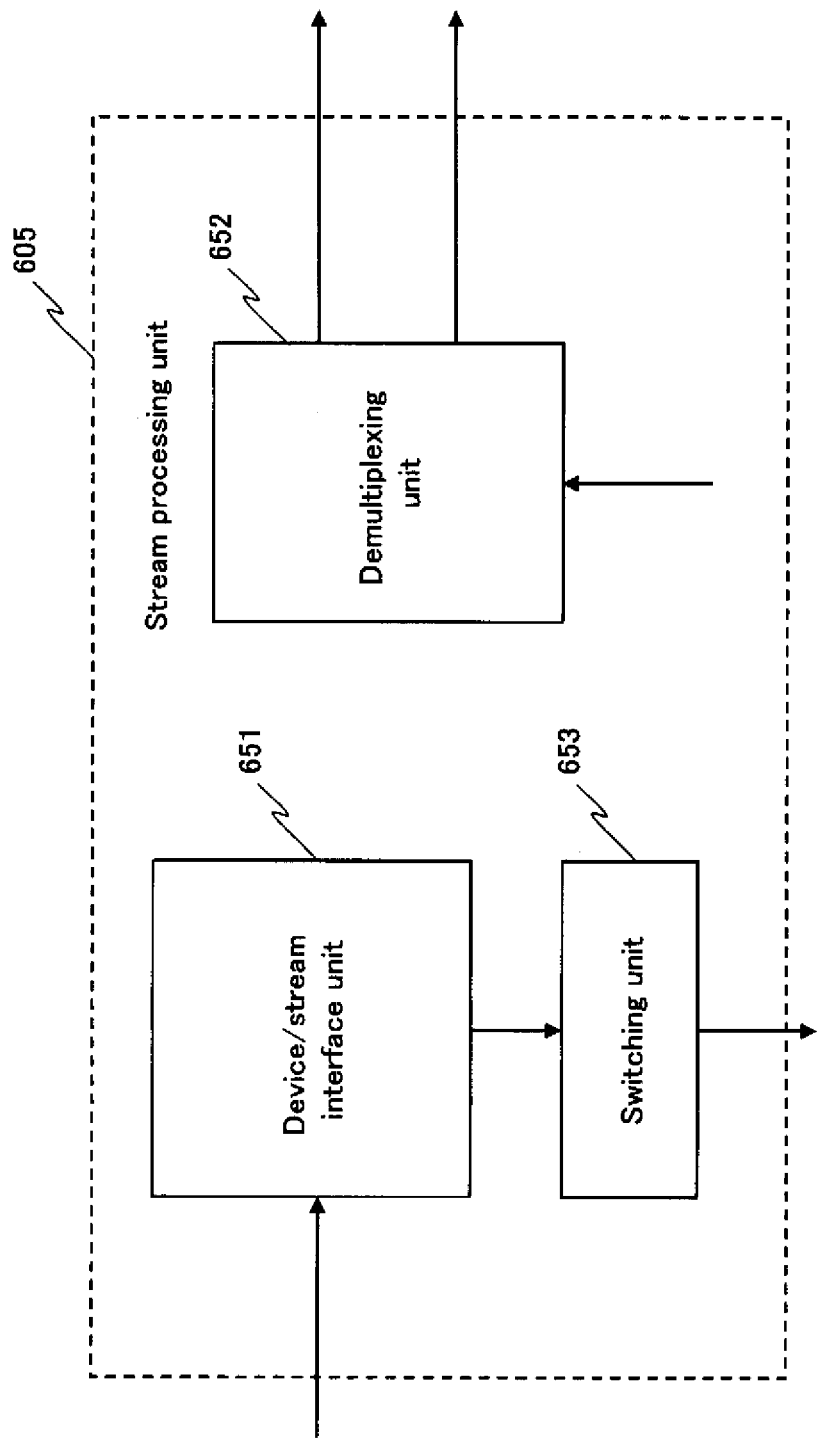

FIG. 90 is a functional block diagram showing a typical structure of the stream processing unit.

Figure 91:
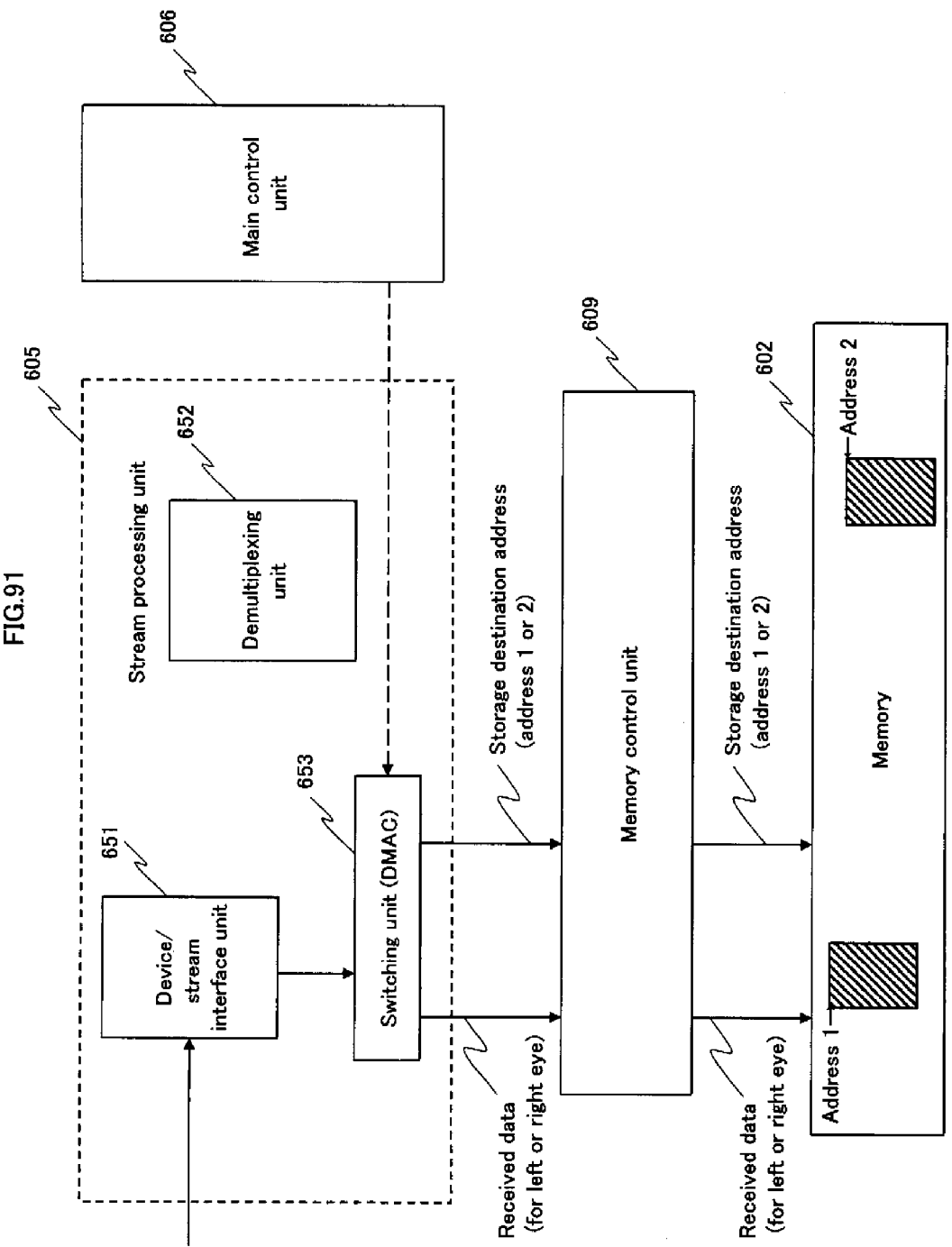

FIG. 91 is a conceptual diagram showing the switching unit 653 and the peripheral when the switching unit 653 is DMAC.

Figure 92:
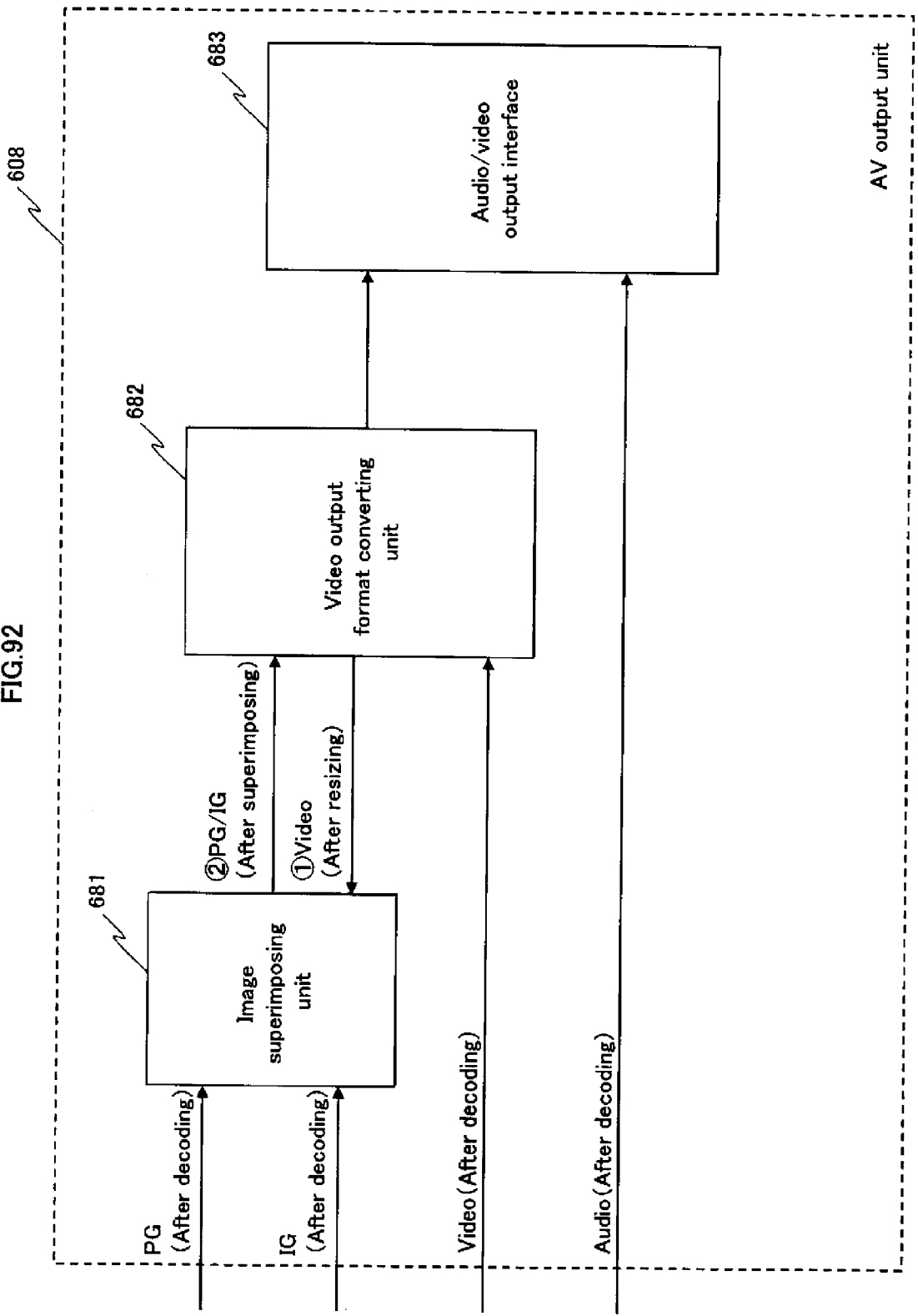

FIG. 92 is a functional block diagram showing a typical structure of the AV output unit.

Figure 93:
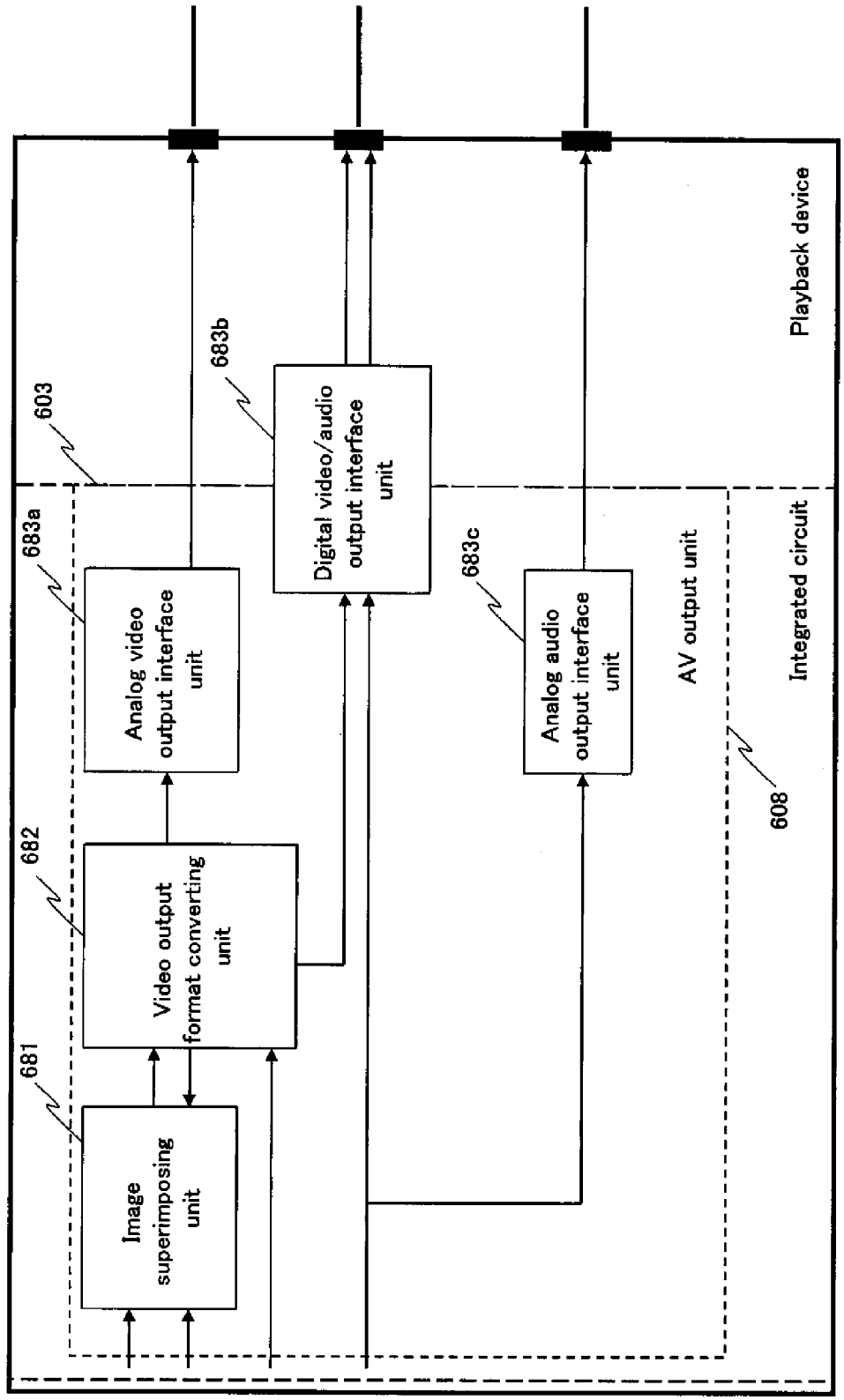

FIG. 93 is an example structure showing the AV output unit, or the data output part of the playback device in more detail.

Figure 94:
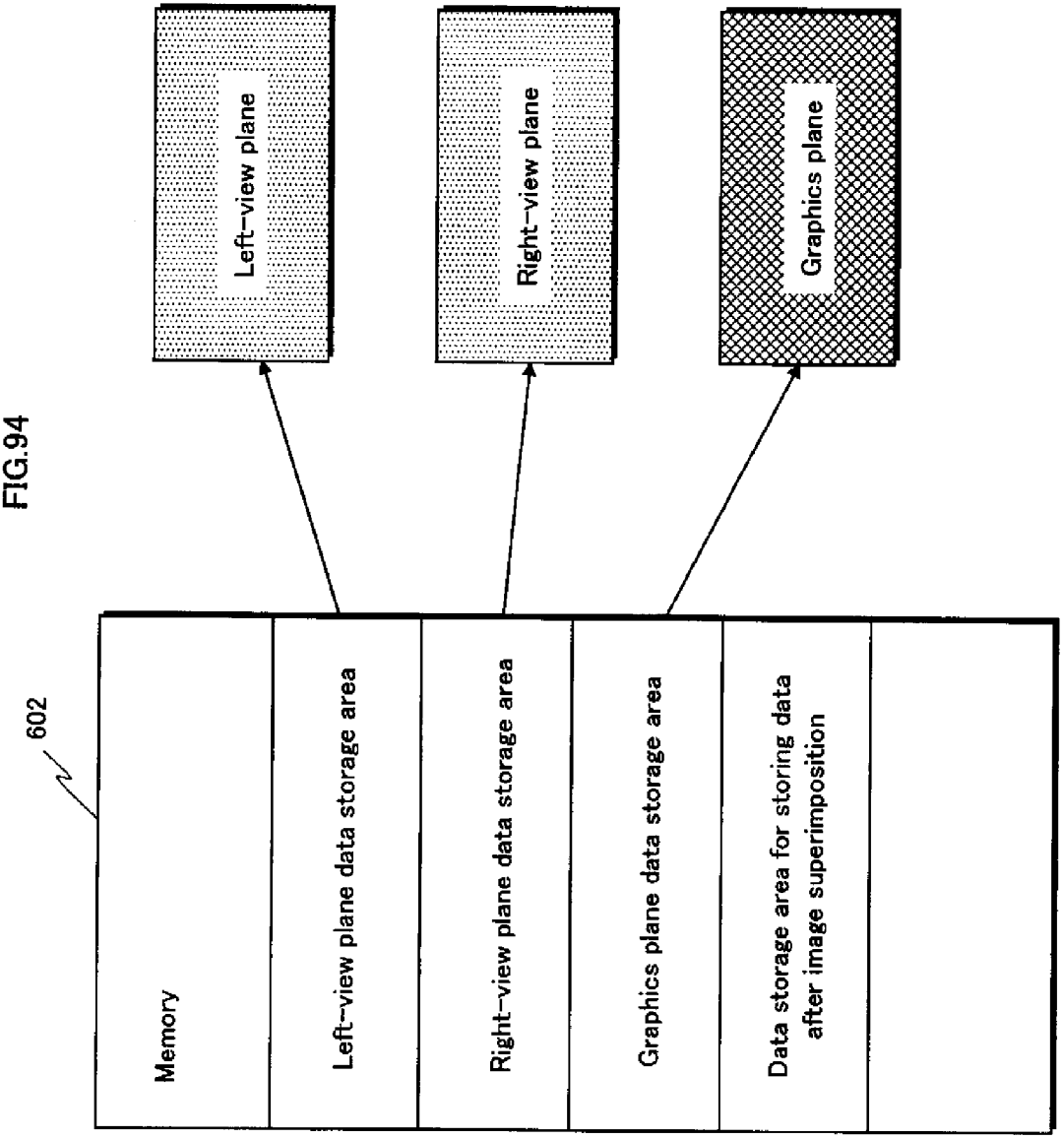

FIG. 94 shows relationships between areas in the memory and each plane in the image superimposing process.

Figure 95:
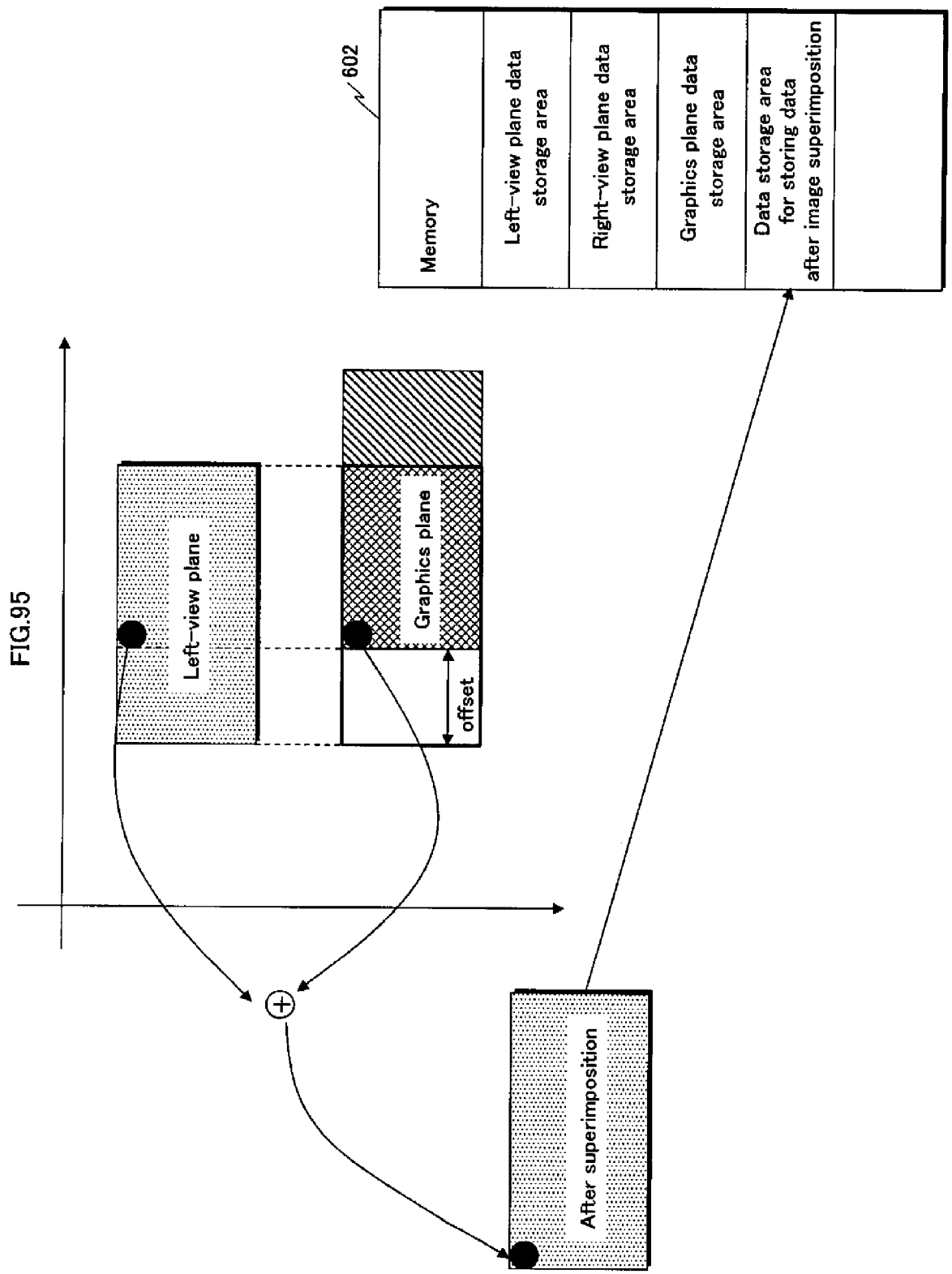

FIG. 95 is a conceptual diagram of the image superimposing process performed by the image superimposing unit.

Figure 96:
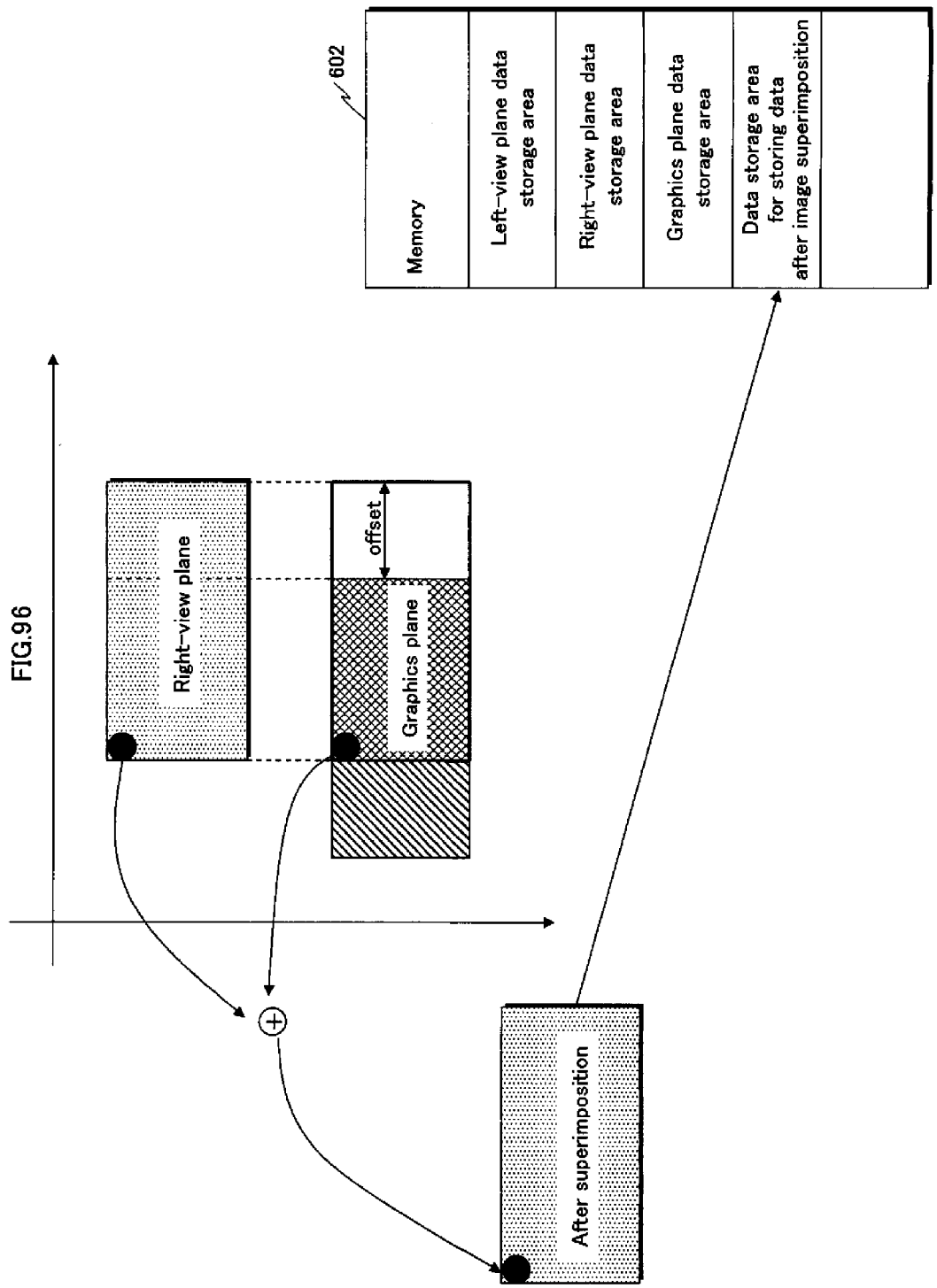

FIG. 96 is a conceptual diagram of the image superimposing process performed by the image superimposing unit.

Figure 97:
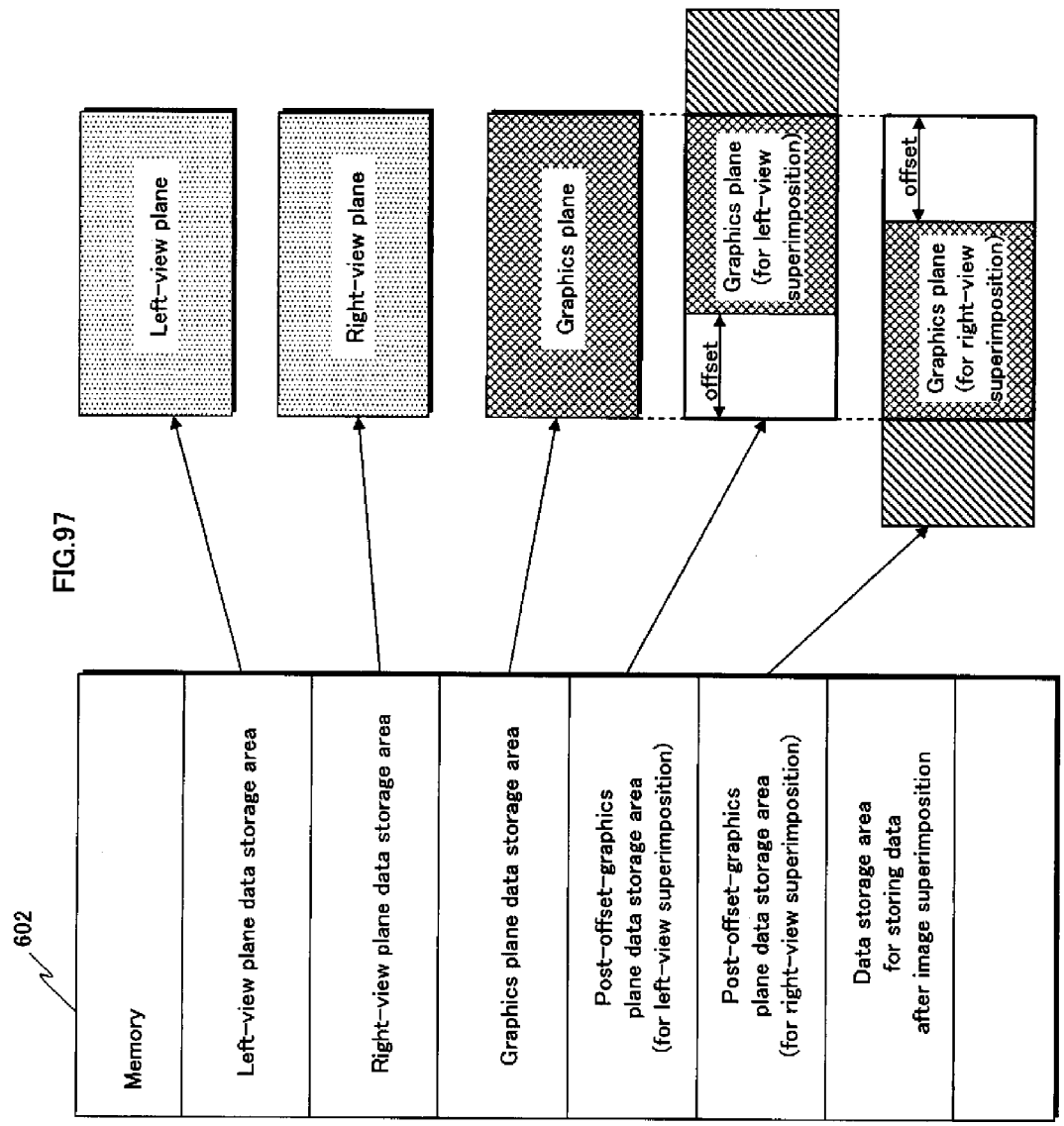

FIG. 97 is a conceptual diagram of the image superimposing process performed by the image superimposing unit.

Figure 98:
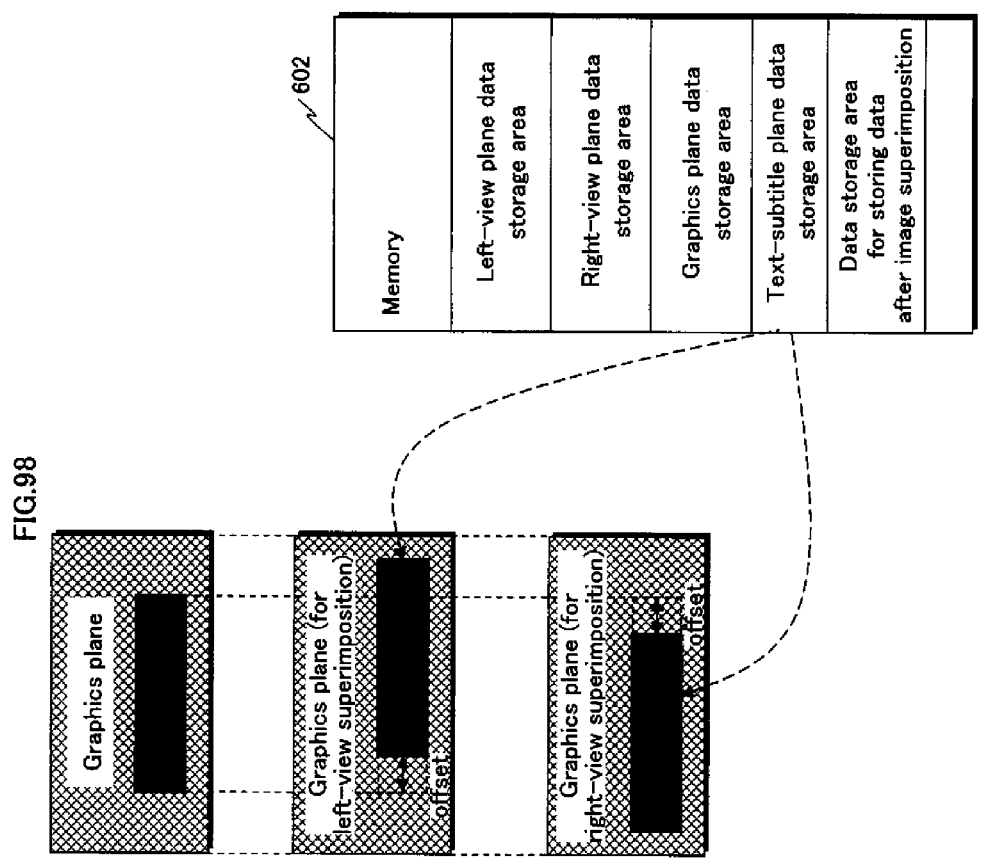

FIG. 98 is a conceptual diagram of the image superimposing process performed by the image superimposing unit.

Figure 99:
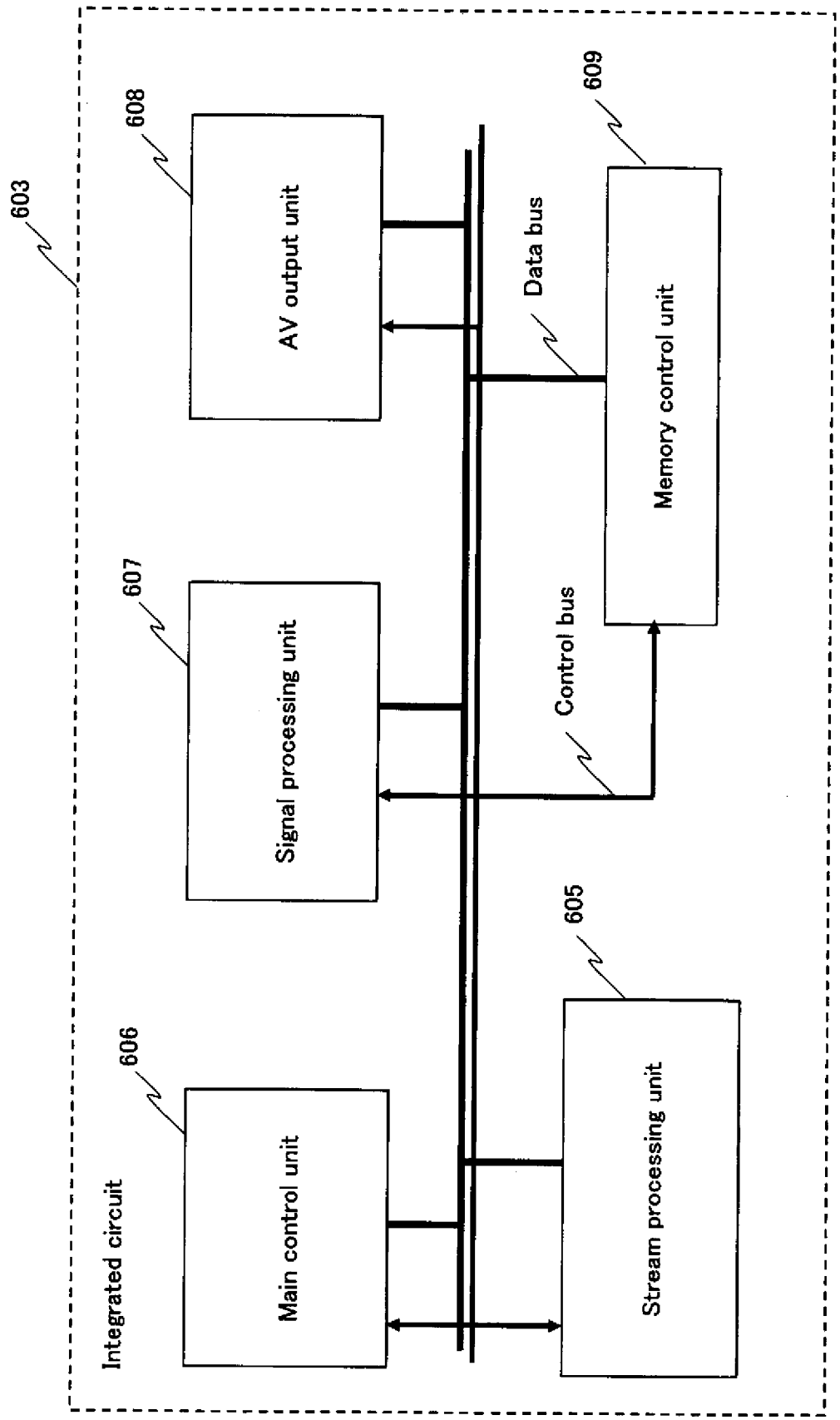

FIG. 99 shows an arrangement of the control buses and data buses in the integrated circuit.

Figure 100:
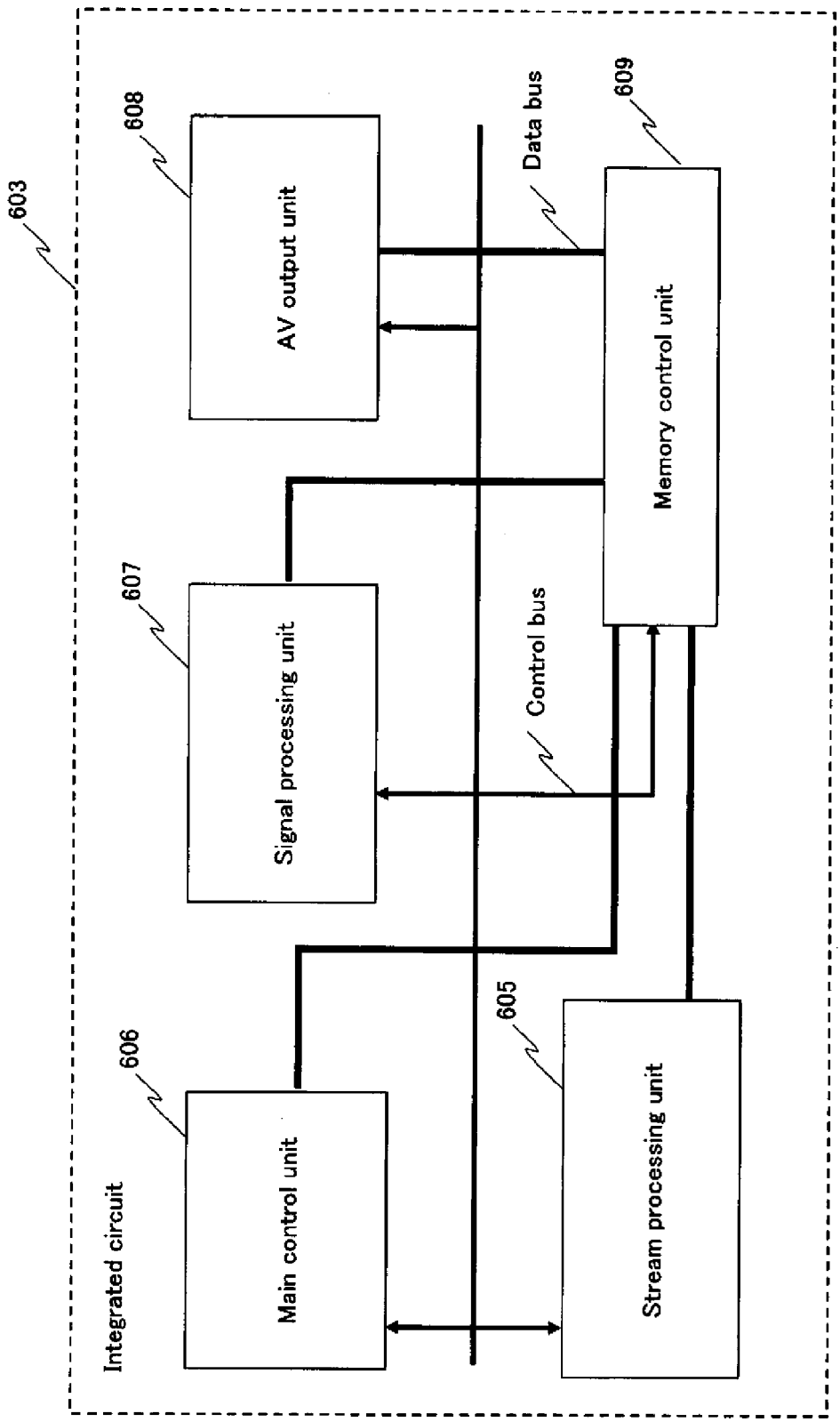

FIG. 100 shows an arrangement of the control buses and data buses in the integrated circuit.

Figure 101:
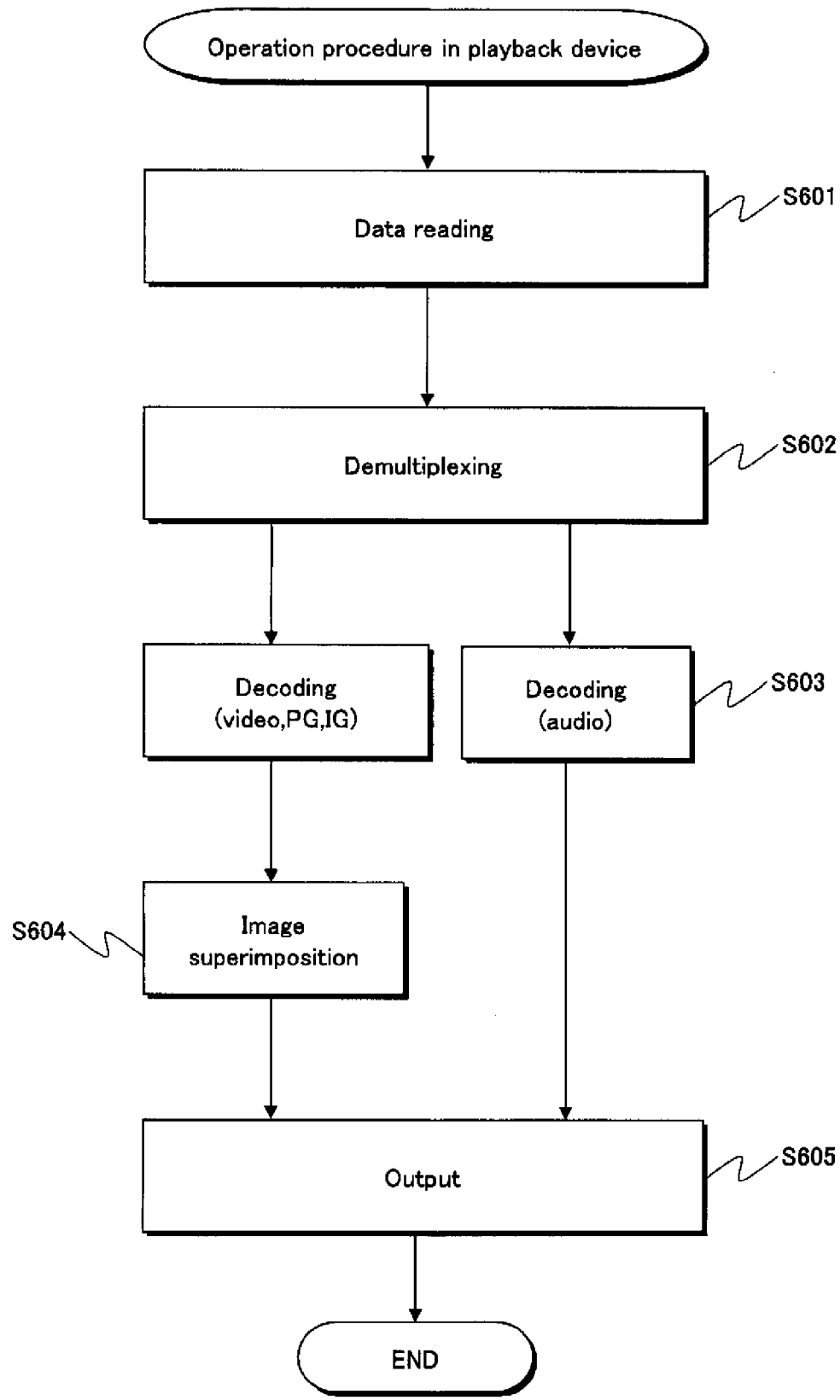

FIG. 101 is a simple flowchart showing an operation procedure in the playback device.

Figure 102:
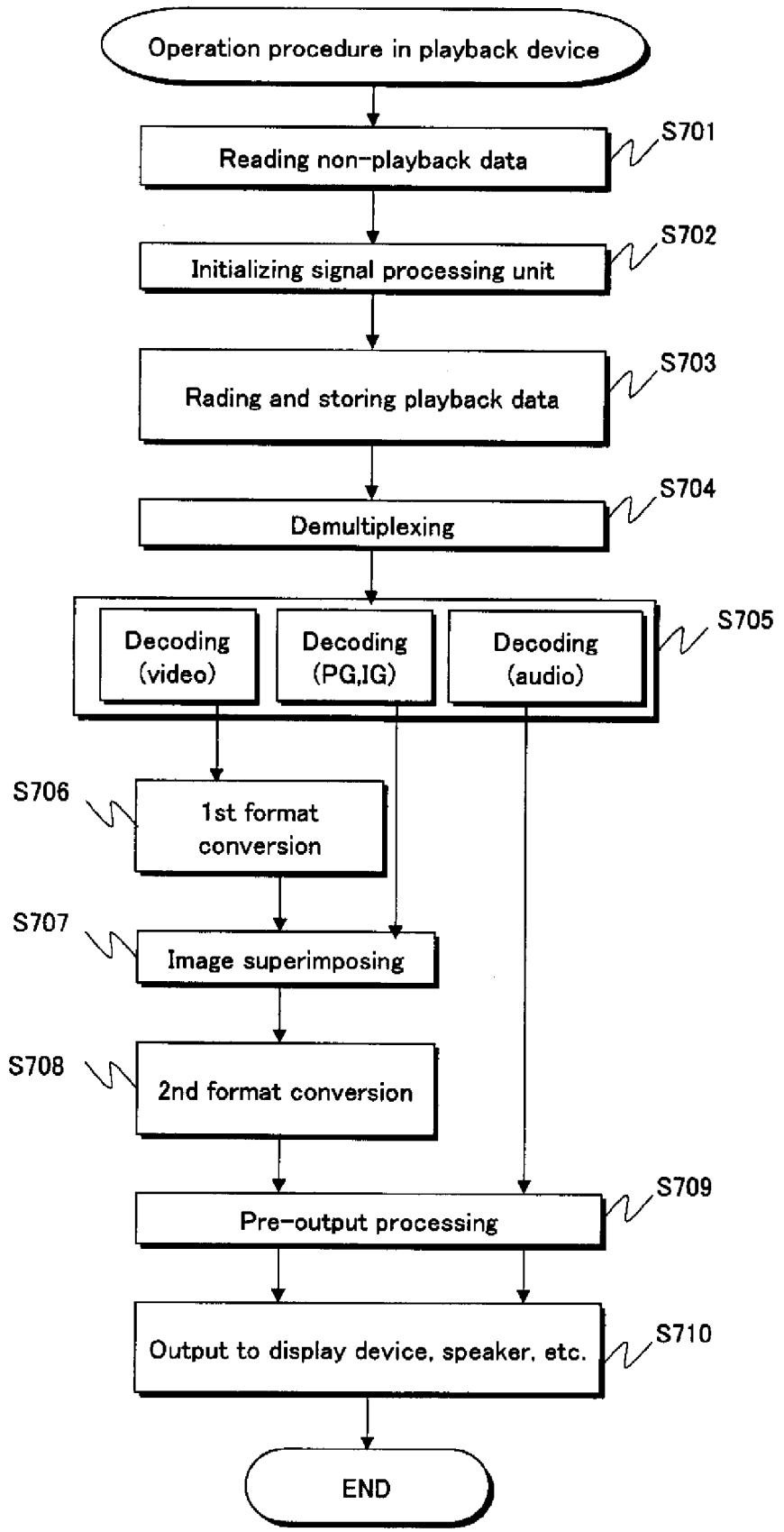

FIG. 102 is a detailed flowchart showing an operation procedure in the playback device.

FIGS. 103A through 103D show one example of Extent start point information of the base-view clip information, and one example of Extent start point information of the dependent-view clip information.

FIGS. 104A through 104C are provided for the explanation of source packet numbers of arbitrary data blocks in the ATC sequences 1 and 2.

DESCRIPTION OF EMBODIMENTS

The following describes an embodiment of a recording medium and a playback device provided with means for solving the above-described problems, with reference to the attached drawings. First, a brief description is give of the principle of the stereoscopic view.

In general, due to the difference in position between the right eye and the left eye, there is a little difference between an image seen by the right eye and an image seen by the left eye. It is this difference that enables the human beings to recognize the image they see in three dimensions. The stereoscopic display is realized by using the parallax of human beings, so that a monoscopic image looks as is it is three-dimensional.

More specifically, there is a difference between the image seen by the right eye and the image seen by the left eye, the difference corresponding to parallax of human beings. The stereoscopic display is realized by displaying the two types of images alternately at regular short time intervals.

The "short time interval" may be a time period that is short enough to provide human beings, by the alternate displays, an illusion that they are seeing a three-dimensional object. The methods for realizing the stereoscopic viewing include one using a holography technology and one using a parallax image.

The former method, the holography technology, is characterized in that it can reproduce an object three-dimensionally in the same manner as a human being recognizes the object normally, and that, in regards with video generation, although it has established a technological theory, it requires (i) a computer that can perform an enormous amount of calculations to generate the video for holography in real time, and (ii) a display device having a resolution in which several thousands of lines can be drawn in a length of 1 mm. It is extremely difficult for the current technology to realize such a product, and thus products for commercial use have hardly been developed.

On the other hand, the latter method using a parallax image has a merit that a stereoscopic viewing can be realized only by preparing images for viewing with the right eye and the left eye. Some technologies including the sequential segregation method have been developed for practical use from the viewpoint of how to cause each of the right eye and the left eye to view only the images associated therewith.

The sequential segregation method is a method in which images for the left eye and right eye are alternately displayed in a time axis direction such that left and right scenes are overlaid in the brain by the effect of residual images of eyes, and the overlaid image is recognized as a stereoscopic image.

In any of the above-described methods, the stereoscopic image is composed of at least two view-point images. The view-point image is an image that is deflected to some extent, and said at least two view-point images include a main-view image and a sub-view image. When the main-view and sub-view images are to be supplied from a recording medium via video streams, a main-view video stream and a sub-view video stream are recorded on the recording medium, where the main-view video stream is a video stream for supplying the main-view image, and the sub-view video stream is a video stream for supplying the sub-view image. The recording medium described in the following is provided so that the main-view video stream and the sub-view video stream can be recorded thereon suitably.

The playback device described in the present application is a 2D/3D playback device (player) which, provided with the 2D playback mode and the 3D playback mode, can switch between these playback modes to play back the main-view video stream and the sub-view video stream.

FIGS. 1A through 1C show the embodiment of the usage act of the recording medium, playback device, display device, and glasses. As shown in FIG. 1A, a recording medium 100 and a playback device 200, together with a television 300, 3D glasses 400, and a remote control 500, constitute a home theater system which is subject to the use by the user.

The recording medium 100 provides the home theater system with, for example, a movie work.

The playback device 200 is connected with the television 300 and plays back the recording medium 100.

The television 300 provides the user with an interactive operation environment by displaying a menu and the like as well as the movie work. The user needs to wear the 3D glasses 400 for the television 300 of the present embodiment to realize the stereoscopic viewing. Here, the 3D glasses 400 are not necessary when the television 300 displays images by the lenticular method. The television 300 for the lenticular method aligns pictures for the left and right eyes vertically in a screen at the same time. And a lenticular lens is provided on the surface of the display screen such that pixels constituting the picture for the left eye form an image only in the left eye and pixels constituting the picture for the right eye form an image only in the right eye. This enables the left and right eyes to see respectively pictures that have a parallax, thereby realizing a stereoscopic viewing.

The 3D glasses 400 are equipped with liquid-crystal shutters that enable the user to view a parallax image by the sequential segregation method or the polarization glasses method. Here, the parallax image is an image which is composed of a pair of (i) an image that enters only into the right eye and (ii) an image that enters only into the left eye, such that pictures respectively associated with the right and left eyes respectively enter the eyes of the user, thereby realizing the stereoscopic viewing. FIG. 1B shows the state of the 3D glasses 400 when the left-view image is displayed. At the instant when the left-view image is displayed on the screen, the liquid-crystal shutter for the left eye is in the light transmission state, and the liquid-crystal shutter for the right eye is in the light block state. FIG. 1C shows the state of the 3D glasses 400 when the right-view image is displayed. At the instant when the right-view image is displayed on the screen, the liquid-crystal shutter for the right eye is in the light transmission state, and the liquid-crystal shutter for the left eye is in the light block state.

The remote control 500 is a machine for receiving from the user operations for playing back AV. The remote control 500 is also a machine for receiving from the user operations onto the layered GUI. To receive the operations, the remote control 500 is equipped with a menu key, arrow keys, an enter key, a return key, and numeral keys, where the menu key is used to call a menu constituting the GUI, the arrow keys are used to move a focus among GUI components constituting the menu, the enter key is used to perform ENTER (determination)

operation onto a GUI component constituting the menu, the return key is used to return to a higher layer in the layered menu.

In the home theater system shown in FIGS. 1A through 1C, an output mode of the playback device for causing the display device 300 to display images in the 3D playback mode is called "3D output mode", and an output mode of the playback device for causing the display device 300 to display images in the 2D playback mode is called "2D output mode".

This completes the description of the usage act of the recording medium and the playback device.

Embodiment 1

Embodiment 1 is characterized in that, when a pair of the main-view video stream and the sub-view video stream for realizing the stereoscopic playback is supplied to the playback device 200 by recording these streams on the recording medium 100, control information defining the offset control is embedded in the metadata in the sub-view video stream.

The offset control mentioned here is a control to apply the offsets of leftward and rightward directions to horizontal coordinates in the graphics plane and overlay the resultant graphics planes with the main-view video plane and the sub-view video plane on which picture data constituting the main view and sub-view are drawn, respectively.

Furthermore, the control information used in the shift control functions as parameter sequences that define (i) information indicating the offset value and (ii) information indicating the offset direction, in correspondence with each of a plurality of frames.

In the following description, the main view and the sub-view are used to realize the parallax image method. The parallax image method (also called a 3D-LR mode) is a method for realizing the stereoscopic viewing by preparing separately an image for the right eye and an image for the left eye, and causing the image for the right eye to enter only into the right eye and the image for the left eye enter only into the left eye. FIG. 2 shows the user's head on the left-hand side of the drawing and the images of a dinosaur skeleton seen respectively by the left eye and the right eye of the user on the right-hand side of the drawing. When the light transmission and block are repeated alternately for the right and left eyes, the left and right scenes are overlaid in the brain of the user by the effect of residual images of eyes, and the overlaid image is recognized as a stereoscopic image appearing in front of the user.

Among the parallax images, the image entering the left eye is called a left-eye image (L image), and the image entering the right eye is called a right-eye image (R image). A video composed of only L images is called a left-view video, and a video composed of only R images is called a right-view video. Also, the video streams which are obtained by digitizing and compress-encoding the left-view video and right-view video are called left-view video stream and right-view video stream, respectively.

These left-view and right-view video streams are compressed by the inter-picture prediction encoding using the correlated property between view points, as well as by the inter-picture prediction encoding using the correlated property in a time axis. The pictures constituting the right-view video stream are compressed by referring to the pictures constituting the left-view video stream having the same display times. One of the video compression methods using such a correlated property between view points is a corrected standard of MPEG-4 AVC/H.264 which is called Multi-view Video Coding (MVC). The Joint Video Team (JVT), which is a joint project of the ISO/IEC MPEG and the ITU-T VCEG, completed in July 2008 the formulation of the corrected standard of MPEG-4 AVC/H.264 called the Multi-view Video Coding (MVC). The MVC is a standard for encoding, in bulk, images for a plurality of view points. Due to the use, in the prediction encoding, of the similarity of images between view points as well as the similarity of images in a time axis, the MVC has improved the compression efficiency compared with methods for encoding independent images for a plurality of view points.

A video stream, among the left-view video stream and the right-view video stream having been compress-encoded by the MVC, that can be decoded independently is called "base-view video stream". A base-view indicator, which will be described later, indicates which of the left-view video stream and the right-view video stream is specified as the base-view video stream. Also, a video stream, among the left-view video stream and the right-view video stream, that has been compress-encoded based on the inter-frame correlated property with each picture data constituting the base-view video stream, and that can be decoded only after the base-view video stream is decoded, is called "dependent-view stream".

A video stream, among the left-view video stream and the right-view video stream having been compress-encoded with use of the correlated property between view points, that can be decoded independently is called "base-view video stream". A base-view indicator in the playitem information indicates which of the left-view video stream and the right-view video stream is specified as the base-view video stream.

At the moment, the MVC is considered to be the best method for encoding the stereoscopic images. Accordingly, in the description hereinafter it is presumed that "main-view video stream" is "base-view video stream", and "sub-view video stream" is "dependent-view video stream".

The video stream in the MPEG4-AVC format, which forms the basis of the MVC video stream, is described in the following.

The MVC video stream has the GOP structure, and is composed of closed GOPs and open GOPs. The closed GOP is composed of an IDR picture, and B-pictures and P-pictures that follow the IDR picture. The open GOP is composed of a non-IDR I-picture, and B-pictures and P-pictures that follow the non-IDR I-picture.

The non-IDR I-pictures, B-pictures, and P-pictures are compress-encoded based on the frame correlation with other pictures. The B-picture is a picture composed of slice data in the bidirectionally predictive (B) format, and the P-picture is a picture composed of slice data in the predictive (P) format. The B-picture is classified into reference B (Br) picture and non-reference B (B) picture.

In the closed GOP, the IDR picture is disposed at the top. In the display order, the IDR picture is not the top, but pictures (B-pictures and P-pictures) other than the IDR picture cannot have dependency relationship with pictures existing in a GOP that precedes the closed GOP. As understood from this, the closed GOP has a role to complete the dependency relationship.

Next, the internal structure of the GOP is described. Each piece of picture data in the open and closed GOPs has the video access unit structure of the H.264 encoding method.

The relationship between the video access unit and the picture is "1 video access unit=1 picture". In the BD-ROM, the relationship is restricted to "1 PES packet=1 frame". Therefore, when the video has the frame structure, "1 PES packet=1 picture", and when the video has the field structure, "1 PES packet=2 pictures". Taken these into account, the PES packet stores the picture in a one-to-one ratio.

Figure 3:
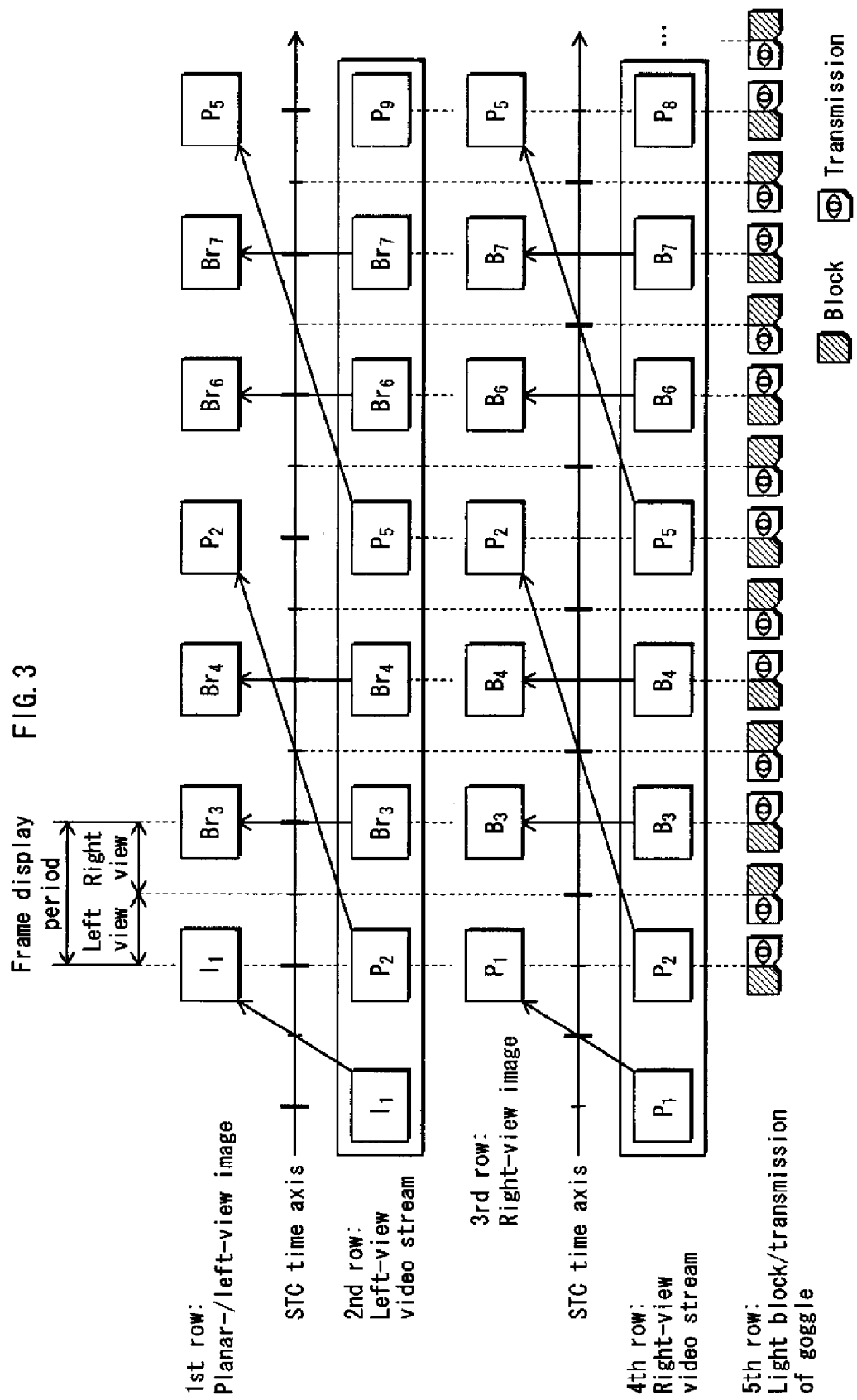
FIG. 3 shows one example of the internal structures of the left-view and right-view video streams for the stereoscopic viewing.

FIG. 3 shows one example of the internal structures of the left-view and right-view video streams for the stereoscopic viewing.

In the second row of FIG. 3, the internal structures of the left-view video stream is shown. This stream includes picture data I1, P2, Br3, Br4, P5, Br6, Br7, and P9. These picture data are decoded according to the Decode Time Stamps (DTS). The first row shows the left-eye image. The left-eye image is played back by playing back the decoded picture data I1, P2, Br3, Br4, P5, Br6, Br7, and P9 according to the PTS, in the order of I1, Br3, Br4, P2, Br6, Br7, and P5.

In the fourth row of FIG. 3, the internal structures of the right-view video stream is shown. This stream includes picture data P1, P2, B3, B4, P5, B6, B7, and P8. These picture data are decoded according to the DTS. The third row shows the right-eye image. The right-eye image is played back by playing back the decoded picture data P1, P2, B3, B4, P5, B6, B7, and P8 according to the PTS, in the order of P1, B3, B4, P2, B6, B7, and P5.

The fifth row shows how the state of the 3D glasses 400 is changed. As shown in the fifth row, when the left-eye image is viewed, the shutter for the right eye is closed, and when the right-eye image is viewed, the shutter for the left eye is closed.

In FIG. 3, for example, the starting P-picture of the right-view video stream refers to the I-picture of the left-view video stream; the B-picture of the right-view video stream refers to the Br-picture of the left-view video stream; and the second P-picture of the right-view video stream refers to the P-picture of the left-view video stream. Here, a mode, in which video frames of the base-view video stream (B) and video frames of the dependent-view video stream (D) are alternately output at a display cycle of ⅛s seconds like "B"-"D"-"B"-"D", is called a "B-D presentation mode".

Also, a mode, in which a same type of video frame is repeatedly output twice or more while the 3D mode is maintained as the playback mode, is called a "B-B presentation mode". In the "B-B presentation mode", video frames of an independently playable base-view video stream are repeatedly output like "B"-"B"-"B"-"B".

The B-D presentation mode and the B-B presentation mode described above are basic presentation modes in the playback device. Other than these, a playback mode called "1 plane+offset" mode is available in the playback device.

The "1 plane+offset" mode (also referred to as "3D-offset mode") is a playback mode in which the stereoscopic viewing is realized by incorporating a shift unit in the latter half of the plane memory and functioning the shift unit. In each of the left-view period and the right-view period, the plane offset unit shifts the coordinates of the pixels in the plane memory in units of lines leftward or rightward to displace the image formation point of the right-eye and left-eye view lines frontward or backward so that the viewer can feel a change in the sense of depth. More specifically, when the pixels coordinates are shifted leftward in the left-view period, and rightward in the right-view period, the image formation point is displaced frontward; and when the pixels coordinates are shifted rightward in the left-view period, and leftward in the right-view period, the image formation point is displaced backward.

In such a plane shift, the plane memory for the stereoscopic viewing only needs to have one plane. It is thus the best method for generating the stereoscopic images with ease. However, the plane shift merely produces stereoscopic images in which monoscopic images come frontward or go backward. Therefore, it is suited for generating a stereoscopic effect for the menu or subtitle, but leaves something to be desired in realizing a stereoscopic effect for the characters or physical objects. This is because it cannot reproduce dimples or unevenness of the faces of characters.

To support the "1 plane+offset" mode, the playback device is structured as follows. For the playback of graphics, the playback device includes a plane memory, a CLUT unit, and an overlay unit. The plane shift unit is incorporated between the CLUT unit and the overlay unit. The plane shift unit realizes the above-described change of pixel coordinates by using the offset in the offset sequence incorporated in the access unit structure of the dependent-view video stream. With this arrangement, the level of jump-out of pixels in the "1 plane+offset" mode changes in synchronization with the MVC video stream. The "1 plane+offset" mode includes "1 plane+zero offset mode". The "1 plane+zero offset mode" is a display mode which, when the pop-up menu is ON, gives the stereoscopic effect only to the pop-up menu by making the offset value zero.

The target of the shift control by the offset sequence is a plurality of plane memories which constitute a predetermined layer model. The plane memory is a memory for storing one screen of pixel data, which has been obtained by decoding the elementary streams, in units of lines so that the pixel data can be output in accordance with the horizontal and vertical sync signals. Each of a plurality of plane memories stores one screen of pixel data that is obtained as a result of decoding by the video decoder, PG decoder, or IG decoder.

The predetermined layer model is composed of a layer of the base-view video plane and the dependent-view video plane, a layer of the PG plane, and a layer of the IG/BD-J plane, and is structured so that these layers (and the contents of the plane memories in these layers) can be overlaid in the order of the base-view video plane, PG plane, and IG/BD-J plane from the bottom.

The layer overlay is achieved by executing a superimposing process onto all combinations of the two layers in the layer model. In the superimposing process, pixel values of pixel data stored in the plane memories of the two layers are superimposed. The following describes the plane memories in each layer.

The base-view video plane is a plane memory for storing one screen of pixel data that is obtained by decoding view components constituting the base-view video stream. The dependent-view video plane is a plane memory for storing one screen of pixel data that is obtained by decoding view components constituting the dependent-view video stream.

The presentation graphics (PG) plane is a plane memory for storing graphics that are obtained when a graphics decoder, which operates by the pipeline method, performs the decoding process. The IG/BD-J plane is a plane memory that functions as an IG plane in some operation mode and functions as a BD-J plane in other operation mode. The interactive graphics (IG) plane is a plane memory for storing graphics that are obtained when a graphics decoder, which operates based on the interactive process, performs the decoding process. The BD-J plane is a plane memory for storing the drawing image graphics that are obtained when an application of an object-oriented programming language performs the drawing process. The IG plane and the BD-J plane are exclusive to each other, and when one of them is used, the other cannot be used. Therefore the IG plane and the BD-J plane share one plane memory.

In the above-mentioned layer model, with regard to the video plane, there are a base-view plane and a dependent-view plane. On the other hand, with regard to the IG/BD-J plane and the PG plane, there is neither a base-view plane nor a dependent-view plane. For this reason, the IG/BD-J plane and the PG plane are the target of the shift control.

Figures 4A, 4B:
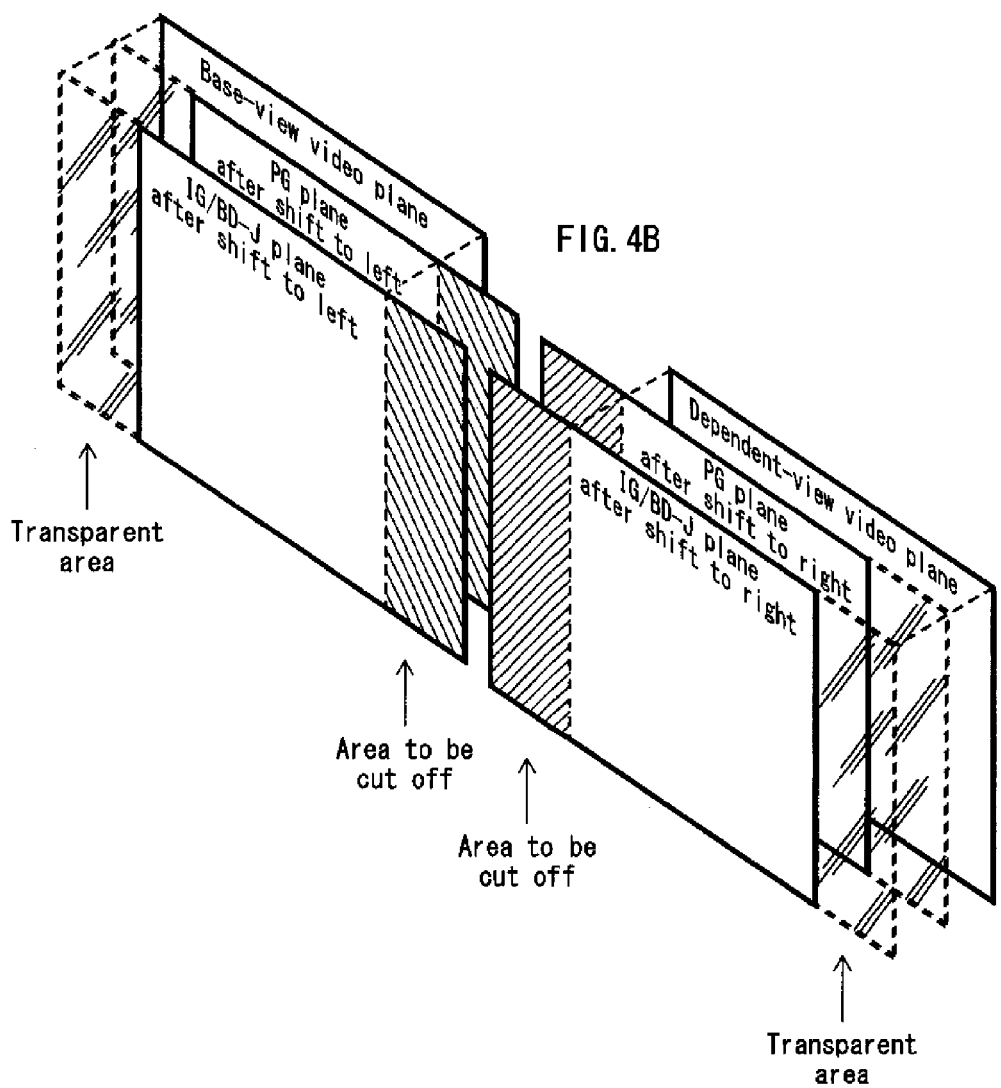
FIGS. 4A and 4B show how the offset control is performed onto the layer model of the plane memories in the "1 plane+offset" mode.

FIGS. 4A and 4B show how the offset control is performed onto the layer model of the plane memories in the "1 plane+ offset" mode. The layer model of the plane memories shown in FIG. 4 includes IG planes, PG planes, video planes, and background planes.

As shown in FIG. 4A, a PG plane and an IG plane are shifted to the left-hand side thereof in the base-view period. A transparent area is added to the left-hand side of each of the PG plane and the IG plane having been shifted leftward, and an end portion thereof on the right-hand side thereof is cut off. Similarly, a transparent area is added to the right-hand side of each of the PG plane and the IG plane having been shifted rightward, and an end portion thereof on the left-hand side thereof is cut off.

As shown in FIG. 4B, a PG plane and an IG plane are shifted to the right-hand side thereof in the base-view period. A transparent area is added to the right-hand side of each of the PG plane and the IG plane having been shifted rightward, and an end portion thereof on the left-hand side thereof is cut off. Similarly, a transparent area is added to the left-hand side of each of the PG plane and the IG plane having been shifted leftward, and an end portion thereof on the right-hand side thereof is cut off.

Figure 5A:
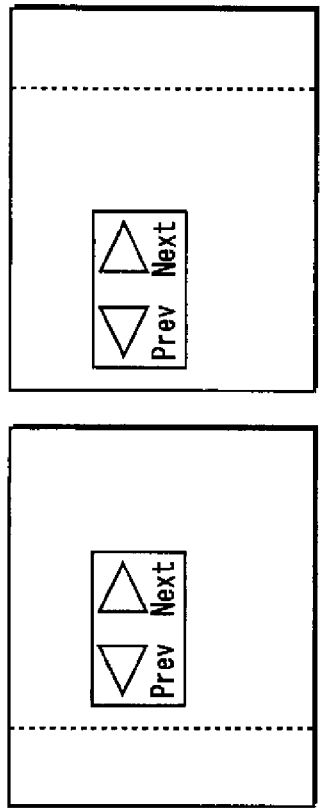
Figure 5B:
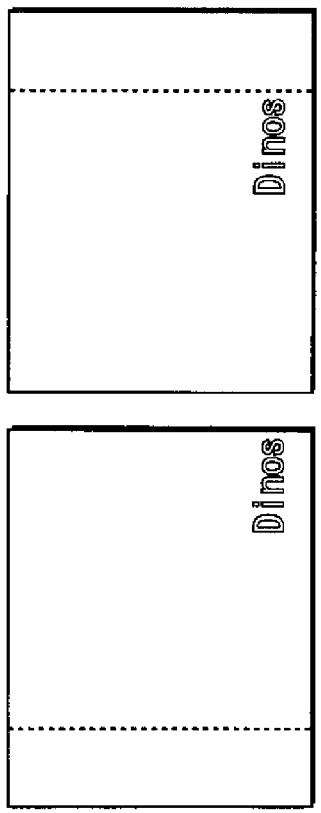
Figure 5C:
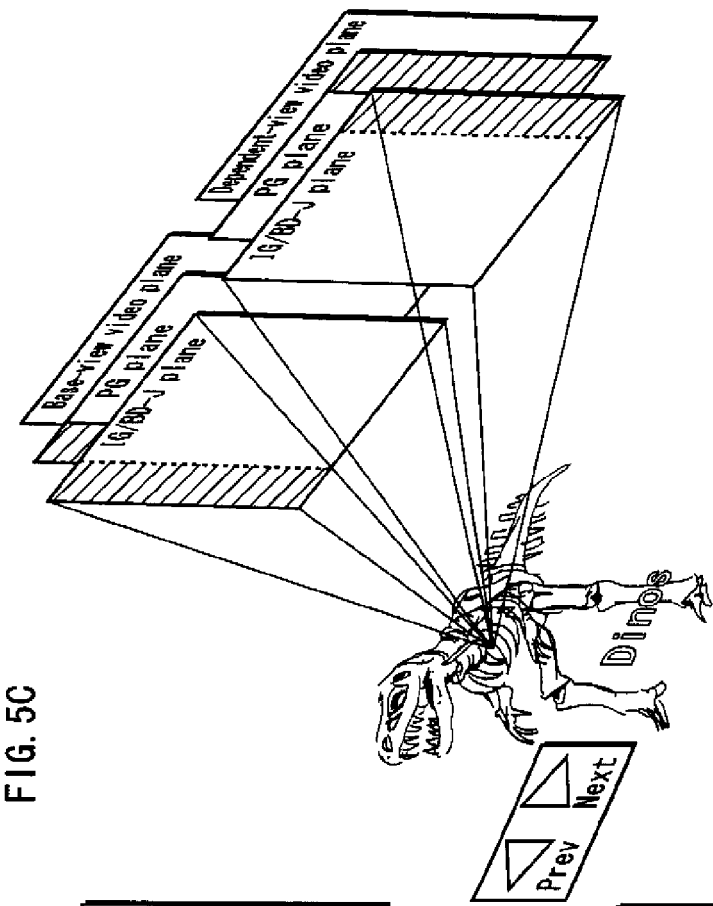

FIGS. 5A through 5C show how a stereoscopic image is played back by the offset control shown in FIG. 4. When the IG plane stores a GUI part for receiving an instruction to skip to the previous chapter or the next chapter, and the PG plane stores subtitle characters representing a title "Dinos", the IG plane and the PG plane store the data as shown in FIGS. 5A and 5B respectively by the offset control in the "1 plane+ offset" mode.

FIG. 5A shows the storage content of the IG plane having been shifted leftward, and of the IG plane having been shifted rightward. FIG. 5B shows the storage content of the PG plane having been shifted leftward, and of the PG plane having been shifted rightward. With this offset control, the stereoscopic image is played back as shown in FIG. 5C. The stereoscopic image shown in FIG. 5C is an overlaid image of the dinosaur shown in FIG. 2, the GUI and the subtitle. Thus a movie content is played back as a stereoscopic image together with the corresponding subtitle and GUI, much like a BD-ROM content being provided at the present day.

FIGS. 6A through 6D show how to realize the stereoscopic viewing in the "1 plane+offset" mode.

When the left-view video is to be output in the "1 plane+ offset" mode, the coordinates of the image data stored in the plane memory called PG plane are shifted towards the positive direction of the X axis by the offset value. The plane memory is then cropped to prevent it from overlapping with the left-view video plane, and is provided to be overlaid with the other planes (see FIG. 6A).

When the right-view video is to be output, the coordinates of the image data stored in the plane memory are shifted towards the negative direction of the X axis by the offset value. The plane memory is then cropped to prevent it from overlapping with the left-view video plane, and is provided to be overlaid with the other planes (see FIG. 6B).

Figure 6A:
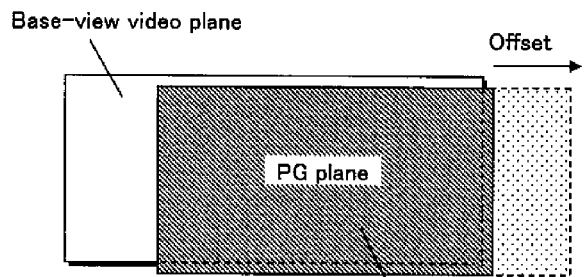
Figure 6B:
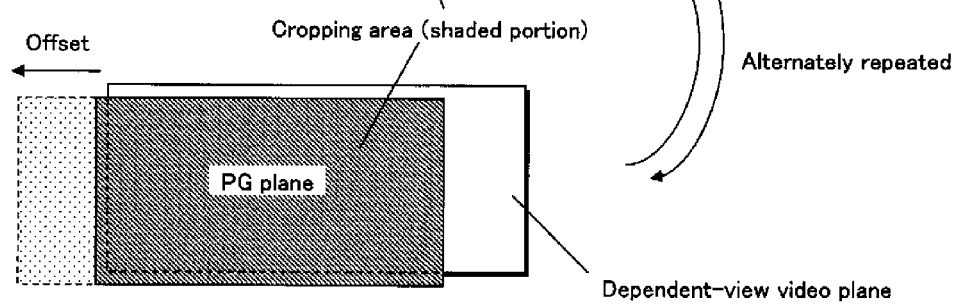
Figure 6C:
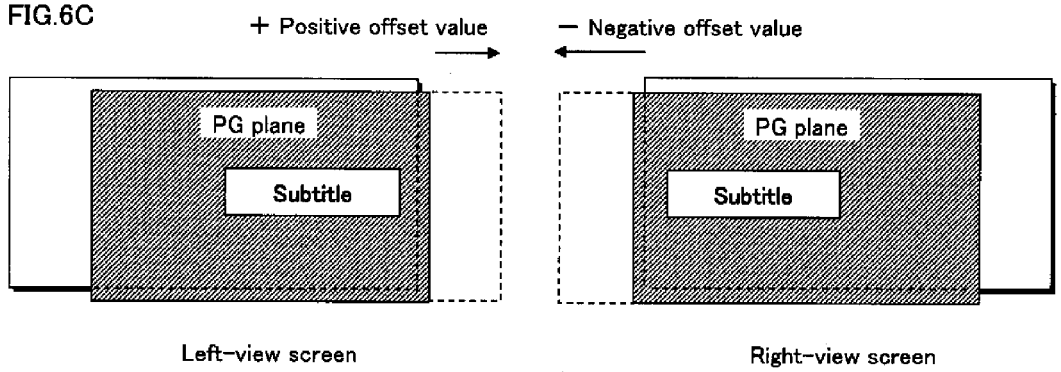
Figure 6D:
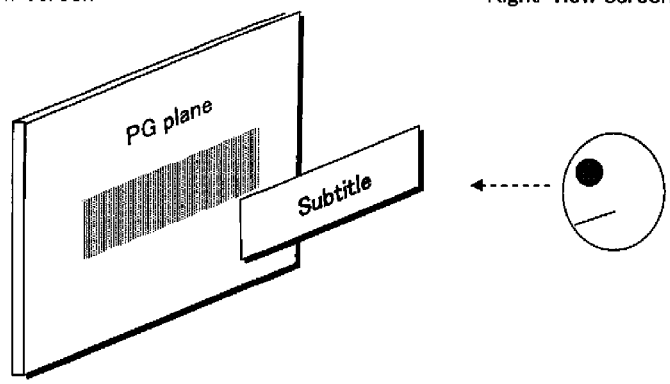

FIG. 6C shows how the image planes are displayed to the user, after being cropped and superposed with use of the offset values. By shifting and cropping the image planes with use of the offset values, it is possible to create parallax images for the left and right eyes. This makes it possible to give depth to a monoscopic image. When the image has such a depth, the user will see the monoscopic image pop up from the screen of the display device (see FIG. 6D).

FIG. 7 shows the internal structure of the dependent-view stream which is provided with the control information for the "1 plane+offset" mode. The first row of FIG. 7 shows a plurality of GOPs. The second rows shows a plurality of video access units constituting each GOP. The video access units correspond to the view components, and are displayed in each display frame ("Frame(1)" through "Frame(number_of_displayed_frames_inGOP)" in FIG. 7) in the GOP.

The third row shows the internal structure of the video access unit. As shown there, the video access unit is structured as a sequence of an access unit delimiter, a sequence parameter set, a picture parameter set, an MVC scalable nesting SEI message, a first view component, a sequence end code, and a stream end code. The MVC scalable nesting SEI message includes a user data container.

FIGS. 8A through 8C show the internal structure of the user data container.

FIG. 8A shows the internal structure of the user data container. The user data container is unregistered user data, and falls into three types: closed caption information; GOP structure map; and offset metadata. These types are indicated by the "type_indicator" in the user data container.

FIG. 8B shows the offset metadata. The offset metadata is a sequence list for the PG plane, IG plane, and BD-J plane, and is used for the offset setting while the presentation graphics, text subtitle, and IG/BD-J plane are played back in the "1 plane+offset" mode. More specifically, the offset metadata indicates the offset control on the PG plane, IG plane, and BD-J plane when the graphics to be overlaid with the picture data is played back in the "1 plane+offset" mode.

The metadata should be stored in the MVC scalable nesting SEI message in the starting video component of each GOP in the encoding order of the dependent-view access unit. A NAL unit including the MVC scalable nesting SEI message should not include data other than the user data container of the metadata.

FIG. 8B shows the internal structure of the offset metadata ("Offset_metadata").

In the frame rate ("frame_rate") field, a frame rate of the access unit including the offset metadata is written.

In the presentation time stamp (PTS) field, the first frame rate in the GOP is written at 90 KHz.

In the offset sequence number ("number_of_offset_sequence") field, the number of sequences is written in the range from "0" to "32".

In the displayed frame number in ("number_of_displayed_frames_in_GOP") field, the number of displayed frames in the GOP including the metadata is written.

The offset metadata further includes as many offset sequences ("offset_sequence[1]" through "offset sequence [number_of_sequence]") as the number indicated by the "number_of_sequence". The offset sequences correspond to the respective GOPs in the video stream.

FIG. 8C shows the internal structure of the offset sequence ("Offset_sequence"). The offset sequence is a parameter sequence that indicates control parameters for each frame period in a group of pictures, where the control parameters are used when the graphics are overlaid with each piece of picture data belonging to the group of pictures. The offset sequence is composed of as many control parameters as the number indicated by the "number_of_displayed_frames_in_GOP". The control parameter is composed of plane offset direction information and a plane offset value.

The plane offset direction information ("Plane_offset_direction") indicates the direction of offset in the plane. When the plane offset direction information is set to a value "0", it indicates the front setting in which the plane memory exists between the TV and the viewer, and in the left-view period, the plane is shifted rightward, and in the right-view period, the plane is shifted leftward.

When the plane offset direction information is set to a value "1", it indicates the behind setting in which the plane memory exists behind the TV or the screen, and in the left-view period, the plane is shifted leftward, and in the right-view period, the plane is shifted rightward. When the plane offset direction information indicates the front setting, the Z-axis coordinate of the control parameter in the three-dimensional coordinate system is a positive coordinate. When the plane offset direction information indicates the behind setting, the Z-axis coordinate of the control parameter in the three-dimensional coordinate system is a negative coordinate.

The plane offset value ("plane_offset_value") indicates the amount of deviation in the horizontal direction, of the pixels constituting the graphics, and indicates the offset value of the plane in units of pixels.

FIG. 9 shows the syntax for describing the offset metadata. The "for" statement whose control variable is "offset_sequence_id" defines as many offset sequences as the number indicated by the "number_of_offset_sequence".

The "for" statement whose control variable is "i" defines as many pairs of "Plane_offset_direction" and "Plane_offset_value" as the number indicated by the "number_of_displayed_frames_in_GOP". With use of such "for" statements, the above-described offset sequences are defined.

FIGS. 10A and 10B show an example of the difference between viewings provided by positive and negative plane offsets. In each of FIGS. 10A and 10B, a right-view graphics image to be output with use of a graphics plane after being shifted in the right-view output is shown in front, and a left-view graphics image to be output with use of a graphics plane after being shifted in the left-view output is shown behind.

FIG. 10A shows the case where the plane offset value is positive (the left-view graphics image is shifted rightward, and the right-view graphics image is shifted leftward). When the plane offset value is positive, the subtitle that is viewed during the left-view output is on the right of the subtitle that is viewed during the right-view output. That is to say, since the convergence point (focus position) is in front of the screen, the subtitle appears in front of the screen.

FIG. 10B shows the case where the plane offset value is negative. When the plane offset value is negative, the subtitle that is viewed during the left-view output is on the left of the subtitle that is viewed during the right-view output. That is to say, since the convergence point (focus position) is behind the screen, the subtitle appears behind the screen.

This completes description of the method for causing the subtitle to appear in front of or behind the screen by switching between positive and negative plane offset values.

<Technical Meaning of Offset Sequence>

The offset sequence with the above-described data structure makes it possible to define the depth of graphics for each frame in the video stream time axis. Thus the offset sequence can be used to define a function Z(t) that is used to calculate, from an arbitrary frame time "t", a depth "z" that corresponds to the frame time "t". When the function Z(t) linearly changes the depth at the frame time "t", the playback device can change the depth of the graphics linearly with the progress of playback by using an offset sequence corresponding to the function Z(t) in the "1 plane+offset" mode. When the function Z(t) exponentially changes the depth at the frame time "t", the playback device can change the depth of the graphics exponentially with the progress of playback by using an offset sequence corresponding to the function Z(t) in the "1 plane+offset" mode. In this way, it is possible to change the depth in real time with the progress of the playback point in the video stream time axis, resulting in the realization of a highly realistic graphics image in the stereoscopic playback.

FIG. 11 is a graph in which the horizontal axis represents a time axis, and the vertical axis represents "Plane_offset_value[j]". In the horizontal time axis, a unit of time is each GOP constituting the dependent-view access unit. The vertical axis in the positive direction represents Plane_offset_value[j] when Plane_offset_direction[j] is "0". The vertical axis in the negative direction represents Plane_offset_value[j] when Plane_offset_direction[j] is "1". The curved lines and straight lines in the graph indicate the displacement over time of Plane_offset_direction[j] for the offset sequences with offset_sequence_id=1, 2, 3, and 4. Of these, the offset sequences with offset_sequence_id=1 and 4 are offset sequences of the linear function defining the depth that changes linearly over time in the time axis; and the offset sequences with offset_sequence_id=2 and 3 are offset sequences of the parabolic function defining the depth that changes parabolically over time in the time axis.

FIG. 12 is a graph in which the horizontal axis represents a time axis, and the vertical axis represents "Plane_offset_value[j]". In the horizontal time axis, a unit of time is each frame in each GOP constituting the dependent-view access unit. Thus the offset sequences with offset_sequence_id=1, 2, and 3 shown in FIG. 12, represented in the time accuracy of frame, have discrete values in units of frame periods. Each offset sequence can define 24 pieces of discrete depths per second. Thus it is possible to change the depth of each offset sequence with the time accuracy of 24 changes per second. Accordingly, it is possible to change the Z coordinate of the graphics in three-dimensional coordinate system with a highly realistic change of the depth, which compares favorably with that in the stereoscopic video playback of the main story.

Further, since the metadata can store a plurality of offset sequences, it is possible to define a plurality of depth functions $Z1(t), Z2(t), Z3(t), Z4(t), \ldots, Zn(t)$ in each of which the depth changes differently over time, by using a plurality of offset sequences 1, 2, 3, 4, ..., n. Here, by using the offset sequences 1, 2, 3, 4, ..., n such that the depth function $Z1(t)$ is a direct function that changes the depth in accordance with variable "t", the depth function $Z2(t)$ is a quadratic function, the depth function $Z3(t)$ is a cubic function, the depth function $Z4(t)$ is a quartic function, ..., and the depth function $Zn(t)$ is an $n^{th}$ function, it is possible to define a plurality of depth functions which differ from each other in correlation between depth and frame period.

By allowing the playback device to select one among the offset sequences 1, 2, 3, 4, ..., n during the operation, it is possible to select an optimum depth function among the depth functions $Z1(t), Z2(t), Z3(t), Z4(t), \ldots, Zn(t)$ and use it in the "1 plane+offset" mode, in response to a change in the state of the playback device or in response to a request from the user. With this structure, the depth of the graphics can be changed variously in the "1 plane+offset" mode.

The plurality of offset sequences defined in the present embodiment respectively specify a plurality of display positions that differ from each other in the change of depth over time. Accordingly, by selecting an appropriate offset sequence among the plurality of offset sequences, it is possible to arrange the graphics at appropriate positions.

Up to now, the first technical meaning of the offset sequence has been described. The following describes the second technical meaning of the offset sequence.

The second technical meaning of the offset sequence is to be able to define depths in correspondence with portions of a moving object in the screen. In the case of the dinosaur skeleton shown in FIG. 2, it is obvious that the portions such as the head, body, legs, and tail have different depths. Further, in the video image, depths of the portions such as the head, body, legs, and tail would change over time. In view of this, the metadata has the data structure for defining a plurality of offset sequences having control parameters for each frame of GOP, where the control parameters indicate depths that are distances to positions immediately before the portions such as head, body, legs, and tail.

FIG. 13 shows one example of the depths defined by the offset sequences with offset_sequence_id=1, 2, 3, and 4.

The offset sequences with offset_sequence_id=1 and 2 specify appropriate depths so that a subtitle/menu can be arranged between the user and the dinosaur. The offset sequences with offset_sequence_id=3 and 4 specify appropriate depths so that a subtitle/menu can be arranged behind the dinosaur. Of these, the offset sequence with offset_sequence_id=1 defines a depth so that the subtitle/menu is arranged at a position closer to the user, between the user and the dinosaur. The offset sequence with offset_sequence_id=2 defines a depth so that the subtitle/menu is arranged at a position closer to the dinosaur, between the user and the dinosaur. The offset sequence with offset_sequence_id=3 defines a depth so that the subtitle/menu is arranged on a line along the legs of the dinosaur. The offset sequence with offset_sequence_id=4 defines a depth so that the subtitle/menu is arranged at a position behind the dinosaur.

In this way, the present invention can define the control parameters that indicate depths that are distances to positions immediately before the portions of the object such as head, body, legs, and tail, and can define the displacement over time of the control parameters. Therefore, by using the data structure defined by the syntax shown in FIG. 9, it is possible to realize a precise and highly-accurate shift control in "1 plane+offset" mode.

Even when the dinosaur shown in the drawings moves around in the screen and an appropriate depth of the subtitle/menu changes momentarily, the subtitle/menu can be arranged at an appropriate position relative to the dinosaur.

This completes the second technical meaning of the offset sequence.

FIGS. 14A through 14C show the internal structure of the recording medium in Embodiment 1. As shown in FIG. 14A, the recording medium in Embodiment 1 stores an index table file, an operation mode object program file, a playlist information file, a stream information file, and a stream file.

<Index Table File>

The index table file is management information of the entire recording medium. The index table file is the first file to be read by a playback device after the recording medium is loaded into the playback device, so that the playback device is enabled to uniquely identify the disc.

The index table file shows correspondence between the operation mode objects (which define the operation modes) and a plurality of title numbers that can be stored in the title number register provided in the playback device. Titles recorded on the recording medium are pairs of (i) an operation mode object identified by a title number and (ii) a playlist played back from that operation mode object. Here, one movie corresponds to one or more titles which can be one or more versions of the movie. That is to say, when a movie has only one version, the relationship between the movie and titles is represented as "movie=title". When a movie has a plurality of versions such as a theatrical version, a director's cut version, and a TV version, each of these versions is provided as one title.

It should be noted here that title numbers that can be stored in the title number register include "0", "1" through "999", and an undefined value "0xFFFF". A title number "0" is a title number of the top menu title. The top menu title is a title that can be called by a menu call operation performed by the user. The title number by the undefined value "0xFFFF" is a title number of the first play title. The first play title is a title that displays a warning to the viewer, a logo of the content provider and so on immediately after the recording medium is loaded.

The index table includes entries (index table entries) in one-to-one correspondence with title numbers. Each index table entry includes an operation mode object that defines an operation mode. With this structure, the index table defines in detail how each title operates in a corresponding operation mode. The index table entries have the following data structure in common: the data structure composed of "object type", "movie object reference" and "object file information". The "object type" indicates whether the type of the operation mode object associated with the title corresponding to the entry is movie object or BD-J object. The "object file information" indicates a file name of a BD-J object associated with the title. The "movie object reference" indicates an identifier of a movie object associated with the title.

In the playback device, the value of the title number register changes in the order of undefined value "0xFFFF"→any of "1" through "999"→"0". This change in the title number stored in the title number register indicates the following. Upon a loading of the recording medium, first the first play title is played back; after the first play title, titles having any of title numbers "1" through "999" are played back; and after these title, the top menu title is played back to wait for a selection by the user. A title having a title number currently stored in the title number register among the title numbers "1" through "999" is the current playback target, namely, the "current title". How the numbers to be stored in the title number register are set is determined by the user operation made in response to the top menu title and by the setting of the title number register by the program.

<Operation-Mode-Object Program File>

The operation-mode-object program file stores operation mode objects which are programs that defined the operation modes of the playback device. The operation mode object is classified into: one that is written as a command; and one that is written in an object-oriented compiler language. The former type of operation mode object supplies a plurality of navigation commands as a batch job to the playback device in the command-based operation mode to operate the playback device based on the navigation commands. The command-based operation mode is called "HDMV mode".

The latter type of operation mode object supplies instances of class structure to the playback device in the operation mode based on the object-oriented compiler language, in order to operate the playback device based on the instances. Java™ applications can be used as the instances of class structure. The operation mode based on the object-oriented compiler language is called "BD-J mode".

<Playlist Information File>

The playlist information file is a file storing information that is used to cause the playback device to play back a playlist. The "playlist" indicates a playback path defined by logically specifying a playback order of playback sections, where the playback sections are defined on a time axis of transport streams (TS). The playlist has a role of defining a sequence of scenes to be displayed in order, by indicating which parts of which TSs among a plurality of TSs should be played back. The playlist 1 information defines "patterns" of the playlists. The playback path defined by the playlist information is what is called "multi-path". The multi-path is composed of a "main path" and one or more "sub-paths". The main path is defined for the main TS. The sub-paths are defined for sub streams. A plurality of sub-paths can be defined while one main path is defined. The plurality of sub-paths are identified by identifiers called sub-path IDs. Chapter positions are defined in the playback time axis of the multi-path. It is possible to realize a random access by the playback device to an arbitrary time point in the time axis of the multi-path by causing the playback device to refer to one of the chapter positions. In the BD-J mode, it is possible to start an AV playback by the multi-path by instructing a Java™ virtual machine to generate a JMF (Java Media Frame work) player instance for playing back the playlist information. The JMF player instance is data that is actually generated in the heap memory of the virtual machine based on a JMF player class. In the HDMV mode, it is possible to start an AV playback by the multi-path by causing the playback device to execute a navigation command instructing to perform a playback according to the playlist. The playback device is provided with a playlist number register storing the number of the current playlist information. The playlist information being played back currently is one of a plurality of pieces of playlist information whose number is currently stored in the playlist number register.

<Stream Information File>

The stream information files are clip information files that are provided in a one-to-one correspondence with the stream files. The stream information file indicates: what ATC sequence is constituted form a sequence of source packets that exist in the stream file; what STC sequence is incorporated in the ATC sequence; and what TS is the ATC sequence.

The stream information file indicates the contents of the stream file. Therefore, when a TS in the stream file is to be played back, it is necessary to preliminarily read, into the memory, a stream information file that corresponds to the stream file. That is to say, in the playback of a stream file, the "prestoring principle", in which the stream information file is preliminarily read into the memory, is adopted. The reason that the prestoring principle is adopted is as follows. The data structure of the TS stored in the stream file has a compatibility with the European digital broadcast standard. So, the stream contains information such as PCR, PMT, and PAT that enable the stream to be treated as a broadcast program. However, it is unwise to extract such information each time a playback is performed. This is because it is necessary, each time a playback is performed, to access a low-speed recording medium to read packets constituting the TS, and analyze the payloads of the TS packets. Therefore, the stream information files are provided in a one-to-one correspondence with the stream files storing TSs, and the stream information files are read into the memory before the stream is played back, so that the information of the TSs can be grasped without analyzing the payloads of the TSs.

<Stream File>

The stream file stores one or more sequences of source packets. The source packet is a TS packet that is attached with a 4-byte TP_Extra_Header. The TP_Extra_Header is composed of a 2-bit copy permission indicator and a 30-bit ATS (Arrival Time Stamp). The ATS included in the TP_Extra_Header indicates an arrival time in a real-time transfer in which the isochronicity is ensured.

Among such sequences of source packets, a sequence of source packets whose time stamps are continuous in the Arrival Time Clock (ATC) time axis is called an "ATC sequence". The ATC sequence is a sequence of source packets, where Arrival_Time_Clocks referred to by the Arrival_Time_Stamps included in the ATC sequence do not include "arrival time-base discontinuity". In other words, the ATC sequence is a sequence of source packets, where Arrival_Time_Clocks referred to by the Arrival_Time_Stamps included in the ATC sequence are continuous. This is why each source packet constituting the ATC sequence is subjected to continuous source packet depacketizing processes and continuous packet filtering processes while the clock counter is counting the arrival time clocks of the playback device.

While the ATC sequence is a sequence of source packets, a sequence of TS packets whose time stamps are continuous in the STC time axis is called an "STC sequence". The STC sequence is a sequence of TS packets which do not include "system time-base discontinuity", which is based on the STC (System Time Clock) that is a system standard time for TSs. The presence of the system time-base discontinuity is indicated by a "discontinuity_indicator" being ON, where the discontinuity_indicator is contained in a PCR packet carrying a PCR (Program Clock Reference) that is referred to by the decoder to obtain an STC. The STC sequence is a sequence of TS packets whose time stamps are continuous in the STC time axis. Therefore, each TS packet constituting the STC sequence is subjected to continuous decoding processes performed by the decoder provided in the playback device, while the clock counter is counting the system time clocks of the playback device.

Each of the main TS and the sub-TSs in the stream file is managed as a "piece of AV stream", namely an "AV clip", by the clip information in the stream information file corresponding to the stream file.

Also, the packet sequence stored in the stream file contains packet management information (PCR, PMT, PAT) defined in the European digital broadcast standard, as information for managing and controlling a plurality of types of PES streams.

The PCR (Program Clock Reference) stores STC time information corresponding to an ATS that indicates the time when the PCR packet is transferred to a decoder, in order to achieve synchronization between an ATC (Arrival Time Clock) that is a time axis of ATSs, and an STC (System Time Clock) that is a time axis of PTSs and DTSs.

The PMT (Program Map Table) stores PIDs in the streams of video, audio, graphics and the like contained in the transport stream file, and attribute information of the streams corresponding to the PIDs. The PMT also has various descriptors relating to the TS. The descriptors have information such as copy control information showing whether copying of the AV clip is permitted or not.

The PAT (Program Association Table) shows a PID of a PMT used in the TS, and is registered by the PID arrangement of the PAT itself.

These PCR, PMT, and PAT, in the European digital broadcast standard, have a role of defining partial transport streams constituting one broadcast program (one program). This enables the playback device to cause the decoder to decode TSs as if it deals with the partial TSs constituting one broadcast program, conforming to the European digital broadcast standard. This structure is aimed to support compatibility between the recording medium playback devices and the terminal devices conforming to the European digital broadcast standard. Among the TSs, a TS that is the base axis of the multi-path is called "main TS"; and a TS that is the base axis of the sub-path is called "sub-TS".

FIG. 14B shows the internal structure of the main TS. FIG. 14C shows the internal structure of the sub-TS. As shown in FIG. 14B, the main TS includes one base-view video stream, 32 base-view PG streams, 32 base-view IG streams, and 32 audio streams. As shown in FIG. 14C, the sub-TS includes one dependent-view video stream, 32 dependent-view PG streams, and 32 dependent-view IG streams.

Next, the internal structure of TS will be described.

FIGS. 15A and 15B illustrate in more detail how the video stream is stored in the PES packet sequences. The first row in FIG. 15A shows a video frame sequence of the video stream. The second row shows a PES packet sequence. The third row shows a TS packet sequence obtained by converting the PES packet sequence. As shown by arrows yg1, yg2, yg3 and yg4, the video stream is composed of a plurality of video presentation units (I picture, B picture, P picture). The video stream is divided up into the individual pictures, and each picture is stored in the payload of a PES packet. Each PES packet has a PES header storing a PTS (Presentation Time-Stamp) that is a display time of the picture stored in the payload of the PES packet, and a DTS (Decoding Time-Stamp) that is a decoding time of the picture stored in the payload of the PES packet.

<TS Packet Sequence>

FIG. 15B shows the format of the TS packets constituting the TS. The first row shows a TS packet sequence. The second row shows a source packet sequence.

As shown in the first row of FIG. 15B, each TS packet is a fixed-length packet consisting of a 4-byte "TS header" carrying information such as a PID identifying the stream, and a 184-byte "TS payload" storing data. The PES packets are divided and stored in the TS payloads.

As shown in the second row, each TS packet is attached with a 4-byte TP_Extra_Header to be converted into a 192-byte source packet. Such 192-byte source packets constitute the TS. The TP_Extra_Header stores information such as an ATS (Arrival_Time_Stamp). The ATS shows a transfer start time at which the TS packet is to be transferred to a PID filter. The source packets are arranged in the TS as shown in the third row. The numbers incrementing from the head of the TS are called SPNs (source packet numbers).

<Multiplexing of Transport Streams>

FIG. 16 schematically shows how the main TS is multiplexed. First, the base-view video stream and an audio stream (First row) are respectively converted into PES packet sequences (Second row), and further converted into source packets sequences, respectively (Third row). Similarly, the base-view presentation graphics stream and the base-view interactive graphics stream (Seventh row) are converted into PES packet sequences, respectively (Sixth row), and further converted into source packet sequences, respectively (Fifth row). The video, audio, and graphics source packets obtained in this way are arranged in the order indicated by their ATSs. This is because the source packets should be read into the read buffer according to their ATSs. The main TS (Fourth row) is composed of these source packets having been arranged in this way.

Elementary Streams to be Multiplexed in TS

The elementary streams (ES) to be multiplexed in these TSs include the video stream, audio stream, presentation graphics stream, and interactive graphics stream.

Video Stream

The video stream specified as the base-view stream constitutes a primary video stream in a picture-in-picture application. The picture-in-picture application is composed of the primary video stream and a secondary video stream. The primary video stream is a video stream composed of picture data of the picture-in-picture application that represents a parent picture in the screen; and the secondary video stream is a video stream composed of picture data of the picture-in-picture application that represents a child picture that is fit in the parent picture.

The picture data constituting the primary video stream and the picture data constituting the secondary video stream are stored in different plane memories after being decoded. The plane memory that stores the picture data constituting the secondary video stream has, in the first half thereof, a structural element (Scaling & Positioning) that performs changing scaling of the picture data constituting the secondary video stream, and positioning display coordinates of the picture data constituting the secondary video stream.

Audio Stream

The audio stream is classified into a primary audio stream and a secondary audio stream. The primary audio stream is an audio stream that is to be a main audio when the mixing playback is performed; and the secondary audio stream is an audio stream that is to be a sub-audio when the mixing playback is performed. The secondary audio stream includes information for downsampling for the mixing, and information for the gain control.

Presentation Graphics (PG) Stream

The PG stream is a graphics stream that can be synchronized closely with the video, with the adoption of the pipeline in the decoder, and is suited for representing subtitles. The PG stream falls into two types: a 2D PG stream; and a stereoscopic PG stream. The stereoscopic PG stream further falls into two types: a left-view PG stream; and a right-view PG stream. One of the left-view PG stream and the right-view PG stream that is specified by the base-view indicator becomes the base-view PG stream, and the other that is not specified by the base-view indicator becomes the dependent-view PG stream.

The reason that the stereoscopic PG stream is provided as well as the 2D PG stream is as follows. For example, when the PG stream represents subtitle characters, the subtitle characters from an anterior view to be displayed in the 2D mode, and the subtitle characters for the left eye and the right eye to be displayed in the 3D-LR mode should be different from each other. For this reason, one graphics stream of an image from an anterior view is displayed in the 2D mode, and two graphics streams (left-view PG stream and right-view PG stream) are displayed in the 3D-LR mode. Similarly, in the 3D-depth mode, an image from an anterior view and a grayscale stream indicating the depth information are played back. The 2D+offset (2D compatible) stream and the 3D-LR stream should not be provided in mixture.

It is possible to define up to 32 2D PG streams, up to 32 base-view PG streams, and up to 32 dependent-view PG streams. These PG streams are attached with different packet identifiers. Thus, it is possible to cause a desired PG stream among these PG streams to be subjected to the playback, by specifying a packet identifier of the one to be played back to the demultiplexing unit.

The left-view PG stream and the right-view PG stream should have the same language attribute so that even if the user switches a display method, a subtitle having the same contents is displayed. It is thus presumed that the 2D subtitles and the 3D subtitles correspond to each other on a one-to-one basis, and that a 2D subtitle not having a corresponding 3D subtitle or a 3D subtitle not having a corresponding 2D subtitle should not be provided. This is to prevent the user from being confused when the display method is switched. With this structure, streams that respectively correspond to the 2D and 3D display modes are selected when one stream number is specified. In such a case, the one stream number should correspond to the same language attribute so that the contents of the subtitles for the 2D and LR are the same.

A close synchronization with video is achieved due to the decoding with the pipeline adopted therein. Thus the use of the PG stream is not limited to the playback of characters such as the subtitle characters. For example, it is possible to display a mascot character of the movie that is moving in synchronization with the video. In this way, any graphics playback that requires a close synchronization with the video can be adopted as a target of the playback by the PG stream.

The PG stream is a stream that is not multiplexed into the transport stream but represents a subtitle. The text subtitle stream (also referred to as textST stream) is a stream of this kind, as well. The textST stream is a stream that represents the contents of subtitle by the character codes.

The PG stream and the text subtitle stream are registered as the same stream type in the same stream registration sequence, without distinction between them in type. And then during execution of a procedure for selecting a stream, a PG stream or a text subtitle stream to be played back is determined according to the order of streams registered in the stream registration sequence. In this way, the PG streams and text subtitle streams are subjected to the stream selection procedure without distinction between them in type. Therefore, they are treated as belonging to a same stream type called "PG_text subtitle stream".

The PG_text subtitle stream for 2D is played back in the "1 plane+offset" mode. Hereinafter, the 2D PG_text subtitle stream is referred to as a "1 plane+offset" PG_text subtitle stream.

Interactive Graphics (IG) Stream

The IG stream is a graphics stream which, having information for interactive operation, can display menus with the progress of playback of the video stream and display pop-up menus in accordance with user operations.

As is the case with the PG stream, the IG stream is classified into a 2D IG stream and a stereoscopic IG stream. The stereoscopic IG stream is classified into a left-view IG stream and a right-view IG stream. One of the left-view IG stream and the right-view IG stream that is specified by the base-view indicator becomes the base-view IG stream, and the other that is not specified by the base-view indicator becomes the dependent-view IG stream. It is possible to define up to 32 2D IG streams, up to 32 base-view IG streams, and up to 32 dependent-view IG streams. These IG streams are attached with different packet identifiers. Thus, it is possible to cause a desired IG stream among these IG streams to be subjected to the playback, by specifying a packet identifier of the one to be played back to the demultiplexing unit.

The IG stream control information (called "interactive control segment") includes information (user_interface_model) that defines the user interface model. The person in charge of authoring can specify either "always on" or "pop-up menu on" by setting the user interface model information, where with the "always on", menus are displayed with the progress of playback of the video stream, and with the "pop-up menu on", the pop-up menus are displayed in accordance with user operations.

The interactive operation information in the IG stream has the following meaning. When the Java virtual machine instructs the playback control engine, which is proactive in the playback control, to start playing back a playlist in accordance with a request from an application, the Java virtual machine, after instructing the playback control engine to start the playback, returns a response to the application to notify that the playback of the playlist has started. That is to say, while the playback of the playlist by the playback control engine continues, the Java virtual machine does not enter the state waiting for end of execution. This is because the Java virtual machine is what is called an "event-driven-type" performer, and can perform operation while the playback control engine is playing back the playlist.

On the other hand, when, in the HDMV mode, the command interpreter instructs the playback control engine to play back a playlist, it enters the wait state until the execution of playback of the playlist ends. Accordingly, the command execution unit cannot execute an interactive process while the playback of the playlist by the playback control engine continues. The graphics decoder performs an interactive operation in place of the command interpreter. Thus, to cause the graphics decoder to perform the interactive operation, the IG stream is embedded with control information defining interactive operations for which buttons are used.

Display Modes Allowed for Each Stream Type

Different 3D display modes are allowed for each stream type. In the primary video stream 3D display mode, two playback modes, namely the B-D presentation mode and the B-B presentation mode are allowed. The B-B presentation mode is allowed for the primary video stream only when the pop-up menu is on. The type of primary video stream when the playback is performed in the B-D presentation mode is called "stereoscopic B-D playback type". The type of primary video stream when the playback is performed in the B-B presentation mode is called "stereoscopic B-B playback type".

In the PG stream 3D display mode, three playback modes, namely the B-D presentation mode, "1 plane+offset" mode, and "1 plane+zero offset" mode are allowed. The "1 plane+zero offset" mode is allowed for the PG stream only when the pop-up menu is on. The type of PG stream when the playback is performed in the B-D presentation mode is called "stereoscopic playback type". The type of PG stream and PG_text subtitle stream when the playback is performed in the "1 plane+offset" mode is called "1 plane+offset type". The type of PG stream and PG_text subtitle stream when the playback is performed in the "1 plane+zero offset" mode is called "1 plane+zero offset type".

In the text subtitle stream 3D display mode, two playback modes, namely the "1 plane+offset" mode, and "1 plane+zero offset" mode are allowed. The "1 plane+zero offset" mode is allowed for the text subtitle stream only when the pop-up menu is on.

In the IG stream 3D display mode, three playback modes, namely the B-D presentation mode, "1 plane+offset" mode, and "1 plane+zero offset" mode are allowed. The "1 plane+zero offset" mode is allowed for the IG stream only when the pop-up menu is on. It is supposed in the following description, except where otherwise mentioned, that the picture-in-picture cannot be used during playback in the 3D playback mode. This is because each of the picture-in-picture and the 3D playback mode requires two video planes for storing non-compressed picture data. It is also supposed in the following description, except where otherwise mentioned, that the sound mixing cannot be used in the 3D playback mode.

Next, the internal structures of the main TS and sub-TS will be described. FIGS. 17A and 17B show the internal structures of the main TS and sub-TS.

FIG. 17A shows the internal structure of the main TS. The main TS is composed of the following source packets.

A source packet having packet ID "0x0100" constitutes a program_map table (PMT). A source packet having packet ID "0x0101" constitutes a PCR.

A source packet sequence having packet ID "0x1011" constitutes the primary video stream.

Source packet sequences having packet IDs "0x1200" through "0x121F" constitute 32 2D PG streams.

Source packet sequences having packet IDs "0x1400" through "0x141F" constitute 32 2D IG streams.

Source packet sequences having packet IDs "0x1100" through "0x111F" constitute primary audio streams.

By specifying a packet identifiers of one of these source packets to the demultiplexing unit, it is possible to cause a desired elementary stream among a plurality of elementary streams multiplexed in the main transport streams to be demultiplexed and subjected to the decoder.

FIG. 17B shows the internal structure of the sub-TS. The sub-TS is composed of the following source packets.

A source packet sequence having packet ID "0x1012" constitutes the dependent-view video stream.

Source packet sequences having packet IDs "0x1220" through "0x123F" constitute 32 base-view PG streams.

Source packet sequences having packet IDs "0x1240" through "0x125F" constitute 32 dependent-view PG streams.

Source packet sequences having packet IDs "0x1440" through "0x143F" constitute 32 base-view IG streams.

Source packet sequences having packet IDs "0x1220" through "0x145F" constitute 32 dependent-view IG streams.

This completes the description of the stream file. Next is a detailed explanation of the playlist information.

Figure 18A:
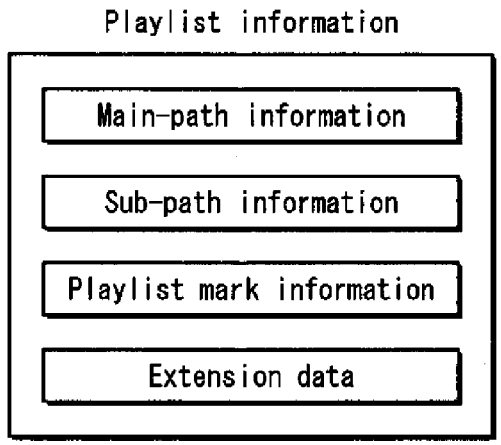

To define the above-described multi-path, the internal structures shown in FIGS. 18A through 18D are provided. FIG. 18A shows the internal structure of the playlist information. As shown in FIG. 18A, the playlist information includes main-path information, sub-path information, playlist mark information, and extension data. These constitutional elements will be described in the following.

Figure 18B:
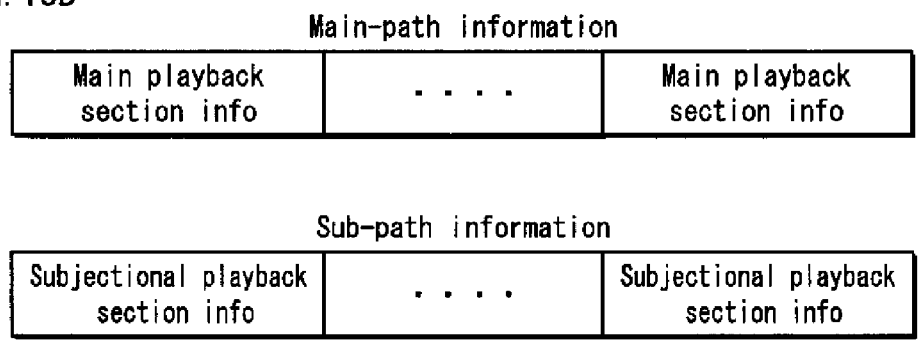

1) The main-path information is composed of one or more pieces of main playback section information. FIG. 18B shows the internal structures of the main-path information and the sub-path information. As shown in FIG. 18B, the main-path information is composed of one or more pieces of main playback section information, and the sub-path information is composed of one or more pieces of sub playback section information.

The main playback section information, called playitem information, is information that defines one or more logical playback sections by defining one or more pairs of an "in_time" time point and an "out_time" time point on the TS playback time axis. The playback device is provided with a playitem number register storing the playitem number of the current playitem. The playitem being played back currently is one of the plurality of playitems whose playitem number is currently stored in the playitem number register.

Figure 18C:
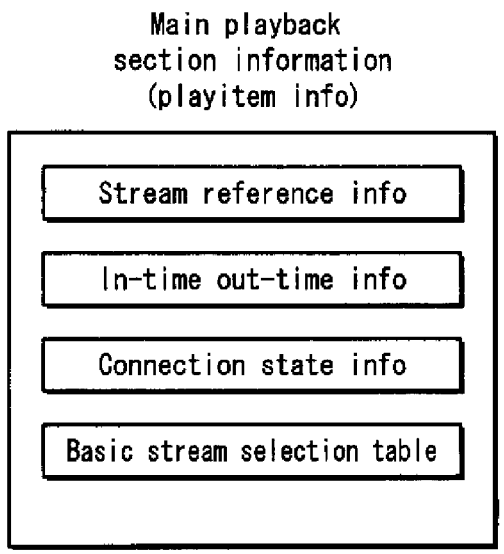

FIG. 18C shows the internal structure of the playitem information. As shown in FIG. 18C, the playitem information includes stream reference information, in-time out-time information, connection state information, and a basic stream selection table.

The stream reference information includes: "clip Information file name information (clip_Information_file_name)" that indicates the file name of the clip information file that manages, as "AV clips", the transport streams constituting the playitem; "clip encoding method identifier (clip_codec_identifier)" that indicates the encoding method of the transport stream; and "STC identifier reference (STC_ID_reference)" that indicates STC sequences in which in-time and out-time are set, among the STC sequences of the transport stream.

The playitem as a playback section has a hierarchical structure composed of playitem information, clip information, and AV clip. It is possible to set a one-to-many relationship between (i) a pair of AV clip and clip information and (ii) playitem information so that one AV clip can be referenced by a plurality of pieces of playitem information. This makes it possible to adopt, as a bank film, an AV clip created for a title so that the bank film can be referenced by a plurality of pieces of playitem information, making it possible to create a plurality of variations of a movie effectively. Note that the "bank film" is a term used in the movie industry and means an image that is used in a plurality of scenes.

When an AV clip as a bank film can be referenced by a plurality of pieces of playitem information, it may be requested to realize that a different section of the bank film can be played back depending on the piece of playitem information referencing the bank film. To satisfy the request, namely to enable a different section of the bank film to be played back depending on the piece of playitem information referencing the bank film, the playitem information is provided with "In_Time" and "Out_Time" as described above so that arbitrary time points on the stream playback time axis can be used as a start point and an end point of the playback section.

Also, when an AV clip as a bank film can be referenced by a plurality of pieces of playitem information, it may be requested to realize that a different audio, subtitle, or menu can be used depending on the piece of playitem information referencing the bank film. To satisfy the request, namely to enable a different audio, subtitle, or menu to be used depending on the piece of playitem information referencing the bank film, the playitem information is provided with the stream selection table as described above. With use of the stream selection table, it is possible to permit a playback of an elementary stream that is most suitable for the user of the bank film, among the elementary streams multiplexed in the AV clip referenced by the playitem information being the main path and among the elementary streams multiplexed in the AV clip referenced by the sub-playitem information being the sub-main path.

This completes the playitem information.

Figure 18D:
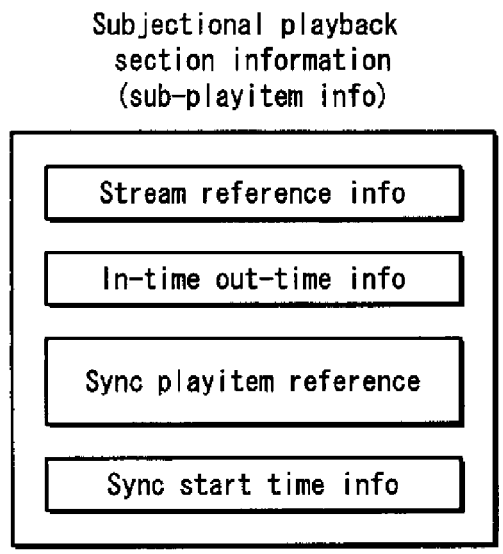

2) The sub playback section information, called sub-path information, is composed of a plurality of pieces of sub-playitem information. FIG. 18D shows the internal structure of the sub-playitem information. As shown in FIG. 12D, the sub-playitem information is information that defines playback sections by defining pairs of an "in_time" and an "out_time" on the STC sequence time axis, and includes stream reference information, in-time out-time information, sync playitem reference, and sync start time information.

The stream reference information, as in the playitem information, includes: "clip Information file name information", "clip encoding method identifier", and "STC identifier reference".

The "in-time out-time information (SubPlayItem_In_Time, SubPlayItem_Out_Time)" indicates the start point and end point of the sub-playitem on the STC sequence time axis.

The "sync playitem reference (Sync_Playitem_Id)" is information that uniquely indicates a playitem with which the sub-playitem is to be synchronized. The sub-playitem In_Time exists on playback time axis of the playitem specified by this sync playitem identifier.

The "sync start time information (Sync_Start_PTS_of_Playitem)" indicates a time point on the STC sequence time axis of the playitem specified by the sync playitem identifier, that corresponds to the start point of the sub-playitem specified by the sub-playitem In_Time.

3) The playlist mark information is information that defines the mark point unique to the playback section. The playlist mark information includes an indicator indicating a playback section, a time stamp indicating the position of a mark point on the time axis of the digital stream, and attribute information indicating the attribute of the mark point.

The attribute information indicates whether the mark point defined by the playlist mark information is a link point or an entry mark.

The link point is a mark point that can be linked by the link command, but cannot be selected when the chapter skip operation is instructed by the user.

The entry mark is a mark point that can be linked by the link command, and can be selected even if the chapter skip operation is instructed by the user.

The link command embedded in the button information of the IG stream specifies a position for a random-access playback, in the form of an indirect reference via the playlist mark information.

<Basic Stream Selection Table (StreamNumber_table)>

The basic stream selection table shows a list of elementary streams that are to be played back in a monoscopic playback mode, and the table, when a playitem containing the basic stream selection table itself becomes the current playitem among a plurality of playitems constituting the playlist, specifies, for each of the plurality of stream types, an ES which is permitted to be played back, among ESs multiplexed in AV clips referenced by the main path and the sub-path of the multi-path. Here, the stream types include: the primary video stream in the picture-in-picture; the secondary video stream in the picture-in-picture; the primary audio stream in the sound mixing; the secondary audio stream in the sound mixing; the PG_text subtitle stream; and the interactive graphics stream. It is possible to register an ES which is permitted to be played back, for each of these stream types. More specifically, the basic stream selection table is composed of sequences of stream registrations. Here, the stream registration is information that, when a playitem containing the basic stream selection table itself becomes the current playitem, indicates what kind of stream is the ES permitted to be played back. Each stream registration is associated with the stream number of the stream. Each stream registration has a data structure in which a pair of a stream entry and a stream attribute is associated with a logical stream number.

The stream number in the stream registration is represented by an integer such as "1", "2", or "3". The largest stream number for a stream type is identical with the number of streams for the stream type.

The playback device is provided with a stream number register for each stream type, and the current stream, namely the ES being played back currently is indicated by the stream number stored in the stream number register.

A packet identifier of the ES to be played back is written in the stream entry. By making use of this structure in which a packet identifier of the ES to be played back can be written in the stream entry, the stream numbers included in the stream registrations are stored in the stream number registers of the playback device, and the playback device causes the PID filter thereof to perform a packet filtering based on the packet identifiers stored in the stream entries of the stream registrations. With this structure, TS packets of the ESs that are permitted to be played back according to the basic stream selection table are output to the decoder, so that the ESs are played back.

In the basic stream selection table, the stream registrations are arranged in an order of stream numbers. When there are a plurality of streams that satisfy the conditions: "playable by playback device"; and "the language attribute of the stream matches the language setting in the device", a stream corresponding to the highest stream number in the stream registration sequences is selected.

With this structure, when there is found a stream that cannot be played back by the playback device, among the stream registrations in the basic stream selection table, the stream is excluded from the playback. Also, when there are a plurality of streams that satisfy the conditions: "playable by playback device"; and "the language attribute of the stream matches the language setting in the device", the person in charge of authoring can convey the playback device how to select one with priority from among the plurality of streams.

It is judged whether there is a stream that satisfies the conditions: "playable by playback device"; and "the language attribute of the stream matches the language setting in the device". Also, a stream is selected from among a plurality of streams that satisfy the conditions. The procedure for the judgment and selection is called a "stream selection procedure". The stream selection procedure is executed when the current playitem is switched, or when a request to switch the stream is input by the user.

A sequential procedure for performing the above-described judgment and selection and setting a stream number in the stream number register of the playback device when a state change occurs in the playback device, such as when the current playitem is switched, is called "procedure to be executed at state change". Since the stream number registers are provided respectively in correspondence with the stream types, the above-described procedure is executed for each stream type.

A sequential procedure for performing the above-described judgment and selection and setting a stream number in the stream number register of the playback device when a request to switch the stream is input by the user is called "procedure at state change request".

A procedure for setting the stream number registers to the initial values of the stream registration sequences when a BD-ROM is loaded, is called "initialization".

Priorities are assigned evenly to the streams specified in the sub-playitem information and the streams specified in the playitem information, as indicated by the stream registration sequences in the basic stream selection table. As a result, even a stream not multiplexed with a video stream is targeted for selection as a stream to be played back in sync with the video stream, if the stream is specified by the sub-playitem information.

Furthermore, when playback device can play back a stream specified by the sub-playitem information, and when the priority of the stream specified by the sub-playitem information is higher than the priority of the graphics stream multiplexed with the video stream, the stream specified by the sub-playitem information is played back in place of the stream multiplexed with the video stream.

FIGS. 19A and 19B show one example of the basic stream selection table. FIG. 19A shows a plurality of stream registration sequences that are provided in the basic stream selection table when there are following stream types: primary video stream; primary audio stream; PG stream; IG stream; secondary video stream; and secondary audio stream. FIG. 19B shows the elementary streams that are demultiplexed from the main TS and the sub-TSs with use of the basic stream selection table. The left-hand side of FIG. 19B shows the main TS and the sub-TSs, the middle part of FIG. 19B shows the basic stream selection table and the demultiplexing unit, and the right-hand side of FIG. 19B shows the primary video stream, primary audio stream, PG stream, IG stream, secondary video stream, and secondary audio stream that are demultiplexed based on the basic stream selection table.

Next, the extension data will be described in detail.

When the playlist constitutes a picture-in-picture application, picture-in-picture metadata needs to be stored in a data block of extension data in the playlist file. When the playlist information refers to the MVC video stream, an extended stream selection table needs to be stored in a data block of extension data in the playlist information file.

When the playlist information refers to the MVC video stream on the disc, or the MVC video stream in the stereoscopic IG stream playback menu, extension information of the sub-path information (sub-path block extension) needs to be stored in a data block of extension data in the playlist information file.

Other aims of the extension data in the playlist information are suspended.

When a 2D playback device finds unknown extension data in the playlist file, the 2D playback device should disregard the extension data.

<Extension Stream Selection Table (StreamNumber_table_StereoScopic(SS))>

The extension stream selection table shows a list of elementary streams that are to be played back in a stereoscopic playback mode, and is used together with the basic stream selection table only in the stereoscopic playback mode. The extension stream selection table defines the elementary streams that can be selected when a playitem is played back or when a sub-path related to the playitem is played back.

The extension stream selection table indicates the elementary streams that are permitted to be played back only in the stereoscopic playback mode, and includes stream registration sequences. Each piece of stream registration information in the stream registration sequences includes a stream number, and a stream entry and a stream attribute corresponding to the stream number. The extension stream selection table means an extension that is unique to the stereoscopic playback mode. Therefore, a playlist for which each piece of playitem information is associated with the extension stream selection table (STN_table_SS) is called "3D playlist".

Each stream entry in the extension stream selection table indicates a packet identifier that is to be used in the demultiplexing by the playback device, when the playback device is in the stereoscopic playback mode, and the corresponding stream number is set in the stream number register of the playback device. A difference from the basic stream selection table is that the stream registration sequences in the extension stream selection table are not targeted by the stream selection procedure. That is to say, the stream registration information in the stream registration sequences of the basic stream selection table is interpreted as the priorities of the elementary streams, and a stream number in any piece of stream registration information is written into the stream number register. In contrast, the stream registration sequences of the extension stream selection table are not targeted by the stream selection procedure, and the stream registration information of the extension stream selection table is used only for the purpose of extracting a stream entry and a stream attribute that correspond to a certain stream number when the certain stream number is stored in the stream number register.

Suppose that, when the playback mode switches from the 2D playback mode to the 3D playback mode, the target stream selection table also switches from the basic stream selection table to the extension stream selection table. Then, the identity of the stream numbers may not be maintained, and the identity of the language attribute may be lost, as well.

Accordingly, the use of the extension stream selection table is restricted to above-described one to maintain the identity of the stream attribute such as the language attribute.

The extension stream selection table is composed of stream registration sequences of the dependent-view streams, stream registration sequences of the PG streams, and stream registration sequences of the IG streams.

The stream registration sequences in the extension stream selection table are combined with the stream registration sequences of the same stream types in the basic stream selection table. More specifically, the dependent-view video stream registration sequences in the extension stream selection table are combined with the primary video stream registration sequences in the basic stream selection table; the PG stream registration sequences in the extension stream selection table are combined with the PG stream registration sequences in the basic stream selection table; and the IG stream registration sequences in the extension stream selection table are combined with the IG stream registration sequences in the basic stream selection table.

After this combination, the above-described procedure is executed onto the stream registration sequences in the basic stream selection table among the two tables after the combination.

FIG. 20 shows the internal structure of the extension stream selection table.

The extension stream selection table is composed of: "length" which indicates the entire length of the extension stream selection table; "fixed offset during pop-up (Fixed_offset_during_Popup)"; and the stream registration sequences of each stream type corresponding to each playitem.

When there are N pieces of playitems identified as playitems #1-#N, stream registration sequences respectively corresponding to the playitems #1-#N are provided in the extension stream selection table. The stream registration sequences corresponding to each playitem are dependent-view stream registration sequence, PG stream registration sequence, and IG stream registration sequence.

The "Fixed_offset_during_Popup" is a fixed offset during pop-up, and controls the playback type of the video or PG_text subtitle stream when the pop-up menu is set to "on" in the IG stream. The "Fixed_offset_during_Popup" field is set to "on" when the "user_interface_model" field in the IG stream is on, namely, when the user interface of the pop-up menu is set to "on". Also, the "Fixed_offset_during_Popup" field is set to "off" when the "user_interface_model" field in the IG stream is off, namely, when the "AlwaysON" user interface is set.

When the fixed offset during pop-up is set to "0", namely, when the pop-up menu is set to "off" in the user interface of the IG stream, the video stream is in the B-D presentation mode, the stereoscopic PG stream becomes the stereoscopic playback type, and during playback in the "1 plane+offset" mode, the PG_text subtitle stream is in the "1 plane+offset" mode.

When the fixed offset during pop-up is set to "1", namely, when the pop-up menu is set to "on" in the IG stream, the video stream is in the B-B presentation mode, the stereoscopic PG stream is in the "1 plane+offset" mode, and the PG stream for "1 plane+offset" is played back as the "1 plane+zero offset" playback type.

In the "1 plane+offset" mode, the PG_text subtitle stream becomes "1 plane+zero offset".

The "offset sequence number information" ("number_of_offset_sequence" in the drawing) indicates the number of offset sequences in the dependent-view stream.

The value of the "offset sequence number information in the extension stream selection table is identical with the number of offset sequences that is included in the dependent-view stream.

FIGS. 21A through 21C shows the stream registration sequences in the extension stream selection table.

FIG. 21A shows the internal structure of the dependent-view video stream registration sequence. The dependent-view video stream registration sequence is composed of v(x) pieces of SS_dependent_view_blocks. Here, "v(x)" represents the number of primary video streams that are permitted to be played back in the basic stream selection table of the playitem information #x. The lead lines in the drawing indicates the close-up of the internal structure of the dependent-view video stream registration sequence. As indicated by the lead lines, the "SS_dependent_view_block" is composed of the stream number, stream entry, stream attribute, and "number_of_offset_sequence".

The stream entry includes: a sub-path identifier reference (ref_to_Subpath_id) specifying a sub-path to which the playback path of the dependent-view video stream belongs; a stream file reference (ref_to_subClip_entry_id) specifying a stream file in which the dependent-view video stream is stored; and a packet identifier (ref_to_stream_PID_subclip) of the dependent-view video stream in this stream file.

The "stream attribute" includes the language attribute of the dependent-view video stream.

The "number_of_offset_sequence" indicates the number of offsets provided in the dependent-view video stream.

The dependent-view video stream registration sequences shown in FIG. 21A indicate that a plurality of pieces of stream registration information are provided in correspondence with a plurality of dependent-view video streams. However, FIG. 21A merely illustrates the data structure thereof. In the actuality, since there is only one base-view video stream normally, the number of pieces of stream registration information for the dependent-view video stream is one.

FIG. 21B shows the internal structure of the PG stream registration sequence. The PG stream registration sequence is composed of P(x) pieces of stream registration information. Here, "P(x)" represents the number of PG streams that are permitted to be played back in the basic stream selection table of the playitem information #x.

The lead lines in the drawing indicates the close-up of the common internal structure of the PG stream registration sequences.

The "PGtextST_offset_sequence_id_ref" is PG_text subtitle stream offset sequence reference information, and indicates an offset sequence with respect to the PG_text subtitle stream in the "1 plane+offset" mode.

The offset metadata is supplied by the access unit of the dependent-view video stream. The playback device should apply the offset, which is supplied by this field, to the presentation graphics (PG) plane of the "1 plane+offset" mode type.

When the field is an undefined value (FF), the playback device does not apply this offset to the PG stream plane memory.

The "is_SS_PG" is a stereoscopic presentation graphics presence/absence flag that indicates the validity and presence of the stream entry of the base-view IG and the stream entry and stream attribute of the dependent-view IG in the PG stream. When the structure is absent in the stereoscopic PG stream, this field should be set to "0"; and when the structure is present in the stereoscopic PG stream, this field should be set to "1".

The "stream_entry_for_base_view" includes: a sub-path identifier reference (ref_to_Subpath_id) specifying a sub-path to which the playback path of the base-view PG stream belongs; a stream file reference (ref_to_subClip_entry_id) specifying a stream file in which the base-view PG stream is stored; and a packet identifier (ref_to_stream_PID_subclip) of the base-view PG stream in this stream file.

The "stream_entry_for_dependent_view" includes: a sub-path identifier reference (ref_to_Subpath_id) specifying a sub-path to which the playback path of the dependent-view PG stream belongs; a stream file reference (ref_to_subClip_entry_id) specifying a stream file in which the dependent-view PG stream is stored; and a packet identifier (ref_to_stream_PID_subclip) of the dependent-view PG stream in this stream file. When the stream file referenced by the "stream_entry_for_dependent_view" in the stream registration information in the extension stream selection table is different from the stream file referenced by the stream entry in the basic stream selection table, a stream file storing the dependent-view PG stream needs to be read.

The "stream_attribute" includes language attributes of the base-view PG stream and the dependent-view PG stream.

The "SS_PG_textST_offset_sequence_id_ref" is reference information for referencing an offset sequence for the PG_text subtitle stream, and indicates the offset sequence for the PG_text subtitle stream. The playback device should apply the offset, which is supplied by this field, to the PG plane.

When the field is an undefined value (FF), the playback device does not apply this offset to the PG stream plane memory.

FIG. 21C shows the internal structure of the IG stream registration sequence. The IG stream registration sequence is composed of I(x) pieces of stream registration information. Here, "I(x)" represents the number of IG streams that are permitted to be played back in the basic stream selection table of the playitem information #x. The lead lines in the drawing indicates the close-up of the common internal structure of the IG stream registration sequences.

The "IG_offset_sequence_id_ref" is an interactive graphics offset sequence reference, and is a reference to the sequence ID of the IG stream in the "1 plane+offset" mode. This value indicates an offset sequence ID defined for the offset sequence. As described above, the offset metadata is supplied by the dependent-view video stream. The playback device should apply the offset, which is supplied by this field, to the IG stream of the "1 plane+offset" mode type.

When the field is an undefined value (FF), the playback device does not apply this offset to the interactive graphics (IG) stream plane.

The "IG_Plane_offset_direction_during_BB_video" is the user interface of the pop-up menu in the B-B presentation mode, and indicates the offset direction in the IG plane in the "1 plane+offset" mode while the IG stream is played back.

When this field is set to "0", it is the front setting. That is to say, the plane memory exists between the television and the viewer, and the plane is shifted rightward during the left-view period, and the plane is shifted leftward during the right-view period.

When this field is set to "1", it is the behind setting. That is to say, the plane memory exists behind the television or the screen, and the left plane is shifted rightward, and the right plane is shifted leftward.

The "IG_Plane_offset_value_during_BB_video" indicates, in units of pixels, the offset value of the IG plane in the "1 plane+offset" mode while the IG stream is played back by the user interface of the pop-up menu in the B-B presentation mode.

The "is_SS_PG" is a stereoscopic interactive graphics presence/absence flag that indicates the validity and presence of the stream entry of the base-view IG and the stream entry and stream attribute of the dependent-view IG in the IG stream. When the data structure of the stereoscopic IG stream is absent, this field should be set to "0"; and when the IG stream that is permitted to be played back is a stereoscopic IG stream, this field should be set to "1".

The "stream_entry_for_base_view" includes: a sub-path identifier reference (ref_to_Subpath_id) specifying a sub-path to which the playback path of the base-view IG stream belongs; a stream file reference (ref_to_subClip_entry_id) specifying a stream file in which the base-view IG stream is stored; and a packet identifier (ref_to_stream_PID_subclip) of the base-view IG stream in this stream file.

The "stream_entry_for_dependent_view" includes: a sub-path identifier reference (ref_to_Subpath_id) specifying a sub-path to which the playback path of the dependent-view IG stream belongs; a stream file reference (ref_to_subClip_entry_id) specifying a stream file in which the dependent-view IG stream is stored; and a packet identifier (ref_to_stream_PID_subclip) of the dependent-view IG stream in this stream file. When the stream file referenced by the "stream_entry_for_dependent_view" in the stream registration information in the extension stream selection table is different from the stream file referenced by the stream entry in the basic stream selection table, a stream file storing the dependent-view IG stream needs to be read.

The "stream_attribute" includes language attributes of the base-view IG stream and the dependent-view IG stream.

The "SS_IG_offset_sequence_id_ref" is a reference to the offset sequence ID for the stereoscopic-type IG stream, and indicates the offset sequence for the offset metadata of the dependent-view video stream. The playback device should apply the offset, which is supplied by this field, to the stereoscopic-type IG plane.

When the field is an undefined value (FF), the playback device does not apply this offset to the IG plane.

The PG_text subtitle stream offset sequence reference information and the IG stream offset sequence reference information are written in the stream registration information in correspondence with stream numbers. Therefore, when the stream selection procedure is executed due to a change of the device state or occurrence of a request for stream change and a stream number corresponding to the language setting on the device side is set in the stream number register, an offset sequence indicated by a reference corresponding to the new stream number is supplied from the video decoder to the shift unit. With this structure, an optimum offset sequence corresponding to the language setting in the playback device is supplied to the shift unit, thus it is possible to set the depth of the graphics in "1 plane+offset" mode to an optimum value corresponding to the language setting in the playback device.

The following describes restrictions for the extension stream selection table.

The stream entry in the stereoscopic dependent-view block should not change in the playlist.

When the type of the stream entry in the stereoscopic dependent-view block is the ES type (stream type=2) that is used by the sub-path, the sub-path ID reference and the sub-clip entry ID reference (ref_to_subclip_entry_id) do not change in the playlist.

Only two types of elementary streams are permitted to be the types of the stream entry, stream entry for the base view, and stream entry for the dependent view. The two types are: ES (stream type=1) in the AV clip used by the playitem; and ES (stream type=2) in the AV clip used by the sub-path.

In the stereoscopic dependent-view block, the stream encoding method in the stream attribute is set to "0x20".

FIG. 22 shows what elementary streams are demultiplexed from the main TS and the sub-TSs with use of the basic stream selection table and the extension stream selection table.

The middle part of FIG. 22 shows the demultiplexing unit. The upper part of FIG. 22 shows the combination of the basic stream selection table and the extension stream selection table. The left-hand side of FIG. 22 shows the main TS and the sub-TSs, and the right-hand side of FIG. 22 shows the demultiplexed base-view video stream, dependent-view video stream, base-view PG stream, dependent-view PG stream, base-view IG stream, dependent-view IG stream, and primary audio stream.

FIG. 23 shows how the stream registration sequences provided in the basic stream selection table and the extension stream selection table are referenced, when the demultiplexing shown in FIG. 22 is performed. The middle part of FIG. 17 shows the basic stream selection table and the extension stream selection table.

The portion next to the left-hand side of the basic stream selection table shows the stream number registers storing stream numbers of the current streams in the playback device. The portion next to the right-hand side of the basic stream selection table shows the language settings in the playback device. The portion under the basic stream selection table shows the demultiplexing unit. The arrow h1 schematically indicates that the language setting for the PG stream matches the language attribute in the stream registration information #X of the PG stream in the basic stream selection table. The arrow h2 schematically indicates setting of the stream number "X" into the stream number register of the PG stream.

The arrow h3 schematically indicates that the language setting for the IG stream matches the language attribute in the stream registration information #Y of the IG stream in the basic stream selection table. The arrow h4 schematically indicates setting of the stream number "Y" into the stream number register of the IG stream.

The setting of the stream number shown in FIG. 23 symbolically indicates that the PG streams and IG streams to be subjected to the demultiplexing are determined depending on the results of the stream selection procedure performed onto the basic stream selection table.

The arrow PD1 schematically indicates an output of the packet identifier written in the stream entry in the "SS_dependent_view_block" in the extension stream selection table. This output enables the demultiplexing unit to perform the demultiplexing, and the dependent-view stream is output.

The arrow PD2 schematically indicates an output of the packet identifier corresponding to the stream number "X", among the stream entries of the stream registration information of the PG stream in the in the extension stream selection table. The arrow X1 indicates that the output of the packet identifier indicated by the arrow PD1 is linked with the setting of the current stream number X into the stream number register.

The arrow PD3 schematically indicates an output of the packet identifier corresponding to the stream number "Y", among the stream entries of the stream registration information of the IG stream in the in the extension stream selection table. The arrow Y1 indicates that the output of the packet identifier indicated by the arrow PD3 is linked with the setting of the current stream number Y into the stream number register.

It should be noted here that "being linked" in the above description means that the output of the packet identifier written in the extension stream selection table is linked with the fact that the stream number X or Y, among the stream numbers written in the stream registration sequences of the PG or IG stream in the basic stream selection table, is set in the stream number register as the PG or IG stream number of the current stream.

This output enables the demultiplexing unit to perform the demultiplexing, and the PG or IG stream is output.

FIG. 24 shows the assigning of the stream numbers that change depending on the mode.

The vertical column on the left-hand side of FIG. 24 shows the stream numbers: video stream #1, audio stream #1, audio stream #2, PG stream #1, PG stream #2, IG stream #1, and IG stream #2.

The element streams arranged on the left-hand side of FIG. 24, enclosed by a dotted line, are element streams that are targeted for demultiplexing only in the 2D playback mode.

The element streams arranged on the right-hand side of FIG. 24, enclosed by a dotted line, are element streams that are targeted for demultiplexing only in the 3D playback mode.

The element streams enclosed by the combined dotted lines of the left-hand side and the right-hand side are element streams that are targeted for demultiplexing in both the 2D and the 3D playback modes.

In FIG. 24, the video stream #1 is enclosed by the combined dotted lines of the left-hand side and the right-hand side. This indicates that the video stream #1 is targeted for demultiplexing in both the 2D and the 3D playback modes. It should be noted here that the left-view video stream thereof for the 3D mode is also used as the 2D video stream, and the right-view video stream is played back only in the 3D mode, which is suggested by the fact that it is enclosed by only the dotted line on the right-hand side of FIG. 24.

The audio streams #1 and #2 are both enclosed by the combined dotted lines of the left-hand side and the right-hand side. This indicates that the audio streams #1 and #2 are targeted for the playback in both the 2D and the 3D playback modes.

With regard to the PG streams #1 and #2, the 2D PG stream is enclosed only by the dotted line of the left-hand side, and the base-view PG stream and the dependent-view PG stream are enclosed only by the dotted line of the right-hand side. This indicates that the 2D PG stream is targeted for the playback only in the 2D playback mode, and the base-view PG stream and the dependent-view PG stream are targeted for the playback only in the 3D playback mode. This also applies to the IG streams.

As understood from the above description, regarding the stream type "video stream", the dependent-view video stream is added as a target of playback in the 3D playback mode.

It is also understood that, as the mode changes from the 2D playback mode to the 3D playback mode, the playback target changes from the 2D PG stream to the base-view PG stream and the dependent-view PG stream.

The extension stream selection table can be created by writing a description in an object-oriented compiler language as shown in FIG. 25, and subjecting the description to the compiler. FIG. 25 shows a syntax for writing the extension stream selection table in an object-oriented compiler language.

The "for" statement whose control variable is "PlayItem_id" forms a loop in which description of the dependent-view stream registration sequence, the PG_text subtitle stream registration sequence, and the IG stream registration sequence is repeated as many times as the number of playitems.

The "for" statement whose control variable is "primary_video_stream_id" defines the dependent-view stream registration sequence, and the dependent-view stream registration sequence is defined by writing "SS_dependent_view_block" that is composed of "stream_entry" "stream_attribute", and "number_of_offset_sequence", as many times as the number indicated by "Number_of_primary_video_stream_entries".

The "for" statement whose control variable is "PG_textST_stream_id" defines the PG_text subtitle stream registration sequence, and forms a loop in which description of "PG_text_offset_sequence_id_ref" and "is_SS_PG" is repeated as many times as the number indicated by "number_of_PG_textST_stream_number_entries". The "if" statement, included in this loop, whose control variable is "is_SS_PG" defines "stream_entry_for_base_biew( )", "stream_entry_for_dependent_view( )", and "stream_attribute( )" when the "is_SS_PG" is "1b". With this "if" statement, the "stream_entry_for_base_biew( )", "stream_entry_for_dependent_view( )", and "stream_attribute( )" are added to the stream registration sequences only when the "is_SS_PG" is "1b". The "stream_entry_for_base_biew( )", "stream_entry_for_dependent_view( )", and "stream_attribute( )" are not added to the stream registration sequences when the "is_SS_PG" is "0b".

The "for" statement whose control variable is "IG_stream_id" defines the IG stream registration sequence, and forms a loop in which description of "IG_offset_sequence_id_ref", "IG_plane_offset_direction_during_BB_video", "IG_plane_offset_value_during_BB_video", and "is_SS_IG" is repeated as many times as the number indicated by "number_of_IG_stream_entries". The "if" statement, included in this loop, whose control variable is "is_SS_IG" defines "stream_entry_for_base_biew( )", "stream_entry_for_dependent_view( )", and "stream_attribute( )" when the "is_S-S_IG" is "1b". With this "if" statement, the "stream_entry_for_base_biew( )", "stream_entry_for_dependent_view( )", and "stream_attribute( )" are added to the stream registration sequences only when the "is_SS_IG" is "1b". The "stream_entry_for_base_biew( )", "stream_entry_for_dependent_view( )", and "stream_attribute( )" are not added to the stream registration sequences when the "is_SS_IG" is "0b".

This completes the description of the recording medium. In the following, the playback device will be described in detail.

FIG. 26 shows the internal structure of the playback device. As shown in FIG. 26, the playback device includes a reading unit 201, a memory 202, a player number register 203, a decoder 204, a demultiplexing unit 205, a plane memory set 206, a shift unit 207, a layer overlay unit 208, a transmission/reception unit 209, a playback control unit 210, an output mode register 211, and a configuration memory 212. The internal structure of FIG. 26 is composed of the minimum structural elements that are required to realize the playback device provided with a problem solving means. A more detailed internal structure will be described in a later embodiment.

The reading unit 201 reads out, from the recording medium, the index table, program file of the operation mode object, playlist information file, stream information file, and stream file.

The memory 202 stores a combined stream registration sequence that is obtained by combining the basic stream selection table and the extension stream selection table.

The player number register 203 includes a video stream number register for storing the stream number of the video stream, a PG stream number register for storing the stream number of the PG stream, an IG stream number register for storing the stream number of the IG stream, and an audio stream number register for storing the stream number of the audio stream.

The decoder 204 for each stream type is composed of a video decoder, a PG decoder, and IG decoder, and an audio decoder.

The demultiplexing unit 205 is provided with a PID filter for performing the packet filtering, and demultiplexes, among the TS packets in a plurality of source packets read from the recording medium, a TS packet that is identified by the packet identifier recited in the combined stream registration sequence.

The plane memory set 206 is composed of a plurality of plane memories.

These plane memories constitute a layer model, and the data stored in each plane memory is supplied for overlaying of the layers.

The shift unit 207 shifts the pixel coordinates.

The layer overlay unit 208 overlays the layers in the plurality of plane memories.

The transmission/reception unit 209 transits to a data transfer phase via a mutual authentication phase and a negotiation phase, when playback device is connected with another device in the home theater system via an interface. The transmission/reception unit 209 performs data transfer in the transfer phase.

In the negotiation phase, the capabilities of the partner device (including the decode capability, playback capability, and display frequency) are grasped, and the capabilities are set in the player setting register, so that the transfer method for the succeeding data transfers is determined. After the mutual authentication phase and the negotiation phase, one line of the pixel data in the non-compression/plaintext format in the picture data after the layer overlaying is transferred to the display device at a high transfer rate in accordance with the horizontal sync period of the display device. On the other hand, in the horizontal and vertical blanking intervals, audio data in the non-compression/plaintext format is transferred to other devices (including an amplifier and a speaker as well as the display device) connected with the playback device. With this structure, the devices such as the display device, amplifier and speaker can receive the picture data and audio data both in the non-compression/plaintext format, and a reproduced output is achieved. Further, when the partner device has the decode capability, a pass-through transfer of the video and audio streams is possible. In the pass-through transfer, it is possible to transfer the video stream and audio stream in the compressed/encrypted format, as they are.

The playback control unit 210 controls the reading unit 201 to read the index table, operation mode object, playlist information, clip information, and stream file from the recording medium, and performs a playback control based on the playlist information and clip information read from the recording medium. In reading the stream file, a random access can be performed to read a source packet corresponding to an arbitrary time point in a time axis, from the stream file.

The output mode register 211 stores a playback mode.

The configuration memory 212 is a nonvolatile memory storing the mode capabilities of the plane memories, and the current mode. The contents to be stored in the configuration memory 212 are set by the producer of the playback device. The mode capability indicates whether or not each of a plurality of plane memories, such as the video plane, PG plane, and IG plane, can perform a corresponding playback mode as described above. Whether a plane memory can perform a playback mode is determined based on the stream type corresponding to the plane memory and based on whether or not the hardware structure for performing the playback mode is provided in the playback device.

The current mode indicates what among the plurality of playback modes the plurality of plane memories are set to, respectively.

This completes the explanation of the playback device. Next, the demultiplexing process performed by the playback device of the present embodiment will be described in detail.

FIGS. 27A and 27B show what packet identifiers are output to the demultiplexing unit by the combined stream registration sequence.

FIG. 27A shows the combined stream registration sequence used in the operation as an example. The combined stream registration sequence is composed of three pieces of stream registration information provided in the basic stream selection table and three pieces of stream registration information provided in the extension stream selection table. The three pieces of stream registration information provided in the basic stream selection table have stream numbers "1", "2", and "3", respectively, and the stream attributes in the three pieces of stream registration information have "English", "Japanese", and "Chinese" as the language attributes, respectively.

The three pieces of stream registration information provided in the extension stream selection table have stream numbers "1", "2", and "3", respectively, and the stream attributes in the three pieces of stream registration information have "English", "Japanese", and "Chinese" as the language attributes, respectively. The stream registration information provided in the basic stream selection table differs in the packet identifier stored in the stream entry, from the stream registration information provided in the extension stream selection table. Also, the stream registration information provided in the extension stream selection table contains (i) a packet identifier for a base-view PG stream for the B-D presentation mode, and (ii) a packet identifier for a dependent-view PG stream.

FIG. 27B shows the setting of a stream number and the outputting of a packet identifier when such a combined stream registration sequence is supplied to playback device in which the language has been set to "Chinese" and the output mode has been set to the 2D playback mode.

The arrows identified by "a1", "a2", and "a3" schematically indicate (i) the judgment on whether language settings match each other, (ii) the setting of a stream number in the stream number register, and (iii) the output of a packet identifier to the demultiplexing unit, respectively.

In the operation procedure of this example, it is judged whether the language setting of the playback device matches the stream attribute contained in the stream registration information whose stream number is "3", and it is judged that they match. As a result of this, the stream number "3" of this stream registration information is written into the stream number register. Also, the packet identifier written in the stream entry of the basic stream selection table is output to the demultiplexing unit. Following this, a TS packet identified by the packet identifier written in the stream entry of the stream registration information whose stream number is "3" in the basic stream selection table is output to the decoder.

FIG. 27C shows the setting of a stream number and the outputting of a packet identifier when such a combined stream registration sequence is supplied to playback device in which the language has been set to "Chinese" and the output mode has been set to the B-D presentation mode.

The arrows identified by "a4", "a5", and "a6" schematically indicate (i) the judgment on whether language settings match each other, (ii) the setting of a stream number in the stream number register, and (iii) the output of a packet identifier to the demultiplexing unit, respectively.

In the operation procedure of this example, it is judged whether the language setting of the playback device matches the stream attribute contained in the stream registration information whose stream number is "3", and it is judged that they match. As a result of this, the stream number "3" of this stream registration information is written into the stream number register. Also, the packet identifier written in the stream entry of the basic stream selection table is output to the demultiplexing unit. Following this, a pair of TS packets identified by a pair of packet identifiers written in the stream entry of the stream registration information whose stream number is "3" in the extension stream selection table are output to the decoder.

FIGS. 28A through 28C show what packet identifiers are output to the demultiplexing unit by the combined stream registration sequence.

FIG. 28A shows the combined stream registration sequence used in the operation as an example. The combined stream registration sequence is composed of three pieces of stream registration information provided in the basic stream selection table and three pieces of stream registration information provided in the extension stream selection table. The three pieces of stream registration information provided in the basic stream selection table have stream numbers "1", "2", and "3", respectively, and all of the stream attributes in the three pieces of stream registration information have "Chinese" as the language attributes.

The three pieces of stream registration information provided in the extension stream selection table have stream numbers "1", "2", and "3", respectively, and all of the stream attributes in the three pieces of stream registration information have "Chinese" as the language attributes. The stream registration information provided in the basic stream selection table differs in the packet identifier stored in the stream entry, from the stream registration information provided in the extension stream selection table. Also, the stream registration information provided in the extension stream selection table contains (i) a packet identifier for a base-view PG stream for the B-D presentation mode, and (ii) a packet identifier for a dependent-view PG stream.

FIG. 28B shows the setting of a stream number and the outputting of a packet identifier when such a combined stream registration sequence is supplied to playback device in which the language has been set to "Chinese" and the output mode has been set to the 2D playback mode.

The arrows identified by "a1", "a2", and "a3" schematically indicate (i) the judgment on whether language settings match each other, (ii) the setting of a stream number, and (iii) the output of a packet identifier to the demultiplexing unit, respectively.

In the operation procedure of this example, it is judged whether the language setting of the playback device matches the stream attribute contained in the stream registration information whose stream number is "1", and it is judged that they match. As a result of this, the stream number "1" of this stream registration information is written into the stream number register. Also, the packet identifier written in the stream entry of the basic stream selection table is output to the demultiplexing unit. Following this, a TS packet identified by the packet identifier written in the stream entry of the stream registration information whose stream number is "1" in the basic stream selection table is output to the decoder.

FIG. 28C shows the setting of a stream number and the outputting of a packet identifier when such a combined stream registration sequence is supplied to playback device in which the language has been set to "Chinese" and the output mode has been set to the B-D presentation mode.

The arrows identified by "a4", "a5", and "a6" schematically indicate (i) the judgment on whether language settings match each other, (ii) the setting of a stream number in the stream number register, and (iii) the output of a packet identifier to the demultiplexing unit, respectively.

In the operation procedure of this example, it is judged whether the language setting of the playback device matches the stream attribute contained in the stream registration information whose stream number is "1", and it is judged that they match. As a result of this, the stream number "1" of this stream registration information is written into the stream number register. Also, the packet identifier written in the stream entry of the basic stream selection table is output to the demultiplexing unit. Following this, a pair of TS packets identified by a pair of packet identifiers written in the stream entry of the stream registration information whose stream number is "1" in the extension stream selection table are output to the decoder.

FIG. 29 shows referencing of the packet identifiers and outputting of the packets when the playback device is set to the B-D presentation mode and the playback device has the B-D capability.

The arrows connecting the combined stream registration sequence and the demultiplexing unit indicate the stream entries in which the packet identifiers currently referenced are written, among a plurality of stream registration sequences in the combined stream registration sequence. FIG. 29 indicates that the demultiplexing unit is referencing (i) a packet identifier written in a stream entry in the base-view video stream registration sequence in the basic stream selection table, (ii) a packet identifier written in a stream entry in the dependent-view stream registration sequence in the extension stream selection table, (iii) a packet identifier written in a stream entry in the PG_text subtitle stream registration sequence in the extension stream selection table, and (iv) a packet identifier written in a stream entry in the IG stream registration sequence in the extension stream selection table.

The arrows connecting the demultiplexing unit and a plurality of decoders indicate the TS packets that are output to the respective decoders, among a plurality of source packets existing in the interleaved stream file. As shown in FIG. 23, the following TS packets are output from the demultiplexing unit to the decoders: a TS packet constituting the base-view video stream; a TS packet constituting the dependent-view video stream; a TS packet constituting the base-view PG stream; a TS packet constituting the dependent-view PG stream; a TS packet constituting the base-view IG stream; and a TS packet constituting the dependent-view IG stream.

FIG. 30 shows referencing of the packet identifiers and outputting of the packets when the playback device is set to the "1 plane+offset" mode.

The arrows connecting the combined stream registration sequence and the shift units indicate the referencing in the "1 plane+offset" mode of (i) an offset of a stream registration sequence corresponding to the PG stream in the extension stream selection table, and (ii) an offset of a stream registration sequence corresponding to the IG stream in the extension stream selection table.

The arrows connecting the demultiplexing unit and a plurality of decoders indicate the TS packets that are output to the respective decoders, among a plurality of source packets existing in the stream file. As shown in FIG. 30, the following TS packets are output from the demultiplexing unit to the decoders: a TS packet constituting the base-view video stream; a TS packet constituting the PG stream; a TS packet constituting the IG stream; and a TS packet constituting the audio stream.

The arrows connecting the video decoder and the shift units indicate that the offset in the dependent-view video stream is supplied to the shift unit for the PG stream and to the shift unit for the IG stream, based on the above-described offset referencing.

FIG. 31 shows referencing of the packet identifiers and outputting of the packets when the playback device is set to the 2D presentation mode.

The arrows connecting the combined stream registration sequence and the demultiplexing unit indicate the stream entries in which the packet identifiers currently referenced are written, among a plurality of stream registration sequences in the combined stream registration sequence. FIG. 31 indicates that the demultiplexing unit is referencing (i) a packet identifier written in a stream entry in the base-view video stream registration sequence in the basic stream selection table, (ii) a packet identifier written in a stream entry in the PG_text subtitle stream registration sequence in the basic stream selection table, and (iii) a packet identifier written in a stream entry in the IG stream registration sequence in the basic stream selection table.

The arrows connecting the demultiplexing unit and a plurality of decoders indicate the TS packets that are output to the respective decoders, among a plurality of source packets existing in the stream file. As shown in FIG. 25, the following TS packets are output from the demultiplexing unit to the decoders: a TS packet constituting the base-view video stream; a TS packet constituting the PG stream; a TS packet constituting the IG stream; and a TS packet constituting the audio stream.

FIG. 32 shows referencing of the packet identifiers and outputting of the packets when the playback device does not have the capability for the B-D presentation mode.

The arrows connecting the combined stream registration sequence and the demultiplexing unit indicate the stream entries in which the packet identifiers currently referenced are written, among a plurality of stream registration sequences in the combined stream registration sequence. FIG. 32 indicates that the demultiplexing unit is referencing (i) a packet identifier written in a stream entry in the base-view video stream registration sequence in the basic stream selection table, (ii) a packet identifier written in a stream entry in the PG_text subtitle stream registration sequence in the basic stream selection table, and (iii) a packet identifier written in a stream entry in the IG stream registration sequence in the basic stream selection table.

The arrows connecting the demultiplexing unit and a plurality of decoders indicate the TS packets that are specified by the stream entries in the stream registration sequences in the basic stream selection table and are output to the respective decoders, among a plurality of source packets existing in the interleaved stream file.

The playback control having been described up to now can be realized by causing a computer to execute a program which is generated by writing the processing procedure represented by the flowcharts of FIGS. 33 through 35 in an object-oriented compiler language.

FIG. 33 shows the playlist playback procedure. In this flowchart, the current playitem number is set to "1" in step S1, and then the control enters a loop in which the steps S2 to S6 are repeated. In this loop, the steps are performed as follows. The stream number is determined by the stream selection procedure (step S2). A stream file storing an elementary stream corresponding to the stream number is opened, and the source packet sequence is read therefrom (step S3). It is instructed that a source packet, among those constituting the source packet sequence, that corresponds to the stream number should be demultiplexed (step S4). The decoder is instructed to play back the read source packet for the period from the in-time to the out-time of the playitem, and for the period from the in-time to the out-time of the sub-playitem (step S5). These steps constituting the loop are repeated until the current playitem number becomes the last number. When it is judged that the current playitem number is not the last number (NO in step S6), the current playitem number is incremented, and the control moves to step S2. When it is judged that the current playitem number is the last number (YES in step S6), the process ends.

FIG. 34 shows the stream selection procedure.

In this flowchart, the basic stream selection table in the current playitem information is set as the current basic stream selection table (step S7). This step is followed by a loop constituted from steps S8 through S17. In this loop, steps S10 through S17 are repeated for each of the PG stream, IG stream, secondary video stream, primary audio stream, and secondary audio stream. In step S10, it is judged whether or not the number of stream entries in the current basic stream selection table corresponding to stream x is 0. In step S11, it is judged whether or not the number of stream entries in the current basic stream selection table corresponding to stream x is equal to or larger than the stream number stored in the stream number register.

When it is judged YES in step S10 or S11, the control goes to step S17 in which the stream number stored in the stream number register is maintained.

When it is judged NO in both steps S10 and S11, the control goes to step S12 in which it is judged which among a plurality of conditions are satisfied by each PES stream registered in the current basic stream selection table, and then in step S13, it is judged whether there are a plurality of PES streams that satisfy a same combination of conditions.

When it is judged in step S13 that there is only one PES stream that satisfies the conditions, the PES stream satisfying the conditions is selected as the current stream (step S14).

When it is judged in step S13 that there are a plurality of PES streams that satisfy a same combination of conditions, a PES stream having the highest priority in the current basic stream selection table is selected from among the plurality of PES streams that satisfy a same combination of conditions (step S15). After the PES stream is selected in this way, the stream number of the selected PES stream is written into the stream number register (step S16).

After the PES stream to be played back in the current playitem is determined as described above, the playback of the current playitem needs to be started. The procedure for playing back the current playitem is based on the output mode that is determined in the "Procedure when playback condition is changed".

FIG. 35 shows the procedure for outputting the packet identifier corresponding to the stream number. In this procedure, the judgment steps S17 and S18 are performed. In step S17, it is judged whether or not the current output mode is the 2D playback mode. When it is judged in step S17 that the current output mode is the 2D playback mode, the control goes to step S38 in which the demultiplexing unit is instructed to perform demultiplexing based on the stream entry of the stream registration information corresponding to the current stream number, among the stream registration sequence in the basic stream selection table.

In step S18, it is judged whether or not the fixed offset_during_Popup of the extension stream selection table is ON.

When it is judged NO in step S17, and NO in step S18, the steps S19 through S30 are executed.

In the steps S19 through S30, the video stream is set to the stereoscopic B-D type, and the video plane is set to the B-D presentation mode (step S19), the demultiplexing based on the packet identifier of Stream entry in SS_dependent_View_block is instructed (step S20), and the process of steps S21 through S26 is executed.

In step S21, it is judged whether or not is_SS_PG in the stream registration information of the current PG stream is ON. When is_SS_PG is ON, the PG stream is set to the to stereoscopic playback type (step S22), and the demultiplexing based on the packet identifier of Stream_entry_base_view and Stream_entry_dependent_view of the stream registration information corresponding to the current PG stream is instructed (step S23).

When is_SS_PG is OFF, the PG stream is set to the "1 Plane+Offset" playback type, the PG stream is set to the "1 Plane+Offset" mode (step S24), and the offset sequence specified by SS_PG_textST_offset_sequence_id_ref of the stream registration information corresponding to the current PG stream is obtained from the dependent-view video stream (step S25), and the plane shift is executed based on the obtained offset sequence (step S26).

In step S27, it is judged whether or not is_SS_IG in the stream registration information of the current IG stream is ON. When is_SS_IG is ON, the demultiplexing based on the packet identifier of Stream_entry_base_view and Stream_entry_dependent_view of the stream registration information corresponding to the current IG stream is instructed (step S28).

When is_SS_IG is OFF, the offset sequence specified by SS_IG_textST_offset_sequence_id_ref of the stream registration information corresponding to the current IG stream is obtained from the dependent-view video stream (step S29), and the plane shift is executed based on the obtained offset sequence (step S30).

When Fixed_offset_during_Popup of the extension stream selection table is ON, the judgment in step S17 results in NO, the judgment in step S18 results in YES, and steps S31 through S37 are executed.

In steps S31 through S37, the video stream is set to the stereoscopic B-B playback type, the video plane is set to the B-B presentation mode (step S31), and steps S32 through S37 are executed.

In step S32, it is judged whether is_SS_PG in the stream registration information of the current PG stream is ON. When is_SS_PG is ON, the control proceeds to step S33 in which the PG stream is set to "1 Plane+Offset" mode type, and the PG plane is set to "1 Plane+Offset" mode. Then, the offset sequence specified by SS_PG_textST_offset_sequence_id_ref is obtained from the dependent-view video stream (step S34), and the plane shift is performed based on the obtained offset sequence (step S35). After this, the control proceeds to step S37.

When is_SS_PG is OFF, the control proceeds to step S36 in which the PG stream is set to "1 Plane+Zero Offset" mode type, and the PG plane is set to "1 Plane+Zero Offset" mode. After this, the control proceeds to step S37.

In step S37, the plane shift is performed in the direction indicated by IG_Plane_offset_direction_during_BB_video in the stream registration information of the current IG stream, by the amount indicated by IG_Plane_offset_value_during_BB_video. With the above-described process, when Fixed_offset_during_Popup is ON, a stereoscopic image, which is generated by superimposing a three-dimensional subtitle or menu on a monoscopic video image, can be played back.

FIG. 36 is a flowchart showing the procedure of shifting the PG plane.

In step S60, it is judged whether a stream is a PG stream or a text subtitle stream. When it is judged that it is a PG stream, the control moves to a loop in which steps S61 through S74 are repeatedly performed. In this loop, the steps are performed as follow. The variables "i" and "j" are initialized to "0" (step S61). Plane_offset_direction[j] and Plane_offset_value[j] of GOP[i], among the offset sequences having offset_sequence_id specified by PG_textST_offset_sequence_id_ref of the current stream, are obtained from the video decoder (step S62). The plane shift is executed by using the Plane_offset_direction[j] and Plane_offset_value[j] of GOP[i]. The step S69 defines the condition for ending the loop using the variable "i". In step S69, it is judged whether or not the variable "i" has become "number_of_offset_sequence". Until it is judged that the condition is satisfied, a process, in which the variable "i" is incremented in step S70 and the control returns to step S62, is repeated.

In another loop, steps S63 through S68 are performed as follow. A start of the base-view horizontal display period in the frame of GOP is waited (step S63). When it is judged that the period has started, the control moves to step S64, in which the pixels of each line in the picture data of frame[j] are shifted by the number of pixels indicated by Plane_offset_value[j] in the direction indicated by Plane_offset_direction[j] of the X axis. After this, a start of the dependent-view horizontal display period in the frame of GOP is waited (step S65). When it is judged that the period has started, the pixels of each line in the picture data of frame[j] are shifted by the number of pixels indicated by Plane_offset_value[j] in the reverse direction of the direction indicated by Plane_offset_direction[j] of the X axis. The step S67 defines the condition for ending the loop using the variable "j". In step S67, it is judged whether or not the variable "j" has become "number_of_displayed_frame_in_GOP". Until it is judged that the condition is satisfied, a process, in which the variable "j" is incremented in step S78 and the control returns to step S63, is repeated.

FIG. 37 is a flowchart showing the procedure of shifting the PG plane when the text subtitle stream is the target of playback. The process structure of FIG. 37 is basically the same as that of FIG. 36 except that step S64 has been replaced with steps S71 and S72, and step S65 has been replaced with step S73.

In step S71, an interpolation value is obtained for each drawing area of the PG plane of the offset to be used for the frame. In step S72, the pixels of each drawing area of the PG plane are shifted by the number of pixels equal to "Plane_offset_value[j]+interpolation value" in the direction indicated by Plane_offset_direction[j] of the X axis.

In step S73, the pixels of each drawing area of the PG plane are shifted by the number of pixels equal to "Plane_offset_value[j]+interpolation value" in the reverse direction of the direction indicated by Plane_offset_direction[j] of the X axis.

FIG. 38 is a flowchart showing the procedure of shifting the IG plane. The process structure of FIG. 38 is basically the same as that of FIG. 36 except that step S60 has been replaced with step S74, step S62 has been replaced with step S75, step S64 has been replaced with step S76, and step S66 has been replaced with step S77.

In step S74, it is judged whether or not Fixed_offset_during_Popup of the STN_table_SS is ON. When it is judged as "No", the control moves to step S61, and when it is judged as "Yes", the control moves to step S78.

In step S75, Plane_offset_direction[j] and Plane_offset_value[j] of GOP[i], among the offset sequences having offset_sequence_id specified by SS_IG_textST_offset_sequence_id_ref of the current stream, are obtained from the video decoder.

In step S76, the pixels of each line in the IG plane are shifted by the number of pixels indicated by Plane_offset_value[j] in the direction indicated by Plane_offset_direction[j] of the X axis.

In step S77, the pixels of each line in the IG plane are shifted by the number of pixels indicated by Plane_offset_value[j] in the reverse direction of the direction indicated by Plane_offset_direction[j] of the X axis.

FIG. 39 is a flowchart showing the procedure of shifting the IG plane when the Fixed_offset_during_Popup of the STN_table_SS is ON. The process structure of FIG. 39 is basically the same as that of FIG. 36 except that step S62 has been replaced with step S78, step S64 has been replaced with step S79, and step S66 has been replaced with step S80.

In step S78, IG_Plane_offset_direction_during_BB_video and IG_Plane_offset_value_during_BB_video of the current stream in the STN_table_SS are obtained.

In step S79, the pixels of each line in the IG plane are shifted by the number of pixels indicated by IG_Plane_offset_value_during_BB_video in the direction indicated by IG_Plane_offset_direction_during_BB_video of the X axis.

In step S80, the pixels of each line in the IG plane are shifted by the number of pixels indicated by IG_Plane_offset_value_during_BB_video in the reverse direction of the direction indicated by IG_Plane_offset_direction_during_BB_video of the X axis.

As described above, according to the present embodiment, it is defined that the control information for controlling the "1 plane+offset" mode should be provided within the dependent-view stream. With this structure, the control information can be generated based on the depth information obtained during shooting by the 3D camera, and based on the parallax information obtained in the encoding process by the encoder for generating the video stream, and the control information can be incorporated, as metadata, into the dependent-view stream. This facilitates generation of the control information for controlling the offset control in the "1 plane+offset" mode. This makes it possible to greatly omit working in the authoring process. Since the control information defines the offset control in the "1 plane+offset" mode, a stereoscopic playback is possible when there is only one subtitle or one menu even if there are no left and right subtitles or menus. In this way, the structure of the present embodiment not only reduces the time and effort required for creating the subtitle and menu for each of the left view and the right view, but makes it possible to realize the stereoscopic playback even if plane memory in the playback device has a size of one plane. This realizes both an efficient authoring and a low cost in the playback device.

Embodiment 2

In Embodiment 1, sub-TSs constituting the dependent-view data blocks are referenced from the sub-clip entry ID reference. Due to this structure, when the sub-TSs are recorded separately from the main TSs, the sub-TSs are read when the playback mode is switched from the 2D playback mode to the 3D playback mode. This might impair the seamlessness of the AV playback. As one improvement with respect to this problem, the present embodiment proposes a structure that ensures the main TSs and the sub-TSs to be read together into the playback device. More specifically, a main TS and a sub-TS are interleaved as a pair and recorded as one file.

Here, as a premise of the present embodiment, files in the UDF file system will be explained briefly. The UDF file is composed of a plurality of Extents managed by the file entry. The "file entry" includes a "descriptor tag", an "ICB tag", and an "allocation descriptor".

The "descriptor tag" is a tag identifying, as a "file entry", the file entry which includes the descriptor tag itself. The descriptor tag is classified into a file entry descriptor tag, a space bit map descriptor tag, and so on. In the case of a file entry descriptor tag, "261", which indicates "file entry" is written therein.

The "ICB tag" indicates attribute information concerning the file entry itself.

The "allocation descriptor" includes a Logical Block Number (LBN) indicating a recording position of an Extent constituting a low-order file under a directory. The allocation descriptor also includes data that indicates the length of the Extent. The high-order two bits of the data that indicates the length of the Extent are set as follows: "00" to indicate an allocated and recorded Extent; "01" to indicate an allocated and not-recorded Extent; and: "11" to indicate an Extent that follows the allocation descriptor. When a low-order file under a directory is divided into a plurality of Extents, the file entry should include a plurality of allocation descriptors in correspondence with the Extents.

It is possible to detect an address of an Extent constituting a stream file by referring to the allocation descriptor in the file entry described above.

The following describes the files in various types that are used in the present embodiment.

<Stereoscopic Interleaved Stream File (FileSS)>

The stereoscopic interleaved stream file (FileSS) is a stream file (2TS-interleaved file) in which two TSs are interleaved, and is identified by a five-digit integer value and an extension (ssif) indicating an interleave-format file for stereoscopic playback. The stereoscopic interleaved stream file is composed of Extent SS[n]. The Extent SS[n] (also referred to as EXTSS[n]) is identified by the index number "n". The index number "n" increments in order starting from the top of the stereoscopic interleaved stream file.

Each Extent SS[n] is structured as a pair of a dependent-view data block and a base-view data block.

The dependent-view data block and base-view data block constituting the Extent SS[n] are a target of cross reference by the file 2D, file base, and file dependent. Note that the cross reference means that a piece of data recorded on a recording medium is registered as an Extent of a plurality of files in the file entries thereof. In the present embodiment, the starting addresses and continuation lengths of the dependent-view data block and base-view data block are registered in the file entries of the file 2D, file base, and file dependent.

<File Base (FileBase)>

The file base (FileBase) is a virtual stream file that is presumed to "store" a main TS specified by the Extent start point information in the clip information corresponding to the file 2D. The file base (FileBase) is composed of at least one Extent 1[i] (also referred to as EXT1[i]). The Extent 1[i] is the $i^{th}$ Extent in the file base, where "i" is an index number of the Extent and is incremented starting from "0" at the top of the file base. The file base is a virtual stream file used to treat the stereoscopic interleaved stream file, which is a 2TS-file, as a 1TS-file. The file base is generated in a virtual manner by building its file entry in the memory of the playback device.

In the actual reading, the file base is identified by performing a file open using a file name of the stereoscopic interleaved stream file. More specifically, when the file open using a file name of the stereoscopic interleaved stream file is called, the middleware of the playback device generates, in the memory, a file entry identifying an Extent in the file base, and opens the file base in a virtual manner. The stereoscopic interleaved stream file can be interpreted as "including only one TS", and thus it is possible to read a 2TS stereoscopic interleaved stream file from the recording medium as a 1TS file base.

When only a base-view data block is to be read in the B-B presentation mode, only the Extents constituting the file base become the target of the reading. Even if the mode is switched from the B-B presentation mode to the B-D presentation mode, both the dependent-view data block and the base-view data block can be read by extending the reading range from the Extents constituting the file base to the Extents constituting the stereoscopic interleaved stream file. Thus, with this arrangement, the efficiency of the file reading is not decreased.

<File Dependent (FileDependent)>

The file dependent (FileDependent) is a stream file that is presumed to "store" a sub-TS, and is composed of Extent 2[i] (also referred to as EXT2[i]). The Extent 2[i] is the $i^{th}$ Extent in the file dependent, where "i" is an index number of the Extent and is incremented starting from "0" at the top of the file dependent. The file dependent is a virtual stream file used to treat the stereoscopic interleaved stream file, which is a 2TS-file, as a 1TS-file storing the sub-TS. The file dependent is generated in a virtual manner by building its file entry in the memory of the playback device.

The dependent-view video stream is attached with and accessed with use of a file name that is represented by a number generated by adding "1" to the five-digit integer representing the file name of the stereoscopic interleaved stream file. The recording medium stores a dummy file, and the "number generated by adding 1", namely, the identification number of the dependent-view video stream, is attached to the dummy file. Note that the dummy file is a file that stores no Extent, namely, substantial information, but is attached with only a file name. The dependent-view video stream is treated as being stored in the dummy file.

<File 2D (File2D)>

The file 2D (File2D) is a 1TS stream file storing a main TS that is played back in the 2D playback mode, and is composed of the Extent 2D. The file 2D is identified by a five-digit integer value and an extension (ssif) indicating an interleave-format file for stereoscopic playback.

The following explains the correspondence between the file 2D/file base and the file dependent. FIG. 40 shows the correspondence between the file 2D/file base and the file dependent.

In FIG. 40, the first row shows a file 2D/file base 00001.m2ts and a file dependent 00002.m2ts. The second row shows Extents that store dependent-view data blocks and base-view data blocks. The third row shows a stereoscopic interleaved stream file 00001.ssif.

The dotted arrows h1, h2, h3, and h4 show the files to which Extents EXT1[i] and EXT2[i] belong, the belongingness being indicated by the allocation identifiers. According to the belongingness guided by the arrows h1 and h2, Extents EXT1[i] and EXT1[i+1] are registered as Extents of the file base 00001.m2ts.

According to the belongingness guided by the arrows h3 and h4, Extents EXT2[i] and EXT2[i+1] are registered as Extents of the file dependent 00002.m2ts.

According to the belongingness guided by the arrows h5, h6, h7, and h8, Extents EXT1[i], EXT2[i], EXT1[i+1], and EXT2[i+1] are registered as Extents of 00001.ssif. As understood from this, Extents EXT1[i] and EXT1[i+1] have the duality of belonging to 00001.ssif and 00001.m2ts. The extension "ssif" is made of capital letters of StereoScopic Interleave File, indicating that the file is in the interleave format for stereoscopic playback.

FIGS. 41A through 41C show the correspondence between the interleaved stream file and file 2D/file base.

The third row in FIG. 41A shows the internal structure of the interleaved stream file. As shown in FIG. 41A, Extents EXT1[1] and EXT1[2] storing base-view data blocks and EXT2[1] and EXT2[2] storing dependent-view data blocks are arranged alternately in the interleave format in the interleaved stream file.

The first row in FIG. 41A shows the internal structure of the file 2D/file base. The file 2D/file base is composed of only Extents EXT1[1] and EXT1[2] storing base-view data blocks, among the Extents constituting the interleaved stream file shown in the third row. The file 2D/file base and the interleaved stream file have the same name, but different extensions.

The second row in FIG. 41A shows the internal structure of the file dependent. The file dependent is composed of only Extents EXT2[1] and EXT2[2] storing dependent-view data blocks, among the Extents constituting the interleaved stream file shown in the third row. The file name of the file dependent is a value higher by "1" than the file name of the interleaved stream file, and they have different extensions.

Not all playback devices necessarily support the 3D playback system. Therefore, it is preferable that even an optical disc including a 3D image supports a 2D playback. It should be noted here that the playback devices supporting only the 2D playback do not identify the data structure extended for the 3D. The 2D playback devices need to access only the 2D playlists and 2D AV clips by using a conventional identification method provided to the 2D playback devices. In view of this, the left-view video streams are stored in a file format that can be recognized by the 2D playback devices.

According to the first method, the main TS is assigned with the same file name as that in the 2D playback system so that the above-described referencing of playlist information can be realized, that is to say, so that the main TS can be used in the 2D playback as well, and stream files in the interleave format have a different extension. FIG. 41B shows that files "00001.m2ts" and "00001.ssif" are coupled with each other by the same file name "00001", although the former is in the 2D format and the latter is in the 3D format.

In a conventional 2D playback device, the playlist refers to only the AV clips the main TS, and therefore the 2D playback device plays back only the file 2D. On the other hand, in a 3D playback device, although the playlist refers to only the file 2D storing the main TS, when it finds a file that has the same identification number and a different extension, it judges that the file is a stream file in the interleave format for the 3D image, and outputs the main TS and sub-TS.

The second method is to use different folders. The main TSs are stored in folders with conventional folder names (for example, "STREAM"), but sub-TSs are stored in folders with folder names unique to 3D (for example, "SSIF"), with the same file name "00001". In the 2D playback device, the playlist refers to only files in the "STREAM" folder, but in the 3D playback device, the playlist refers to files having the same file name in the "STREAM" and "SSIF" folders simultaneously, making it possible to associate the main TS and the sub-TS.

The third method uses the identification numbers. That is to say, this method associates the files based on a predetermined rule regarding the identification numbers. For example, when the identification number of the file 2D/file base is "00001", the file dependent is assigned with identification number "00002" that is made by adding "1" to the identification number of the file 2D/file base, as shown in FIG. 41C. However, the file system of the recording medium treats the file dependent, which is assigned with a file name according to the rule, as a non-substantial dummy file. This is because the file dependent is, in the actuality, the stereoscopic interleaved stream file.

The file names having been associated with each other in this way are written into (i) the stream registration information in the basic stream selection table and (ii) the sub-clip entry ID reference (ref_to_STC_id[0]) in the stream registration information in the extension stream selection table. On the other hand, the playback device recognizes a file name, which is a value higher by "1" than the file name written in the sub-clip entry ID reference, as the file name of the dummy file, and performs the process of opening the file dependent in a virtual manner. This ensures that the stream selection procedure reads, from the recording medium, the file dependent that is associated with other files in the above-described manner.

This completes the description of the file 2D, file base, and file dependent.

The following explains the data blocks in detail.

<Base-View Data Block>

The base-view data block (B[i]) is the $i^{th}$ data in the main TS. Note that the main TS is a TS specified as the main element of the main path by the clip information file name information of the current playitem information. The "i" in B[i] is an index number that is incremented starting from "0" corresponding to the data block at the top of the file base.

The base-view data blocks fall into those shared by the file base and the file 2D, and those not shared by the file base and the file 2D.

The base-view data blocks shared by the file base and the file 2D and the base-view data blocks unique to the file 2D become the Extents of the file 2D, and they are set to have a length that does not cause a buffer underflow in the playback device. The starting sector address of the base-view data blocks is written in the allocation descriptor in the file entry of the file 2D.

The base-view data blocks unique to the file base, which are not shared by the file 2D, do not become the Extents of the file 2D, and thus they are not set to have a length that does not cause an underflow in a single buffer in the playback device. The base-view data blocks are set to have a smaller size, namely, a length that does not cause an underflow in a double buffer in the playback device.

The starting sector addresses of the base-view data block unique to the file base are not written in the allocation descriptor in the file entry. Instead of this, the starting source pocket in the base-view data block is pointed to by the Extent start point information in the clip information of the clip information file corresponding to the main TS. Therefore, the starting sector address of a base-view data block unique to the file base needs to be obtained by using (i) the allocation descriptor in the file entry of the stereoscopic interleaved stream file and (ii) the Extent start point information in the clip information.

When the base view is the left view, the base-view data block is a block of source packets that store portions of a plurality of types of PES streams for 2D playback and left-view playback, including: source packets that store portions of the left-view video stream; source packets that store portions of the left-view graphics stream; source packets that store portions of the audio stream that are played back together with those streams; and packet management information (PCR, PMT, PAT) defined in the European broadcasting standard. The packets constituting the base-view data block have continuous ATCs, STCs, and SPNs to ensure a seamless AV playback for a predetermined period.

<Dependent-View Data Block>

The dependent-view data block (D[i]) is the $i^{th}$ data in the sub-TS. Note that the sub-TS is a TS specified as the main element of the sub-path by the stream entry in the stream registration sequence in the extension stream selection table corresponding to the current playitem information. The "i" in D[i] is an index number that is incremented starting from "0" corresponding to the data block at the top of the file dependent.

The dependent-view data blocks become the Extents of the file dependent, and are set to have a length that does not cause an underflow in a double buffer in the playback device.

Also, in the continuous areas in the recording medium, a dependent-view data block is disposed before a base-view data block that is played back in the same playback time together the dependent-view data block. For this reason, when the stereoscopic interleaved stream file is read, the dependent-view data block is read before the corresponding base-view data block, without fail.

The starting sector addresses of the dependent-view data blocks are not written in the allocation descriptor in the file entry of the file 2D since the dependent-view data blocks are not shared by the file 2D. Instead of this, the starting source pocket in the dependent-view data block is pointed to by the Extent start point information in the clip information. Therefore, the starting sector address of a dependent-view data block needs to be obtained by using (i) the allocation descriptor in the file entry of the file 2D and (ii) the Extent start point information in the clip information.

When the dependent view is the right view, the dependent-view data block is a block of source packets that store portions of a plurality of types of PES streams for right-view playback, including: source packets that store portions of the right-view video stream; source packets that store portions of the right-view graphics stream; and source packets that store portions of the audio stream that are played back together with those streams. The packets constituting the dependent-view data block have continuous ATCs, STCs, and SPNs to ensure a seamless AV playback for a predetermined period. In the continuous dependent-view data blocks and corresponding base-view data blocks, the source packet numbers of the source packets constituting these blocs are continuous, but the ATSs of the source packets constituting these blocs are each the same value. Accordingly, a plurality of source packets constituting the dependent-view data blocks and a plurality of source packets constituting the corresponding base-view data blocks reach the PID filters at the same ATC time.

<Classification of Extent>

As described above, the Extents of the file 2D fall into those shared by the file base, and those not shared by the file base.

Suppose here that the Extents of the file 2D are B[0], B[1], B[2], B[3]2D, and B[4]2D, and that the Extents of the file base are B[0], B[1], B[2], B[3]ss, and B[4]ss. Of these, B[0], B[1], and B[2] are base-view data blocks shared by the file base. B[3]2D and B[4]2D are base-view data blocks unique to the file 2D, not shared by the file base.

Also, B[3]ss and B[4]ss are base-view data blocks unique to the file base, not shared by the file 2D.

The data of B[3]2D is bit-for-bit same as data of B[3]ss. The data of B[4]2D is bit-for-bit same as data of B[4]ss.

The data blocks B[2], B[3]2D, and B[4]2D in the file 2D constitute Extents (big Extents) having a large continuation length immediately before a position at which a long jump is caused. In this way, big Extents can be formed immediately before a long jump in the file 2D. Accordingly, even when a stereoscopic interleaved stream file is played back in the 2D playback mode, there is no need to worry an occurrence of an underflow in the read buffer.

The file 2D and the file base have sameness, although being partially different in Extents. Therefore, the file 2D and the file base are generically called "file 2D/file base".

<Long Jump>

In general, when an optical disc is adopted as the recording medium, an operation for suspending a reading operation of the optical pickup, and, during the suspension, positioning the optical pickup onto the next reading-target area is called "jump".

The jump is classified into: a jump that increases or decreases the rotation speed of the optical disc; a track jump; and a focus jump. The track jump is an operation of moving the optical pickup in the radius direction of the disc. The focus jump is available when the optical disc is a multi-layer disc, and is an operation of moving the focus of the optical pickup from one recording layer to another recording layer. These jumps are called "long jumps" since they generally require a long seek time, and a large number of sectors are skipped in reading due to the jumps. During a jump, the reading operation by the optical pickup is suspended.

The length of the portion for which the reading operation is skipped during a jump is called "jump distance". The jump distance is typically represented by the number of sectors included in the portion. The above-mentioned long jump is specifically defined as a jump whose jump distance exceeds a predetermined threshold value. The threshold value is, for example, 40000 sectors in the BD-ROM standard, in accordance with the disc type and the performance concerning the process of reading the drive.

Typical positions at which the long jump is caused include a boundary between recording layers, and a position at which one playitem is connected with n playitems, namely, a multi-connection is performed.

Here, when a one-to-n multi-connection of playitems is performed, the first TS among "n" pieces of TSs constituting "n" pieces of playitems can be disposed at a position immediately after a TS that constitutes the playitem that precedes the "n" playitems. However, any of the second TS and onwards cannot be disposed at the position immediately after the TS that constitutes the playitem preceding the "n" playitems. When, at a one-to-n multi-connection, a jump is made from the one playitem to any of the second playitem and onwards in the "n" playitems, the reading needs to skip one or more recording areas of TSs. Therefore, a long jump occurs at a position where a one-to-n multi-connection exists.

<Playback Path of Each Mode>

The playback path of the 2D playback mode is composed of Extents of the file 2D referenced by the clip information file name information in the current playitem information.

The playback path of the B-D presentation mode is composed of Extents of the stereoscopic interleaved stream file referenced by the clip information file name information in the current playitem information.

The playback path of the B-B presentation mode is composed of Extents of the file base referenced by the clip information file name information in the current playitem information.

Switching among these playback paths of the three modes can be made by performing a file open using the file name written in the clip information file name information in the current playitem information: as the file name of the file 2D; as the file name of the file base; or as the file name of the stereoscopic interleaved stream file. Such switching among playback paths does not change the current playlist or current playitem, and thus can maintain the seamlessness when the playback mode is changed.

With this structure, the playback device can read data blocks suited for each playback mode from the recording medium by opening any of the stereoscopic interleaved stream file, file base, and file 2D based on the clip information file name information in the current playitem information.

<Specific Values of EXT2D, EXT1[n], EXT2[n]>

The lowermost value of EXT2D is determined so that, when a playback in the 2D playback mode is performed, a buffer under flow does not occur in the read buffer of the playback device during a jump period from each base-view data block to the next base-view data block.

The lowermost value of EXT2D is represented by the following expression for Condition 1, when it takes Tjump2D(n) of time when a jump from the $n^{th}$ base-view data block to the $(n+1)^{th}$ base-view data block is made, each base-view data block is read into the read buffer at a speed of Rud2D, and the base-view data block is transferred from the read buffer to the video decoder at an average speed of Rbext2D.

[Lowermost value of EXT2D]≥(Rud2D×Rbext2D)/
    (Rud2D−Rbext2D)×Tjump2D(n)       <Condition 1>

It is presumed here that an Extent corresponding to a base-view data block B[n]ss is represented as EXT1[n]. In this case, the lowermost value of EXT1[n] is determined so that, when a playback in the B-D presentation mode is performed, a buffer under flow does not occur in the double buffer during a jump period from each base-view data block to the next dependent-view data block, and during a jump period from said dependent-view data block to the next base-view data block.

In the present example, the double buffer is composed of a read buffer 1 and a read buffer 2. The read buffer 1 is the same as the read buffer provided in the 2D playback device.

It is presumed here that, when a playback in the B-D presentation mode is performed, it takes Tfjump3D(n) of time when a jump from the $n^{th}$ base-view data block to the $p^{th}$ dependent-view data block is made, and it takes TBjump3D (n) of time when a jump from the $p^{th}$ dependent-view data block to the $(n+1)^{th}$ base-view data block is made.

It is further presumed that, each base-view data block is read into the read buffer 1 at a speed of Rud3D, each dependent-view data block is read into the read buffer 2 at the speed of Rud3D, and the base-view data block is transferred from the read buffer 1 to the video decoder at an average speed of Rbext3D. Then the lowermost value of EXT1[n] is represented by the following expression for Condition 2. The continuation length of the big Extents is set to a value that is equal to or higher than the lowermost value.

[Lowermost value of EXT1[n]]≥(Rud3D×Rbext3D)/
    (Rud3D−Rbext3D)×(TFjump3D(n)+EXT2[n]/
    (Rud3D+TBjump3D(n)))       <Condition 2>

The lowermost value of EXT2 is determined so that, when a playback in the B-D presentation mode is performed, a buffer under flow does not occur in the double buffer of the playback device during a jump period from each dependent-view Extent to the next base-view data Extent, and during a jump period from said base-view Extent to the next dependent-view Extent.

The lowermost value of EXT2[n] is represented by the following expression for Condition 3, when it takes Tfjump3D(n+1) of time when a jump from the $(n+1)^{th}$ base-view data block to the $(p+1)^{th}$ dependent-view data block is made, and the dependent-view data block is transferred from the read buffer 2 to the decoder at an average speed of Rdext3D.

[Lowermost value of EXT2[n]]≥(Rud3D+Rbext3D)/
 (Rud3D−Rdext3D)×(TBjump3D(n)+EXT2[n+1]/
 (Rud3D+TFjump3D(n+1)))      <Condition 3>

<Specific Values of EXTSS>

When a jump from a reading of an Extent to the next Extent is to be made, the buffer should be occupied by a sufficient amount of data immediately before the jump. Accordingly, when a stereoscopic interleaved stream file is to be read, the read buffer needs to store one Extent, and occurrence of a buffer under flow should be avoided.

However, the "EXTSS" needs to be determined based not only on "Tjump", a time period taken when a jump from an Extent to another Extent, but on "Tdiff". It should be noted here that the "Tdiff" represents a delay time that occurs in connection with a preloading of dependent-view data blocks in EXTss and a preloading of dependent-view data blocks in EXTssnext. The following further explains the meaning of Tdiff. When a stereoscopic interleaved stream file is read while the starting dependent-view data block is being preloaded.

In EXTss, the playback is delayed as much as the time period required for preloading the dependent-view data block. Here, the time period required for preloading the starting dependent-view data block in EXTss is referred to as "delay period" because the playback is delayed as much as the period.

On the other hand, in EXTssnext, immediately after a jump from EXTss to EXTssnext is made, the starting dependent-view data block is preloaded. Thus the playback by the video decoder is allowed to be delayed for the period of the preloading. Therefore the time period in which the starting dependent-view data block is preloaded in the playback of EXTssnext is referred to as "grace period" because the start of playback by the video decoder is allowed to be delayed for the period.

In view of this, a value of Tdiff is obtained by subtracting the delay period from the grace period of the dependent-view data block. More specifically, the value Tdiff is calculated using the following expression.

Tdiff=ceil[((S1stEXT1[i]EXTSSnext)−S1stEXT1[i]
 EXTSS)×1000×8]/Rud72]

In the above expression, Tdiff means a difference between the time period for reading S1stEXT2[i]EXTss and the time period for reading S1stEXT2[i]EXTSSnext; S1stEXT2[i]EXTss represents the size of EXT2[i] which is located at the start of EXTss; S1stEXT2[i]EXTssnext represents the size of EXT2[i] which is located at the start of EXTssnext. EXTssnext is an Extent in the stereoscopic interleaved stream file, is located immediately after EXTss, and is played back seamlessly with EXTss.

With use of Tdiff and Tjump, which is a time period required for jump to EXTssnext, Sextss, which is the minimum Extent size based on the average bit rate in each Extent, is calculated as a value satisfying the following Condition 4.

SextSS[Byte]≥ceil[(Tjump+Tdiff×Rud72)/(1000×8)]×
 (Rextss×192)/(Rud72×188−Rextss×192)]    <Condition 4>

In the above Condition 4, Rud72 represents a data rate in transfer from the BD-ROM drive in the stereoscopic playback mode.

Rextss represents an average bit rate in EXTss and is obtained using the following expressions.

Rextss=ceil[Nsp×188×8/(ATCDextss/27000000)]

ATCDextss=ATCstart_EXTssnext−ATCstart_EXTss

ATCDextss=ATClast_EXTss−ATCstart_EXTss+ceil
 (27000000×188×8/min(Rts1,Rts2))

In the above expressions, ATCDextss represents the ATC period of EXTss.

ATCstart_EXTss represents the minimum ATC value specified by the ATC field of the source packet sequence in EXTss.

ATCstart_EXTssnext represents the minimum ATC value specified by the ATC field of the source packet sequence in EXTssnext.

ATClast_EXTss represents the maximum ATC value specified by the ATC field of the source packet sequence in EXTss.

Nsp represents the number of source packets which are included in the main TS and sub-TS and have ATC values corresponding to ATCs in the range of ATCDexss.

Rts1 represents a value of the TS recording rate in the main TS, and its maximum value is 48 Mbps.

Rts2 represents a value of the TS recording rate in the sub-TS, and its maximum value is 48 Mbps.

When two playitems are to be played back continuously, EXTss includes the first byte of data in the ATC sequence that is used by the previous playitem (Playitem 1).

EXTss has a size equal to or more than the minimum Extent size defined in Condition 4.
  When EXTss is the first byte of data in the ATC sequence that is used by the previous playitem, the connection condition information of the previous playitem is not set to "5" (connection process that requires a clean break at the boundary between playitems) or "6" (connection process in which the boundary between playitems matches the boundary between GOPs).

EXTss includes byte of data in the ATC sequence that is used by the current playitem (Playitem 2).

EXTss has a size equal to or more than the minimum Extent size defined in Condition 4.
  When EXTss is the last byte of data in the ATC sequence that is used by the Playitem 2, the connection condition information of Playitem 2 is not set to "5" or "6". In this case, it is not necessary to satisfy the size of EXTss.

FIG. 42 shows correspondence among the stereoscopic interleaved stream file, file 2D, file base, and file dependent. The first row in FIG. 42 shows the file 2D, the second row shows data blocks recorded on the recording medium, the third row shows the stereoscopic interleaved stream file, the fourth row shows the file base, and the shows the file dependent.

The data blocks shown in the second row are D[1], B[1], D[2], B[2],D[3], B[3]ss, D[4], B[4]ss, B[3]2D, and B[4]2D. The arrows ex1, ex2, ex3, and ex4 show the belongingness in which, among these data blocks, data blocks B[1], B[2], B[3]2D, and B[4]2D constitute the Extents of the file 2D.

The arrows ex5 and ex6 show the belongingness in which D[1], B[1],D[2], B[2],D[3], B[3]ss, D[4], and B[4]ss constitute the Extents of the stereoscopic interleaved stream file.

The fourth row shows that, among these data blocks constituting the stereoscopic interleaved stream file, B[1], B[2], B[3]ss, and B[4]ss constitute the Extents of the file base. The fifth row shows that, among the data blocks constituting the stereoscopic interleaved stream file, D[1], D[2], D[3], and D[4] constitute the Extents of the file dependent.

FIG. 43 shows the 2D playlist and 3D playlist. The first row shows the 2D playlist information. The second row shows the base-view data blocks. The third row shows the 3D playlist. The fourth row shows the dependent-view data blocks.

The arrows rf1, rf2, and rf3 show a playback path generated by combining the extension "m2ts" and a file name "00001" described in "clip_information_file_name" in the playitem information of the 2D playlist information. In this case, the playback path on the base-view side is constituted from data blocks B[1], B[2], and B[3]2D.

The arrows rf4, rf5, rf6, and rf7 show a playback path specified by the playitem information of the 3D playlist information. In this example, the playback path on the base-view side is constituted from data blocks B[1], B[2], B[3]ss, and B[4]ss.

The arrows rf8, rf9, rf10, and rf11 show a playback path specified by the sub-playitem information of the 3D playlist information. In this example, the playback path on the dependent-view side is constituted from data blocks D[1], D[2], D[3], and D[4]. These data blocks constituting the playback paths specified by the playitem information and the sub-playitem information can be read by opening files that are generated by combining the extension "ssif" and file names written in "clip_information_file_name" in the playitem information.

As shown in FIG. 43, the clip information file name information in the 3D playlist and the clip information file name information in the 2D playlist have file names in common. Accordingly, the playlist information can be written to include description that is common to the 3D playlist and the 2D playlist (see as signs df1 and df2 indicate) so as to define the 3D playlist and the 2D playlist. Accordingly, once playlist information for realizing the 3D playlist is written: the playlist information functions as the 3D playlist when the output mode of the playback device is the stereoscopic output mode; and the playlist information functions as the 2D playlist when the output mode of the playback device is the 2Doutput mode. The 2D playlist and the 3D playlist shown in FIG. 33 have in common a piece of playlist information, which is interpreted as the 2D playlist or the 3D playlist depending on the output mode of the playback device that interprets the piece of playlist information. This reduces the amount of time and effort made by a person in charge of authoring.

When main TSs and sub-TSs are stored in the stereoscopic interleaved stream file, a file name of the file 2D is written in "clip_information_file_name" in the playitem information of the 2D playlist, and a file name of the file base is written in "clip_information_file_name" in the playitem information of the 3D playlist. Since the file base is a virtual file and its file name is the same as that of the stereoscopic interleaved stream file, the file name of the stereoscopic interleaved stream file can be written in "clip_information_file_name" in the playitem information. A file name of the file dependent is written in "ref_to_subclip_entry_id" in the stream registration information in the extension stream selection table. The file name of the file dependent is created by adding "1" to the identification number of the stereoscopic interleaved stream file.

FIG. 44 shows a playlist generated by adding a sub-path to the 3D playlist shown in FIG. 43. The playlist shown in FIG. 43 includes only a sub-path whose sub-path ID is "1", while the second sub-path in the playlist shown in FIG. 44 is identified by sub-path ID "2", and refers to data blocks different from those referred to by the sub-path 1. The two or more pieces of sub-path information define a plurality of right views which are of different angles at which the object is viewed by the right eye. As many data blocks as the angles constitute the right-view. Also, as many sub-paths as the angles are provided.

It is possible to display comfortable stereoscopic images based on parallax to the user by changing sub-paths to be played back in synchronization with main paths defined by the main TS constituted from the base-view data blocks.

With respect to this playlist information realizing the 3D playlist, the playlist information functions as the 3D playlist when the output mode of the playback device is the stereoscopic output mode, and the playlist information functions as the 2D playlist when the output mode of the playback device is the 2Doutput mode. The 2D playlist and the 3D playlist shown in FIG. 43 have in common a piece of playlist information, which is interpreted as the 2D playlist or the 3D playlist appropriately depending on the output mode of the playback device that interprets the piece of playlist information. This reduces the amount of time and effort made by a person in charge of authoring.

The following describes how to specify the base-view video stream.

In general, the left-view video is generated as the 2D video. However, some might think that the right-view video is suitable for the 2D video. To support such a demand, a base-view indicator is set in each piece of playitem information, where the base-view indicator indicates which of the left view and the right view is set as the base view. The base-view indicator set in each piece of playitem information indicates which of the left-view video stream and the right-view video stream is set as the base-view video stream, which of the left-view PG stream and the right-view PG stream is set as the base-view PG stream, and which of the left-view IG stream and the right-view IG stream is set as the base-view IG stream.

As described above, a dependent-view data block precedes a base-view data block without fail. As a result, by referring to the base-view indicator, it is possible to recognize which of the source packet for playing back the right view and the source packet for playing back the left view is first supplied to the playback device.

When the right-view video stream is specified as the base-view video stream, this information causes the right-view video stream to be entered to the video decoder first to obtain non-compressed picture data, even if the right view is specified by the sub-path information. And based on the non-compressed picture data obtained by decoding the right-view video stream, motion compensation is performed. This makes the selection of the base view more flexible.

FIG. 45A shows a 3D playlist generated by adding a base-view indicator to the 3D playlist shown in FIG. 43A.

FIG. 45B shows how the base-view indicator is described in the structure defining the playitem, in an object-oriented programming language. FIG. 45B shows one example of such description. As shown in FIGS. 45A and 45B, when an immediate value "0" is set in the base-view indicator, the left-view video stream is specified as the base-view video stream; and when an immediate value "1" is set in the base-view indicator, the right-view video stream is specified as the base-view video stream.

The base-view indicator can be used when the stream are output to the display device. The display device use the base-view indicator to differentiate the two types of streams. In a system in which glasses with shutters are used, displays of the glasses and the display device cannot be synchronized unless it is recognized which of the left view and the right view is the main image referenced by the playitem. A switch signal is sent to the glasses with shutters so that the light is transmitted through the glass for the left eye when the left view is displayed, and the light is transmitted through the glass for the right eye when the right view is displayed.

The information provided by the base-view indicator is also used In stereoscopic methods for the naked eye, such as the lenticular method, in which prism is incorporated in the screen of the display device. This is because the differentiation between the left view and the right view is necessary also in such methods. This completes the description of the base-view indicator. The base-view indicator is based on the premise that either the left view or the right view, among the parallax images, can be played back as the monoscopic video.

FIG. 46 is a flowchart showing the playitem playback procedure.

In step S41, it is judged whether or not the current output mode is the 3D output mode. When the current output mode is the 2D output mode, a loop constituted from steps S43 through S48 is performed.

In step S43, the stream file, which is identified by: "xxxxx" described in Clip_information_file_name of the current playitem; and extension "m2ts", is opened. In step S44, the "In_time" and "Out_time" of the current playitem are converted into "Start_SPN[i]" and "End_SPN[i]" by using the entry map corresponding to the packet ID of the video stream.

In step S45, the Extents belonging to the reading range [i] are identified to read the TS packet with PID [i] from the Start_SPN[i] to the End_SPN[i]. In step S46, the drive of the recording medium is instructed to continuously read the Extents belonging to the reading range [i].

When the current output mode is the stereoscopic output mode, a loop constituted from steps S50 through S60 is performed.

In step S50, the stream file, which is identified by: "xxxxx" described in the Clip_information_file_name of the current playitem; and extension "ssif", is opened. In step S51, either the left-view or right-view video stream that is specified by the base-view indicator of the current playitem information is set to the base-view video stream. The left-view or right-view video stream that is not set to the base-view video stream is set to the dependent-view stream.

In step S52, the "In_time" and "Out_time" of the current playitem are converted to "Start_SPN[i]" and "End_SPN[i]" by using the entry map corresponding to the packet ID of the base-view video stream.

In step S53, the sub-playitem corresponding to the dependent-view stream is identified. In step S54, the "In_time" and "Out_time" of the identified sub-playitem are converted into "Start_SPN[j]" and "End_SPN[j]" by using the entry map [j] corresponding to the packet ID [j] of the dependent-view stream.

The Extents belonging to the reading range [i] are identified to read the TS packet having the packet ID [i] from "Start_SPN[i]" to "End_SPN[i]" (step S55). The Extents belonging to the reading range [j] are identified to read the TS packet having the packet ID [j] from "Start_SPN[j]" to "End_SPN[j]" (step S56). Following this, in step S57, the Extents belonging to the reading ranges [i] and [j] are sorted in the ascending order. In step S58, the drive is instructed to continuously read the Extents belonging to the reading ranges [i] and [j] using the sorted addresses. After this, when the source packet sequence is read, in step S59, the base-view and dependent-view ATC sequences are restored and supplied to the PID filters for the base view and dependent view.

As described above, according to the present embodiment, base-view and dependent-view data blocks are stored in one stereoscopic interleaved stream file, and when they are supplied to the decoder, the base-view and dependent-view ATC sequences are restored. With this structure, the decoder can treat the stereoscopic interleaved stream file in the same manner as a regular stream file. Thus the storage method of the base-view and dependent-view video streams can be positively used for the storage of the stereoscopic interleaved stream file.

Embodiment 3

The present embodiment describes the clip information file in detail.

FIGS. 47A through 47C show the internal structure of the clip information file.

FIG. 47A shows the clip information file for 2D. FIG. 47B shows the clip information file for 3D. These clip information files include "clip information", "sequence information", "program information", and "characteristic point information".

The "clip information" is information indicating, for each ATC sequence, what type of AV clip each source packet sequence stored in the stream file is. The clip information includes: application type indicating the type (such as the movie, the slide show) which the application constituted from the AV clip in concern falls under; stream type indicating the type of stream which the AV clip in concern falls under; TS recording rate being a transfer rate of TS packet in the AV clip in concern; ATC delta being a difference in ATC from the ATC sequence constituting the preceding AV clip; and an identifier of the encoding method used in the encoding.

The "sequence information" indicates, for each ATC sequence, information (ATC sequence information) that indicates what type of ATC sequence one or more source packet sequences stored in the stream file are. The ATC sequence information includes: information indicating, by the source packet number, where the source packet being the start point of the ATC exists; offsets between the STC sequence identifiers and the ATC sequence identifiers; and STC sequence information corresponding to each of a plurality of STC sequences. Each piece of STC sequence information includes: a packet number of a source packet storing the PCR of the STC sequence in concern; information indicating where in the STC sequence the source packet being the start point of the STC sequence exists; and the playback start time and the playback end time of the STC sequence.

The "program information" indicates the program structures of the main TS and sub-TSs managed as "AV clips" by the clip information file. The program information indicates what types of ESs are multiplexed in the AV clip. More specifically, the program information indicates what types of packet identifiers the ESs multiplexed in the AV clip have, and indicates the encoding method. Thus the program information indicates the encoding method, such as MPEG2-video or MPEG4-AVC, that is used to compress-encode the video stream.

The "characteristic point information" is information indicating, for each ES, where the characteristic points of a plurality of ESs multiplexed in the AV clip exist. The information indicating the characteristic point for each ES is called "entry map".

What becomes the characteristic point is different for each type of stream. In the case of the base-view and dependent-view video streams, the characteristic point is the access unit delimiter of the I-picture that is located at the start of the open GOP and closed GOP. In the case of the audio stream, the characteristic point is the access unit delimiter indicating the start positions of the audio frames that exist at regular intervals, for example, every one second. In the case of the PG and IG streams, the characteristic point is the access unit delimiter indicating the start positions of the display sets (display set of epoch start, display set of acquisition point) that are provided with all the functional segments necessary for the display, among the display sets of the graphics streams.

The ATC sequence and the STC sequence differ in how they represent the characteristic point. The ATC sequence represents the characteristic point by the source packet number. The STC sequence represents the characteristic point by using the PTS that indicates the time point on the STC time axis.

In view of the above-described differences, the entry map for each ES is composed of a plurality of entry points. More specifically, in each entry point constituting the entry map, a source packet number that indicates the location of the characteristic point in the ATC sequence is associated with a PTS that indicates the location of the characteristic point in the STC sequence. Further, each entry point includes a flag ("is_angle_change" flag) that indicates whether an angle change to the characteristic point is available. Since an angle change is available at the source packet located at the start of the interleave unit constituting the multi-angle section, the "is_angle_change" flag in the entry point indicating the starting source packet of the interleave unit is always set ON. Also, the entry point indicating the starting source packet of the interleave unit is associated with In_Time in the playitem information by the entry point.

The entry map for each ES indicates the source packet numbers of the characteristic points for respective stream types in correspondence with the PTSs. Accordingly, by referencing this entry map, it is possible to obtain, from an arbitrary time point in the ATC sequence, source packet numbers that indicate locations of the characteristic points for the ESs that are closest to the arbitrary time point.

This completes the explanation of the clip information file for 2D. Next is a detailed explanation of the clip information file for 3D. FIG. 47B shows the internal structure of clip information file for 3D. The clip information file for 3D includes: "clip dependent information (dependent-view management information)" which is clip information for the file dependent; and "clip base information (base-view management information)" which is clip information for the file base, as well as the "clip information for file 2D" that is regular clip information (management information). The reason is as follows. As described in Embodiment 2, the stereoscopic interleaved stream file is stored in a directory that is different from the directory in which the regular stream files are stored, to prevent them from mixing each other. Accordingly, the clip information files cannot be associated with the stereoscopic interleaved stream file. Thus the clip dependent information and the clip base information are stored in the clip information file for 2D.

The clip dependent information and the clip base information differ from the clip information file for 2D in that the clip dependent information and the clip base information include metadata that has the Extent start point sequence.

As shown in FIG. 47B, the clip dependent information includes the Extent start point sequence, and the clip base information also includes the Extent start point sequence. The Extent start point sequence included in the clip dependent information is composed of a plurality of pieces of Extent start point information, and each piece of Extent start point information indicates the source packet number of each source packet that is at the start of each of a plurality of Extents constituting the file dependent.

Similarly, the Extent start point sequence included in the clip base information is composed of a plurality of pieces of Extent start point information, and each piece of Extent start point information indicates the source packet number of each source packet that is at the start of each of a plurality of Extents constituting the file base.

The following describes the technical meaning of providing the plurality of pieces of Extent start point information.

The TSs stored in the stream files are originally one TS with only one ATC sequence. Accordingly, the location of the start of a portion that is created by dividing the original one cannot be determined even if the sequence information of the clip information file is referenced. On the other hand, the start of a divisional portion is a start of an Extent, as well. Thus, it is possible to recognize the start of a divisional portion by referencing the information of the file system such as the file entry or the Extent descriptor. However, since the information of the file system is managed by the middleware, it is extremely difficult for the application to reference the information of the Extent. In view of this problem, in the present embodiment, the Extent start point information is used so that the ordinal number of the packet that corresponds to the Extent in concern is indicated in the clip information.

FIGS. 103A through 103D show one example of Extent start point information of the base-view clip information, and one example of Extent start point information of the dependent-view clip information. FIG. 103A shows the Extent start point information of the base-view clip information, and the Extent start point information of the dependent-view clip information.

FIG. 103B shows base-view data blocks B[0], B[1], B[2], . . . , B[n] constituting the ATC sequence 1 and dependent-view data blocks D[0], D[1], D[2], . . . , D[n] constituting the ATC sequence 2. FIG. 103C shows the number of source packets of the dependent-view data blocks and the number of source packets of the base-view data blocks.

FIG. 103D shows a plurality of data blocks included in the stereoscopic interleaved stream file.

When, as shown in FIG. 103B, the ATC sequence 2 is constituted from dependent-view data blocks D[0], D[1], D[2], . . . , D[n], then "0", "b1", "b2", "b3", "b4", . . . , "bn" representing the relative source packet numbers of the dependent-view data blocks D[0], D[1], D[2], . . . , D[n] are written in "SPN_extent_start" in the Extent start point information of the file dependent.

When the ATC sequence 1 is constituted from base-view data blocks B[0], B[1], B[2], . . . , B[n], then "0", "a1", "a2", "a3", "a4", . . . , "an" representing the relative source packet numbers of the base-view data blocks B[0], B[1], B[2], . . . , B[n] are written in "SPN_extent_start" in the Extent start point information of the file base.

FIG. 103C shows the number of source packets with regard to an arbitrary dependent-view data block D[x] and an arbitrary base-view data block B[x] in the stereoscopic interleaved stream file. When the start source packet number of the dependent-view data block D[x] is "bx", and the start source packet number of the dependent-view data block D[x+1] is "$b_{x+1}$", the number of source packets constituting the D[x] is "$b_{x+1}$−bx".

Similarly, when the start source packet number of the base-view data block B[x] is "ax", and the start source packet number of the base-view data block B[x+1] is "$a_{x+1}$", the number of source packets constituting the B[x] is "$a_{x+1}$−ax".

When the start source packet number of the last base-view data block B[n] in the stereoscopic interleaved stream file is "an", and the number of source packets in the ATC sequence 1 is number_of_source_packets1, the number of source packets constituting the base-view data block B[n] is "number_of_source_packets1−an".

When the start source packet number of the last dependent-view data block D[n] in the stereoscopic interleaved stream file is "bn", and the number of source packets in the ATC sequence 2 is number_of_source_packets2, the number of source packets constituting the dependent-view data block D[n] is "number_of_source_packets2−bn".

FIG. 103D shows the start source packet numbers of the dependent-view data blocks and the start source packet numbers of the base-view data blocks in this example.

In the stereoscopic interleaved stream file, the start SPN of D[0] is "0", and the start SPN of B[0] is "b1".

The start SPN of D[1] is the sum of the number of source packets "b1" of the preceding D[0] and the number of source packets "a1" of B[0], and thus "b1+a1".

The start SPN of B[1] is the sum of the number of source packets "b1" of the preceding D[0], the number of source packets "a1" of B[0], and the number of source packets "b2−b1" of the preceding D[1]. Thus the start SPN of B[1] is "b2+a1(=b1+a1+b2−b1)".

The start SPN of D[2] is the sum of the number of source packets "b1" of the preceding D[0], the number of source packets "a1" of B[0], the number of source packets "b2−b1" of the preceding D[1], and the number of source packets "a2−a1" of B[1]. Thus the start SPN of D[2] is "b2+a2 (=b1+a1+b2−b1+a2−a1)".

The start SPN of B[2] is the sum of the number of source packets "b1" of the preceding D[0], the number of source packets "a1" of B[0], the number of source packets "b2−b1" of the preceding D[1], the number of source packets "a2−a1" of the preceding B[1], and the number of source packets "b3−b2" of D[2]. Thus the start SPN of B[2] is "b3+a2 (=b1+a1+b2−b1+a2−a1+b3−b2)".

FIGS. 104A through 104C are provided for the explanation of source packet numbers of arbitrary data blocks in the ATC sequences 1 and 2.

Considered here is a case for obtaining source packet numbers in a stereoscopic interleaved stream file D[x] which exists at the source packet number "bx", in the ATC sequence 2 shown in FIG. 104A. In this case, the start source packet number of D[x] is a sum of the relative source packet numbers of D[0], B[0], D[1], B[1], D[2], B[2], . . . , D[x−1], B[x−1]. Thus the start source packet number of D[x] is "bx+ax" as shown in FIG. 104B.

Also considered here is a case for obtaining source packet numbers in a stereoscopic interleaved stream file B[x] which exists at the source packet number "ax", in the ATC sequence 1 shown in FIG. 104A. In this case, the start source packet number of B[x] is a sum of the relative source packet numbers of D[0], B[0], D[1], B[1], D[2], B[2], . . . , D[x−1], B[x−1], D[x]. Thus the start source packet number of B[x] is "$b_{x+1}$+ax" as shown in FIG. 104B.

FIG. 104C shows a file base whose Extents are the above-described base-view data blocks, and a file dependent whose Extents are the above-described dependent-view data blocks.

The start LBN of EXT1[x], which is an Extent corresponding to B[x] of the file base, and the continuation length are obtained as follows. Also, the start LBN of EXT2[x], which is an Extent corresponding to D[x] of the file dependent, and the continuation length are obtained as follows.

The LBN is obtained from the start source packet number of D[x] by converting the source packet to the LBN by a calculation of ((bx+ax)*192/2048). Similarly, the LBN is obtained from the start source packet number of B[x] by converting the source packet to the LBN by a calculation of (($b_{x+1}$+ax)*192/2048). In these calculations, "192" represents the number of bytes that is the source packet size. "2048" represents the number of bytes that is the sector size (logical block size). The LBN of the Extent of the stereoscopic interleaved stream file that is closest to each of these LBNs is calculated by assigning the LBN obtained by the above-described conversion to "file_offset" being an argument of the function SSIF_LBN(file_offset). The function SSIF_LBN is a function that traces allocation descriptors of SSIF from the file_offset and returns an LBN corresponding to the file_offset.

Through these calculations, the start LBN of EXT2[x] is represented as SSIF_LBN((bx+ax)*192/2048), and the start LBN of EXT1[x] is represented as SSIF_LBN(($b_{x+1}$+ax)*192/2048).

On the other hand, the continuation length of EXT2[x] is represented as (SSIF_LBN(($b_{x+1}$+ax)*192/2048)−SSIF_LBN ((bx+ax)*192/2048)), and the continuation length of EXT1[x] is represented as (SSIF_LBN(($b_{x+1}$+$a_{x+1}$)*192/2048)−SSIF_LBN (($b_{x+1}$+ax)*192/2048)). It is possible to obtain the file base and the file dependent virtually by generating, on the memory, a file entry that indicates these LBNs and continuation lengths.

FIG. 48 shows a syntax of the Extent start point information. The "number_of_extent_units" indicates the number of Extent blocks whose ATS sections are the same.

The "for" statement whose control variable is "extent_id" defines base/dependent_view_extent_start_address and interleaved_base/dependent_view_extent_start_address as many times as the number specified by number_of_extents_units.

The base/dependent_view_extent_start_address [extent_id] indicates the start address of each Extent in the LR-separate file format. The interleaved_base/dependent_view_extent_start_address [extent_id] indicates the start address of each Extent in the LR-in-one file format. Of these, the base_view_extent_start_address [extent_id] indicates a relative address from the start of the file. The relative address is indicated in a unit of 192 bytes (SPN), and can support up to 768 GB with 32 bits. This is because the judgment in units of SPNs is easier since this is a search for the playback start address using EP_map. This may be in a unit of 6 KB since each Extent is 6-KB-align. Since 6 KB=192 bytes*32, a 5-bit shift is applicable. A structural element of the Extent start point information that represents the start address of Extent by the source packet number is referred to as "SPN_extent_start".

FIGS. 49A and 49B show the Extent start point information and the entry map table included in the clip information file. FIG. 49A shows an outline of the structure of the entry map table. The lead line eh1 indicates the close-up of the internal structure of the entry map table. As indicated by the lead line eh1, the entry map table includes "entry map header information", "Extent start type", "entry map for PID=0x1011", "entry map for PID=0x1012", "entry map for PID=0x1220", and "entry map for PID=0x1221".

The "entry map header information" stores information such as the PIDs of video stream indicated by the entry maps, and values of entry points.

The "Extent start type" indicates which of an Extent constituting the left-view video stream and an Extent constituting the right-view video stream is disposed first.

The "entry map for PID=0x1011", "entry map for PID=0x1012", "entry map for PID=0x1220", and "entry map for PID=0x1221" are entry maps for each PES stream constituted from a plurality of types of source packets. Each entry map includes "entry points", each of which is composed of a pair of PTS and SPN values. Also, and identification number of the entry point is called an "entry point ID" (hereinafter referred to as EP_ID), where the EP_ID of the first entry point is "0", and after this, the EP_ID for each entry point in the serial order is incremented by "1". By using the entry maps, the playback device can identify a source packet position corresponding to an arbitrary position on the time axis of the video stream. For example, when a special playback such as a fast forward or rewinding is to be performed, I-pictures registered in the entry maps can be identified, selected, and played back. This makes it possible to process efficiently without analyzing the AV clip. Also, the entry maps are created for each video stream which is multiplexed in the AV clip, and are managed by the PIDs.

The lead line eh2 indicates the close-up of the internal structure of the entry map for PID=0x1011. The entry map for PID=0x1011 includes entry points corresponding to EP_ID=0, EP_ID=1, EP_ID=2, and EP_ID=3. The entry point corresponding to EP_ID=0 indicates a correspondence among the "is_angle_change" flag having been set to "ON", SPN=3, and PTS=80000. The entry point corresponding to EP_ID=1 indicates a correspondence among the "is_angle_change" flag having been set to "OFF", SPN=1500, and PTS=270000.

The entry point corresponding to EP_ID=2 indicates a correspondence among the "is_angle_change" flag having been set to "OFF", SPN=3200, and PTS=360000. The entry point corresponding to EP_ID=3 indicates a correspondence among the "is_angle_change" flag having been set to "OFF", SPN=4800, and PTS=450000. Here, the "is_angle_change" flag indicates whether or not it is possible to decode independent of the entry point itself. When the video stream has been encoded by the MVC or MPEG-4 AVC and an IDR picture exists in the entry point, this flag is set to "ON". When a Non-IDR picture exists in the entry point, this flag is set to "OFF".

FIG. 49B shows which source packets are indicated by the entry points included in the entry map corresponding to the TS packet having the PID=0x1011 shown in FIG. 15A. The entry point corresponding to EP_ID=0 indicates SPN=3, and this source packet number is associated with PTS=80000. The entry point corresponding to EP_ID=1 indicates SPN=1500, and this source packet number is associated with PTS=270000.

The entry point corresponding to EP_ID=2 indicates SPN=3200, and this source packet number is associated with PTS=360000. The entry point corresponding to EP_ID=3 indicates SPN=4800, and this source packet number is associated with PTS=450000.

FIG. 50 shows the stream attribute included in the program information.

The lead line ah1 indicates the close-up of the internal structure of the stream attribute.

As indicated by the lead line ah1, the stream attribute information includes: stream attribute information of the left-view video stream constituted from the TS packet having packet ID "0x1011"; stream attribute information of the right-view video stream constituted from the TS packet having packet ID "0x1012"; stream attribute information of the audio stream constituted from the TS packets having packet IDs "0x1100" and "0x1101"; and stream attribute information of the PG stream constituted from the TS packets having packet IDs "0x1220" and "0x1221". As understood from this, the stream attribute information indicates what attributes the PES streams have, where the PES streams are constituted from a plurality of types of source packets. As indicated by the lead line ah1, attribute information of each stream included in the AV clip is registered for each PID.

FIG. 51 shows how entry points are registered in an entry map. The first row of FIG. 51 shows the time axis defined by the STC sequence. The second row shows the entry map included in the clip information. The third row shows the Extent start point information in the clip dependent information and the Extent start point information in the clip base information. The fourth row shows a source packet sequence constituting the ATC sequence. When the entry map specifies a source packet corresponding to SPN=n1 among the ATC sequence, the PTS of the entry map is set to "PTS=t1" on the time axis of the STC sequence. With this arrangement, it is possible to cause the playback device to perform a random access to the source packet corresponding to SPN=n1 in the ATC sequence at the time "PTS=t1". Also, when the entry map specifies a source packet corresponding to SPN=n21 among the ATC sequence, the PTS of the entry map is set to "PTS=t21" on the time axis of the STC sequence. With this arrangement, it is possible to cause the playback device to perform a random access to the source packet corresponding to SPN=n21 in the ATC sequence at the time "PTS=t21".

By using the entry maps, the playback device can identify the source packet corresponding to an arbitrary position on the time axis of the video stream. For example, when a special playback such as a fast forward or rewinding is to be performed, I-pictures registered in the entry maps can be identified, selected, and played back. This makes it possible to process efficiently without analyzing the AV clip.

Also, in the third row, Extent start point [i] in the clip dependent information and Extent start point [j] in the clip base information indicate the start source packet numbers of Extents constituting the dependent-view video stream and the base-view video stream in the fourth row, respectively.

With this structure, it is possible to extract only the source packet sequence constituting the base-view video stream, by reading the source packet indicated by the Extent start point [i] in the clip dependent information through a source packet immediately before the source packet indicated by the Extent start point [j] in the clip base information.

It is also possible to extract only the source packet sequence constituting the base-view video stream, by reading the source packet indicated by the Extent start point [j] in the clip base information through a source packet immediately before the source packet indicated by the Extent start point [i+1] in the clip dependent information.

Further, it is possible to restore the ATC sequence that constitutes the base-view video stream by combining the source packets constituting the base-view video stream; and it is possible to restore the ATC sequence that constitutes the dependent-view video stream by combining the source packets constituting the dependent-view video stream.

FIG. 52 shows how the ATC sequence is restored from the data blocks constituting the stereoscopic interleaved stream file.

The fourth row of FIG. 52 shows a plurality of data blocks that constitute the stereoscopic interleaved stream file. The third row shows the source packet sequence multiplexed in the main TS and the sub-TS.

The second row shows a set of STC sequence 2 constituting the dependent view, an entry map, and ATC sequence 2 constituting the dependent view. The first row shows a set of STC sequence 1 constituting the dependent view, an entry map, and ATC sequence 1 constituting the dependent view. The arrows extending from the third row to the first and the second rows schematically show that the ATC sequences 1 and 2 are restored from the data blocks of the two TSs (main TS and sub-TS) interleaved in the stereoscopic interleaved stream file. These ATC sequences are associated with the STC sequences by the entry map in the clip information.

This completes the description of the recording medium in the present embodiment. The following describes the playback device in detail.

The playback device in the present embodiment has a structure in which the reading unit receives inputs of source packets from two recording mediums. For this purpose, the reading unit includes two drives and two read buffers. The two drives are used to access the two recording mediums, respectively. The two read buffers are used to temporarily store the source packets input from the two drives and output them to the decoder. An ATC sequence restoring unit is provided between the two drives and the two read buffers. The ATC sequence restoring unit separates the ATC sequence constituting the base-view stream and the ATC sequence constituting the dependent-view stream, from the source packets in the interleaved stream file read from one recording medium, and writes the two ATC sequences into the two read buffers, respectively. With this structure, the playback device can process the ATC sequence constituting the base-view video stream and the ATC sequence constituting the dependent-view video stream as if they have been read from different recording mediums, respectively. FIG. 53A shows the internal structure of the reading unit provided with the ATC sequence restoring unit. As described above, the ATC sequence restoring unit is provided between the two drives and the two read buffers. The arrow B0 symbolically indicates the input of the source packet from one drive. The arrow B1 schematically indicates the writing of the ATC sequence 1 constituting the base-view video stream. The arrow D1 schematically indicates the writing of the ATC sequence 2 constituting the dependent-view video stream.

FIG. 53B shows how the two ATC sequences obtained by the ATC sequence restoring unit are treated. The PID filters provided in the demultiplexing unit are shown in the middle part of the FIG. 53B. On the left-hand side of the figure, the two ATC sequences obtained by the ATC sequence restoring unit are shown. The right-hand side of the figure shows the base-view video stream, dependent-view video stream, base-view PG stream, dependent-view PG stream, base-view IG stream, and dependent-view IG stream, which are obtained by demultiplexing the two ATC sequences. The demultiplexing performed by the two ATC sequences is based on the basic stream selection table and the extension stream selection table described in Embodiment 1. The ATC sequence restoring unit is realized by creating a program that causes the hardware resource to perform the process shown in FIG. 54. FIG. 54 shows the procedure for restoring the ATC sequence.

In step S91, the ATC sequence for base-view is set as the ATC sequence 1, and the ATC sequence for dependent-view is set as the ATC sequence 2. In step S92, the variable "x" is initialized to "1". The variable "x" specifies a base-view data block and a dependent-view data block. After this, the control enters a loop in which steps S94 through S96 are repeatedly performed as follows.

It is judged whether or not a source packet number bx specified by the variable "x" is equal to a source packet number bn specified by the last numeral "n" of the base-view data block (step S93). When the result of the judgment is in the negative (No in step S93), the source packets from the source packet (bx+ax), which is specified by the source packet number "bx+ax", to the source packet immediately before the source packet ($b_{x+1}$+ax) specified by the source packet number "$b_{x+1}$+ax" are added into the ATC sequence 2 (step S94). Then, the source packets from the source packet (bx+1+ax) to the source packet immediately before the source packet (bx+1+ax+1) are added into the ATC sequence 1 (step S95). And then the variable "x" in incremented (step S96). These steps are repeated until it is judged Yes in step S93.

When it is judged Yes in step S93, as many source packets as the number specified by "number_of_source_packet2-$bn$" starting from the source packet number "bn" are added into the ATC sequence 2 (step S97). And as many source packets as the number specified by "number_of_source_packet1-$bn$" starting from the source packet number "an" are added into the ATC sequence 1 (step S98).

After the ATC sequences 1 and 2 are restored through the above-described steps, the file base is virtually opened by generating, in the memory, the file entry that indicates the start LBN of the base-view data block and the continuation length (step S99). Similarly, the file dependent is virtually opened by generating, in the memory, the file entry that indicates the start LBN of the dependent-view data block and the continuation length (step S100).

<Technical Meaning of Opening File Base>

When a random access from an arbitrary time point is to be performed, a sector search within a stream file needs to be performed. The sector search is a process for identifying a source packet number of a source packet corresponding to the arbitrary time point, and reading a file from a sector that contains a source packet of the source packet number.

Since the size of one Extent constituting the stereoscopic interleaved stream file is large, the sector search requires a wide range of searching. In that case, when a random access from an arbitrary time point is performed, it may take a long time to identify the reading-target sector.

This is because, in the interleaved stream file, data blocks constituting the base-view video stream and the dependent-view video stream are disposed in the interleaved manner to constitute one long Extent, and the allocation descriptor of the file entry of the interleaved stream file merely indicates the start address of the long Extent.

In contrast, the file base is composed of a plurality of short Extents, and the start address of each Extent is written in the allocation descriptor. As a result, the sector search requires a narrow range of searching. Thus, when a random access from an arbitrary time point is performed, the reading-target sector can be identified in a short time.

That is to say, since the data blocks constituting the base-view video stream are managed as Extents of the file base, and the start address of the data block is written in the allocation descriptor in the file entry corresponding to the file base, it is possible to quickly reach the sector including the source packet at the target random access position, by starting the sector search from the start address of the Extent that contains the target random access position.

With the above-described structure in which the data blocks constituting the base-view video stream are managed as Extents of the file base, and the start address of each Extent and the continuation length are written in the allocation descriptor in the file entry corresponding to the file base, it is possible to perform a random access from an arbitrary time point in the base-view video stream at a high speed.

More specifically, the sector search is performed as follows. First, the entry map corresponding to the base-view video stream is used to detect a source packet number that is the random access position corresponding to the arbitrary time point.

Next, the Extent start point information in the clip information corresponding to the base-view video stream is used to detect an Extent that contains the source packet number that is the random access position.

Further, the allocation descriptor in the file entry corresponding to the file base is referenced to identify the start sector address of the Extent that contains the source packet number that is the random access position. Then a file read is performed by setting a file pointer to the start sector address, and a packet analysis is executed onto the read source packet to identify the source packet with the source packet number that is the random access position. Then the identified source packet is read. With this procedure, the random access to the main TS is executed efficiently. This also applies to the sub-TS.

As described above, according to the present embodiment, Extents of the base-view video stream and the dependent-view video stream in the interleaved stream file are supplied to the demultiplexing unit and the decoder after they are rearranged based on the Extent start point information. Thus the decoder and program can treat, as the files virtually existing on the recording medium, the file base storing the base-view video stream and the file dependent storing the dependent-view video stream.

In this structure, the base-view video stream and the dependent-view video stream for the stereoscopic viewing are recorded on the recording medium, while the base-view video stream and the dependent-view video stream can be accessed separately. With this structure, the processing efficiency of the playback device is improved.

It should be noted here that, while the Extent start point information can indicate the start of Extent in a unit of byte, it is preferable that the start of Extent is indicated in a unit of a fixed length when Extents are aligned with reading blocks with a fixed length such as the ECC blocks. This restricts the amount of information that is required for identifying the addresses.

Embodiment 4

The present embodiment explains about the demultiplexing unit, decoder, and hardware scale of the plane memory.

The demultiplexing unit of the present embodiment includes as many pairs of a source depacketizer and a PID filter as the number of stream input lines.

FIGS. 55A and 55B show the internal structures of the demultiplexing unit and the video decoder.

FIG. 55A shows the decoder model of the demultiplexing unit. In this example, the demultiplexing unit includes two pairs of a source depacketizer and a PID filter. This is because originally the demultiplexing unit processes two lines of stream inputs from two recording mediums. In the 2D playback mode, the demultiplexing unit processes stream inputs from two recording mediums, and in the 3D playback mode, the demultiplexing unit processes two lines of stream inputs that are "L" and "R", and "2D" and "depth".

As shown in FIG. 55A, the demultiplexing unit includes a source depacketizer 22, a PID filter 23, a source depacketizer 27, and a PID filter 28.

The source depacketizer 22, in the state where a source packet is stored in a read buffer 2a, in the instant when the value of the ATC generated by the ATC counter and the value of the ATS of the source packet stored in the read buffer 2a become identical, transfers only the source packet (TS packet) to the PID filter 23 in accordance with the recording rate of the AV clip. In the transfer, the input time to the decoder is adjusted in accordance with the ATS of each source packet.

The PID filter 23 outputs, among the TS packets output from the source depacketizer 22, TS packets whose PIDs match the PIDs required for the playback, to the decoders according to the PIDs.

The source depacketizer 26, in the state where a source packet is stored in a read buffer 2b, in the instant when the value of the ATC generated by the ATC counter and the value of the ATS of the source packet stored in the read buffer 2b become identical, transfers only the source packet (TS packet) to the PID filter 27 in accordance with the system rate of the AV clip. In the transfer, the input time to the decoder is adjusted in accordance with the ATS of each source packet.

The PID filter 27 outputs, among the TS packets output from the source depacketizer 26, TS packets whose PIDs match the PIDs required for the playback, to the decoders according to the PIDs.

Next, the internal structure of a primary video decoder 31 will be described.

FIG. 55B shows the internal structure of the primary video decoder 31. As shown in FIG. 55B, the PID filter 23 includes a TB 51, an MB 52, an EB 53, a TB 54, an MB 55, an EB 56, a decoder core 57, a buffer switch 58, a DPB 59, and a picture switch 60.

The Transport Buffer (TB) 51 is a buffer for temporarily storing a TS packet containing the left-view video stream, as it is after being output from the PID filter 23.

The Multiplexed Buffer (MB) 52 is a buffer for temporarily storing a PES packet when the video stream is output from the TB to the EB. When the data is transferred from the TB to the MB, the TS header is removed from the TS packet.

The Elementary Buffer (EB) 53 is a buffer for storing the video access unit in the encoded state. When the data is transferred from the MB to the EB, the PES header is removed.

The Transport Buffer (TB) 54 is a buffer for temporarily storing a TS packet containing the right-view video stream, as it is after being output from the PID filter.

The Multiplexed Buffer (MB) 55 is a buffer for temporarily storing a PES packet when the video stream is output from the TB to the EB. When the data is transferred from the TB to the MB, the TS header is removed from the TS packet.

The Elementary Buffer (EB) 56 is a buffer for storing the video access unit in the encoded state. When the data is transferred from the MB to the EB, the PES header is removed.

The decoder core 57 generates a frame/field image by decoding each access unit constituting the video stream at predetermined decoding times (DTSs). Since there are a plurality of compress-encoding methods, such as MPEG2, MPEG4 AVC, and VC1, that can be used to compress-encode the video stream that is to be multiplexed into the AV clip, the decoding method of the decoder core 57 is selected in accordance with the stream attribute. When it decodes the picture data constituting the base-view video stream, the decoder core 57 performs a motion compensation using the picture data, which exist in the future and past directions, as reference pictures. When it decodes each picture data constituting the dependent-view video stream, the decoder core 57 performs a motion compensation using the picture data, which constitute the base-view video stream, as reference pictures. After the picture data are decoded in this way, the decoder core 57 transfers the decoded frame/field image to the DPB 59, and transfers the corresponding frame/field image to the picture switch at the timing of the display time (PTS).

The buffer switch 58 determines from which of the EB 53 and the EB 56 the next access unit should be extracted, by using the decode switch information that was obtained when the decoder core 57 decoded the video access units, and transfers a picture from either the EB 53 or the EB 56 to the decoder core 57 at the timing of the decoding time (DTS) assigned to the video access unit. Since the DTSs of the left-view video stream and the right-view video stream are set to arrive alternately in units of pictures on the time axis, it is preferable that the video access units are transferred to the decoder core 57 in units of pictures when decoding is performed ahead of schedule disregarding the DTSs.

The Decoded Picture Buffer (DPB) 59 is a buffer for temporarily storing the decoded frame/field image. The DPB 59 is used by the video decoder 57 to refer to the decoded pictures when the video decoder 57 decodes a video access unit such as the P-picture or the B-picture having been encoded by the inter-picture prediction encoding.

The picture switch 60, when the decoded frame/field image transferred from the video decoder 57 is to be written into a video plane, switches the writing destination between the left-view video plane and the right-view video plane. When the left-view stream is targeted, non-compressed picture data is written into the left-view video plane in a moment, and when the right-view stream is targeted, non-compressed picture data is written into the right-view video plane in a moment.

The operation of the video decoder in the mode switching is described. In the LR method, the 2D image is displayed when the mode is switched to the mode in which only the left-view images are output. In the depth method, the 2D image is displayed when the processing of the depth information is stopped and the depth information is not added. Note that the LR method and the depth method require different data. Thus, when switching between them is performed, the streams to be decoded need to be re-selected.

Next, the size of the decoder and the plane memory in the playback device will be described.

The determination of whether the device is to be provided with one decoder or two decoders, or one plane or two planes, is made based on the combination of the stream type and the stereoscopic method.

When the 3D-LR method is adopted and the playback target is an MVC video stream, the playback device is provided with one decoder and two planes.

When the 3D-Depth method is adopted, the playback device is provided with one decoder and two planes, and a parallax image generator is required. This also applies to the primary video stream and the secondary video stream.

The reason that the playback device has one decoder when the MVC video stream is played back is that non-compressed left-view and right-view picture data are used as reference images to realize the motion compensation for the macro blocks of each piece of compressed picture data. The non-compressed left-view and right-view picture data to be used as reference images are stored in a decoded-picture buffer.

This completes the description of the video decoder and the video plane.

For the PG stream: the playback device is provided with one decoder and one plane when the "1 plane+offset" method is adopted; and the playback device is provided with two decoders and two planes when the 3D-LR method or the 3D-Depth method is adopted.

For the IG stream: the playback device is provided with one decoder and one plane when the "1 plane+offset" method is adopted; and the playback device is provided with two decoders and two planes when the 3D-LR method is adopted.

For the text subtitle stream for which the 3D-LR method cannot be adopted: the playback device is provided with one decoder and one plane when the "1 plane+offset" method is adopted; and the playback device is provided with one decoder and two planes when the 3D-Depth method is adopted.

Next, the internal structure of the PG stream, and the internal structure of the PG decoder for decoding the PG stream will be described.

Each of the left-view PG stream and the right-view PG stream includes a plurality of display sets. The display set is a set of functional segments that constitute one screen display. The functional segments are processing units that are supplied to the decoder while they are stored in the payloads of the PES packets which each have the size of approximately 2 KB, and are subjected to the playback control with use of the DTSs and PTSs.

The display set falls into the following types.

A. Epoch-Start Display Set

The epoch-start display set is a set of functional segments that start the memory management by resetting the composition buffer, code data buffer, and graphics plane in the graphics decoder. The epoch-start display set includes all functional segments required for composition of the screen.

B. Normal-Case Display Set

The normal-case display set is a display set that performs the composition of the screen while continuing the memory management of the composition buffer, code data buffer, and graphics plane in the graphics decoder. The normal-case display set includes functional segments that are differentials from the preceding display set.

C. Acquisition-Point Display Set

The acquisition-point display set is a display set that includes all functional segments required for composition of the screen, but does not reset the memory management of the composition buffer, code data buffer, and graphics plane in the graphics decoder. The acquisition-point display set may include functional segments that are different from those in the previous display set.

D. Epoch-Continue Display Set

The epoch-continue display set is a display set that continues the memory management of the composition buffer, code data buffer, and graphics plane in the playback device as it is when the connection between a playitem permitting the playback of the PG stream and a playitem immediately before the playitem is the "seamless connection" (CC=5) that evolves a clean break. In this case, the graphics objects obtained in the object buffer and the graphics plane are kept to be present in the object buffer and the graphics plane, without being discarded.

Certain time points on the playback time axis of the STC sequence are assigned to the start point and end point of these display sets, and the same times are assigned to the left view and to the right view. Also, for the left-view PG stream and the right-view PG stream, the types of the display sets that are present on the same time point on the time axis are the same. That is to say, when the display set on the left view side is the epoch-start display set, the display set on the right view side that is at the same time point on the time axis of the STC sequence is the epoch-start display set.

Further, when the display set on the left view side is the acquisition-point display set, the display set on the right view side that is at the same time point on the time axis of the STC sequence is the acquisition-point display set.

Each display set includes a plurality of functional segments. The plurality of functional segments include the following.

(1) Object Definition Segment

The object definition segment is a functional segment for defining the graphics object. The object definition segment defines the graphics object by using a code value and a run length of the code value.

(2) Pallet Definition Segment

The pallet definition segment includes pallet data that indicates correspondence among each code value, brightness, and red color difference/blue color difference. The same correspondence among the code value, brightness, and color difference is set in both the pallet definition segment of the left-view graphics stream and the pallet definition segment of the right-view graphics stream.

(3) Window Definition Segment

The window definition segment is a functional segment for defining a rectangular frame called "window" in the plane memory that is used to extend the non-compressed graphics object onto the screen. The drawing of the graphics object is restricted to the inside of the plane memory, and the drawing of the graphics object is not performed outside the window.

Since a part of the plane memory is specified as the window for displaying the graphics, the playback device does not need to perform the drawing of the graphics for the entire plane. That is to say, the playback device only needs to perform the graphics drawing onto the window that has a limited size. The drawing of the part of the plane for display other than the window can be omitted. This reduces the load of the software on the playback device side.

(4) Screen Composition Segment

The screen composition segment is a functional segment for defining the screen composition using the graphics object, and includes a plurality of control items for the composition controller in the graphics decoder. The screen composition segment is a functional segment that defines in detail the display set of the graphics stream, and defines the screen composition using the graphics object. The screen composition falls into the types such as Cut-In/-Out, Fade-In/-Out, Color Change, Scroll, and Wipe-In/-Out. With use of the screen composition defined by the screen composition segment, it is possible to realize display effects such as deleting a subtitle gradually, while displaying the next subtitle.

(5) End Segment

The end segment is a functional segment that is located at the end of a plurality of functional segments belonging to one display set. The playback device recognizes a series of segments from the screen composition segment to the end segment as the functional segments that constitute one display set.

In the PG stream, the start time point of the display set is identified by the DTS of the PES packet storing the screen composition segment, and the end time point of the display set is identified by the PTS of the PES packet storing the screen composition segment.

The left-view graphics stream and the right-view graphics stream are packetized elementary streams (PES). The screen composition segment is stored in the PES packet. The PTS of the PES packet storing the screen composition segment indicates the time when the display by the display set to which the screen composition segment belongs should be executed.

The value of the PTS of the PES packet storing the screen composition segment is the same for both the left-view video stream and the right-view video stream.

Decoder Models of PG Decoder

The PG decoder includes: a "coded data buffer" for storing functional segments read from the PG stream; a "stream graphics processor" for obtaining a graphics object by decoding the screen composition segment; an "object buffer" for storing the graphics object obtained by the decoding; a "composition buffer" for storing the screen composition segment; and a "composition controller" for decoding the screen composition segment stored in the composition buffer, and performing a screen composition on the graphics plane by using the graphics object stored in the object buffer, based on the control items included in the screen composition segment.

A "transport buffer" for adjusting the input speed of the TS packets constituting the functional segments is provided at a location before the graphics plane.

Also, at locations after the graphics decoder, a "graphics plane", a "CLUT unit" for converting the pixel codes constituting the graphics object stored in the graphics plane into values of brightness/color difference based on the pallet definition segment, and a "shift unit" for the plane shift are provided.

The pipeline in the PG stream makes it possible to simultaneously executes the following processes: the process in which the graphics decoder decodes an object definition segment belonging to a certain display set and writes the graphics object into the graphics buffer; and the process in which a graphics object obtained by decoding an object definition segment belonging to a preceding display set is written from the object buffer to the plane memory.

FIGS. 56A and 56B show the internal structure of the graphics decoder for the PG stream. FIG. 56A shows a decoder model for displaying data in the "1 plane+offset" mode. FIG. 56B shows a decoder model for displaying data in the LR mode.

In FIGS. 56A and 56B, the graphics decoder itself is represented by a frame drawn by the solid line, and a portion that follows the graphics decoder is represented by a frame drawn by the chain line.

FIG. 56A shows the structure composed of one graphics decoder and one graphics plane. However, the output of the graphics plane branches to the left view and the right view. Thus two shift units are provided in correspondence with the outputs to the left view and the right view, respectively.

FIG. 56B shows that two series of "transport buffer"-"graphics decoder"-"graphics plane"-"CLUT unit" are provided so that the left-view stream and the right-view stream can be processed independently.

The offset sequence is contained in the dependent-view video stream. Thus, in the plane offset format, one graphics decoder is provided, and the output from the graphics decoder is supplied to the left view and the right view by switching therebetween.

The PG decoder performs the following to switch between 2D and 3D.

1. The mutual switching between the "1 plane+offset" mode and the 2D mode is performed seamlessly. This is realized by invalidating the "Offset".

2. When switching between the 3D-LR mode and the 2D mode is performed, the display of the subtitle temporarily disappears because the switching between the modes requires switching between PIDs. This is the same as the switching between streams.

3. When switching between the 3D-LR mode and the L mode is performed, switching is made to the display of only L (base-view side). The seamless switching is possible, but there is a possibility that the display position may be shifted.

When switching between the 3D-depth mode and the 2D mode is performed, it is possible to switch between graphics objects seamlessly by, in the background while the 2D is displayed, generating the left-view and right-view graphics objects in advance by decoding the depth information indicated by grayscale.

When the switching is executed by the PG decoder, switching from the depth mode or the "1 plane+offset" to the 2D mode is easy. However, in the case of the 3D-LR method, the graphics objects for the stereoscopic viewing and the 2D are different from each other. Thus, the PG stream that is processed when the switching is to be made needs to be changed, and there is a possibility that the graphics object is not displayed until the next PG stream is supplied.

To prevent the provision of a period in which the graphics object is not displayed, switching to only the base-view graphics object, not to the front-view 2D graphics object, is available. In this case, an image slightly shifted to the left may be displayed. Also, the management data may be set to indicate which method should be used when the stereoscopic PG is switched to the 2D PG.

Decoder Models of Text Subtitle Decoder

The text subtitle decoder is composed of a plurality of pieces of subtitle description data.

The text subtitle decoder includes: a "subtitle processor" for separating the text code and the control information from the subtitle description data; a "management information buffer" for storing the text code separated from the subtitle description data; a "text render" for extending the text code in the management information buffer to the bit map by using the font data; an "object buffer" for storing the bit map obtained by the extension; and a "drawing control unit" for controlling the text subtitle playback along the time axis by using the control information separated from the subtitle description data.

The text subtitle decoder is preceded by: a "font preload buffer" for preloading the font data; a "TS buffer" for adjusting the input speed of the TS packets constituting the text subtitle stream; and a "subtitle preload buffer" for preloading the text subtitle stream before the playback of the playitem.

The graphics decoder is followed by a "graphics plane"; a "CLUT unit" for converting the pixel codes constituting the graphics object stored in the graphics plane into values of brightness and color difference based on the pallet definition segment; and a "shift unit" for the plane shift.

FIGS. 57A and 57B show the internal structure of the text subtitle decoder. FIG. 57A shows a decoder model of the text subtitle decoder in the "1 plane+offset" mode. FIG. 57B shows a decoder model of the text subtitle decoder in the 3D-LR method. In FIGS. 57A and 57B, the text subtitle decoder itself is represented by a frame drawn by the solid line, a portion that follows the text subtitle decoder is represented by a frame drawn by the chain line, and a portion that precedes the text subtitle decoder is represented by a frame drawn by the dotted line.

FIG. 57A shows that the output of the graphics plane branches to the left view and the right view. Thus two shift units are provided in correspondence with the outputs to the left view and the right view, respectively.

FIG. 57B shows that the left-view graphics plane and the right-view graphics plane are provided, and that the bit map extended by the text subtitle decoder is written into the graphics planes. In the text subtitle decoder of the 3D-LR method, the color pallet information has been extended, and three colors have been added for the sake of "depth" in addition to the three colors for the characters, background, and edge of the subtitle. The rendering engine can render the subtitle.

The text subtitle stream differs from the PG stream as follows. That is to say, the font data and the character code are sent, not the graphics data is sent as the bit map, so that the rendering engine generates the subtitle. Thus the stereoscopic viewing of the subtitle is realized in the "1 plane+offset" mode. When the text subtitle is displayed in the "1 plane+offset" mode, switching between modes is made by switching between font sets, or switching between rendering methods. There is also known a method for switching between modes by defining the L/R font set or the OpenGL font set. It is also possible for the rendering engine to perform the 3D display.

In the 3D-LR mode, the stereoscopic playback is realized by defining the font set and the OpenGL font set for the base view independently of the font set and the OpenGL font set for the dependent view. It is also possible for the rendering engine to render the 3D font to realize the stereoscopic playback.

In the 3D-depth mode, the depth images are generated by the rendering engine.

This completes the description of the text subtitle stream and the text subtitle decoder. Next, the internal structure of the IG stream and the structure of the IG decoder will be described.

IG Stream

Each of the left-view IG stream and the right-view IG stream includes a plurality of display sets. Each display set includes a plurality of functional segments. As is the case with the PG stream, the display set falls into the following types. epoch-start display set, normal-case display set, acquisition-point display set, and epoch-continue display set.

The plurality of functional segments belonging to these display sets include the following types.

(1) Object Definition Segment

The object definition segment of the IG stream is the same as that of the PG stream. However, the graphics object of the IG stream defines the in-effect and out-effect of pages, the normal, selected, and active states of the button members. The object definition segments are grouped into those that define the same state of the button members, and those that constitute the same effect image. The group of object definition segments defining the same state is called "graphics data set".

(2) Pallet Definition Segment

The pallet definition segment of the IG stream is the same as that of the PG stream.

(3) Interactive Control Segment

The interactive control segment includes a plurality of pieces of page information. The page information is information that defines a screen composition of the multi-page menu. Each piece of page information includes an effect sequence, a plurality of pieces of button information, and a reference value of a pallet identifier.

The button information is information that realizes an interactive screen composition on each page constituting the multi-page menu by displaying the graphics object as one state of a button member.

The effect sequence constitutes the in-effect or the out-effect with use of the graphics object, and includes effect information, where the in-effect is played back before a page corresponding to the page information is displayed, and the out-effect is played back after the page is displayed.

The effect information is information that defines each screen composition for playing back the in-effect or the out-effect. The effect information includes: a screen composition object that defines a screen composition to be executed in the window (partial area) defined by the window definition segment on the graphics plane; and effect period information that indicates a time interval between the current screen and the next screen in the same area.

The screen composition object in the effect sequence defines a control that is similar to the control defined by the screen composition segment of the PG stream. Among the plurality of object definition segments, an object definition segment that defines the graphics object used for the in-effect is disposed at a location that precedes an object definition segment that defines the graphics object used for the button member.

Each piece of button information in the page information is information that an interactive screen composition on each page constituting the multi-page menu by displaying the graphics object as one state of a button member. The button information includes a set button page command that, when a corresponding button member becomes active, causes the playback device to perform the process of setting a page other than the first page as the current page.

To make it possible for the offset in the plane shift to be changed for each page during a playback of the IG stream, a navigation command for changing the offset is incorporated into the button information, and the "auto-activate" of the navigation command is defined in the corresponding piece of button information, in advance. This makes it possible to change automatically the value or direction of the offset defined in the stream registration information of the IG stream.

(4) End Segment

The end segment is a functional segment that is located at the end of a plurality of functional segments belonging to one display set. A series of segments from the interactive control segment to the end segment are recognized as the functional segments that constitute one display set.

The following are the control items of the interactive control segment that are the same for both the left-view graphics stream and the right-view graphics stream: button adjacency information; selection time-out time stamp; user time-out duration; and composition time-out information.

1. Button Adjacency Information

The button adjacency information is information that specifies a button to be changed to the selected state when a key operation specifying any of upward, downward, leftward, and rightward is performed while a certain button adjacent to the specified button is in the selected state.

2. Selection Time-Out Time Stamp

The selection time-out time stamp indicates a time-out time that is required to automatically activate a button member in the current page and cause the playback device to execute the button member.

3. User Time-Out Duration

The user time-out duration indicates a time-out time that is required to return the current page to the first page so that only the first page is displayed.

4. Composition Time-Out Information

The composition time-out information indicates a time period that is required to end an interactive screen display by the interactive control segment. With respect to the IG stream, the start time point of a display set is identified by the DTS of the PES packet storing the interactive control segment, and the end time point of the display set is identified by the composition time-out time of the interactive control segment. The same DTS and the same composition time-out time are set for both the left view and the right view.

Decoder Models of IG Decoder

The IG decoder includes: a "coded data buffer" for storing functional segments read from the IG stream; a "stream graphics processor" for obtaining a graphics object by decoding the screen composition segment; an "object buffer" for storing the graphics object obtained by the decoding; a "composition buffer" for storing the screen composition segment; and a "composition controller" for decoding the screen composition segment stored in the composition buffer, and performing a screen composition on the graphics plane by using the graphics object stored in the object buffer, based on the control items included in the screen composition segment.

A "transport buffer" for adjusting the input speed of the TS packets constituting the functional segments is provided at a location before the graphics plane.

Also, at locations after the graphics decoder, a "graphics plane", a "CLUT unit" for converting the pixel codes constituting the graphics object stored in the graphics plane into values of brightness/color difference based on the pallet definition segment, and a "shift unit" for the plane shift are provided.

FIGS. 58A and 58B show decoder models of the IG decoder. In FIGS. 58A and 58B, the IG decoder itself is represented by a frame drawn by the solid line, a portion that follows the graphics decoder is represented by a frame drawn by the chain line, and a portion that precedes the IG decoder is represented by a frame drawn by the dotted line.

FIG. 58A shows a decoder model for displaying the 2D-format IG stream in the LR format in the "1 plane+offset" mode. FIG. 58B shows a decoder model of the IG stream for displaying LR-format data.

These decoders include a circuit for reflecting values of system parameters onto the offsets so that the program can control the depth information of the menu graphics.

FIG. 58B shows a two-decoder model that enables the offset values to be changed with use of a command. Accordingly, in this decoder model, the depth information of the menu can be changed by the command. Note that different offset values may be set for the left view and the right view. On the other hand, in the depth method, the offset is invalid.

The composition controller in the graphics decoder realizes the initial display of the interactive screen by displaying the current button, among a plurality of button members in the interactive screen, by using the graphics data of the graphics data set corresponding to the selected state, and displaying the remaining buttons by using the graphics data set corresponding to the normal state.

When a user operation specifying any of upward, downward, leftward, and rightward is performed, it writes, into the button number register, a number of a button member that is present in the direction specified by the user operation among a plurality of button members in the normal state and adjacent to the current button, the writing causing the button member having become newly the current button to change from the normal state to the selected state.

In the interactive screen, when a user operation for changing the button member from the selected state to the active state is performed, the interactive screen is updated by extracting the graphics data constituting the active state from the graphics data set and displaying the extracted graphics data.

The update of the interactive screen should be executed in common to the left view and the right view. Thus it is preferable that the left-view graphics decoder and the right-view graphics decoder have in common a composition controller for the two-decoder model.

In the above-described case, the inter-changing is realized by using the same navigation command for both the left view and the right view of the stereoscopic IG stream, and setting the same button structure for both the 3D graphics object and the 2D graphics object.

When switching between the 2D IG stream and the stereoscopic IG stream, it is possible to change only the displayed graphics object when the attribute and number and the like of the navigation command and button information are the same for both. Switching from the 3D-LR mode to the display of only the L image can be made without reloading, but there is a possibility that the display position may be shifted. It is preferable that the playback device performs the switching based on a flag set to indicate which is adopted by the title producer.

The following are notes on switching between modes.

Reloading does not occur when switching between the "1 plane+offset" mode and the 2D mode is performed. This is because the IG stream does not need to be reloaded, and only invalidation of the offset is required.

Reloading occurs when switching between the 3D-LR mode and the 2D mode is performed. This is because the streams are different.

Reloading does not occur when switching between the 3D-depth mode and the 2D mode is performed if the decoding of the depth information has been completed at the preloading.

The seamless playback may not be guaranteed if the reloading of the IG stream occurs in connection with switching between the 2D mode and the 3D mode, even if the preload model, which reads out the IG stream into the memory before the start of the AV playback, has been adopted.

This completes the description of the IG stream and the IG decoder. Next, the plane memory will be described in detail.

The following describes the plane memory structure in the "1 plane+offset" mode method.

The layer overlaying in the plane memory is achieved by executing a superimposing process onto all combinations of the layers in the layer model. In the superimposing process, pixel values of pixel data stored in the plane memories of the two layers are superimposed. The layer overlaying by the layer overlay unit 208 is achieved by executing a superimposing process onto all combinations of two layers among the layers in the layer model. In the superimposing process, pixel values of pixel data stored in the plane memories of the two layers are superimposed in the layer model of the plane memory.

The superimposing between layers is performed as follows. A transmittance α as a weight is multiplied by a pixel value in unit of a line in the plane memory of a certain layer, and a weight of (1−transmittance α) is multiplied by a pixel value in unit of a line in the plane memory of a layer below the certain layer. The pixel values with these brightness weights are added together. The resultant pixel value is set as a pixel value in unit of a line in the layer. The layer overlaying is realized by repeating this superimposing between layers for each pair of corresponding pixels in a unit of a line in adjacent layers in the layer model.

A multiplication unit for multiplying each pixel value by the transmittance to realize the layer overlaying, an addition unit for adding up the pixels, and a scaling/positioning unit for performing the scaling and positioning of the secondary video are provided at locations after the plane memory, as well as the above-described CLUT unit, shift unit and the like.

FIG. 59 shows a circuit structure for overlaying the outputs of these decoder models and outputting the result in the 3D-LR mode. In FIG. 59, the layer models composed of the primary video plane, secondary video plane, PG plane, and IG plane are represented by the frames drawn by the solid line, and portions that follow the plane memories are represented by the frames drawn by the chain line. As shown in FIG. 56, there are two above-described layer models. Also, there are two portions following the plane memories.

With the plane memory structure for the 3D-LR method which is provided with two pairs of a layer model and a portion following the plane memory, two pairs of the primary video plane, secondary video plane, PG plane, and IG plane are provided for the left view and the right view, and the outputs from each plane memory are overlaid, as the layer overlaying, separately for the left view and the right view.

The secondary video plane, as is the case with the primary video plane, can be displayed in the 3D-LR mode or in the 3D-depth mode. Also, with the PG stream, it is possible to display a monoscopic image to pop up in front of the background, by assigning an offset to the 2D image.

FIG. 60 shows a circuit structure for overlaying the outputs of the decoder models and outputting the result in the "1 plane+offset" mode.

In FIG. 57, the layer model composed of the primary video plane for the left view, primary video plane for the right view, secondary video plane, PG plane, and IG plane is represented by a frame drawn by the solid line, and a portion that follows the plane memory is represented by a frame drawn by the chain line. As shown in FIG. 57, there is only one above-described layer model. Also, there are two portions following the plane memory.

In the "1 plane+offset" mode method, the primary video planes are provided, one for each of the left view and the right view. The secondary video plane, PG plane, and IG plane are provided, one for both the left view and the right view. There is only one plane memory for both the left view and the right view. With this structure, the above-described layer overlaying is performed onto the left-view and right-view outputs.

The playback device basically has the hardware structure including two decoders and two planes since it is required to support both the B-D presentation mode and the "1 plane+offset" mode. When the mode switches to the "1 plane+offset" mode or the 2D playback mode, the playback device has the "1 decoder+1 plane" structure, invalidating one of the two pairs of "1 decoder+1 plane".

When the mode switches from the 3D playback mode to the 2D playback mode, and the structure of the playback device changes from the "2 decoders+2 planes" structure to the "1 decoder+1 plane" structure, the target of the demultiplexing becomes only the TS packets constituting the L image. And the user having been viewing both the L and R images via the 3D glasses comes to view only the L image as soon as the mode switches from the 3D playback mode to the 2D playback mode.

This change from the viewing by two eyes to the viewing by one eye increases the burden of the eye, and the user may catch a chill. In view of this, in the present embodiment, when such a change occurs, the target of the PID filter is changed from the TS packets constituting the L and R images to the TS packets constituting the L image, and the memory management in the graphics decoder is reset. In this changing, the subtitle is temporarily deleted to prevent the user from catching a chill.

As described above, according to the present embodiment, the subtitle in the plane memory is temporarily reset when the decoder structure is switched from the 2-decoder structure to the 1-decoder structure. This lessens the burden of the eye that is caused when the viewing of the user changes from the viewing by two eyes to the viewing by one eye.

Embodiment 5

The present embodiment describes the production of the recording mediums described in the embodiments so far, namely, the production act of the recording medium.

Each of the recording mediums described in the embodiments so far can be produced as a BD-ROM disc that is a multi-layered optical disc, a BD-RE disc having compatibility with the BD-ROM disc, a BD-R disc, or an AVC-HD medium.

FIG. 61 shows an internal structure of a multi-layered optical disc.

The first row of FIG. 61 shows a BD-ROM being a multi-layered optical disc. The second row shows tracks in the horizontally extended format though they are in reality formed spirally in the recording layers. These spiral tracks in the recording layers are treated as one continuous volume area. The volume area is composed of a lead-in area, recording layers of recording layers 1 through 3, and a lead-out area, where the lead-in area is located at the inner circumference, the lead-out area is located at the outer circumference, and the recording layers of recording layers 1 through 3 are located between the lead-in area and the lead-out area. The recording layers of recording layers 1 through 3 constitute one consecutive logical address space.

The volume area is sectioned into units in which the optical disc can be accessed, and serial numbers are assigned to the access units. The serial numbers are called logical addresses. A data reading from the optical disc is performed by specifying a logical address. Here, in the case of a read-only disc such as the BD-ROM, basically, sectors with consecutive logical addresses are also consecutive in the physical disposition on the optical disc. That is to say, data stored in the sectors with consecutive logical addresses can be read without performing a seek operation. However, at the boundaries between recording layers, consecutive data reading is not possible even if the logical addresses are consecutive. It is thus presumed that the logical addresses of the boundaries between recording layers are registered in the recording device preliminarily.

In the volume area, file system management information is recorded immediately after the lead-in area. Following this, a partition area managed by the file system management information exists. The file system is a system that expresses data on the disc in units called directories and files. In the case of the BD-ROM, the file system is a UDF (Universal Disc Format). Even in the case of an everyday PC (personal computer), when data is recorded with a file system called FAT or NTFS, the data recorded on the hard disk under directories and files can be used on the computer, thus improving usability. The file system makes it possible to read logical data in the same manner as in an ordinary PC, using a directory and file structure.

The fourth row shows how the areas in the file system area managed by the file system are assigned. As shown in the fourth row, a non-AV data recording area exists on the innermost circumference side in the file system area; and an AV data recording area exists immediately following the non-AV data recording area. The fifth row shows the contents recorded in the non-AV data recording area and the AV data recording area. As shown in the fifth row, Extents constituting the AV files are recorded in the AV data recording area; and Extents constituting non-AV files, which are files other than the AV files, are recorded in the non-AV data recording area.

FIG. 62 shows the application format of the optical disc based on the file system.

The BDMV directory is a directory in which data such as AV content and management information used in the BD-ROM are recorded. Five sub-directories called "PLAYLIST directory," "CLIPINF directory," "STREAM directory," "BDJO directory," "JAR directory," and "META directory" exist below the BDMV directory. Also, two types of files (i.e. index.bdmv and MovieObject.bdmv) are arranged under the BDMV directory.

A file "index.bdmv" (the file name "index.bdmv" is fixed) stores an index table.

A file "MovieObject.bdmv" (the file name "MovieObject.bdmv" is fixed) stores one or more movie objects. The movie object is a program file that defines a control procedure to be performed by the playback device in the operation mode (HDMV mode) in which the control subject is a command interpreter. The movie object includes one or more commands and a mask flag, where the mask flag defines whether or not to mask a menu call or a title call when the call is performed by the user onto the GUI.

A program file (XXXXX.bdjo—"XXXXX" is variable, and the extension "bdjo" is fixed) to which an extension "bdjo" is given exists in the BDJO directory. The program file stores a BD-J object that defines a control procedure to be performed by the playback device in the BD-J mode. The BD-J object includes an "application management table". The "application management table" in the BD-J object is a table that is used to cause the playback device to perform an application signaling, with the title being regarded as the life cycle. The application management table includes an "application identifier" and a "control code", where the "application identifier" indicates an application to be executed when a title corresponding to the BD-J object becomes a current title. BD-J applications whose life cycles are defined by the application management table are especially called "BD-J applications". The control code, when it is set to AutoRun, indicates that the application should be loaded onto the heap memory and be activated automatically; and when it is set to Present, indicates that the application should be loaded onto the heap memory and be activated after a call from another application is received. On the other hand, some BD-J applications do not end their operations even if the title is ended. Such BD-J applications are called "title unboundary applications".

A substance of such a Java™ application is a Java™ archive file (YYYYY.jar) stored in the JAR directory under the BDMV directory.

An application may be, for example, a Java™ application that is composed of one or more xlet programs having been loaded into a heap memory (also called work memory) of a virtual machine. The application is constituted from the xlet programs having been loaded into the work memory, and data.

In the "PLAYLIST directory", a playlist information file ("xxxxx.mpls"—"XXXXX" is variable, and the extension "mpls" is fixed) to which an extension "mpls" is given exists.

In the "CLIPINF directory", a clip information file ("xxxxx.clpi"—"XXXXX" is variable, and the extension "clpi" is fixed) to which an extension "clpi" is given exists.

The Extents constituting the files existing in the directories explained up to now are recorded in the non-AV data area.

The "STREAM directory" is a directory storing a transport stream file. In the "STREAM directory", a transport stream file ("xxxxx.m2ts"—"XXXXX" is variable, and the extension "m2ts" is fixed) to which an extension "m2ts" is given exists.

The above-described files are formed on a plurality of sectors that are physically continuous in the partition area. The partition area is an area accessed by the file system and includes an "area in which file set descriptor is recorded", "area in which end descriptor is recorded", "ROOT directory area", "BDMV directory area", "JAR directory area", "BDJO directory area", "PLAYLIST directory area", "CLIPINF directory area", and "STREAM directory area". The following explains these areas.

The "file set descriptor" includes a logical block number (LBN) that indicates a sector in which the file entry of the ROOT directory is recorded, among directory areas. The "end descriptor" indicates an end of the file set descriptor.

Next is a detailed description of the directory areas. The above-described directory areas have an internal structure in common. That is to say, each of the "directory areas" is composed of a "file entry", "directory file", and "file recording area of lower file".

The "file entry" includes a "descriptor tag", "ICB tag", and "allocation descriptor".

The "descriptor tag" is a tag that indicates the entity having the descriptor tag is a file entry.

The "ICB tag" indicates attribute information concerning the file entry itself.

The "allocation descriptor" includes a logical block number (LBN) that indicates a recording position of the directory file. Up to now, the file entry has been described. Next is a detailed description of the directory file.

The "directory file" includes a "file identification descriptor of lower directory" and "file identification descriptor of lower file".

The "file identification descriptor of lower directory" is information that is referenced to access a lower directory that belongs to the directory file itself, and is composed of identification information of the lower directory, the length of the directory name of the lower directory, a file entry address that indicates the logical block number of the block in which the file entry of the lower directory is recorded, and the directory name of the lower directory.

The "file identification descriptor of lower file" is information that is referenced to access a file that belongs to the directory file itself, and is composed of identification information of the lower file, the length of the lower file name, a file entry address that indicates the logical block number of the block in which the file entry of the lower file is recorded, and the file name of the lower file.

The file identification descriptors of the directory files of the directories indicate the logical blocks in which the file entries of the lower directory and the lower file are recorded. By tracing the file identification descriptors, it is therefore possible to reach from the file entry of the ROOT directory to the file entry of the BDMV directory, and reach from the file entry of the BDMV directory to the file entry of the PLAYLIST directory. Similarly, it is possible to reach the file entries of the JAR directory, BDJO directory, CLIPINF directory, and STREAM directory.

The "file recording area of lower file" is an area in which the substance of the lower file that belongs to a directory. A "file entry" of the lower entry and one or more "Extents" are recorded in the "file recording area of lower file".

The stream file that constitutes the main feature of the present application is a file recording area that exists in the directory area of the directory to which the file belongs. It is possible to access the transport stream file by tracing the file identification descriptors of the directory files, and the allocation descriptors of the file entries.

Up to now, the internal structure of the recording medium has been described. The following describes how to generate the recording medium shown in FIGS. 58 and 59, namely a form of a recording method.

The recording method of the present embodiment includes not only the above-described real-time recording in which AV files and non-AV files are generated in real time, and are written into the AV data recording area and the non-AV data recording area, but also a pre-format recording in which bit streams to be recorded into the volume area are generated in advance, a master disc is generated based on the bit streams, and the master disc is pressed, thereby making possible a mass production of the optical disc. The recording method of the present embodiment is applicable to either the real-time recording or the pre-format recording.

When the recording method is to be realized by the real-time recording technology, the recording device for performing the recording method creates an AV clip in real time, and stores the AV clip into the BD-RE, BD-R, hard disk, or semi-conductor memory card.

In this case, the AV clip may be a transport stream that is obtained as the recording device encodes an analog input signal in real time, or a transport stream that is obtained as the recording device partializes a digital input transport stream. The recording device for performing the real-time recording includes: a video encoder for obtaining a video stream by encoding a video signal; an audio encoder for obtaining an audio stream by encoding an audio signal; a multiplexor for obtaining a digital stream in the MPEG2-TS format by multiplexing the video stream, audio stream and the like; and a source packetizer for converting TS packets constituting the digital stream in the MPEG2-TS format into source packets. The recording device stores an MPEG2 digital stream having been converted into the source packet format, into an AV clip file, and writes the AV clip file into the BD-RE, BD-R, or the like. When the digital stream is written, the control unit of the recording device performs a process of generating the clip information and the playlist information in the memory. More specifically, when the user requests a recording process, the control unit creates an AV clip file and an AV clip information file in the BD-RE or the BD-R.

After this, when the starting position of GOP in the video stream is detected from the transport stream which is input from outside the device, or when the GOP of the video stream is created by the encoder, the control unit of the recording device obtains (i) the PTS of the intra picture that is positioned at the start of the GOP and (ii) the packet number of the source packet that stores the starting portion of the GOP, and additionally writes the pair of the PTS and the packet number into the entry map of the clip information file, as a pair of EP_PTS entry and EP_SPN entry. After this, each time a GOP is generated, a pair of EP_PTS entry and EP_SPN entry is written additionally into the entry map of the clip information file. In so doing, when the starting portion of a GOP is an IDR picture, an "is_angle_change" flag having been set to "ON" is added to a pair of EP_PTS entry and EP_SPN entry. Also, when the starting portion of a GOP is not an IDR picture, an "is_angle_change" flag having been set to "OFF" is added to a pair of EP_PTS entry and EP_SPN entry.

Further, the attribute information of a stream in the clip information file is set in accordance with the attribute of the stream to be recorded. After the clip and the clip information are generated and written into the BD-RE or the BD-R, the playlist information defining the playback path via the entry map in the clip information is generated and written into the BD-RE or the BD-R. When this process is executed with the real-time recording technology, a hierarchical structure composed of the AV clip, clip information, and playlist information is obtained in the BD-RE or the BD-R.

This completes the description of the recording device for performing the recording method by the real-time recording. Next is a description of the recording device for performing the recording method by the pre-format recording.

The recording method by the pre-format recording is realized as a manufacturing method of an optical disc including an authoring procedure.

FIGS. 63A and 63B show the manufacturing method of an optical disc. FIG. 63A is a flowchart of the recording method by the pre-format recording and shows the procedure of the optical disc manufacturing method. The optical disc manufacturing method includes the authoring step, signing step, medium key obtaining step, medium key encrypting step, physical format step, identifier embedding step, a mastering step, and replication step.

In the authoring step S201, a bit stream representing the whole volume area of the optical disc is generated.

In the signing step S202, a request for signature is made to the AACS LA to manufacture the optical disc. More specifically, a portion is extracted from the bit stream is sent to the AACS LA. Note that the AACS LA is an organization for managing the license of the copyrighted work protection technologies for the next-generation digital household electric appliances. The authoring sites and mastering sites are licensed by the AACS LA, where the authoring sites perform authoring of optical discs by using authoring devices, and the mastering sites execute mastering by using mastering devices. The AACS LA also manages the medium keys and invalidation information. The AACS LA signs and returns the portion of the bit stream.

In the medium key obtaining step S203, a medium key is obtained from the AACS LA. The medium key provided from the AACS LA is not fixed. The medium key is updated to a new one when the number of manufactured optical discs reaches a certain number. The update of the medium key makes it possible to exclude certain makers or devices, and to invalidate an encryption key by using the invalidation information even if the encryption key is cracked.

In the medium key encrypting step S204, a key used for encrypting a bit stream is encrypted by using the medium key obtained in the medium key obtaining step.

In the physical format step S205, the physical formatting of the bit stream is performed.

In the identifier embedding step S206, an identifier, which is unique and cannot be detected by ordinary devices, is embedded, as electronic watermark, into the bit stream to be recorded on the optical disc. This prevents mass production of pirated copies by unauthorized mastering.

In the mastering step S207, a master disc of the optical disc is generated. First, a photoresist layer is formed on the glass substrate, a laser beam is radiated onto the photoresist layer in correspondence with desired grooves or pits, and then the photoresist layer is subjected to the exposure process and the developing process. The grooves or pits represent values of the bits constituting the bit stream that has been subjected to the eight-to-sixteen modulation. After this, the master disc of the optical disc is generated based on the photoresist whose surface has been made uneven by the laser cutting in correspondence with the grooves or pits.

In the replication step S208, copies of the optical disc are produced by a mass production by using the master disc of the optical disc.

FIG. 63B shows the procedure of the recording method by the pre-format recording when a general user records any of the various files described in the embodiment so far onto a recording medium such as BD-R or BD-RE by using a personal computer, not when the optical disc is mass-produced. Compared with FIG. 63A, in the recording method shown in FIG. 63B, the physical format step S205 and the mastering step S207 have been omitted, and each file writing step S209 has been added.

Next, the authoring step is explained.

FIG. 64 is a flowchart showing the procedure of the authoring step.

In step S101, the reel sets of the main TS and sub-TS are defined. A "reel" is a file which stores the material data of an elementary stream. In the authoring system, the reels exist on a drive on a local network. The reels are data representing, for example, L and R images shot by a 3D camera, audio recorded at the shooting, audio recorded after the shooting, subtitles for each language, and menus. A "reel set" is a group of links to the material files, representing a set of elementary streams to be multiplexed into one transport stream. In this example, a reel set is defined for each of the main TS and the sub-TS.

In step S102, the prototypes of playitem and sub-playitem are defined, and the prototypes of the main path and sub-path are defined by defining a playback order of playitem and sub-playitem. The prototype of the playitem can be defined by receiving, via a GUI, a specification of a reel that is permitted to be played back by a targeted playitem in the monoscopic playback mode, and a specification of In_Time and Out_Time. The prototype of the sub-playitem can be defined by receiving, via a GUI, a specification of a reel that is permitted to be played back by a playitem corresponding to a targeted sub-playitem in the stereoscopic playback mode, and a specification of In_Time and Out_Time.

For the specification of a reel to be permitted to be played back, a GUI is provided to make it possible to check a check box corresponding to, among the links to the material files in the reel set, a link to a material file permitted to be played back. With this GUI, numeral input columns are displayed in correspondence with the reels. With use of the numeral input columns, the priority of each reel is received, and based on this, the priorities of the reels are determined. With the setting of the reels permitted to be played back and the setting of the priorities, the stream selection table and the extension stream selection table are generated.

The specification of In_Time and Out_Time is performed when the recording device executes the process in which the time axis of the base-view video stream or the dependent-view video stream is displayed as a graphic on the GUI, a slide bar is moved on the graphic of the time axis, and specification of a positional setting of the slide bar is received from the user.

The definition of the playback order of the playitem and the sub-playitem is realized by the following process: a picture at In_Time of the playitem is displayed as a thumbnail on the GUI, and the recording device receives from the user an operation made onto the thumbnail to set the playback order.

In step S103, a plurality of elementary streams are obtained by encoding the material files specified by the reel sets. The plurality of elementary streams include the base-view video stream and the dependent-view video stream, and the audio stream, PG stream, and IG stream that are to be multiplexed with the base-view video stream and the dependent-view video stream.

In step S104, one main TS is obtained by multiplexing thereinto the base-view video stream and an elementary stream which, among the elementary streams obtained by the encoding, belongs to same reel set as the base-view video stream.

In step S105, one sub-TS is obtained by multiplexing thereinto the dependent-view video stream and an elementary stream which, among the elementary streams obtained by the encoding, belongs to the same reel set as the dependent-view video stream.

In step S106, the prototype of the clip information file is created based on the parameters having been set during the encoding and multiplexing.

In step S107, the playlist information is defined by generating the playitem information and the sub-playitem information based on the prototype of the playitem, and then generating the main path information and the sub-path information by defining the playback order based on the playitem information and the sub-playitem information.

In the generation of the playitem information, the stream selection table is generated in the playitem information so that, among the elementary streams multiplexed in the main TS, elementary streams that are defined, in the basic structure of the playitem, to be played back in the monoscopic playback mode are set to "playable". Also, to define the playback section in the base-view video stream, the In_TIme and Out_TIme having been defined by the above-described editing are written in the playitem information.

In the generation of the sub-playitem information, the extension stream selection table is generated in the extension data of the playlist information so that, among the elementary streams multiplexed in the sub-main TS, elementary streams that are defined, in the basic structure of the playitem, to be played back in the stereoscopic playback mode are set to "playable". The playitem information and the sub-playitem information are defined based on information in the clip information file, and thus are set based on the prototype of the prototype of the clip information file.

In step S108, the main TS, sub-TS, prototype of the clip information file, and prototype of the playlist information are converted into a directory file group in a predetermined application format.

Through the above-described processes, the main TS, sub-TS, clip information, playitem information, and sub-playitem information are generated. Then the main TS and the sub-TS are converted into respective independent stream files, the clip information is converted into the clip information file, and the playitem information and the sub-playitem information are converted into the playlist information file. In this way, a set of files to be recorded onto the recording medium are obtained.

When the depths are to be calculated for each frame using the functional expression of the linear function or the parabolic function, a function for obtaining a depth for each frame time from the frame time of the video stream is defined in the application program interface of the recording device. Then the frame time of the base-view video stream is given to the function, and the depth for each frame time is calculated. The depths calculated in this way are converted into the plane offset value and the offset direction information.

After this, when the video stream encoding step is executed, the plane offset value and the offset direction information obtained the above-described conversion are written into the metadata of each GOP. In this way, the offset sequence can be generated in the encoding process.

FIG. 65 is a flowchart showing the procedure for writing the AV file. The AV files are written according to this flowchart when the recording method by the real-time recording or the recording method including the mastering or replication is implemented.

In step S401, the recording device generates the file entry in the memory of the recording device by creating "xxxxx.ssif". In step S402, it is judged whether the continuous free sector areas have been ensured. When the continuous free sector areas have been ensured, the control proceeds to step S403 in which the recording device writes the source packet sequence constituting the dependent-view data block into the continuous free sector areas as much as EXT2[i]. After this, steps S404 through S408 are executed. When it is judged in step S402 that the continuous free sector areas have not been ensured, the control proceeds to step S409 in which the exceptional process is performed, and then the process ends.

The steps S404 through S408 constitute a loop in which the process of steps S404-S406 and S408 is repeated until it is judged "NO" in step S407.

In step S405, the recording device writes the source packet sequence constituting the base-view data block into the continuous free sector areas as much as EXT1[i]. In step S406, it adds, into the file entry, the allocation descriptor that indicates the start address of the source packet sequence and continuation length, and registers it as an Extent. In connection with this, it writes, into the clip information, the Extent start point information that indicates the start source packet number thereof.

The step S407 defines the condition for ending the loop. In step S407, it is judged whether or not there is a non-written source packet in the base-view and dependent-view data blocks. When it is judged that there is a non-written source packet, the control proceeds to step S408 to continue the loop. When it is judged that there is no non-written source packet, the control proceeds to step S410.

In step S408, it is judged whether or not there are continuous sector areas. When it is judged that there are continuous sector areas, the control proceeds to step S403. When it is judged that there are no continuous sector areas, the control returns to step S402.

In step S410, "xxxxx.ssif" is closed and the file entry is written onto the recording medium. In step S411, "xxxxx.m2ts" is created and the file entry of "xxxxx.m2ts" is generated in the memory. In step S412, the allocation descriptor that indicates the continuation length and the start address of Extent of the base-view data block unique to the file 2D is added into the file entry of "xxxxx.m2ts". In step S413, "xxxxx.m2ts" is closed and the file entry is written.

In step S404, it is judged whether or not there is a long jump occurrence point in the range of "EXTss+EXT2D". In the present example, it is presumed that the long jump occurrence point is a boundary between layers. When it is judged that there is a long jump occurrence point in the range of "EXTss+EXT2D", the control proceeds to step S420 in which a copy of the base-view data block is created, and base-view data blocks B[i]ss and B[i]2D are written into the area immediately before the long jump occurrence point, and then the control proceeds to step S406. These become Extents of the file 2D and Extents of the file base.

Next is a description of the recording device to be used for the work in the authoring step. The recording device described here is used by the authoring staff in a production studio for distributing movie contents. The use form of the recording device of the present invention is as follows: a digital stream and a scenario are generated in accordance with the operation by the authoring staff, where the digital stream represents a movie title and is generated by compress-encoding in compliance with the MPEG standard, and the scenario describes how the movie title should be played, a volume bit stream for BD-ROM including these data is generated, and the volume bit stream is recorded into a recording medium that is to be delivered to the mastering site.

FIG. 66 shows the internal structure of the recording device. As shown in FIG. 66, the recording device includes a video encoder 501, a material producing unit 502, a scenario generating unit 503, a BD program producing unit 504, a multiplexing processing unit 505, and a format processing unit 506.

The video encoder 501 generates left-view and right-view video streams by encoding left-view and right-view non-compressed bit map images in accordance with a compression method such as the MPEG4-AVC or the MPEG2. In so doing, the right-view video stream is generated by encoding frames that correspond to the left-view video stream, by the inter-picture prediction encoding method. In the process of the inter-picture prediction encoding, the depth information for 3D image is extracted from the motion vectors of the left-view and right-view images, and the depth information is stored into a frame depth information storage unit 501*a*. The video encoder 501 performs an image compression using the relative characteristics between pictures by extracting the motion vectors in units of macro blocks of 8×8 or 16×16.

In the process of extracting the motion vectors in units of macro blocks, a moving image whose foreground is a human being and background is a house is determined as a target of extracting the motion vector. In this case, an inter-picture prediction is performed between a left-eye image and a right-eye image. With this process, no motion vector is detected from the portion of the image corresponding to the "house", but a motion vector is detected from the portion of the image corresponding to the "human being".

The detected motion vector is extracted, and the depth information is generated in units of frames when the 3D image is displayed. The depth information is, for example, an image having the same resolution as the frame having the depth of eight bits.

The material producing unit 502 generates streams such as an audio stream, interactive graphics stream, and a presentation graphics stream, and writes the generated streams into an audio stream storage unit 502*a*, an interactive graphics stream storage unit 502*b*, and a presentation graphics stream storage unit 502*c*.

When generating an audio stream, the material producing unit 502 generates the audio stream by encoding a non-compressed LinearPCM audio by a compression method such as AC3. Other than this, the material producing unit 502 generates a presentation graphics stream in a format conforming to the BD-ROM standard, based on the subtitle information file that includes a subtitle image, a display timing, and subtitle effects such as fade-in and fade-out. Also, the material producing unit 502 generates an interactive graphics stream in a format for the menu screen conforming to the BD-ROM standard, based on the menu file that describes bit-map images, transition of the buttons arranged on the menu, and the display effects.

The scenario generating unit 503 generates a scenario in the BD-ROM format, in accordance with the information of each stream generated by the material producing unit 502 and the operation input by the authoring staff via the GUI. Here, the scenario means a file such as an index file, movie object file, or playlist file. Also, the scenario generating unit 503 generates a parameter file which describes which stream each AV clip for realizing the multiplexing process is constituted from. The file generated here such as an index file, movie object file, or playlist file has the data structure described in Embodiments 1 and 2.

The BD program producing unit 504 generates a source code for a BD program file and generates a BD program in accordance with a request from a user that is received via a user interface such as the GUI. In so doing, the program of the BD program file can use the depth information output from the video encoder 501 to set the depth of the GFX plane.

The multiplexing processing unit 505 generates an AV clip in the MPEG2-TS format by multiplexing a plurality of streams described in the BD-ROM scenario data, such as the left-view video stream, right-view video stream, video, audio, subtitle, and button. When generating this, the multiplexing processing unit 505 also generates the clip information file that makes a pair with the AV clip.

The multiplexing processing unit 505 generates the clip information file by associating, as a pair, (i) the entry map generated by the multiplexing processing unit 505 itself and (ii) attribute information that indicates an audio attribute, image attribute and the like for each stream included in the AV clip. The clip information file has the structure that has been described in each embodiment so far.

The format processing unit 506 generates a disc image in the UDF format by arranging, in a format conforming to the BD-ROM standard, the BD-ROM scenario data generated by the scenario generating unit 503, the BD program file produced by the BD program producing unit 504, the AV clip and clip information file generated by the multiplexing processing unit 505, and directories and files in a format conforming to the BD-ROM standard, where the UDF format is a file system conforming to the BD-ROM standard. The format processing unit 506 writes the bit stream representing the disc image into the BD-ROM bit-stream storage unit.

In so doing, the format processing unit 506 generates the 3D metadata for the PG stream, IG stream, and secondary video stream by using the depth information output from the video encoder 501. Also, the format processing unit 506 sets by automation the arrangement of an image on the screen so as not to overlap with an object in the 3D image, and adjusts the offset value so that depths do not overlap each other. The file layout of the disc image generated in this way is set to have the data structure of the file layout that has already been described. The generated disc image is converted into the data for BD-ROM press, and the press process is performed onto the data. The BD-ROM is produced in this way.

Embodiment 6

The present embodiment describes the internal structure of a 2D/3D playback device that has integrated functions of the playback devices having been described in the embodiments so far.

FIG. 67 shows the structure of a 2D/3D playback device. The 2D/3D playback device includes a BD-ROM drive 1, a read buffer 2*a*, a read buffer 2*b*, a switch 3, a system target decoder 4, a plane memory set 5*a*, a plane overlay unit 5*b*, an HDMI transmission/reception unit 6, a playback control unit 7, a management information memory 9, a register set 10, a program executing unit 11, a program memory 12, an HDMV module 13, a BD-J platform 14, a middleware 15, a mode management module 16, a user event processing unit 17, a local storage 18, and a nonvolatile memory 19.

The BD-ROM drive 1, like a 2D playback device, reads out data from a BD-ROM disc based on a request from the playback control unit 7. AV clips read from the BD-ROM disc are transferred to the read buffer 2*a* or 2*b*.

When a 3D image is to be played back, the playback control unit 7 issues a read request that instructs to read the base-view data block and the dependent-view data block alternately in units of Extents. The BD-ROM drive 1 reads out Extents constituting the base-view data block into the read buffer 2*a*, and reads out Extents constituting the dependent-view data block into the read buffer 2*b*. When a 3D image is to be played back, the BD-ROM drive 1 should have a higher reading speed than the BD-ROM drive for a 2D playback device, since it is necessary to read both the base-view data block and the dependent-view data block simultaneously.

The read buffer 2*a* is a buffer that may be realized by, for example, a dual-port memory, and stores the data of the base-view data blocks read by the BD-ROM drive 1.

The read buffer 2*b* is a buffer that may be realized by, for example, a dual-port memory, and stores the data of the dependent-view data blocks read by the BD-ROM drive 1.

The switch 3 is used to switch the source of data to be input into the read buffers, between the BD-ROM drive 1 and the local storage 18.

The system target decoder 4 decodes the streams by performing the demultiplexing process onto the source packets read into the read buffer 2a and the read buffer 2b.

The plane memory set 5a is composed of a plurality of plane memories. The plane memories include those for storing a left-view video plane, a right-view video plane, a secondary video plane, an interactive graphics plane (IG plane), and a presentation graphics plane (PG plane).

The plane overlay unit 5b performs the plane overlaying explained the embodiments so far. When the image is to be output to the television or the like, the output is conformed to the 3D system. When it is necessary to play back the left-view image and the right-view image alternately by using the shutter glasses, the image is output as it is. When the image is to be output to, for example, the lenticular television, a temporary buffer is prepared, the left-view image is first transferred into the temporary buffer, and the left-view image and the right-view image are output simultaneously after the right-view image is transferred.

The HDMI transmission/reception unit 6 executes the authentication phase and the negotiation phase described in Embodiment 1 in conformance with, for example, the HDMI standard, where HDMI stands for High Definition Multimedia Interface. In the negotiation phase, the HDMI transmission/reception unit 6 can receive, from the television, (i) information indicating whether or not it supports a stereoscopic display, (ii) information regarding resolution for a monoscopic display, and (iii) information regarding resolution for a stereoscopic display.

The playback control unit 7 includes a playback engine 7a and a playback control engine 7b. When it is instructed from the program executing unit 11 or the like to play back a 3D playlist, the playback control unit 7 identifies a base-view data block of a playitem that is the playback target among the 3D playlist, and identifies a dependent-view data block of a sub-playitem in the 3D sub-path that should be played back in synchronization with the playitem. After this, the playback control unit 7 interprets the entry map of the corresponding clip information file, and requests the BD-ROM drive 1 to alternately read the Extent of the base-view data block and the Extent of the dependent-view data block, starting with the playback start point, based on the Extent start type that indicates which of an Extent constituting the base-view video stream and an Extent constituting the dependent-view video stream is disposed first. When the playback is started, the first Extent is read into the read buffer 2a or the read buffer 2b completely, and then the transfer from the read buffer 2a and the read buffer 2b to the system target decoder 4 is started.

The playback engine 7a executes AV playback functions. The AV playback functions in the playback device are a group of traditional functions succeeded from CD and DVD players. The AV playback functions include: Play, Stop, Pause On, Pause Off, Still Off, Forward Play (with specification of the playback speed by an immediate value), Backward Play (with specification of the playback speed by an immediate value), Audio Change, Picture Data Change for Secondary Video, and Angle Change.

The playback control engine 7b performs playlist playback functions. The playlist playback functions mean that, among the above-described AV playback functions, the Play and Stop functions are performed in accordance with the current playlist information and the current clip information, where the current playlist information constitutes the current playlist.

The management information memory 9 is a memory for storing the current playlist information and the current clip information. The current playlist information is a piece of playlist information that is currently a target of processing, among a plurality of pieces of playlist information that can be accessed from the BD-ROM, built-in medium drive, or removable medium drive. The current clip information is a piece of clip information that is currently a target of processing, among a plurality of pieces of clip information that can be accessed from the BD-ROM, built-in medium drive, or removable medium drive.

The register set 10 is a player status/setting register set that is a set of registers including a general-purpose register for storing arbitrary information that is to be used by contents, as well as the playback status register and the playback setting register having been described in the embodiments so far.

The program executing unit 11 is a processor for executing a program stored in a BD program file. Operating according to the stored program, the program executing unit 11 performs the following controls: (1) instructing the playback control unit 7 to play back a playlist; and (2) transferring, to the system target decoder, PNG/JPEG that represents a menu or graphics for a game so that it is displayed on the screen. These controls can be performed freely in accordance with construction of the program, and how the controls are performed is determined by the process of programming the BD-J application in the authoring process.

The program memory 12 stores a current dynamic scenario which is provided to the command interpreter that is an operator in the HDMV mode, and to the Java™ platform that is an operator in the BD-J mode. The current dynamic scenario is a current execution target that is one of Index.bdmv, BD-J object, and movie object recorded in the BD-ROM. The program memory 12 includes a heap memory.

The heap memory is a stack region for storing byte codes of the system application, byte codes of the BD-J application, system parameters used by the system application, and application parameters used by the BD-J application.

The HDMV module 13 is a DVD virtual player that is an operator in the HDMV mode, and is a performer in the HDMV mode. The HDMV module 13 has a command interpreter, and performs the control in the HDMV mode by interpreting and executing the navigation command constituting the movie object. The navigation command is described in a syntax that resembles a syntax used in the DVD-Video. Accordingly, it is possible to realize a DVD-Video-like playback control by executing the navigation command.

The BD-J platform 14 is a Java™ platform that is an operator in the BD-J mode, and is fully implemented with Java2 Micro_Edition (J2ME) Personal Basis Profile (PBP 1.0), and Globally Executable MHP specification (GEM1.0.2) for package media targets. The BD-J platform 14 is composed of a class loader, a byte code interpreter, and an application manager.

The class loader is one of system applications, and loads a BD-J application by reading byte codes from the class file existing in the JAR archive file, and storing the byte codes into the heap memory.

The byte code interpreter is what is called a Java™ virtual machine. The byte code interpreter converts (i) the byte codes constituting the BD-J application stored in the heap memory and (ii) the byte codes constituting the system application, into native codes, and causes the MPU to execute the native codes.

The application manager is one of system applications, and performs application signaling for the BD-J application based on the application management table in the BD-J object, such as starting or ending a BD-J application. This completes the internal structure of the BD-J platform.

The middleware 15 is an operating system for the embedded software, and is composed of a kernel and a device driver. The kernel provides the BD-J application with a function unique to the playback device, in response to a call for the Application Programming Interface (API) from the BD-J application. The middleware 15 also realizes controlling the hardware, such as starting the interruption handler by sending an interruption signal.

The mode management module 16 holds Index.bdmv that was read from the BD-ROM, built-in medium drive, or removable medium drive, and performs a mode management and a branch control. The management by the mode management is a module assignment to cause either the BD-J platform or the HDMV module to execute the dynamic scenario.

The user event processing unit 17 receive a user operation via a remote control, and causes the program executing unit 11 or the playback control unit 7 to perform a process as instructed by the received user operation. For example, when the user presses a button on the remote control, the user event processing unit 17 instructs the program executing unit 11 to execute a command included in the button. For example, when the user presses a fast forward/rewind button on the remote control, the user event processing unit 17 instructs the playback control unit 7 to execute the fast forward/rewind process onto the AV clip of the currently played-back playlist.

The local storage 18 includes the built-in medium drive for accessing a hard disc, and the removable medium drive for accessing a semiconductor memory card, and stores downloaded additional contents, data to be used by applications, and other data. An area for storing the additional contents is divided into as many small areas as BD-ROMs. Also, an area for storing data used by applications is divided into as many small areas as the applications.

The nonvolatile memory 19 is a recording medium that is, for example, a readable/writable memory, and is a medium such as a flash memory or FeRAM that can preserve the recorded data even if a power is not supplied thereto. The nonvolatile memory 19 is used to store a backup of the register set 10.

Next, the internal structure of the system target decoder 4 and the plane memory set 5a will be described. FIG. 68 shows the internal structure of the system target decoder 4 and the plane memory set 5a. As shown in FIG. 65, the system target decoder 4 and the plane memory set 5a include an ATC counter 21, a source depacketizer 22, a PID filter 23, an STC counter 24, an ATC counter 25, a source depacketizer 26, a PID filter 27, a primary video decoder 31, a left-view video plane 32, a right-view video plane 33, a secondary video decoder 34, a secondary video plane 35, a PG decoder 36, a PG plane 37, an IG decoder 38, an IG plane 39, a primary audio decoder 40, a secondary audio decoder 41, a mixer 42, a rendering engine 43, a GFX plane 44, and a rendering memory 45.

The primary video decoder 31 decodes the left-view video stream, and writes the decoding result, namely, a non-compressed video frame, into the left-view video plane 32.

The left-view video plane 32 is a plane memory that can store picture data with a resolution of, for example, 1920×2160 (1280×1440).

The right-view video plane 33 is a plane memory that can store picture data with a resolution of, for example, 1920×2160 (1280×1440).

The secondary video decoder 34, having the same structure as the primary video plane, performs decoding of an input secondary video stream, and writes resultant pictures to the secondary video plane in accordance with respective display times (PTS).

The secondary video plane 35 stores picture data for the secondary video that is output from the system target decoder 4 as a result of decoding the secondary video stream.

The PG decoder 36 extracts and decodes a presentation graphics stream from the TS packets input from the source depacketizer, and writes the resultant non-compressed graphics data to the PG plane in accordance with respective display times (PTS).

The PG plane 37 stores non-compressed graphics object that is obtained by decoding the presentation graphics stream.

The IG decoder 38 extracts and decodes an interactive graphics stream from the TS packets input from the source depacketizer, and writes the resultant non-compressed graphics object to the IG plane in accordance with respective display times (PTS).

The IG plane 39 stores non-compressed graphics object that is obtained by decoding the interactive graphics stream.

The primary audio decoder 40 decodes the primary audio stream.

The secondary audio decoder 41 decodes the secondary audio stream.

The mixer 42 mixes the decoding result of the primary audio decoder 40 with the decoding result of the secondary audio decoder 41.

The rendering engine 43, provided with infrastructure software such as Java2D or OPEN-GL, decodes JPEG data/PNG data in accordance with a request from the BD-J application. The rendering engine 43 also obtains an image or a widget, and writes it into the IG plane or the background graphics plane. The image data obtained by decoding the JPEG data is used as the wallpaper of the GUI, and is written into the background graphics plane. The image data obtained by decoding the PNG data is written into the IG plane to be used to realize a button display accompanied with animation. These images and/or widgets obtained by decoding the JPEG/PNG data are used by the BD-J application to display a menu for receiving selection of a title, subtitle, or audio, or to constitute a GUI part for a game that works in conjunction with a stream playback when the game is played. The images and/or widgets are also used to constitute a browser screen on a WWW site when the BD-J application accesses the WWW site.

The GFX plane 44 is a plane memory into which graphics data such as JPEG or PNG is written after it is decoded.

The rendering memory 45 is a memory into which the JPEG data and the PNG data to be decoded by the rendering engine are read. A cache area is allocated to this image memory when the BD-J application executes a live playback mode. The live playback mode is realized by combining the browser screen on the WWW site with the stream playback by the BD-ROM. The cache area is a cache memory for storing the current and the preceding browser screens in the live playback mode, and stores non-compressed PNG data or non-compressed JPEG data that constitute the browser screen.

As described above, according to the present embodiment, a recording medium that includes the characteristics described in the embodiments so far as a whole can be realized as a BD-ROM, and a playback device that includes the characteristics described in the embodiments so far as a whole can be realized as a BD-ROM playback device.

Embodiment 7

The present embodiment describes the register set in detail.

The register set is composed of a plurality of player status registers and a plurality of player setting registers. Each of the player status registers and player setting registers is a 32-bit register and is assigned with a register number so that a register to be accessed is identified by the register number.

The bit positions of the bits (32 bits) that constitute each register are represented as "b0" through "b31". Among these, bit "b31" represents the highest-order bit, and bit "b0" represents the lowest-order bit. Among the 32 bits, a bit sequence from bit "bx" to bit "by" is represented by [bx:by].

The value of an arbitrary bit range [bx:by] in a 32-bit sequence stored in the player setting register/player status register of a certain register number is treated as an environment variable (also called "system parameter" or "player variable") that is a variable of an operation system in which the program runs. The program that controls the playback can obtain a system parameter via the system property or the application programming interface (API). Also, unless otherwise specified, the program can rewrite the values of the player setting register and the player status register. With respect to the BD-J application, it is required that the authority to obtain or rewrite system parameters is granted by the permission management table in the JAR archive file.

The player status register is a hardware resource for storing values that are to be used as operands when the MPU of the playback device performs an arithmetic operation or a bit operation. The player status register is also reset to initial values when an optical disc is loaded, and the validity of the stored values is checked. The values that can be stored in the player status register are the current title number, current playlist number, current playitem number, current stream number, current chapter number, and so on. The values stored in the player status register are temporary values because the player status register is reset to initial values each time an optical disc is loaded. The values stored in the player status register become invalid when the optical disc is ejected, or when the playback device is powered off.

The player setting register differs from the player status register in that it is provided with power handling measures. With the power handling measures, the values stored in the player setting register are saved into a non-volatile memory when the playback device is powered off, and the values are restored when the playback device is powered on. The values that can be set in the player setting register include: various configurations of the playback device that are determined by the manufacturer of the playback device when the playback device is shipped; various configurations that are set by the user in accordance with the set-up procedure; and capabilities of a partner device that are detected through negotiation with the partner device when the device is connected with the partner device.

FIG. 69 shows the internal structures of the register set 10 and the playback control engine 7b.

The left-hand side of FIG. 69 shows the internal structures of the register set 10, and the right-hand side shows the internal structures of the playback control engine 7b.

The following describes the player status registers and the player setting registers assigned with respective register numbers.

PSR1 is a stream number register for the audio stream, and stores a current audio stream number.

PSR2 is a stream number register for the PG stream, and stores a current PG stream number.

PSR4 is set to a value in the range from "1" through "100" to indicate a current title number.

PSR5 is set to a value in the range from "1" through "999" to indicate a current chapter number; and is set to a value "0xFFFF" to indicate that the chapter number is invalid in the playback device.

PSR6 is set to a value in the range from "0" through "999" to indicate a current playlist number.

PSR7 is set to a value in the range from "0" through "255" to indicate a current playitem number.

PSR8 is set to a value in the range from "0" through "0xFFFFFFFF" to indicate a current playback time point (current PTM) with the time accuracy of 45 KHz.

PSR10 is a stream number register for the IG stream, and stores a current IG stream number.

PSR21 indicates whether or not the user intends to perform the stereoscopic playback.

PSR22 indicates an output mode value.

PSR23 is used for the setting of "Display Capability for Video". This indicates whether or not a display device connected to the playback device has a capability to perform the stereoscopic playback.

PSR24 is used for the setting of "Player Capability for 3D". This indicates whether or not the playback device has a capability to perform the stereoscopic playback.

On the other hand, the playback control engine 7b includes a procedure executing unit 8 for determining the output mode of the current playlist uniquely by referring to the PSR4, PSR6, PSR21, PSR23, and PSR24, and the stream selection table of the current playlist information in the management information memory 9. The "Player Capability for 3D" stored in PSR24 means the capability of playback device regarding the 3D playback as a whole. Thus it may be simply denoted as "3D-Capability".

PSR23 defines the output mode, and the selection model of the state transition is defined as shown in FIG. 70.

FIG. 70 shows the state transition of the selection model of the output mode. There exist two general states in this selection model. The two general states are represented by "invalid" and "valid" in the ovals. The "invalid" indicates that the output mode is invalid, and the "valid" indicates that the output mode is valid.

The general state is maintained unless a state transition occurs. The state transition is caused by a start of playlist playback, a navigation command, an output mode change requested by a BD-J application, or a jump to a BD-J title. When a state transition occurs, a procedure for obtaining a preferable output mode is executed.

The arrows jm1, jm2, jm3, ... shown in FIG. 31 represent events that trigger state transitions. The state transitions in FIG. 31 include the following.

The "Load a disc" means the state in which the BD-ROM has been loaded.

The "Start presentation" means to "start playlist playback" in the HDMV mode. In the BD-J mode, it means to branch to a BD-J title. This is because, in the BD-J mode, branching to a BD-J title does not necessarily mean that a playlist starts to be played back.

The "Jump to BD-J title" means to branch to a BD-J title. More specifically, it indicates that a title (BD-J title), which is associated with a BD-J application in the index table, becomes a current title.

The "Start Playlist Playback" means that a playlist number identifying a playlist is set to a PSR, and the playlist information is read onto the memory as the current playlist information.

The "Change Output Mode" means that the output mode is changed when the BD-J application calls the API.

The "Terminate Presentation", in the HDMV mode, means that a playback of a playlist is completed; and in the BD-J mode, means that a BD-J title jumps to a title (HDMV title) that is associated with a movie object in the index table.

When a disc is loaded, the state of the output mode transits to a temporary state "Initialization". After this, the state of the output mode transits to the invalid state.

The output mode selection state is maintained to be "invalid" until the playback start (Start Presentation) is made active. The "Start Presentation", in the HDMV mode, means that a playlist has been started to be played back; and in the BD-J mode, means that a BD-J title has been started to be played back, and some operation of a BD-J application has been started. It does not necessarily mean that a playlist has been started to be played back.

When Start Presentation is made active, the state of the output mode transits to a temporary state "Procedure when playback condition is changed".

The output mode transits to "Valid" depending on the result of "Procedure when playback condition is changed". The output mode transits to "Invalid" when the output mode is effective and Start Presentation is completed.

The navigation command in the movie object should be executed before a playlist starts to be played back because the content provider sets a preferable output mode with the command. When the navigation command in the movie object is executed, the state transits to "invalid" in this model.

FIG. 71 is a flowchart showing the procedure for the initialization process.

In step S501, it is judged whether or not a disc unbound BD-J application is running. In step S502, it is judged whether or not the stereoscopic display capability information in PSR23 indicates "there is capability" and the initial_output_mode information in Index.bdmv indicates the "stereoscopic output mode".

When it is judged as Yes in step S501, the current output is maintained in step S503. When it is judged as No in step S1 and Yes in step S502, the output mode in PSR22 is set to the stereoscopic output mode in step S504. When it is judged as No in step S501 and No in step S502, the output mode in PSR22 is set to the 2D output mode in step S505.

FIG. 72 shows the "Procedure when playback condition is changed". In step S511, it is judged whether or not the output mode in PSR22 is the 2D output mode. In step S513, it is judged whether or not the stereoscopic display capability information in PSR23 indicates "1" and the extension stream selection table exists in the playlist.

When it is judged as Yes in step S511, the current output mode is not changed in step S512. When it is judged as No in step S511 and Yes in step S513, the current output mode is not changed (step S512). When it is judged as No in step S511 and No in step S513, the current output mode is set to the 2D output mode (step S514).

What should be taken into account when a playlist starts to be played back is that PES streams that can be played back in respective playitems are defined in the stream selection tables of the respective playitems. For this reason, when the current playitem starts to be played back, first, it is necessary to select an optimum one for playback from among PES streams that are permitted to be played back in the stream selection table of the current playitem. The procedure for this selection is called "stream selection procedure".

The following describes the bit assignment in the player setting register for realizing the 3D playback mode. Registers to be used to realizing the 3D playback mode are PSR21, PSR22, PSR23, and PSR24. FIGS. 73A through 73D show the bit assignment in the player setting register for realizing the 3D playback mode.

FIG. 73A shows the bit assignment in PSR21. In the example shown in FIG. 73A, the lowest-order bit "b0" represents the output mode preference. When bit "b0" is set to "0b", it indicates the 2D output mode, and when bit "b0" is set to "1b", it indicates the stereoscopic output mode. The navigation command or the BD-J application cannot rewrite the value set in PSR21.

FIG. 73B shows the bit assignment in PSR22.

The lowest-order bit "b0" in PSR22 represents the current output mode. When the output mode is changed, the video output of the playback device should be changed in correspondence with it. The value of the output mode is controlled by the selection model.

FIG. 73C shows the bit assignment in PSR23. As shown in FIG. 73C, the lowest-order bit "b0" in PSR23 represents the stereoscopic display capability of the connected TV system. More specifically, when bit "b0" is set to "0b", it indicates that the connected TV system is "stereoscopic presentation incapable"; and when bit "b0" is set to "1b", it indicates that the connected TV system is "stereoscopic presentation capable".

These values are automatically set before a playback is started, when the playback device supports an interface that negotiates with the display device. When these values are not set automatically, they are set by the user.

FIG. 73D shows the bit assignment in PSR24. As shown in FIG. 73D, the lowest-order bit "b0" in PSR24 represents the stereoscopic display capability of the playback device. More specifically, when bit "b0" is set to "0b", it indicates that the stereoscopic presentation is incapable; and when bit "b0" is set to "1b", it indicates that the stereoscopic presentation is capable.

As described above, according to the present embodiment, the validity of the output mode can be maintained even if the state of the playback is changed, or a request to switch between streams is received from the user.

Embodiment 8

In Embodiment 1, information defining the offset control is imbedded in the metadata of the sub-view video stream, whereas in the present embodiment, control information defining the offset control is imbedded in the metadata of the graphics stream, the offset control applying the offsets of leftward and rightward directions to horizontal coordinates in the graphics plane and overlaying the resultant graphics planes with the main-view video plane and the sub-view video plane on which picture data constituting the main view and sub-view are drawn, respectively.

The following describes parameters for use in the shift control and data for interpolating the parameters.

FIGS. 74A through 74E show relationships between the depths of the macroblocks and the parameters for the shift control.

It is presumed here that the picture data representing the L image and the picture data representing the R image shown in FIG. 2 are constituted from the macroblocks shown in FIGS. 74A and 74B, respectively. In these drawings, each rectangular box represents a macroblock. Among the macroblocks constituting the L and R images, the macroblocks with hatching constitute the three-dimensional object.

FIG. 74C shows the three-dimensional object represented by the L and R images, the same as the one shown in FIG. 2. FIG. 74D shows the three-dimensional object represented by the macroblocks shown in FIGS. 74A and 74B. The macroblocks shown in FIGS. 74A and 74B have depths determined based on the correlationships between the L image and the R image. Accordingly, when the macroblocks are arranged in the Z-axis direction based on these depths, the macroblocks will appear as shown in FIG. 74D. The macroblocks have depths of the head, body, limbs, and tail of a dinosaur being the three-dimensional object. Thus the depths to be used in the shift control are defined as shown in FIG. 74E. That is to say, the depths to be used in the shift control are obtained by deviating the depths of the corresponding macroblocks for the stereoscopic image, by a in the Z-axis direction. In this way, the respective four depths for displaying the graphics immediately before the head, body, limbs, and tail can be defined.

The four depths can be defined as four offset sequences so that the depth of any of the head, body, limbs, and tail of the dinosaur can be selected appropriately to be used as the depth of the graphics displayed in the "1 plane+offset" mode.

In the MPEG4-MVC, since the encoding is performed by using the correlationships between the L and R images, motion vectors of the macroblocks constituting the L image and of the macroblocks constituting the R image are generated. With use of the motion vectors, the depths of the macroblocks can be detected, and from the depths of the macroblocks, shift control parameters corresponding to the respective macroblocks can be obtained.

The generation of the shift control parameters is realized by executing the procedure for defining the offset sequence in parallel with the encoding of the video stream. FIG. 75 is a flowchart showing the procedure for defining the offset sequence that is executed in parallel with the encoding of the video stream.

In step S5110, it is judged whether or not encoding of GOP has started. When it is judged in step S110 that encoding of GOP has started, the control moves to step S111 in which offset sequences corresponding to each macroblock constituting the moving object in the picture of the starting video access unit are generated in the MVC scalable nesting SEI message of the starting video access unit in the GOP. This is because the control parameters for use in the "1 plane+offset" mode, such as the shiftwidth in the X-axis direction and the shiftwidth in the Z-axis direction, are generated in correspondence with each macroblock constituting the picture data of the starting video access unit.

In step S112, it is judged whether or not motion vectors of the moving object in the screen have been calculated in units of macroblocks, wherein this judgment is made each time the L and R images belonging to the GOP are encoded. When it is judged that the motion vectors have been calculated, the depth information is calculated. In the present embodiment, the depth information is calculated in a simple process of step S113 in which the horizontal scalar value of the motion vector of each macroblock is converted into shiftwidth, and a horizontal component in the movement direction of each macroblock is converted into the shift direction. In this process, approximate values of the shiftwidth and shift direction for each frame period are obtained.

In step S114, the amount of deviation is added to the shiftwidth obtained for each macroblock in the frame period. The scalar values in the horizontal direction, which are the source of the conversion, indicate the depths of the three-dimensional object itself at the portions corresponding to the macroblocks. Thus the process of step S114 is performed to indicate the depths immediately before the three-dimensional object as the shiftwidths in the "1 plane+offset" mode, by adding the amount of deviation.

In step S115, the shiftblock and shift direction of each macroblock in the frame period added with the interpolation values are additionally written, as a new Plane_offset_value and a Plane_offset_direction, into the offset sequence for each macroblock.

In step S116, it is judged whether or not the encoding of GOP in the video stream is to continue. When it is judged that the encoding of GOP in the video stream is to continue, the control returns to step S112. As far as it is judged that the encoding of GOP in the video stream is to continue, Plane_offset_value and a Plane_offset_direction continue to be added to the offset sequence.

When the encoding of GOP ends, the generation of the offset metadata in the video access unit for the GOP ends, and the control returns to step S110.

Note that when a shooting is done with use of a 3D camera or the base-view video stream and the dependent-view video stream are encoded, the shiftwidth and shift direction of each macroblock may be stored as a database for each GOP, then the shiftwidth and shift direction may be subjected to an appropriate conversion, and the results of the conversion may be stored in the MVC scalable nesting SEI message in the access unit at the start of the GOP. This makes it possible to define a plurality of offset sequences that define a plurality of depths. Note that when the 3D camera is provided with the codec for the MPEG4-MVC, the above-described definition of the offset sequence should be executed by the 3D camera.

This completes the description of how parameters for the shift control in the "1 plane+offset" mode are generated. The following describes interpolation parameters for interpolate the control parameters generated as described above. The interpolation parameters exist in the metadata inside the subtitle stream.

FIGS. 76A and 76B show the window definition segment and the control information in the subtitle stream.

The "window definition segment" is a functional segment for defining the rectangular area in the graphics plane. As described earlier, in the Epoch, the continuity is generated in the memory management only when the clearing and the redrawing are performed in a certain rectangular area in the graphics plane. The rectangular area in the graphics plane is called "window", and is defined by the window definition segment. FIG. 76A shows the data structure of the window definition segment. As shown in FIG. 76A, the window definition segment includes: "window_id" uniquely identifying a window in the graphics plane; "window_horizontal_position" indicating the horizontal position of an upper-left pixel in the graphics plane; "window_vertical_position" indicating the vertical position of the upper-left pixel in the graphics plane; "window_width" indicating the horizontal width of the window in the graphics plane; and "window_height" indicating the vertical width of the window in the graphics plane.

The following explains the values that the "window_horizontal_position", "window_vertical_position", "window_width", and "window_height" can take. The coordinate system in which these values are represented is an internal area of the graphics plane. In the internal area of the graphics plane, the window has a two-dimensional size of a vertical length "video_height" and a horizontal length "video_width".

The "window_horizontal_position" is a horizontal address of the upper-left pixel in the graphics plane, and takes a value in the range from "0" to "video_width−1". The "window_vertical_position" is a vertical address of the upper-left pixel in the graphics plane, and takes a value in the range from "0" to "video_height-1".

The "window_width" is a horizontal width of the window in the graphics plane, and takes a value in the range from "0" to "video_width-window_horizontal_position−1". The "window_height" is a vertical width of the graphics plane, and takes a value in the range from "0" to "video_height-window_vertical_position−1".

With the "window_horizontal_position", "window_vertical_position", "window_width", and "window_height" of the window definition segment, it is possible to define, for each Epoch, the location of the window in the graphics plane and the size of the window. This makes it possible to make an adjustment during the authoring by, for example, causing the window to appear above a picture belonging to an Epoch so that a window does not disturb display of the picture while the picture is displayed. This makes the display of the graphics subtitle easy to see. Since the window definition segment can be defined for each Epoch, even if an image pattern in the picture changes over time, the graphics can be made easy to see in correspondence with the change. As a result of this, it is possible to increase the quality of the movie to the same level as the case where the subtitle is embedded in the main body of the movie.

FIG. 76B shows the structure of the PCS (Presentation Composition Segment) with additional fields for the "1 plane+offset" mode.

As shown in FIG. 76B, the PCS includes "segment_type", "segment_length", "composition_number", "composition_state", "pallet_update_flag", "pallet_id_ref", "number_of_composition_object", and "composition_object(1)" through "composition_object(m)".

The "composition_number" identifies the graphics update in the display set, by a numeral ranging from "0" to "65535". It identifies the graphics update as follows. The "composition_number" is set to satisfy the rule that, when there are graphics updates between the start of Epoch and the present PCS, the "composition_number" is incremented each time one of the graphics updates is passed through.

The "composition_state" indicates which of Normal Case, Acquisition Point, and Epoch Start, the Display Set starting with the present PCS is.

The "pallet_update_flag" indicates whether the Pallet-Only Display Update has been done in the present PCS. Note that the Pallet-Only Display Update is an update that is made by switching only the previous pallet to a new one. When an update is performed in the present PCS, the present PCS is set to "1".

The "3d_graphics_offset_direction" and "3d_graphics_offset" following these are metadata in the graphics stream.

The "3d_graphics_offset_direction" is a field for setting a leftward or a rightward direction in which a shift is to be made by the Offset.

The "3d_graphics_offset" is a field for setting specifically how much the target should be moved in the leftward or rightward direction.

The "pallet_id_ref" indicates a pallet to be used for the Pallet-Only Display Update.

The "composition_object(1)" through "composition_object (n)" are information indicating how to control the Object to be displayed in the Display Set to which the present PCS belongs. The lead line "col" indicates a close-up of the internal structure of an arbitrary "composition_object(i)". As the lead line "col" indicates, the "composition_object(i)" includes "object_id_ref", "window_id_ref", "object_cropped_flag", "forced_on_flag", "object_horizontal_position", "object_vertical_position", "cropping_rectangle information (1), (2), . . . , (n)".

The "object_id_ref" indicates an identifier of an ODS that corresponds to the "composition_object(i)" and should be referenced.

The "window_id_ref" indicates a window to be assigned to the graphics object. Up to two graphics objects can be assigned to one window.

The "object_cropped_flag" is a flag to switch between displaying a graphics object having been cropped in the object buffer and displaying a not-cropped graphics object. When the "object_cropped_flag" is set to "1", a graphics object having been cropped in the object buffer is displayed; and when the "object_cropped_flag" is set to "0", a not-cropped graphics object is displayed. The "forced_on_flag", when set to "1", indicates that the graphics object indicates a subtitle that is to be displayed forcibly even if the subtitle has been set to "OFF" in the setting of the player.

The "object_horizontal_position" indicates the horizontal position of the upper-left pixel in the graphics object in the graphics plane.

The "object_vertical_position" indicates the vertical position of the upper-left pixel in the graphics plane.

The "cropping_rectangle information (1), (2), . . . , (n)" are information elements that are valid while the "object_cropped_flag" is set to "1". The lead line "wd2" indicates a close-up of the internal structure of an arbitrary "cropping_rectangle information (i)". As the lead line "wd2" indicates, the "cropping_rectangle information(i)" includes "object_cropping_horizontal_position", "object_cropping_vertical_address", "object_cropping_width", and "object_cropping_height".

The "object_cropping_horizontal_position" indicates a horizontal position of an upper-left pixel in the cropping rectangle in the graphics plane. Note that the cropping rectangle is a frame used to cut out a part of the graphics object, and corresponds to "Region" defined in the ETSI EN 300 743 standard.

The "object_cropping_vertical_address" indicates a vertical position of the upper-left pixel in the cropping rectangle in the graphics plane.

The "object_cropping_width" indicates a horizontal width of the cropping rectangle in the graphics plane.

The "object_cropping_height" indicates a vertical width of the cropping rectangle in the graphics plane.

This completes the explanation of the data structure of the PCS.

The unit of the value indicated in the "3D_graphics_offset" may be defined as an amount of shift that is made in a unit of a pixel on the screen, or may be defined as an amount of shift that is made in a unit of, for example, two pixels for the sake of reduction in the number of bits to be used to define the "3D_graphics_offset".

For example, the "3D_graphics_offset_direction" may be structured as a one-bit field so that when the field is set to "0", the offset is applied in the direction in which the subtitle pops out in front of the display (namely, before the graphics plane is overlaid with the left-eye video plane, the graphics plane is shifted rightward by the offset), and when the field is set to "1", the offset is applied in the direction in which the subtitle recedes behind the display in the depth direction. Also, the "3D_graphics_offset" may have six bits so that leftward and rightward offsets to be applied to the graphics plane to be superimposed with the video plane may each be 64 pixels (when the offset indicates the amount of movement in unit of a pixel).

In this case, since the leftward and rightward offsets of 64 pixels each do not provide a sufficient 3D subtitle (pop-out), the value of this field is used as an interpolation value for the offset sequence in the dependent-view stream. More specifically, the offset indicated in the "composition_object" is an interpolation value that is used in combination with the offset sequence in the dependent-view stream, and indicates an amount of interpolation in support of the offset indicated by the offset sequence in the dependent-view stream.

Next, how each PCS is described will be explained. FIGS. 77A through 77C show examples of descriptions in the window definition segment and PCS belonging to a display set. FIG. 77A shows an example of description in the PCS in the DS1.

In FIG. 77A, the "window_horizontal_position" and the "window_vertical_position" in the window definition segment indicate an upper-left coordinate LP1 of the window in the graphics plane, and the "window_width" and the "window_height" indicate the horizontal and vertical widths of the display frame of the window.

In FIG. 77A, the "object_cropping_horizontal_position" and the "object_cropping_vertical_position" in the crop information indicate a standard point ST1 of the crop range in the coordinate system whose origin is an upper-left coordinate of the graphics object in the object buffer. A range of "object_cropping_width" and "object_cropping_height" from the standard point (the range enclosed by a thick-line frame in the drawing) is called "crop range". The cropped graphics object is placed in a range "cp1" enclosed by a dotted line whose standard point (an upper-left point) is the "object_horizontal_position" and the "object_vertical_position" in the coordinate system of the graphics plane. With this arrangement, "Actually" is written into the window in the graphics plane, and the subtitle "Actually" is overlaid with the video image and a resultant overlaid image is displayed.

FIG. 77B shows an example of description in the PCS in the DS2. The descriptions in the window definition segment in FIG. 77B is similar to that in FIG. 77A, and the explanation thereof is omitted. The descriptions in the crop information is different from FIG. 77A. In FIG. 77B, the "object_cropping_horizontal_position" and the "object_cropping_vertical_position" in the crop information indicate an upper-left coordinate of "I was hiding" in the subtitle "Actually, I was hiding my feelings" in the object buffer. The "object_cropping_width" and "object_cropping_height" indicate the horizontal width and vertical width of "I was hiding". With this arrangement, "I was hiding" is written into the window in the graphics plane, and the subtitle "I was hiding" is overlaid with the video image and a resultant overlaid image is displayed.

FIG. 77C shows an example of description in the PCS in the DS3. The descriptions in the window definition segment in FIG. 77B is similar to that in FIG. 77A, and the explanation thereof is omitted. The descriptions in the crop information is different from FIG. 77A. In FIG. 77C, the "object_cropping_horizontal_position" and the "object_cropping_vertical_position" in the crop information indicate an upper-left coordinate of "my feelings" in the subtitle "Actually, I was hiding my feelings" in the object buffer. The "object_cropping_width" and "object_cropping_height" indicate the horizontal width and vertical width of "my feelings". With this arrangement, "my feelings" is written into the window in the graphics plane, and the subtitle "my feelings" is overlaid with the video image and a resultant overlaid image is displayed.

In this way, a predetermined display effect of the subtitle can be realized by describing the PCSs in the DS1, DS2 and DS3 as explained above.

FIG. 78 shows how the offset changes over time in the case where an interpolation is performed by using "3d_graphics_offset" in "composition_object" and in the case where no interpolation is performed. The solid line indicates how the offset changes over time in the case where an interpolation is performed by using "3d_graphics_offset" in "composition_object", and the dotted line indicates how the offset changes over time in the case where the interpolation using "3d_graphics_offset" in "composition_object" is not performed.

There may be a case where there are two drawing areas in the graphics plane, and one drawing area is desired for displaying a spoken text, the other desired for displaying a commentary of the director of the movie, and it is further desired that the commentary appears to be placed further away from the spoken text so that the subtitle has a stereoscopic effect. In such a case, it is possible to increase the depth of the commentary by setting the interpolation value for the second drawing area.

The plane shift is performed in units of lines. Thus a rule should be made to prohibit a plurality of drawing areas from being defined per line, or to cause offsets of the drawing areas to be set to the same value when a plurality of drawing areas are defined for one line.

Embodiment 9

The present embodiment relates to an improvement that the video offset information has offset values corresponding to respective areas obtained by dividing the screen.

FIG. 79 shows an offset sequence composed of offsets that correspond to respective areas obtained by dividing the screen. The left-hand side of FIG. 79 shows an offset sequence composed of nine offsets. The right-hand side of FIG. 79 shows the correspondence between the offsets constituting the offset sequence and the nine areas obtained by dividing the screen. As shown in FIG. 79, Offset_1 indicates the offset value of an upper-left area, Offset_1 indicates the offset value of an upper-left area, Offset_2 indicates the offset value of a left-middle area, Offset_3 indicates the offset value of a lower-left area, Offset_4 indicates the offset value of an upper-middle area, Offset_5 indicates the offset value of a center area, Offset_6 indicates the offset value of a lower-middle area, Offset_7 indicates the offset value of an upper-right area, Offset_8 indicates the offset value of a right-middle area, and Offset_9 indicates the offset value of a lower-right area. These offset values are determined based on the depth information of each frame of video in the video stream.

FIG. 80 shows the correspondence between the depths of objects in the screen and the offsets. The left-hand side of FIG. 80 shows an example of picture data. The right-hand side of FIG. 80 shows the offsets of the respective areas constituting the screen. In the left-hand side of FIG. 80, it is presumed that the elliptical object appears to be behind the screen, and the triangular object appears to pop out in front of the screen.

In this case, Offset 1 corresponding to the area containing the elliptical object has a small value.

Offsets 5, 6, 8, and 9 corresponding to the areas containing the triangular object have large values. In this way, the offset information is generated based on the depths of the objects included in the scenes of each frame.

Next, the 3D playback device will be explained. The basic part of the structure of the 3D playback device is the same as the structure of the 3D playback devices having been explained in the embodiments so far. Thus the explanation will center on the extension or the different portions.

FIG. 81 shows the video decoder, left-view plane, right-view plane, and PG/IG plane, among the components of the playback device.

The 3D video decoder, at the same timing as a frame of decoded image is written onto the 2D/left-eye image plane at the timing of PTS, notifies the plane overlay unit of the video offset information contained in the frame.

Also, the SPEM(25), among the registers storing player variables, stores information indicating which among the nine offsets included in the video offset information are offsets from which the largest value is taken to be used in the plane shift. The SPEM(25) indicates which among Offset_1, Offset_2, Offset_3, Offset_4, Offset_5, Offset_6, Offset_7, Offset_8, and Offset_9 have values from which the largest value is taken.

The SPEM(25) is set by a command or API when the program of the BD program file is executed. The SPEM(25) has, for example, 9-bit information, each of the nine bits indicates valid/invalid of each offset value.

The plane overlay unit determines, as the value by which the plane is to be shifted, the largest value of the offset value based on the video offset information transferred from the 3D video decoder and based on the values of the SPRM(25). The plane overlay unit then performs overlaying with the plane stored in the plane memory by performing the plane shift and cropping process.

In the example shown in FIG. 81, the offsets have the following values: Offset_1=−3, Offset_2=−3, Offset_3=−1, Offset_4=−2, Offset_5=3, Offset_6=5, Offset_7=1, Offset_8=4, and Offset_9=5. The SPRM(25) is set to indicate that Offset_1, Offset_4, and Offset_7 are valid, and the largest values of these offsets are used in the plane shift.

The shift unit determines the largest value (in this example, MAX(−3, −2, 1)=1) among the values of Offset_1, Offset_4, and Offset_7 that are indicated as valid by the SPRM(25) in the video offset information, executes the plane shift and the cropping process, and performs the superimposing with image plane.

With the structure stated above, it is possible to reduce the size of the memory provided in the 3D playback device, by including the video offset information into the video stream.

<Application of Offset>

The SPEM(25) may include not only the information indicating offsets having valid values among the offsets of the nine areas, but also a base offset value. The plane overlay unit, after determining the largest value among the valid values of the offsets, may add the base offset value to the largest value. For example, when the largest value among the valid values of the offsets is "3" and the base offset value is "2", the offset value used in the plane shift is "5" (3+2=5).

<Application of Window>

In the present embodiment, the SPRM(25) is used to indicate valid offsets among those corresponding to the nine areas constituting the screen. However, not limited to this, the valid offsets may be determined based on a graphics rectangular area in the graphics plane.

FIG. 82 shows the correspondence between the contents of the graphics plane and the offsets.

Suppose here that the graphics image to be displayed is the ellipse shown in the lower row of FIG. 82. In this case, valid offsets are Offset_5, Offset_6, Offset_8, and Offset_9. This also applies to the case where information such as the closed caption is played back three-dimensionally, as well as to the case where the graphics such as IG/PG is displayed.

<Position of Offset Information>

The video offset information may be stored only at the start of a GOP, not in each frame contained in the GOP. Also, as many pieces of video offset information as the frames contained in the GOP may be stored at the start of the GOP.

The video offset information may be calculated based on the difference between the motion vectors of the left-eye and right-eye images during the video encoding.

<Modifications>

When the video offset information is calculated from the depths of the objects included in the scenes of each frame, the depths of the graphics change greatly if the depths of the depth information change greatly. In view of this, the values may be set by causing the values to pass through a low-pass filter between frames.

<Application of Plane Memory>

In the present embodiment, the video offset information is set to have values corresponding to the nine areas constituting the screen. However, not limited to this, the video offset information may have offset values for each plane. In this case, the plane overlay unit changes the offset values depending on the plane, and performs the plane shift and cropping.

<Storage Position>

In the present embodiment, the offset values are stored in the 2D/left-eye video stream. However, not limited to this, the offset values may be stored in the right-eye video stream.

Embodiment 10

In the present embodiment, the 3D-depth method is introduced, as well as the 3D-LR method which realizes the stereoscopic viewing effect by using the L and R images. In the 3D-depth method, the stereoscopic viewing effect is realized by using the 2D image and the depth information.

The 3D-depth method is realized by incorporating a parallax image generator in the latter half of the video decoder, and in the 3D-depth method, the left-view picture data and the right-view picture data are generated from (i) each piece of picture data in the video stream and (ii) the depth information of each pixel that constitutes the picture data.

The depth information may be made of grayscale picture data (also referred to as depth information picture data) that represents the depth of pixels by a grayscale.

FIGS. 83A through 83D show one example of the 3D-depth method. FIG. 83A shows a 2D image, and FIG. 83B shows a grayscale generated for the 2D image shown in FIG. 83A. The grayscale is represented by pixels that are composed of only the brightness element. The brighter (whiter) the grayscale pixels are, the shallower they are; and the darker the grayscale pixels are, the deeper they are. FIGS. 83C and 83D show the left-eye image and the right-eye image that are generated with use of the grayscale, respectively. FIG. 84 shows a stereoscopic image generated in the 3D-depth mode. As shown in FIG. 84, by generating the left-eye image and the right-eye image for each frame of 2D images, the user can enjoy the stereoscopic viewing by seeing the left-eye image and the right-eye image through the goggle.

In the 3D-depth method, a video stream that can be played back as a 2D image becomes the base-view video stream; and a video stream that is composed of grayscale picture data becomes the dependent-view video stream.

The base-view video stream can be shared by the 3D-depth mode and the 3D-LR mode. It is therefore possible to generate images for the 3D-depth mode and images for the 3D-LR mode by combining the base-view video stream and a video stream for the 3D-depth mode or a video stream for the 3D-LR mode. The data management structure is structured to support these combinations so that the display method is switched in accordance with the properties of the player and the television connected thereto. To achieve the 3D-depth mode, the playback device needs to be provided with dedicated hardware. As a result, it is supposed in the present application, except where otherwise mentioned, that the recording medium and the playback device do not support the 3D-depth mode.

FIGS. 85A and 85B show one example of the structure of recording medium for realizing the 3D-depth mode. FIG. 85A shows directories and files for the 3D-depth mode.

The stream files including data blocks of the base-view video stream for 3D playback are stored in the BASE subdirectory which is created under the STREAM directory such that the stream files for 3D playback are distinguished from the stream files for 2D playback.

The stream files including data blocks of the dependent-view video stream of the LR format for 3D playback are stored in the LR sub-directory which is created under the STREAM directory such that the stream files for 3D playback are distinguished from the stream files for 2D playback.

The stream files including data blocks of the base-view video stream of the depth format for 3D playback are stored in the DEPTH sub-directory which is created under the STREAM directory such that the stream files for 3D playback are distinguished from the stream files for 2D playback.

Similarly, the stream management information for managing stream files for playback in the LR format is stored in the LR sub-directory which is created under the CLIPINF directory such that the management for 3D playback is distinguished from the management for 2D playback.

The stream management information for managing stream files for playback in the depth format is stored in the DEPTH sub-directory which is created under the CLIPINF directory such that the management for 3D playback is distinguished from the management for 2D playback. The extension is also changed in accordance with the format of the file.

A stream file which, by itself alone, can realize a playback is assigned with the same extension assigned to the corresponding stream file for 2D playback.

A stream file, which does not include a data block of the base-view video stream, cannot realize a playback (cannot decode the video) by itself alone, and can decode the video only when it is executed together with a stream file including a data block of the base-view video stream, is assigned with an extension such as ".3dts", for the distinction.

A stream file, in which data blocks of the base-view video stream and the dependent-view video stream are arranged in the interleaved manner and thus a playback cannot be realized if the contents of the file are read in sequence from the start thereof, is assigned with an extension such as ".ilts" (which stands for "interleaved TS"), for distinction.

FIG. 85B shows a syntax for writing the extension stream selection table for support of the 3D-depth mode. In the syntax shown in FIG. 85B, a type "type=4" has been added to "stream_entry( )". When the type is set to "type=4", "ref_to_stream_PID_of_3DClip" specifying a file for 3D is included.

The "LR_dependent_view_ES_availability", "LR_interleaved_file_availability", "Depth_dependent_view_ES_availability", and "Depth_interleaved_file_availability" are flags for indicating that the files in the interleave format are not necessary when the dependent-view video stream using "Out-of-MUX" is supplied.

The "3D_base_view_block( )" is a block that exists without fail. When different Extents are to be referenced for 2D and 3D, it references "STREAM/BASExxxxx.m2ts" by the stream entry of "type=4".

When the same Extent is to be referenced for 2D and 3D, it references "STREAM/xxxxx.m2ts" by the stream entry of "type=1".

When "LR_dependent_view_ES_availability" has been set ON, it specifies "STREAM/LR/xxxxx.3dts" by using the stream entry of "type=4". When the LR interleave file is used, "STREAM/LR/xxxxx.ilts" is specified.

When "Depth_dependent_view_ES_availability" has been set ON and different Extents are to be referenced for 2D and 3D, it specifies "STREAM/DEPTH/xxxxx.3dts" by using the stream entry of "type=4". When the Depth interleave file is used, "STREAM/DEPTH/xxxxx.ilts" is specified.

FIG. 86 shows correspondence between the playitem and the streams. The first column on the left-hand side of FIG. 86 shows the playitem including the extension stream selection table written by the syntax of FIG. 85B. The second column adjacent to the first column shows the transport streams stored in the stream files shown in FIG. 85A. The third column shows various types of playback devices. The fourth column shows clip information files that are referenced by the playback devices.

The playitem shown on the left-hand side of FIG. 86 includes clip information file name (Clip_filename), stream selection table (STN_table), and extension stream selection table (STN_table_extension) corresponding to the 3D-depth method. The small boxes included in the stream selection table and the extension stream selection table indicate the types of the stream entries of the stream registration information in these tables. As shown in FIG. 86, the stream entry in the stream selection table is type 1 (type=1).

In contrast, in the extension stream selection table, the stream entries of: the base-view video stream (base view stream); the dependent-view video stream in the 3D-LR format (LR dependent view stream); the stereoscopic interleaved stream in the 3D-LR format (LR interleaved stream); the dependent-view video stream in the 3D-depth format (Depth dependent view stream); and the stereoscopic interleaved stream in the 3D-depth format (Depth interleaved stream) are each type 4 (type=4).

The top row of the second column shows the internal structure of the stereoscopic interleaved stream file (00001.ssif). The signs "D", "R", "L", and "$L_{2D}$" in the small boxes indicate: Extent of the base-view video stream in the depth format; Extent of the right-view video stream; Extent of the left-view video stream; and Extent for 2D among Extents of the left-view video stream, respectively.

When the stream file is to be referenced by a 2D player by file path STREAM/00001.m2ts from the clip information file name in the playitem information, the Extents "L" and "$L_{2D}$" among the above-described Extents of the stereoscopic interleaved stream file are referenced by the 2D player.

When the stream file is to be referenced by a 3D player in the 3D-LR mode by file path STREAM/BASE/00001.m2ts from the clip information file name in the playitem information, the Extents "L" and "$L_{3D}$" among the above-described Extents of the stereoscopic interleaved stream file are referenced by the 3D player.

When the stream file is to be referenced by a 3D player in the 3D-LR mode by file path STREAM/LR/00001.3dts from the clip information file name in the playitem information, the Extents "R", "R", and "R" among the above-described Extents of the stereoscopic interleaved stream file are referenced by the 3D player.

When the stream file is to be referenced by a 3D player in the 3D-LR mode by file path STREAM/LR/00001.ilts from the clip information file name in the playitem information, the Extents "R", "L", "R" and "$L_{3D}$" among the above-described Extents of the stereoscopic interleaved stream file are referenced by the 3D player.

When the stream file is to be referenced by a 3D player in the 3D-depth mode by file path STREAM/DEPTH/00001.3dts from the clip information file name in the playitem information, the Extents "D", "D", and "D" among the above-described Extents of the stereoscopic interleaved stream file are referenced by the 3D player.

When the stream file is to be referenced by a 3D player in the 3D-depth mode by file path STREAM/DEPTH/00001.ilts from the clip information file name in the playitem information, the Extents "D", "L", "D", "$L_{3D}$", and "L" among the above-described Extents of the stereoscopic interleaved stream file are referenced by the 3D player.

The fourth column of FIG. 86 indicates that: "CLIPINF/00001.clpi" is referenced by the 2D player, 3D players that perform the 3D-LR playback, and 3D players that perform the depth playback; "CLIPINF/LR/00001.clpi" is referenced by the 3D players that perform the 3D-LR playback; and "CLIPINF/DEPTH/00001.clpi" is referenced by the 3D players that perform the depth playback.

As described above, when the stream entry is "type=4", streams files to be read are determined based on the type of 3D playback (LR format or Depth format) and the file format supported by the player (base/dependent file format or single file format).

When cross-linking is realized between the 2D stream files and 3D stream files so that the same Extents can be referenced for these files, a stream file that is the same as the 2D stream file can be referenced by setting the stream entry of the base-view stream to "type=1". When multiplication into one transport stream is realized, a stream file that is the same as the 2D stream file can be referenced by setting the stream entries of the base-view stream and the dependent-view stream to "type=1".

Embodiment 11

Embodiment 11 explains the data structure for reducing the size of the buffer that is used when video data for playback is decoded by the 3D playback device of the present invention, and explains the 3D playback device.

As indicated in the previous Embodiment, the 3D video decoder is provided with: an Elementary Buffer EB(1) for storing the video access unit of the 2D/left-view video stream in the encoded state; and an Elementary Buffer EB(2) for storing the video access unit of the right-view video stream in the encoded state.

These buffers correspond to the CPB in the MPEG-4 AVC standard, and the buffer size thereof is determined in accordance with a predetermined standard. In general, the buffer size is set in proportion to the bit rate. That is to say, the greater the bit rate is, the larger the necessary buffer size is; and the smaller the bit rate is, the smaller the necessary buffer size is. The bit rate mentioned here means a transfer rate in a transfer from an MB to an EB, and corresponds to the BitRate stored in the HRD parameter, in the MPEG-4 AVC standard.

For example, when the bit rate of the 2D/left-view video stream is 40 Mbps and the buffer size necessary therefor is 4 MB, the buffer size necessary for the bit stream encoded by the same encoding method whose bit rate is 30 Mbps is 4 MB×30 Mbps/40 Mbps=3 MB.

It should be noted here that the total bit rate of the 2D/left-view video stream and the right-view video stream is determined from the transfer rate from the drive or the like, and is set as a fixed value. In the present example, it is presumed that the total bit rate of the video streams is 60 Mbps.

Accordingly, when the total bit rate is 60 Mbps and the bit rate of the 2D/left-view video stream is 40 Mbps, the bit rate of the right-view video stream is 20 Mbps; and when the bit rate of the 2D/left-view video stream is 30 Mbps, the bit rate of the right-view video stream is 30 Mbps.

Here, with regard to the largest value of the bit rate, the largest bit rate of the 2D/left-view video stream is 40 Mbps, and the largest bit rate of the right-view video stream is 30 Mbps. From the largest values of the bit rates, the sizes of the EBs can be defined as follows: the size of EB(1) for the 2D/left-view video stream is 4 MB×40 Mbps/40 Mbps=4 MB; and the size of EB(2) for the right-view video stream is 4 MB×30 Mbps/40 Mbps=3 MB. Based on this definition of the buffer sizes, it would be presumed that the playback of the 3D video is guaranteed if the 3D playback device is provided with 4 MB+3 MB=7 MB of buffer and each video stream is generated so that an underflow or an overflow does not occur with the buffer size as defined above.

However, since the total bit rate of the 2D/left-view video stream and the right-view video stream is 60 Mbps, there is no combination of the largest bit rate of the 2D/left-view video stream=40 Mbps and the largest bit rate of the right-view video stream=30 Mbps. For this reason, the buffer size of each buffer is determined from the largest bit rate of each video stream for the 3D playback device (4 MB+3 MB), a buffer size larger than necessary is set.

In view of this problem, the following describes the data structure enabling the 3D playback device to set the minimum buffer sizes for the EB(1) and EB(2), and describes the 3D playback device.

First, the data structure will be described.

The basic part of the data structure is the same as the data structure for storing the 3D video having been described in the previous embodiments. Thus the following description centers on the extended or different parts.

In the data structure of the present embodiment, the playitem additionally has fields indicating the sizes of the EB(1) and EB(2) as shown in FIG. 87, which is the difference from the structures described earlier. FIG. 87 shows the playitem information that includes size information of the elementary buffers.

The "EB(1) size" field stores size information of EB(1) necessary for decoding the 2D/left-view video stream referenced from a playitem.

The "EB(2) size" field stores size information of EB(2) necessary for decoding the right-view video stream to be played back together with the playitem.

The total size of EB(1) and EB(2) is determined from the total bit rate of the 2D/left-view video stream and the right-view video stream. For example, when the total bit rate of the 2D/left-view video stream and the right-view video stream is 60 Mbps, the total size of EB(1) and EB(2) is 4 MB×60 Mbps/40 Mbps=6 MB.

Also, the 2D/left-view video stream to be referenced from the playitem is generated so that an underflow or an overflow does not occur with the buffer size defined in the "EB(1) size" field, and the right-view video stream to be played back together with the playitem is generated so that an underflow or an overflow does not occur with the buffer size defined in the "EB(2) size" field.

Next, the 3D playback device will be described.

The basic part of the 3D playback device is the same as the 3D playback device for playing back the 3D video having been described in the previous embodiments. Thus the following description centers on the extended or different parts.

The 3D playback device of the present embodiment resizes the EBs for the base view and dependent view (resizes memory areas to be allocated) depending on the playitem to be played back, which is the difference from the 3D playback devices described earlier.

The playback control unit, before the playback of the playitem, obtains the sizes of EB(1) and EB(2) by referring to the "EB(1) size" field and the "EB(2) size" field in playitem #1, and notifies the system target decoder of the obtained sizes. Upon receiving the notification of the sizes, the system target decoder resizes EB(1) and EB(2) of the 3D video decoder. The playback control unit starts playing back the playitem after the resizing of EB(1) and EB(2) is completed.

When the 3D playback device plays back playitem #1 as the 3D video, it identifies (i) the 2D/left-view video stream to be referenced from playitem #1 and (ii) the right-view video stream to be played back together with playitem #1. The 3D playback device resizes EB(1) and EB(2) of the video decoder in the system target decoder, based on the "EB(1) size" field and the "EB(2) size" field included in playitem #1. In the present example, the 3D playback device resizes EB(1) and EB(2) to 4 MB and 2 MB, respectively, before starting to play back the video stream. Similarly, when the 3D playback device plays back playitem #2, it resizes EB(1) and EB(2) of the video decoder in the system target decoder, based on the "EB(1) size" field and the "EB(2) size" field included in playitem #2. In the present example, the 3D playback device resizes EB(1) and EB(2) to 3 MB and 3 MB, respectively, before starting to play back the video stream.

With the above-described structure, it is possible to control the sizes of EB(1) and EB(2) necessary for the playback of 3D video appropriately depending on the bit rate of the video stream, thus making it possible to define the necessary buffer sizes based on the total bit rate of the 2D/left-view video stream and the right-view video stream. This, compared with the case where each buffer size is defined based on the largest value of each bit rate, reduces the total buffer size of the necessary buffers EB(1) and EB(2).

Note that when the buffer sizes are resized so that either of the EBs is smaller than the other in size, a seamless connection between playitems may not be guaranteed because the data transfer between the playitems may fail. Thus such resizing may be prohibited. More specifically, in the playitems whose connection condition is "5" or "6", setting of the buffer sizes for EB(1) and EB(2) may be prohibited or disregarded. Alternatively, in a playitems whose connection condition is "5" or "6", it may be made a rule that the values of the buffer sizes for EB(1) and EB(2) should be the same as the values of the buffer sizes for EB(1) and EB(2) in the previous playitem.

Also, since the total bit rate of the 2D/left-view video stream and the right-view video stream is determined as a fixed value, only the "EB(1) size" field may be provided, and the size of EB(2) may be obtained by subtracting the size of EB(1) from the total buffer size of EB(1) and EB(2) ("size of EB(2)"="total buffer size"−"size of EB(1)").

Furthermore, the "EB(1) size" field and the "EB(2) size" field may take any form as far as the buffer sizes can be calculated. For example, the fields may include bit rates of the video stream so that the buffer sizes can be calculated from the bit rates. Alternatively, combinations of the EB(1) size and EB(2) size may be defined as a table, and the IDs thereof may be set.

Embodiment 12

The present embodiment relates to an improvement of adding depth information to the 3D metadata in the clip information, where the depth information indicates depths added to 2D images represented by the presentation graphics stream, interactive graphics stream, and sub-picture graphics stream.

FIG. 88 shows the 3D metadata to which the depth information has been added. As shown in the upper row of FIG. 88, the 3D metadata is table information including: one or more PTSs that indicate display times of 3D image; and corresponding offset values that indicate shifts of right-view/left-view pixels. The offset values are represented by the numbers of pixels to be shifted in the X-axis direction, and can include negative values. In this embodiment, each pair of a PTS and an offset value shown in one row of the table is called an offset entry. The period during which each offset entry is valid extends from a time point indicated by the PTS of the current offset entry to a time point indicated by the PTS of the next offset entry. For example, when the PTS of offset entry #1 indicates a time point "180000" and the PTS of offset entry #2 indicates a time point "270000", offset entry #1 is valid during a period from the time point "180000" to the time point "270000". The plane overlay unit of the playback device overlays the PG plane, IG plane and sub-picture plane by shifting them rightward or leftward based on the offset values at respective time points. With such plane overlaying, a parallax image can be generated, and it is possible to add a three-dimensional depth to the two-dimensional image.

Note that although the 3D metadata is set for each PID in the present embodiment, the 3D metadata may be set for each plane. The structure simplifies the process of analyzing the 3D metadata by the 2D/3D playback device. By taking into account the performance of the 2D/3D playback device in the overlaying process, the interval between the offset entries may be limited, for example, to be not less than one second.

Here, video stream attribute information will be explained. In the 3D-LR mode, the codec, frame rate, aspect ratio, and resolution indicated by the video stream attribute information of the 2D/base-view video stream with PID "0x1011" should match those indicated by the video stream attribute information of the corresponding right-view AV stream with PID "0x1012", respectively. Also, in the 3D-depth mode, the codec, frame rate, aspect ratio, and resolution indicated by the video stream attribute information of the 2D/base-view video stream with PID "0x1011" should match those indicated by the video stream attribute information of the corresponding depth-map AV stream with PID "0x1013", respectively. This is because: if the codecs are different, the reference relationships between the video streams will not be established; and if the frame rates, aspect ratios, and resolutions are different, the user will feel uncomfortable when the images are played back in synchronization with each other as a 3D image.

As a variation of the above-described structure, the video stream attribute information of the right-view AV stream may include a flag that indicates that the video stream in question is a video stream that references the 2D/base-view video stream. As another variation, the video stream attribute information may include information of the reference-destination AV stream. With such a structure, the tool for verifying whether or not the created data conforms to a predetermined format can check the relationships between the video streams.

An entry map of the 2D/left-view video stream is stored in the clip information file of the 2D/base-view video stream. In each entry point of the 2D/left-view video stream, the PTS and SPN of the I-picture at the start of GOP of the 2D/left-view video stream are registered. Similarly, an entry map of the right-view video stream is stored in the clip information file of the right-view video stream. In each entry point of the right-view video stream, the PTS and SPN of the picture at the start of GOP of the right-view video stream are registered.

Embodiment 13

The present embodiment describes an example structure of a playback device for playing back the data of the structure described in an earlier embodiment, which is realized by using an integrated circuit 603. FIG. 89 shows an example structure of a 2D/3D playback device which is realized by using an integrated circuit.

The medium interface unit 601 receives (reads out) data from the medium, and transfers the data to the integrated circuit 603. Note that the medium interface unit 601 receives the data of the structure described in the earlier embodiment. The medium interface unit 601 is, for example: a disc drive when the medium is the optical disc or hard disk; a card interface when the medium is the semiconductor memory such as the SD card or the USB memory; a CAN tuner or Si tuner when the medium is broadcast waves of broadcast including the CATV; or a network interface when the medium is the Ethernet, wireless LAN, or wireless public line.

The memory 602 is a memory for temporarily storing the data received (read) from the medium, and the data that is being processed by the integrated circuit 603. For example, the SDRAM (Synchronous Dynamic Random Access Memory), DDRx SDRAM (Double-Date-Ratex Synchronous Dynamic Random Access Memory; x=1, 2, 3 . . . ) or the like is used as the memory 602. Note that the number of the memories 602 is not fixed, but may be one or two or more, depending on the necessity.

The integrated circuit 603 is a system LSI for performing the video/audio processing onto the data transferred from the interface unit 601, and includes a main control unit 606, a stream processing unit 605, a signal processing unit 607, a memory control unit 609, and an AV output unit 608.

The main control unit 606 includes a processor core having the timer function and the interrupt function. The processor core controls the integrated circuit 603 as a whole according to the program stored in the program memory or the like. Note that the basic software such as the OS (operating software) is stored in the program memory or the like preliminarily.

The stream processing unit 605, under the control of the main control unit 606, receives the data transferred from the medium via the interface unit 601 and stores it into the memory 602 via the data bus in the integrated circuit 603. The stream processing unit 605, under the control of the main control unit 606, also separates the received data into the video-base data and the audio-base data. As described earlier, on the medium, AV clips for 2D/L including left-view video stream and AV clips for R including right-view video stream are arranged in an interleaved manner, in the state where each clip is divided into some Extents. Accordingly, the main control unit 606 performs the control so that, when the integrated circuit 603 receives the left-eye data including left-view video stream, the received data is stored in the first area in the memory 602; and when the integrated circuit 603 receives the right-eye data including right-view video stream, the received data is stored in the second area in the memory 602. Note that the left-eye data belongs to the left-eye Extent, and the right-eye data belongs to the right-eye Extent. Also note that the first and second areas in the memory 602 may be areas generated by dividing a memory logically, or may be physically different memories.

The signal processing unit 607, under the control of the main control unit 606, decodes, by an appropriate method, the video-base data and the audio-base data separated by the stream processing unit 605. The video-base data has been recorded after being encoded by a method such as MPEG-2, MPEG-4 AVC, MPEG-4 MVC, or SMPTE VC-1. Also, the audio-base data has been recorded after being compress-encoded by a method such as Dolby AC-3, Dolby Digital Plus, MLP, DTS, DTS-HD, or Linear PCM. Thus, the signal processing unit 607 decodes the video-base data and the audio-base data by the methods corresponding thereto. Models of the signal processing unit 607 are various decoders of Embodiment 9 shown in FIG. 65.

The memory control unit 609 mediates the access to the memory 602 from each functional block in the integrated circuit 603.

The AV output unit 608, under the control of the main control unit 606, performs the superimposing of the video-base data having been decoded by the signal processing unit 607, or format conversion of the video-base data and the like, and outputs the data subjected to such processes to the outside of the integrated circuit 603.

FIG. 90 is a functional block diagram showing a typical structure of the stream processing unit 605. The stream processing unit 605 includes a device/stream interface unit 651, a demultiplexing unit 652, and switching unit 653.

The device/stream interface unit 651 is an interface for transferring data between the interface unit 601 and the integrated circuit 603. The device/stream interface unit 651 may be: SATA (Serial Advanced Technology Attachment), ATAPI (Advanced Technology Attachment Packet Interface), or PATA (Parallel Advanced Technology Attachment) when the medium is the optical disc or the hard disk; a card interface when the medium is the semiconductor memory such as the SD card or the USB memory; a tuner interface when the medium is broadcast waves of broadcast including the CATV; or a network interface when the medium is the Ethernet, wireless LAN, or wireless public line. The device/stream interface unit 651 may have a part of the function of the interface unit 601, or the interface unit 601 may be embedded in the integrated circuit 603, depending on the type of the medium.

The demultiplexing unit 652 separates the playback data, transferred from the medium, including video and audio, into the video-base data and the audio-base data. Each Extent, having been described earlier, is composed of source packets of video, audio, PG (subtitle), IG (menu) and the like (dependent source packets may not include audio). The demultiplexing unit 652 separates the playback data into video-base TS packets and audio-base TS packets based on the PID (identifier) included in each source packet. The demultiplexing unit 652 transfers the data after the separation to the signal processing unit 607. A model of the demultiplexing unit 652 is, for example, the source depacketizer and the PID filter of Embodiment 9 shown in FIG. 65.

The switching unit 653 switches the output destination (storage destination) so that, when the device/stream interface unit 651 receives the left-eye data, the received data is stored in the first area in the memory 602; and when the integrated circuit 603 receives the right-eye data, the received data is stored in the second area in the memory 602. Here, the switching unit 653 is, for example, DMAC (Direct Memory Access Controller). FIG. 91 is a conceptual diagram showing the switching unit 653 and the peripheral when the switching unit 653 is DMAC. The DMAC, under the control of the main control unit 606, transmits the data received by the device stream interface and the data storage destination address to the memory control unit 609. More specifically, the DMAC switches the output destination (storage destination) depending on the received data, by transmitting Address 1 (the first storage area) to the memory control unit 609 when the device stream interface receives the left-eye data, and transmitting Address 2 (the second storage area) to the memory control unit 609 when the device stream interface receives the right-eye data. The memory control unit 609 stores data into the memory 602 in accordance with the storage destination address sent from the DMAC. Note that a dedicated circuit for controlling the switching unit 653 may be provided, instead of the main control unit 606.

In the above description, the device/stream interface unit 651, demultiplexing unit 652, and switching unit 653 are explained as a typical structure of the stream processing unit 605. However, the stream processing unit 605 may further include an encryption engine unit for decrypting received encrypted data, key data or the like, a secure management unit for controlling the execution of a device authentication protocol between the medium and the playback device and for holding a secret key, and a controller for the direct memory access. In the above, it has been explained that, when the data received from the medium is stored into the memory 602, the switching unit 653 switches the storage destination depending on whether the received data is left-eye data or right-eye data. However, not limited to this, the data received from the medium may be temporarily stored into the memory 602, and then, when the data is to be transferred to the demultiplexing unit 652, the data may be separated into the left-eye data and the right-eye data.

FIG. 92 is a functional block diagram showing a typical structure of the AV output unit 608. The AV output unit 608 includes an image superimposing unit 681, a video output format converting unit 682, and an audio/video output interface unit 683.

The image superimposing unit 681 superimposes the decoded video-base data. More specifically, the image superimposing unit 681 superimposes the PG (subtitle) and the IG (menu) onto the left-view video data or the right-view video data in units of pictures. A model of the image superimposing unit 681 is, for example, Embodiment 11 and FIG. 92.

The image superimposing unit 681 superimposes the left-view plane and graphics plane, and right-view plane and left-view plane. FIG. 94 shows relationships between areas in the memory 602 and each plane in the image superimposing process. The memory 602 includes areas (a left-view plane data storage area, a right-view plane data storage area, and a graphics plane data storage area) for storing data that has been decoded and is to be rendered in each plane. It should be noted here that the planes may be areas in the memory 602 or may be virtual spaces. The memory 602 further includes a data storage area for storing data after image superimposition. FIGS. 95 and 96 are conceptual diagrams of image superimposition. For the sake of convenience, the following description presumes that the image superimposing process is performed in the one-plane offset mode in which one graphics plane is used, and when the graphics plane is superimposed with the left-view plane, an offset of "+X" is applied to the graphics plane, and when the graphics plane is superimposed with the right-view plane, an offset of "−X" is applied. Note however that two graphics planes may be prepared for the superimposing process, and the graphics planes may be superimposed with the left-view plane and the right-view plane, respectively, with respective offset values applied thereto. FIG. 95 shows that the graphics plane having been translated rightward on paper by the predetermined offset value is superimposed with the left-view plane. FIG. 96 shows that the graphics plane having been translated leftward on paper by the predetermined offset value is superimposed with the right-view plane. As shown in these figures, pixels corresponding to each other, being positioned at the same coordinates in the horizontal direction on paper, are superimposed with each other, and the data after the superimposition is stored into the data storage area for storing data after image superimposition in the memory 602. Note that, as described earlier, the offset values to be applied to the graphics plane are included in the right-view video stream (sub-view video stream) or the playlist. FIG. 97 is a conceptual diagram showing another method of image superimposing. According to this method, the memory 602 further includes post-offset-graphics plane data storage areas (for left-view superimposition and right-view superimposition), the data to be superimposed with the left-view plane and the right-view plane is prepared in advance in the memory 602, the image superimposing unit 681 reads out necessary data from the memory 602 and superimposes the read data, and stores the data after the superimposition into the data storage area for storing data after image superimposition in the memory 602. FIG. 98 is a conceptual diagram concerning superimposition of the text subtitle (different from PG/IG). As described earlier, the text subtitle has been multiplexed in the text subtitle stream. The text subtitle is rendered in the graphics plane and then superimposed. For the superimposing with the left-view plane and the right-view plane, the text subtitle is rendered in the graphics plane by being shifted by respective offset values, and the graphics planes are superimposed with the left-view plane and the right-view plane, respectively. Note that as shown in FIG. 98, the memory 602 further includes a text-subtitle plane data storage area.

The video output format converting unit 682 performs the following processes and the like as necessary: the resize process for enlarging or reducing the decoded video-base data; the IP conversion process for converting the scanning method from the progressive method to the interlace method and vice versa; the noise reduction process for removing the noise; and the frame rate conversion process for converting the frame rate.

The audio/video output interface unit 683 encodes, in accordance with the data transmission format, the video-base data, which has been subjected to the image superimposing and the format conversion, and the decoded audio-base data. Note that, as will be described later, the audio/video output interface unit 683 may be provided outside the integrated circuit 603.

FIG. 93 is an example structure showing the AV output unit 608, or the data output part of the playback device in more detail. The integrated circuit 603 of the present embodiment and the playback device support a plurality of data transmission formats for the video-base data and the audio-base data. The audio/video output interface unit 683 shown in FIG. 92 corresponds to an analog video output interface unit 683a, a digital video/audio output interface unit 683b, and an analog audio output interface unit 683c.

The analog video output interface unit 683a converts and encodes the video-base data, which has been subjected to the image superimposing process and the output format conversion process, into the analog video signal format, and outputs the conversion result. The analog video output interface unit 683a is, for example: a composite video encoder that supports any of the NTSC method, PAL method, and SECAM method; an encoder for the S image signal (Y/C separation); an encoder for the component image signal; or a DAC (D/A converter).

The digital video/audio output interface unit 683b overlays the decoded audio-base data with the video-base data having been subjected to the image superimposing and the output format conversion, encrypts the overlaid data, encodes in accordance with the data transmission standard, and outputs the encoded data. The digital video/audio output interface unit 683b is, for example, HDMI (High-Definition Multimedia Interface).

The analog audio output interface unit 683c, being an audio DAC or the like, performs the D/A conversion onto the decoded audio-base data, and outputs analog audio data.

The transmission format of the video-base data and audio-base data may be switched depending on the data receiving device (data input terminal) supported by the display device/speaker, or may be switched in accordance with the selection by the user. Furthermore, it is possible to transmit a plurality of pieces of data corresponding to the same content in parallel by a plurality of transmission formats, not limited to the transmission by a single transmission format.

In the above description, the image superimposing unit 681, video output format converting unit 682, and audio/video output interface unit 683 are explained as a typical structure of the AV output unit 608. However, the AV output unit 608 may further include, for example, a graphics engine unit for performing the graphics processing such as the filter process, image overlaying, curvature drawing, and 3D display.

This completes the description of the structure of the playback device in the present embodiment. Note that all of the functional blocks included in the integrated circuit 603 may not be embedded, and that, conversely, the memory 602 shown in FIG. 89 may be embedded in the integrated circuit 603. Also, in the present embodiment, the main control unit 606 and the signal processing unit 607 have been described as different functional blocks. However, not limited to this, the main control unit 606 may perform a part of the process performed by the signal processing unit 607.

The route of the control buses and the data buses in the integrated circuit 603 is designed in an arbitrary manner depending on the processing procedure of each processing block or the contents of the processing. However, the data buses may be arranged so that the processing blocks are connected directly as shown in FIG. 99, or maybe arranged so that the processing blocks are connected via the memory 602 (the memory control unit 609) as shown in FIG. 100.

The integrated circuit 603 may be a multi-chip module that is generated by enclosing a plurality of chips into one package, and its outer appearance is one LSI. It is also possible to realize the system LSI by using the FPGA (Field Programmable Gate Array) that can be re-programmed after the manufacturing of the LSI, or the reconfigurable processor in which the connection and setting of the circuit cells inside the LSI can be reconfigured.

Next, the operation of the playback device having the above-described structure will be explained.

FIG. 101 is a flowchart showing a playback procedure in which data is received (read) from the medium, is decoded, and is output as a video signal and an audio signal.

S601: data is received (read) from the medium (the interface unit 601→the stream processing unit 605).

S602: the data received (read) in S601 is separated into various data (the video-base data and the audio-base data) (the stream processing unit 605).

S603: the various data generated by the separation in S602 are decoded by the appropriate format (the signal processing unit 607).

S604: among the various data decoded in S603, the video-base data is subjected to the superimposing process (the AV output unit 608).

S605: the video-base data and the audio-base data having been subjected to the processes in S602 through S604 are output (the AV output unit 608).

FIG. 102 is a flowchart showing a detailed playback procedure. Each of the operations and processes is performed under the control of the main control unit 606.

S701: the device/stream interface unit 651 of the stream processing unit 605 receives (reads out) data (playlist, clip information, etc.) which is other than the data stored in the medium to be played back and is necessary for playback of the data, via the interface unit 601, and stores the received data into the memory 602 (the interface unit 601, the device/stream interface unit 651, the memory control unit 609, the memory 602).

S702: the main control unit 606 recognizes the compression method of the video and audio data stored in the medium by referring to the stream attribute included in the received clip information, and initializes the signal processing unit 607 so that the corresponding decode processing can be performed (the main control unit 606).

S703: the device/stream interface unit 651 of the stream processing unit 605 receives (reads out) the data of video/audio that is to be played back, from the medium via the interface unit 601, and stores the received data into the memory 602 via the stream processing unit 605 and the memory control unit 609. Note that the data is received (read) in units of Extents, and the main control unit 606 controls the switching unit 653 so that, when the left-eye data is received (read), the received data is stored in the first area; and when the right-eye data is received (read), the received data is stored in the second area, and the switching unit 653 switches the data output destination (storage destination) (the interface unit 601, the device/stream interface unit 651, the main control unit 606, the switching unit 653, the memory control unit 609, the memory 602).

S704: the data stored in the memory 602 is transferred to the demultiplexing unit 652 of the stream processing unit 605, and the demultiplexing unit 652 identifies the video-base data (main video, sub-video), PG (subtitle), IG (menu), and audio-base data (audio, sub-audio) based on the PIDs included in the source packets constituting the stream data, and transfers the data to each corresponding decoder in the signal processing unit 607 in units of TS packets (the demultiplexing unit 652).

S705: each in the signal processing unit 607 performs the decode process onto the transferred TS packets by the appropriate method (the signal processing unit 607).

S706: among the video-base data decoded by the signal processing unit 607, the data corresponding to the left-view video stream and the right-view video stream is resized based on the display device (the video output format converting unit 682).

S707: the PG (subtitle) and IG (menu) are superimposed onto the video stream resized in S706 (the image superimposing unit 681).

S708: the IP conversion, which is a conversion of the scanning method, is performed onto the video data after the superimposing in S707 (the video output format converting unit 682).

S709: the encoding, D/A conversion and the like are performed onto video-base data and the audio-base data having been subjected to the above-described processes, based on the data output format of the display device/speaker or the data transmission format for transmission to the display device/speaker. The composite video signal, the S image signal, the component image signal and the like are supported for the analog output of the video-base data. Also, HDMI is supported for the digital output of the video-base data and the audio-base data. (the audio/video output interface unit 683)

S710: the video-base data and the audio-base data having been subjected to the process in S709 is output and transmitted to the display device/speaker (the audio/video output interface unit 683, the display device/speaker).

This completes the description of the operation procedure of the playback device in the present embodiment. Note that the result of process may be temporarily stored into the memory 602 each time a process is completed. Also, in the above operation procedure, the video output format converting unit 682 performs the resize process and the IP conversion process. However, not limited to this, the processes may be omitted as necessary, or other processes (noise reduction process, frame rate conversion process, etc.) may be performed. Furthermore, the processing procedures may be changed if possible.

(Supplementary Notes)

Up to now, the present invention has been described through the best embodiments that the Applicant recognize as of now. However, further improvements or changes can be added regarding the following technical topics. Whether to select any of the embodiments or the improvements and changes to implement the invention is optional and may be determined by the subjectivity of the implementer.

(Assignment of a Plurality of Offset Sequences)

As described above, the depth of each macro block constituting an image may be stored in a different one of a plurality of offset sequences. However, this structure is merely one example.

As another example, a plurality of pieces of depth information indicating depths that differ from each other in order by "+10" or "−10" may be set as plane offset direction information of each offset sequence and as plane offset shift values.

(Correspondence Between Files)

In Embodiment 3, as a specific example of association using the identification information, the identification number of the right view is generated by adding "1" to the identification number of the left view. However, not limited to this, the identification number of the right view may be generated by adding "10000" to the identification number of the left view.

When a coupling method is to be realized to associate the files by the file names, the playback device side requires a mechanism for detecting the coupled files, and a mechanism for detecting the file based on a predetermined rule, and playing back files that are not referenced by the playlist. The 3D supporting playback devices require the above-described mechanisms when they use any of such coupling methods. However, with this structure, there is no need to use different types of playlists to play back both the 2D and 3D images, and it is possible to make the playlist operate safely in the conventional 2D playback devices that are already prevalent.

As in the Depth method in which the grayscale is used, when the stereoscopic image cannot be played back only with one stream, it is necessary to distinguish the stream by assigning a different extension thereto to prevent it from being played back singly by the device by mistake. In connection with the identification of the file that cannot be played back singly, it is necessary to prevent the user from being confused when the 3D file is referenced from an existing device via DLNA (Digital Living Network Alliance). It is possible to realize the pairing information only by the file names by assigning the same file number and different extensions.

(Stereoscopic Viewing Methods)

According to the parallax image method used in Embodiment 1, the left-eye and right-eye images are displayed alternately in the time axis direction. As a result, for example, when 24 images are displayed per second in a normal two dimensional movie, 48 images, for the combination of the left-eye and right-eye images, should be displayed per second in a three dimensional movie. Accordingly, this method is suitable for display devices that rewrite each screen at relatively high speeds. The stereoscopic viewing using the parallax images is used in the play equipment of the amusement parks, and has been established technologically. Therefore, it may be said that this method is closest to the practical use in the homes. There have been proposed various other technologies such as the two-color separation method, as the methods for realizing stereoscopic viewing using the parallax images. In the embodiments, the sequential segregation method and the polarization glasses method have been used as examples. However, the present invention is not limited to these methods as far as the parallax images are used.

Also, not limited to the lenticular lens, the television 300 may use other devices, such as the liquid crystal element, that have the same function as the lenticular lens. It is further possible to realize the stereoscopic viewing by providing a vertical polarization filter for the left-eye pixels, and providing a horizontal polarization filter for the right-eye pixels, and causing the viewer to view the screen through a pair of polarization glasses that is provided with a vertical polarization filter for the left eye and a horizontal polarization filter for the right eye.

(Target of Application of Left View and Right View)

The left view and right view may be prepared not only to be applied to the video stream representing the main story, but also to be applied to the thumbnail images. As is the case with the video stream, the 2D playback device displays conventional 2D thumbnail images, but the 3D playback device outputs a left-eye thumbnail image and a right-eye thumbnail image prepared for the 3D, in compliance with a 3D display system.

Similarly, the left view and right view may be applied to menu images, thumbnail images of each scene for chapter search, and reduced images of each scene.

(Embodiments of Program)

The application program described in each embodiment of the present invention can be produced as follows. First, the software developer writes, using a programming language, a source program that achieves each flowchart and functional component. In this writing, the software developer uses the class structure, variables, array variables, calls to external functions, and so on, which conform to the sentence structure of the programming language he/she uses.

The written source program is sent to the compiler as files. The compiler translates the source program and generates an object program.

The translation performed by the compiler includes processes such as the syntax analysis, optimization, resource allocation, and code generation. In the syntax analysis, the characters and phrases, sentence structure, and meaning of the source program are analyzed and the source program is converted into an intermediate program. In the optimization, the intermediate program is subjected to such processes as the basic block setting, control flow analysis, and data flow analysis. In the resource allocation, to adapt to the instruction sets of the target processor, the variables in the intermediate program are allocated to the register or memory of the target processor. In the code generation, each intermediate instruction in the intermediate program is converted into a program code, and an object program is obtained.

The generated object program is composed of one or more program codes that cause the computer to execute each step in the flowchart or each procedure of the functional components. There are various types of program codes such as the native code of the processor, and Java™ byte code. There are also various forms of realizing the steps of the program codes. For example, when each step can be realized by using an external function, the call statements for calling the external functions are used as the program codes. Program codes that realize one step may belong to different object programs. In the RISC processor in which the types of instructions are limited, each step of flowcharts may be realized by combining arithmetic operation instructions, logical operation instructions, branch instructions and the like.

After the object program is generated, the programmer activates a linker. The linker allocates the memory spaces to the object programs and the related library programs, and links them together to generate a load module. The generated load module is based on the presumption that it is read by the computer and causes the computer to execute the procedures indicated in the flowcharts and the procedures of the functional components. The program described here may be recorded on a computer-readable recording medium, and may be provided to the user in this form.

(Playback of Optical Disc)

The BD-ROM drive is equipped with an optical head that includes a semiconductor laser, collimated lens, beam splitter, objective lens, collecting lens, and light detector. The light beams emitted from the semiconductor laser pass through the collimated lens, beam splitter, and objective lens, and are collected on the information surface of the optical disc.

The collected light beams are reflected/diffracted on the optical disc, pass through the objective lens, beam splitter, and collimated lens, and are collected in the light detector. A playback signal is generated depending on the amount of light collected in the light detector.

(Variations of Recording Medium)

The recording medium described in each Embodiment indicates a general package medium as a whole, including the optical disc and the semiconductor memory card. In each Embodiment, it is presumed, as one example, that the recording medium is an optical disc in which necessary data is preliminarily recorded (for example, an existing read-only optical disc such as the BD-ROM or DVD-ROM). However, the present invention is not limited to this. For example, the present invention may be implemented as follows: (i) obtain a 3D content that includes the data necessary for implementing the present invention and is distributed by a broadcast or via a network; (ii) record the 3D content into a writable optical disc (for example, an existing writable optical disc such as the BD-RE, DVD-RAM) by using a terminal device having the function of writing into an optical disc (the function may be embedded in a playback device, or the device may not necessarily be a playback device); and (iii) apply the optical disc recorded with the 3D content to the playback device of the present invention.

(Embodiments of Semiconductor Memory Card Recording Device and Playback Device)

The following describes embodiments of the recording device for recording the data structure of each Embodiment into a semiconductor memory, and the playback device for playing back thereof.

First, the mechanism for protecting the copyright of the data recorded on the BD-ROM will be explained, as a presupposed technology.

Some of the data recorded on the BD-ROM may have been encrypted as necessitated in view of the confidentiality of the data.

For example, the BD-ROM may contain, as encrypted data, the data corresponding to a video stream, an audio stream, or a stream including these.

The following describes decryption of the encrypted data among the data recorded on the BD-ROM.

The semiconductor memory card playback device preliminarily stores data (for example, a device key) that corresponds to a key that is necessary for decrypting the encrypted data recorded on the BD-ROM.

On the other hand, the BD-ROM is preliminarily recorded with (i) data (for example, a medium key block (MKB) corresponding to the above-mentioned device key) that corresponds to a key that is necessary for decrypting the encrypted data, and (ii) encrypted data (for example, an encrypted title key corresponding to the above-mentioned device key and MKB) that is generated by encrypting the key itself that is necessary for decrypting the encrypted data. Note here that the device key, MKB, and encrypted title key are treated as a set, and are further associated with an identifier (for example, a volume ID) written in an area (called BCA) of the BD-ROM that cannot be copied in general. It is structured such that encrypted data cannot be decrypted if these elements are combined incorrectly. Only if the combination is correct, a key (for example, a title key that is obtained by decrypting the encrypted title key by using the above-mentioned device key, MKB, and volume ID) that is necessary for decrypting the encrypted data can be derived. The encrypted data can be decrypted by using the derived key.

When a playback device attempts to play back a BD-ROM loaded in the device, it cannot play back the encrypted data unless the device itself has a device key that makes a pair (or corresponds to) the encrypted title key and MKB recorded on the BD-ROM. This is because the key (title key) that is necessary for decrypting the encrypted data has been encrypted, and is recorded on the BD-ROM as the encrypted title key, and the key that is necessary for decrypting the encrypted data cannot be derived if the combination of the MKB and the device key is not correct.

Conversely, when the combination of the encrypted title key, MKB, device key, and volume ID is correct, the video stream and audio stream are decoded by the decoder with use of the above-mentioned key (for example, a title key that is obtained by decrypting the encrypted title key by using the device key, MKB, and volume ID) that is necessary for decrypting the encrypted data. The playback device is structured in this way.

This completes the description of the mechanism for protecting the copyright of the data recorded on the BD-ROM. It should be noted here that this mechanism is not limited to the BD-ROM, but may be applicable to, for example, a readable/writable semiconductor memory (such as a portable semiconductor memory such as the SD card) for the implementation.

Next, the playback procedure in the semiconductor memory card playback device will be described. In the case in which the playback device plays back an optical disc, it is structured to read data via an optical disc drive, for example. On the other hand, in the case in which the playback device plays back a semiconductor memory card, it is structured to read data via an interface for reading the data from the semiconductor memory card.

More specifically, the playback device may be structured such that, when a semiconductor memory card is inserted into a slot (not illustrated) provided in the playback device, the playback device and the semiconductor memory card are electrically connected with each other via the semiconductor memory card interface, and the playback device reads out data from the semiconductor memory card via the semiconductor memory card interface.

(Embodiments of Receiving Device)

The playback device explained in each Embodiment may be realized as a terminal device that receives data (distribution data) that corresponds to the data explained in each Embodiment from a distribution server for an electronic distribution service, and records the received data into a semiconductor memory card.

Such a terminal device may be realized by structuring the playback device explained in each Embodiment so as to perform such operations, or may be realized as a dedicated terminal device that is different from the playback device explained in each Embodiment and stores the distribution data into a semiconductor memory card. Here, a case where the playback device is used will be explained. Also, in this explanation, an SD card is used as the recording-destination semiconductor memory.

When the playback device is to record distribution data into an SD memory card inserted in a slot provided therein, the playback device first send requests a distribution server (not illustrated) that stores distribution data, to transmit the distribution data. In so doing, the playback device reads out identification information for uniquely identifying the inserted SD memory card (for example, identification information uniquely assigned to each SD memory card, more specifically, the serial number or the like of the SD memory card), from the SD memory card, and transmits the read identification information to the distribution server together with the distribution request.

The identification information for uniquely identifying the SD memory card corresponds to, for example, the volume ID having been described earlier.

On the other hand, the distribution server stores necessary data (for example, video stream, audio stream and the like) in an encrypted state such that the necessary data can be decrypted by using a predetermined key (for example, a title key).

The distribution server, for example, holds a private key so that it can dynamically generate different pieces of public key information respectively in correspondence with identification numbers uniquely assigned to each semiconductor memory card.

Also, the distribution server is structured to be able to encrypt the key (title key) itself that is necessary for decrypting the encrypted data (that is to say, the distribution server is structured to be able to generate an encrypted title key).

The generated public key information includes, for example, information corresponding to the above-described MKB, volume ID, and encrypted title key. With this structure, when, for example, a combination of the identification number of the semiconductor memory card, the public key contained in the public key information which will be explained later, and the device key that is preliminarily recorded in the playback device, is correct, a key (for example, a title key that is obtained by decrypting the encrypted title key by using the device key, the MKB, and the identification number of the semiconductor memory) necessary for decrypting the encrypted data is obtained, and the encrypted data is decrypted by using the obtained necessary key (title key).

Following this, the playback device records the received piece of public key information and distribution data into a recording area of the semiconductor memory card being inserted in the slot thereof.

Next, a description is given of an example of the method for decrypting and playing back the encrypted data among the data contained in the public key information and distribution data recorded in the recording area of the semiconductor memory card.

The received public key information stores, for example, a public key (for example, the above-described MKB and encrypted title key), signature information, identification number of the semiconductor memory card, and device list being information regarding devices to be invalidated.

The signature information includes, for example, a hash value of the public key information.

The device list is, for example, information for identifying the devices that might be played back in an unauthorized manner. The information, for example, is used to uniquely identify the devices, parts of the devices, and functions (programs) that might be played back in an unauthorized manner, and is composed of, for example, the device key and the identification number of the playback device that are preliminarily recorded in the playback device, and the identification number of the decoder provided in the playback device.

The following describes playing back the encrypted data among the distribution data recorded in the recording area of the semiconductor memory card.

First, it is checked whether or not the decryption key itself can be used, before the encrypted data is decrypted by using the decryption key.

More specifically, the following checks are conducted.
(1) A check on whether the identification information of the semiconductor memory card contained in the public key information matches the identification number of the semiconductor memory card preliminarily stored in the semiconductor memory card.
(2) A check on whether the hash value of the public key information calculated in the playback device matches the hash value included in the signature information.
(3) A check, based on the information included in the device list, on whether the playback device to perform the playback is authentic (for example, the device key shown in the device list included in the public key information matches the device key preliminarily stored in the playback device).

These checks may be performed in any order.

After the above described checks (1) through (3), the playback device performs a control not to decrypt the encrypted data when any of the following conditions is satisfied: (i) the identification information of the semiconductor memory card contained in the public key information does not match the identification number of the semiconductor memory card preliminarily stored in the semiconductor memory card; (ii) the hash value of the public key information calculated in the playback device does not match the hash value included in the signature information; and (iii) the playback device to perform the playback is not authentic.

On the other hand, when all of the conditions: (i) the identification information of the semiconductor memory card contained in the public key information matches the identification number of the semiconductor memory card preliminarily stored in the semiconductor memory card; (ii) the hash value of the public key information calculated in the playback device matches the hash value included in the signature information; and (iii) the playback device to perform the playback is authentic, are satisfied, it is judged that the combination of the identification number of the semiconductor memory, the public key contained in the public key information, and the device key that is preliminarily recorded in the playback device, is correct, and the encrypted data is decrypted by using the key necessary for the decryption (the title key that is obtained by decrypting the encrypted title key by using the device key, the MKB, and the identification number of the semiconductor memory).

When the encrypted data is, for example, a video stream and an audio stream, the video decoder decrypts (decodes) the video stream by using the above-described key necessary for the decryption (the title key that is obtained by decrypting the encrypted title key), and the audio decoder decrypts (decodes) the audio stream by using the above-described key necessary for the decryption.

With such a structure, when devices, parts of the devices, and functions (programs) that might be used in an unauthorized manner are known at the time of the electronic distribution, a device list showing such devices and the like may be distributed. This enables the playback device having received the list to inhibit the decryption with use of the public key information (public key itself) when the playback device includes anything shown in the list. Therefore, even if the combination of the identification number of the semiconductor memory, the public key itself contained in the public key information, and the device key that is preliminarily recorded in the playback device, is correct, a control is performed not to decrypt the encrypted data. This makes it possible to prevent the distribution data from being used by an unauthentic device.

It is preferable that the identifier of the semiconductor memory card that is preliminarily recorded in the semiconductor memory card is stored in a highly secure recording area. This is because, when the identification number (for example, the serial number of the SD memory card) that is preliminarily recorded in the semiconductor memory card is tampered with, unauthorized copying becomes easy. More specifically, unique, although different identification numbers are respectively assigned to semiconductor memory cards, if the identification numbers are tampered with to be the same, the above-described judgment in (1) does not make sense, and as many semiconductor memory cards as tamperings may be copied in an unauthorized manner.

For this reason, it is preferable that information such as the identification number of the semiconductor memory card is stored in a highly secure recording area.

To realize this, the semiconductor memory card, for example, may have a structure in which a recording area for recording highly confidential data such as the identifier of the semiconductor memory card (hereinafter, the recording area is referred to as a second recording area) is provided separately from a recording area for recording regular data (hereinafter, the recording area is referred to as a first recording area), a control circuit for controlling accesses to the second recording area is provided, and the second recording area is accessible only through the control circuit.

For example, data may encrypted so that encrypted data is recorded in the second recording area, and the control circuit may be embedded with a circuit for decrypting the encrypted data. In this structure, when an access is made to the second recording area, the control circuit decrypts the encrypted data and returns decrypted data. As another example, the control circuit may hold information indicating the location where the data is stored in the second recording area, and when an access is made to the second recording area, the control circuit identifies the corresponding storage location of the data, and returns data that is read from the identified storage location.

An application, which is running on the playback device and is to record data onto the semiconductor memory card with use of the electronic distribution, issues, to the control circuit via a memory card interface, an access request requesting to access the data (for example, the identification number of the semiconductor memory card) recorded in the second recording area. Upon receiving the request, the control circuit reads out the data from the second recording area and returns the data to the application running on the playback device. It sends the identification number of the semiconductor memory card and requests the distribution server to distribute the data such as the public key information, and corresponding distribution data. The public key information and corresponding distribution data that are sent from the distribution server are recorded into the first recording area.

Also, it is preferable that the application, which is running on the playback device and is to record data onto the semiconductor memory card with use of the electronic distribution, preliminarily checks whether or not the application is tampered with before it issues, to the control circuit via a memory card interface, an access request requesting to access the data (for example, the identification number of the semiconductor memory card) recorded in the second recording area. For checking this, an existing digital certificate conforming to the X.509 standard, for example, may be used.

Also, the distribution data recorded in the first recording area of the semiconductor memory card may not necessarily be accessed via the control circuit provided in the semiconductor memory card.

INDUSTRIAL APPLICABILITY

The information recording medium of the present invention stores a 3D image, but can be played back in both 2D-image playback devices and 3D-image playback devices. This makes it possible to distribute movie contents such as movie titles storing 3D images, without causing the consumers to be conscious about the compatibility. This activates the movie market and commercial device market. Accordingly, the recording medium and the playback device of the present invention have high usability in the movie industry and commercial device industry.

REFERENCE SIGNS LIST

100 recording medium
200 playback device
300 display device
400 3D glasses
500 remote control

The invention claimed is:

1. A receiving device for receiving data transmitted via a broadcast or via a network,
wherein the data includes a main-view video stream, a sub-view video stream, a graphics stream, and metadata,
the main-view video stream includes picture data of a main view of a stereoscopic image,
the sub-view video stream includes picture data of a sub view of the stereoscopic image,
the graphics stream includes graphics data,
the metadata is control information that defines an offset control for each of a plurality of rectangular areas that are obtained by dividing a screen, the offset control applying offsets of leftward and rightward directions to horizontal coordinates of a group of pixels constituting a rectangular area, when the graphics data is overlaid with the picture data of the main view and the picture data of the sub view, and
the receiving device comprises:
a video decoder operable to obtain the picture data of the main view and the picture data of the sub view by decoding the main-view video stream and the sub-view video stream;
a graphics decoder operable to obtain the graphics data by decoding the graphics stream; and
an overlay unit operable to overlay the graphics data with the picture data of the main view and the picture data of the sub view by applying offsets of leftward and rightward directions to the horizontal coordinates of the group of pixels constituting each rectangular area in accordance with the control information.

2. The receiving device of claim 1, wherein
the metadata is included in the sub-view video stream.

3. The receiving device of claim 2, wherein
the control information further includes information that defines directions of the offsets to be applied to each rectangular area, and
the overlay unit overlays the graphics data with the picture data of the main view and the picture data of the sub view by applying offsets of leftward and rightward directions to the horizontal coordinates in the graphics data in accordance with the control information.

4. The receiving device of claim 3, wherein each of the picture data included in the main-view video stream and the picture data included in the sub-view video stream represents a plurality of groups of pictures, each group of pictures in the plurality of groups of pictures constitutes a plurality of frames, and the control information is a plurality of pieces of control information held as parameter sequences in one-to-one correspondence with the plurality of frames, and the overlay unit overlays the graphics data with the picture data of the main view and the picture data of the sub view by applying offsets of leftward and rightward directions to the horizontal coordinates of the group of pixels constituting each rectangular area in accordance with the control information.

* * * * *